US008799775B2

(12) United States Patent
Weeldreyer et al.

(10) Patent No.: US 8,799,775 B2
(45) Date of Patent: Aug. 5, 2014

(54) DEVICE, METHOD, AND GRAPHICAL USER INTERFACE FOR DISPLAYING EMPHASIS ANIMATIONS FOR AN ELECTRONIC DOCUMENT IN A PRESENTATION MODE

(75) Inventors: Christopher Douglas Weeldreyer, San Carlos, CA (US); Peter William Rapp, Pittsburgh, PA (US); Jay Christopher Capela, Santa Cruz, CA (US); Ted Stephen Boda, San Jose, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 12/725,365

(22) Filed: Mar. 16, 2010

(65) Prior Publication Data

US 2011/0078560 A1   Mar. 31, 2011

Related U.S. Application Data

(60) Provisional application No. 61/246,091, filed on Sep. 25, 2009.

(51) Int. Cl.
*G06F 3/01* (2006.01)
*G06F 3/0488* (2013.01)
*G06F 3/0481* (2013.01)

(52) U.S. Cl.
CPC ............ *G06F 3/0488* (2013.01); *G06F 3/0481* (2013.01); *G06F 3/04883* (2013.01)
USPC .......................................... 715/255; 715/730

(58) Field of Classification Search
CPC .. G06F 3/0481; G06F 3/0488; G06F 3/04883
USPC .......................................... 715/255, 730, 863
See application file for complete search history.

(56) References Cited

U.S. PATENT DOCUMENTS

| | | | | |
|---|---|---|---|---|
| 5,917,480 | A | * | 6/1999 | Tafoya et al. ................. 715/732 |
| 6,008,807 | A | | 12/1999 | Bretschneider et al. ...... 345/339 |
| 6,256,649 | B1 | * | 7/2001 | Mackinlay et al. ........... 715/212 |
| 6,259,436 | B1 | * | 7/2001 | Moon et al. .................... 345/173 |
| 6,330,004 | B1 | * | 12/2001 | Matsuzawa et al. .......... 715/723 |
| 6,417,855 | B1 | * | 7/2002 | Yonts ............................. 345/473 |
| 6,433,801 | B1 | * | 8/2002 | Moon et al. .................... 715/840 |
| 6,833,827 | B2 | * | 12/2004 | Lui et al. ........................ 345/173 |
| 6,904,570 | B2 | * | 6/2005 | Foote et al. .................... 715/863 |
| 7,058,891 | B2 | | 6/2006 | O'Neal et al. ................. 715/730 |
| 7,184,028 | B2 | * | 2/2007 | Wu et al. ........................ 345/173 |
| 7,215,436 | B2 | * | 5/2007 | Hull et al. ..................... 358/1.15 |

(Continued)

OTHER PUBLICATIONS

Apple,"Keynote '08 User's Guide," © Apple Inc., 204 pages.

*Primary Examiner* — Stephen Hong
*Assistant Examiner* — Marshon Robinson
(74) *Attorney, Agent, or Firm* — Morrison & Foerster LLP

(57) ABSTRACT

A computing device with a display displays a first portion of an electronic document in a presentation mode of an electronic document authoring application. The first portion of the electronic document includes predefined activation regions for a plurality of presentation emphasis objects. While displaying the first portion of the electronic document the device detects a first input by a user on a respective predefined activation region for a first presentation emphasis object in the plurality of presentation emphasis objects. In response to detecting the first input on the respective predefined activation region for the first presentation emphasis object, the device: selects a first emphasis animation for the first presentation emphasis object based on the first input; displays the first emphasis animation; and displays the first presentation emphasis object.

30 Claims, 86 Drawing Sheets

(56) References Cited

U.S. PATENT DOCUMENTS

| | | | |
|---|---|---|---|
| 7,240,287 B2 | 7/2007 | Qureshi et al. | 715/730 |
| 7,299,424 B2 | 11/2007 | Jarrett et al. | |
| 7,571,384 B1* | 8/2009 | Webb | 715/268 |
| 7,737,996 B2* | 6/2010 | Gerhard et al. | 345/619 |
| 7,768,501 B1* | 8/2010 | Maddalozzo et al. | 345/173 |
| 2003/0038821 A1* | 2/2003 | Kraft | 345/629 |
| 2003/0063073 A1* | 4/2003 | Geaghan et al. | 345/173 |
| 2003/0090506 A1 | 5/2003 | Moore et al. | 345/730 |
| 2003/0110120 A1* | 6/2003 | Salehi | 705/37 |
| 2003/0160814 A1 | 8/2003 | Brown | 345/732 |
| 2003/0193484 A1* | 10/2003 | Lui et al. | 345/173 |
| 2004/0066422 A1* | 4/2004 | Chandane | 345/865 |
| 2004/0194014 A1* | 9/2004 | Anwar | 715/500 |
| 2004/0217944 A1* | 11/2004 | Kong | 345/173 |
| 2004/0244037 A1* | 12/2004 | Yamaguchi et al. | 725/37 |
| 2005/0024322 A1* | 2/2005 | Kupka | 345/156 |
| 2005/0024341 A1* | 2/2005 | Gillespie et al. | 345/173 |
| 2006/0007174 A1* | 1/2006 | Shen | 345/173 |
| 2006/0026535 A1* | 2/2006 | Hotelling et al. | 715/863 |
| 2006/0052885 A1* | 3/2006 | Kong | 700/84 |
| 2006/0064643 A1* | 3/2006 | Hariton | 715/751 |
| 2006/0069635 A1* | 3/2006 | Ram et al. | 705/37 |
| 2006/0075348 A1 | 4/2006 | Xu et al. | 715/730 |
| 2006/0212806 A1* | 9/2006 | Griffin et al. | 715/523 |
| 2006/0267957 A1* | 11/2006 | Kolmykov-Zotov et al. | 345/173 |
| 2007/0113201 A1* | 5/2007 | Bales et al. | 715/810 |
| 2007/0126741 A1* | 6/2007 | Gerhard et al. | 345/473 |
| 2007/0186158 A1* | 8/2007 | Kim et al. | 715/531 |
| 2007/0229476 A1* | 10/2007 | Huh | 345/173 |
| 2007/0268317 A1 | 11/2007 | Banay | |
| 2008/0094356 A1* | 4/2008 | Ording et al. | 345/157 |
| 2008/0165160 A1* | 7/2008 | Kocienda et al. | 345/175 |
| 2008/0276161 A1* | 11/2008 | Slavens | 715/213 |
| 2009/0077464 A1* | 3/2009 | Goldsmith et al. | 715/257 |
| 2009/0144651 A1* | 6/2009 | Sprang et al. | 715/800 |
| 2009/0144656 A1* | 6/2009 | Kwon et al. | 715/808 |
| 2009/0193366 A1* | 7/2009 | Davidson | 715/863 |
| 2009/0292989 A1* | 11/2009 | Matthews et al. | 715/702 |
| 2010/0031202 A1* | 2/2010 | Morris et al. | 715/863 |
| 2010/0269029 A1* | 10/2010 | Siegel et al. | 715/205 |

* cited by examiner

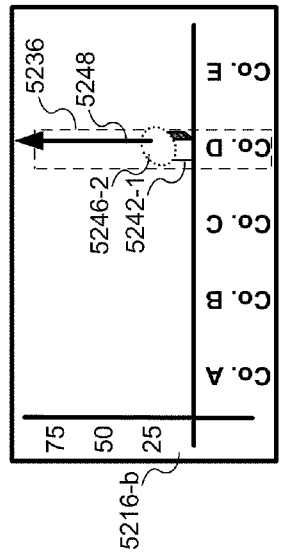
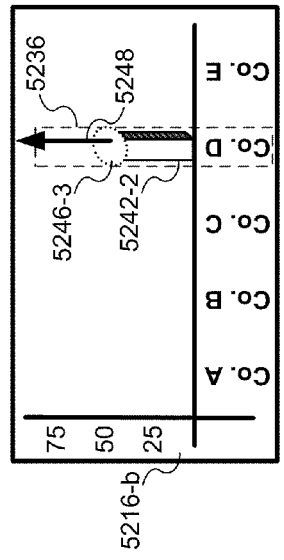
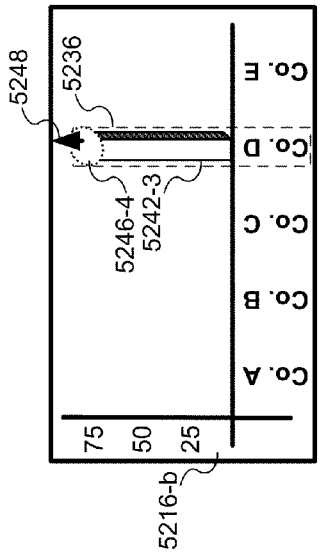
Figure 5OO-1
Figure 5OO-2
Figure 5OO-3
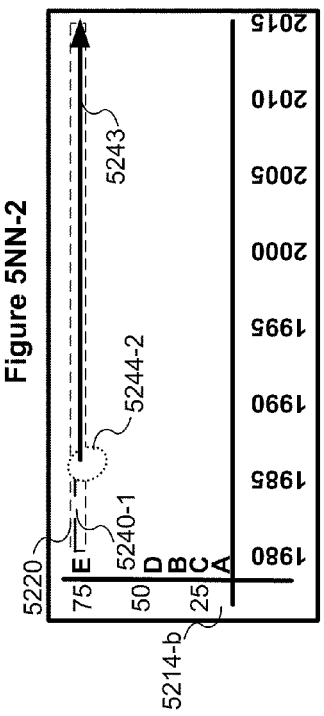
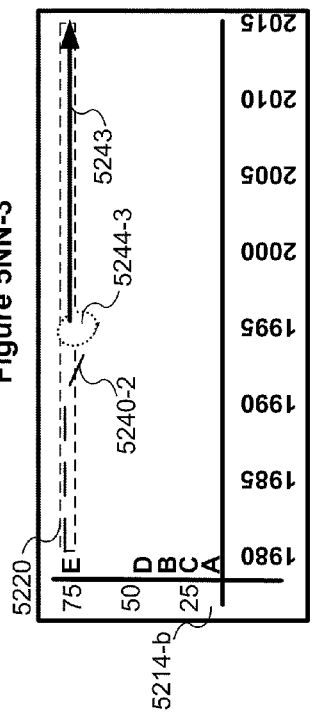
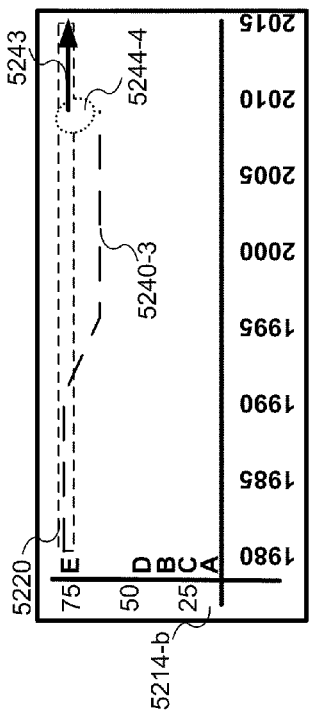
Figure 5NN-1
Figure 5NN-2
Figure 5NN-3

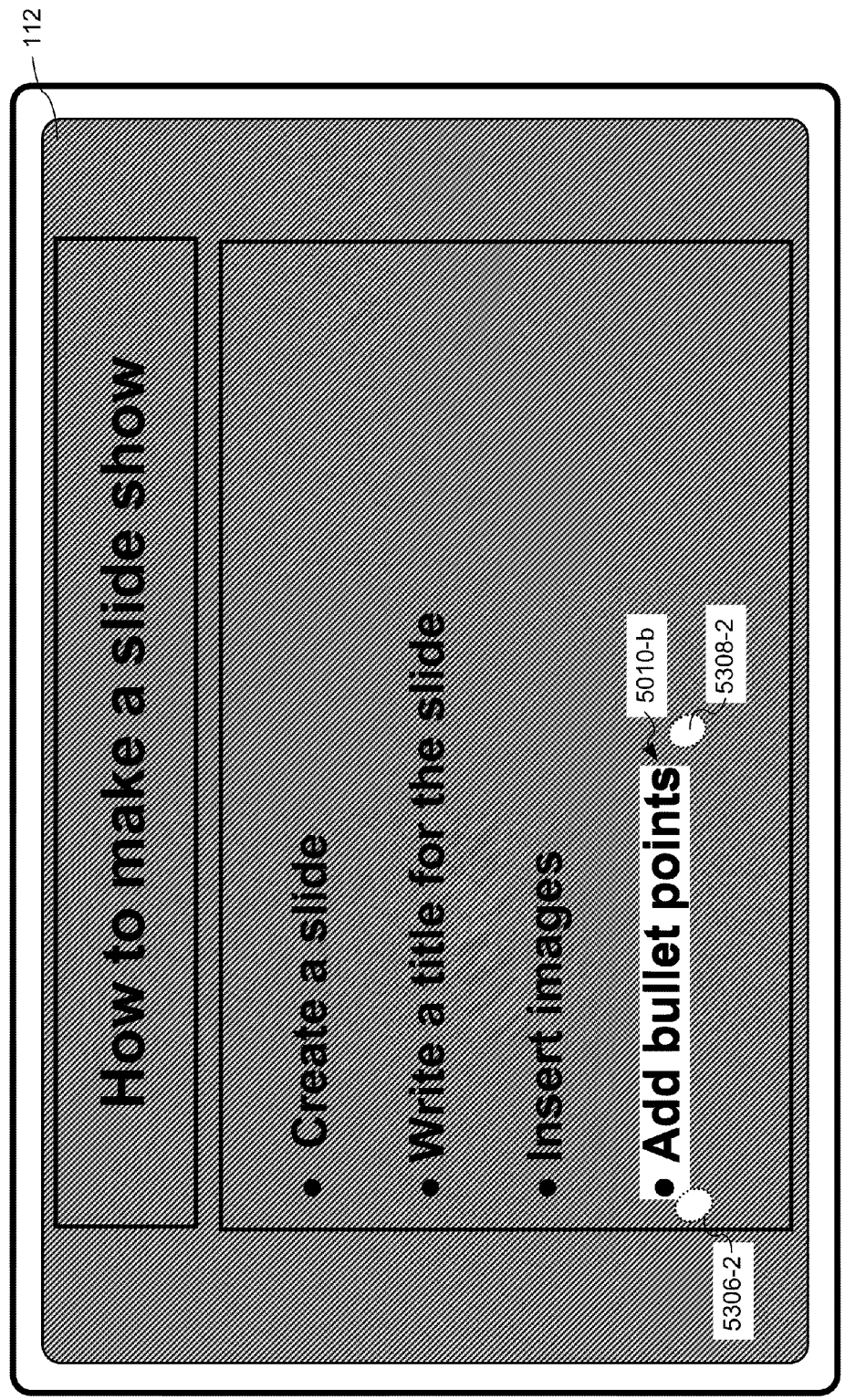
Figure 5AAA

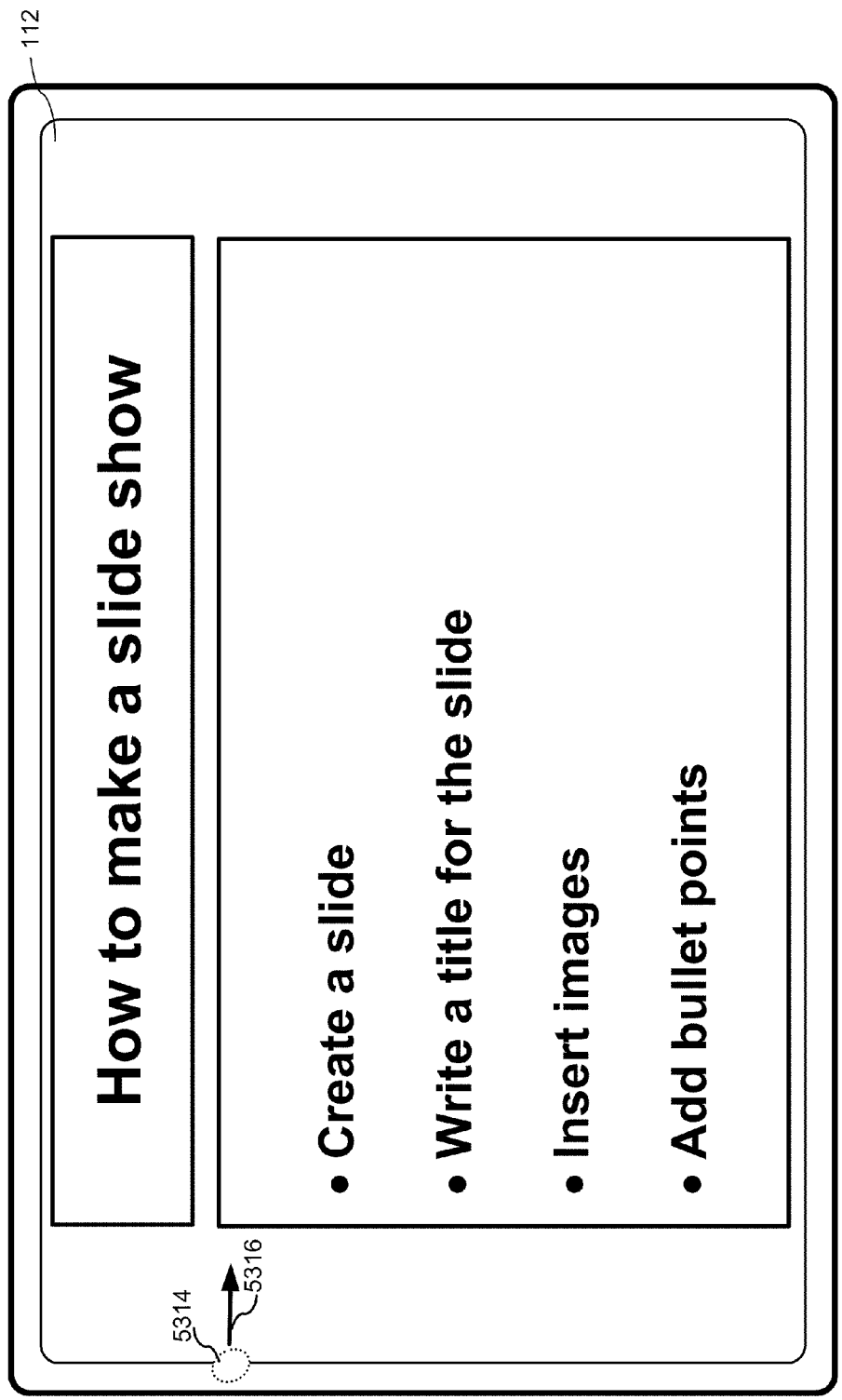
Figure 5BBBB

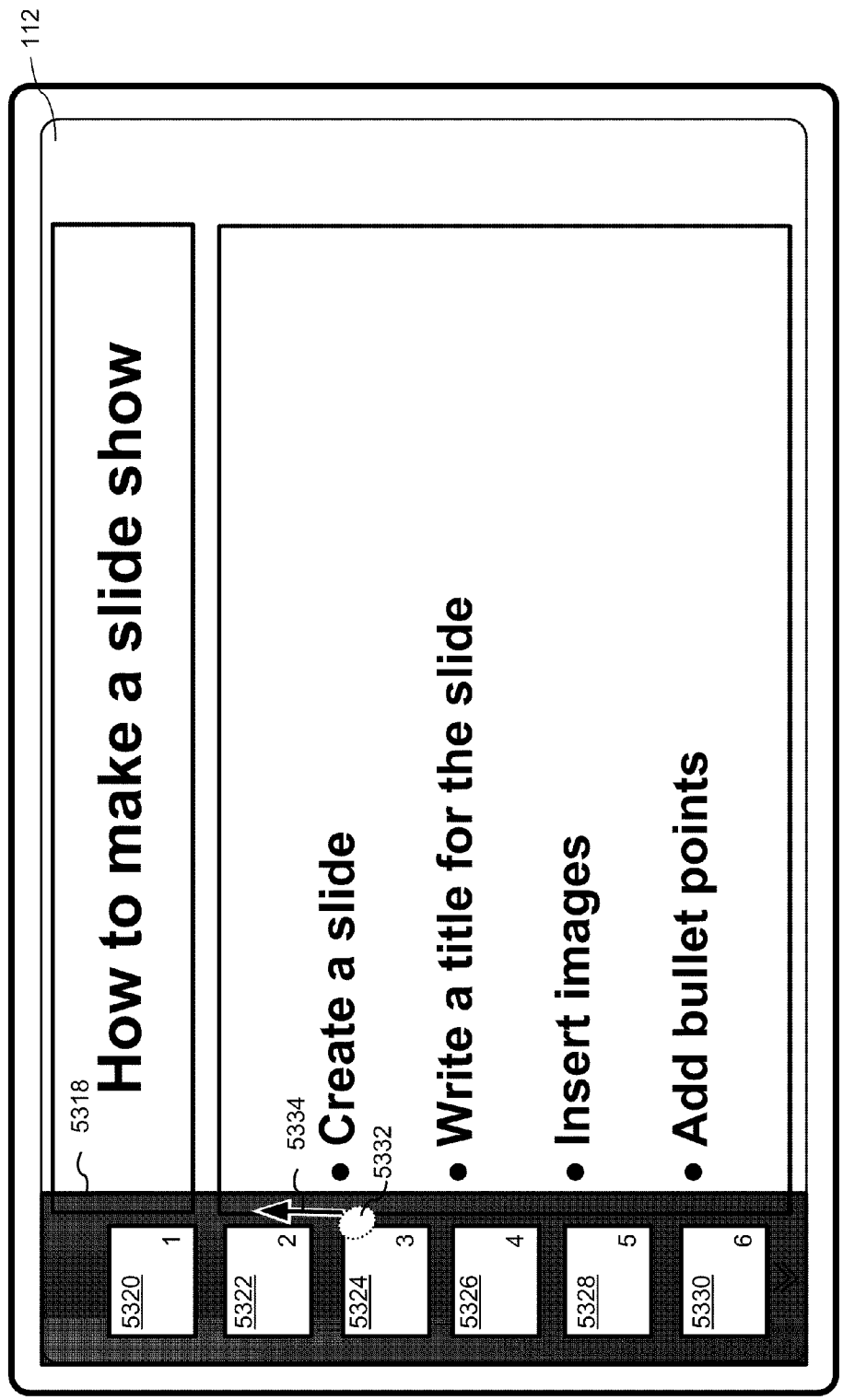
Figure 5CCC

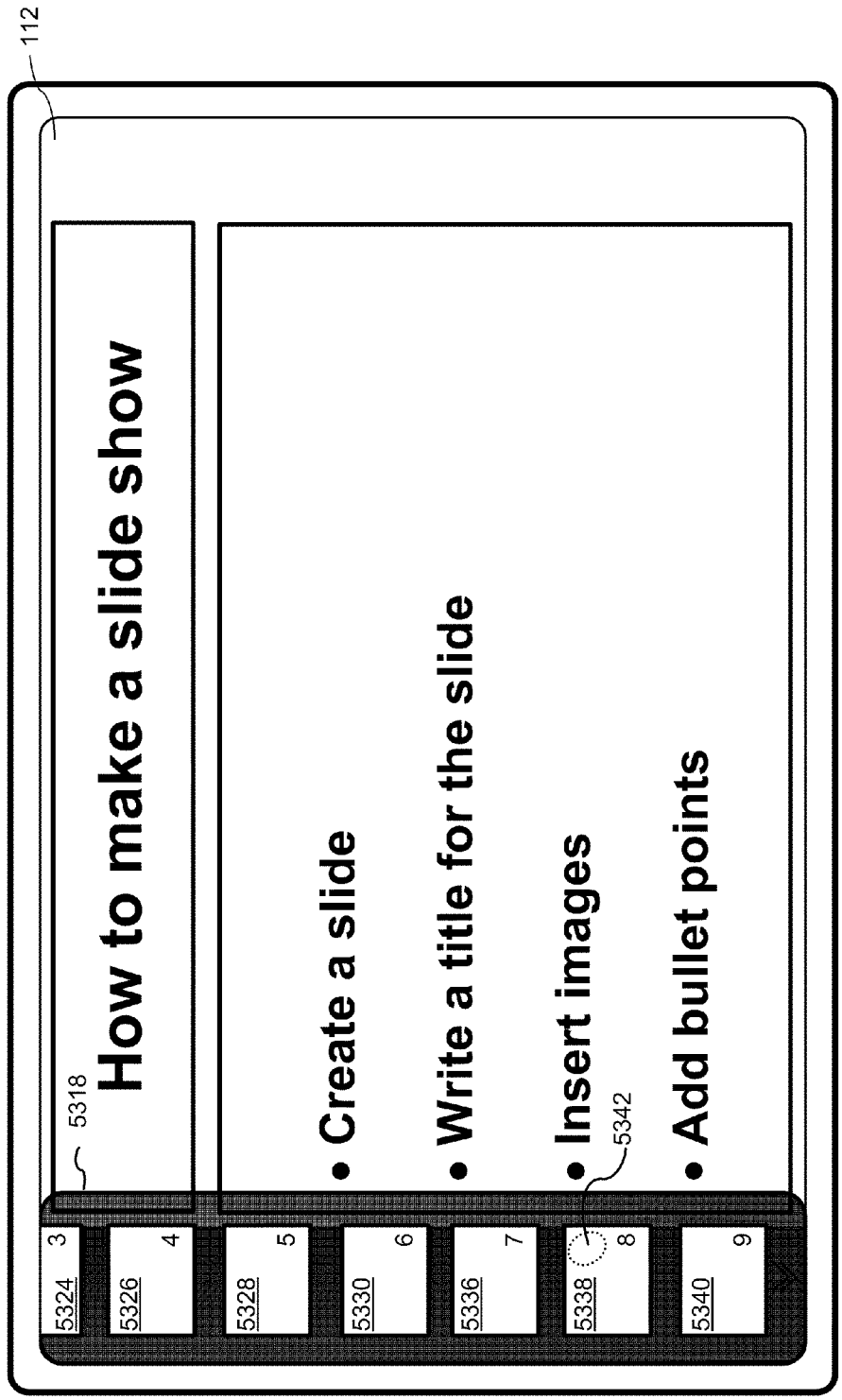
Figure 5DDD

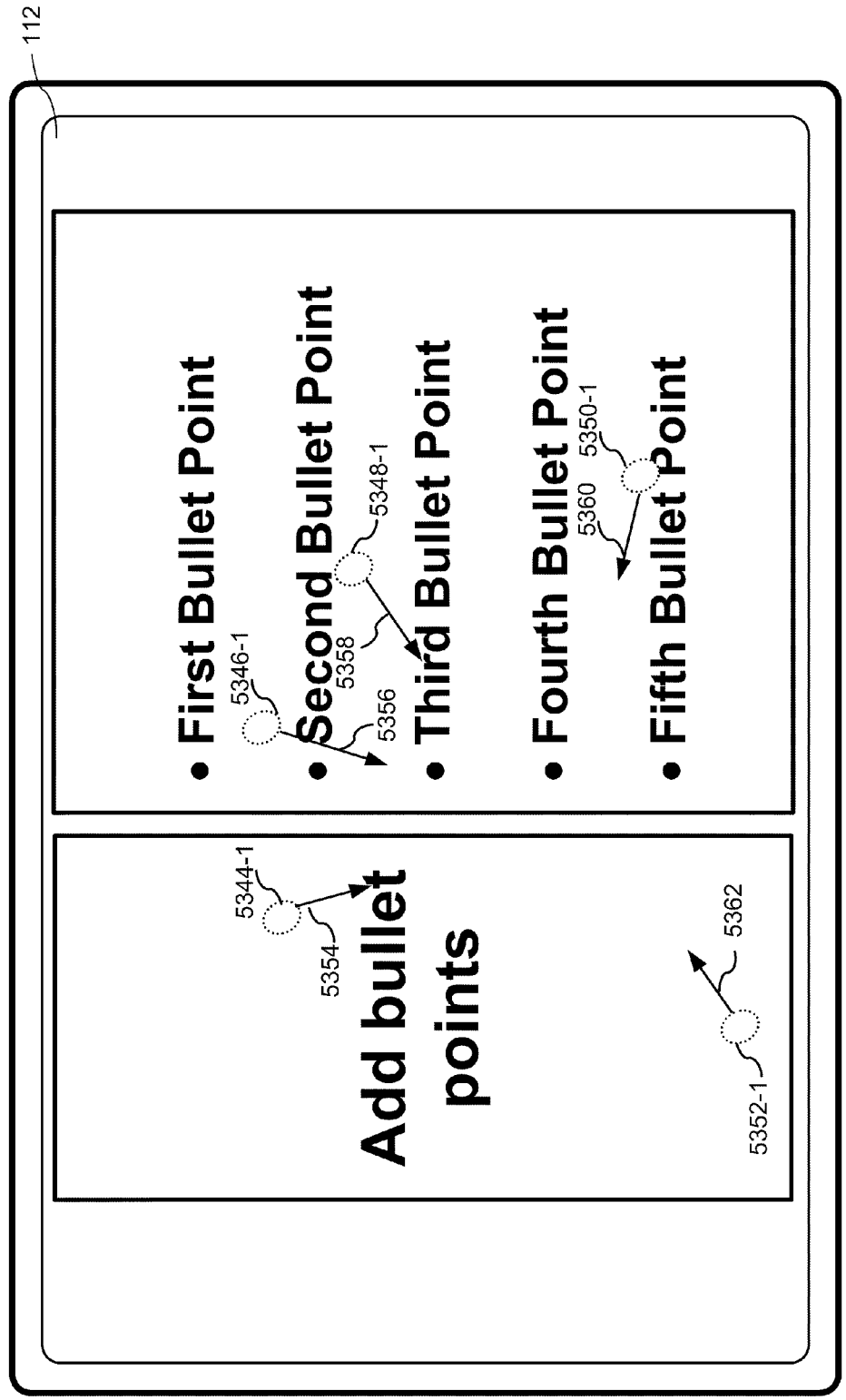
Figure 5EEE

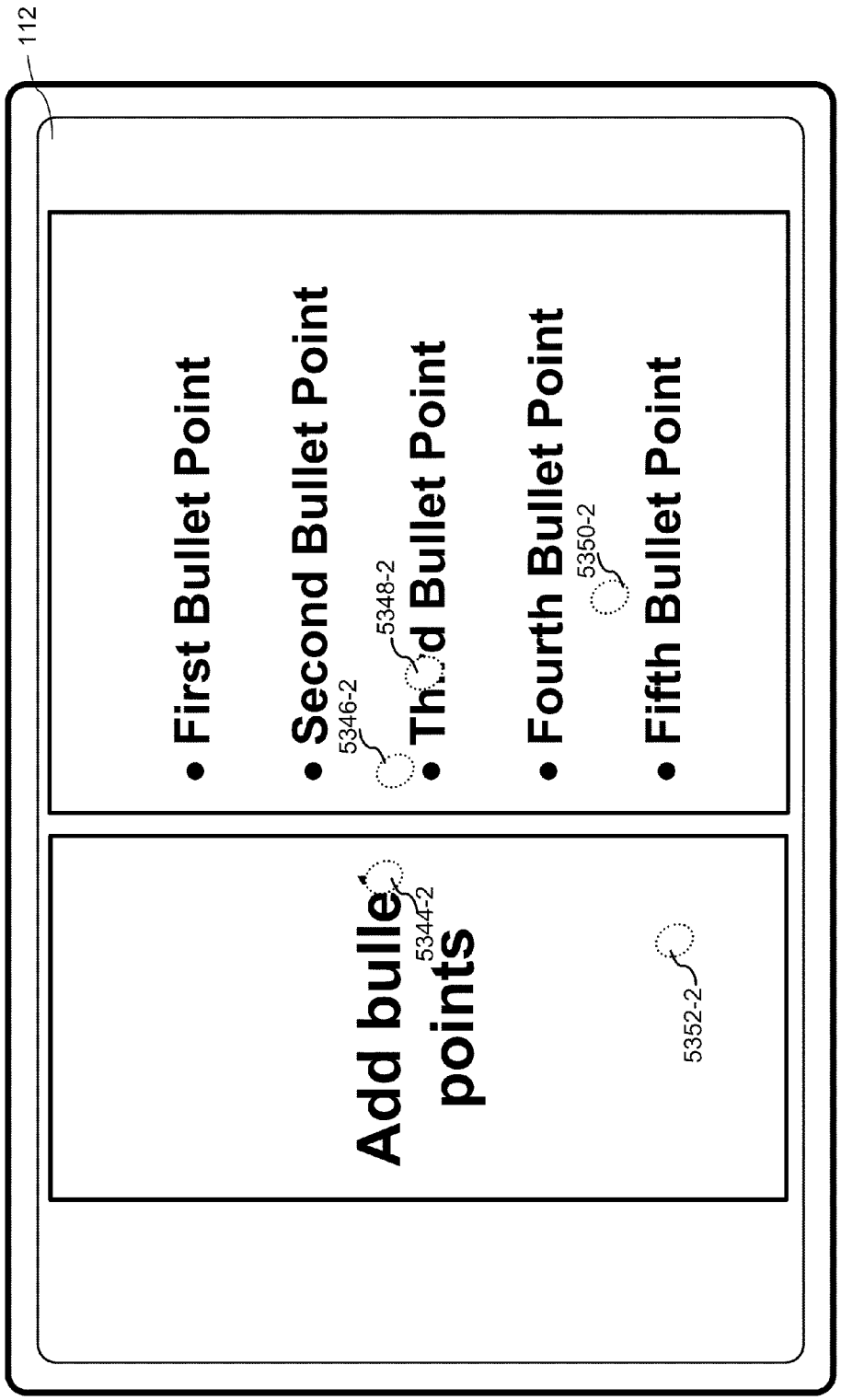
Figure 5FFF

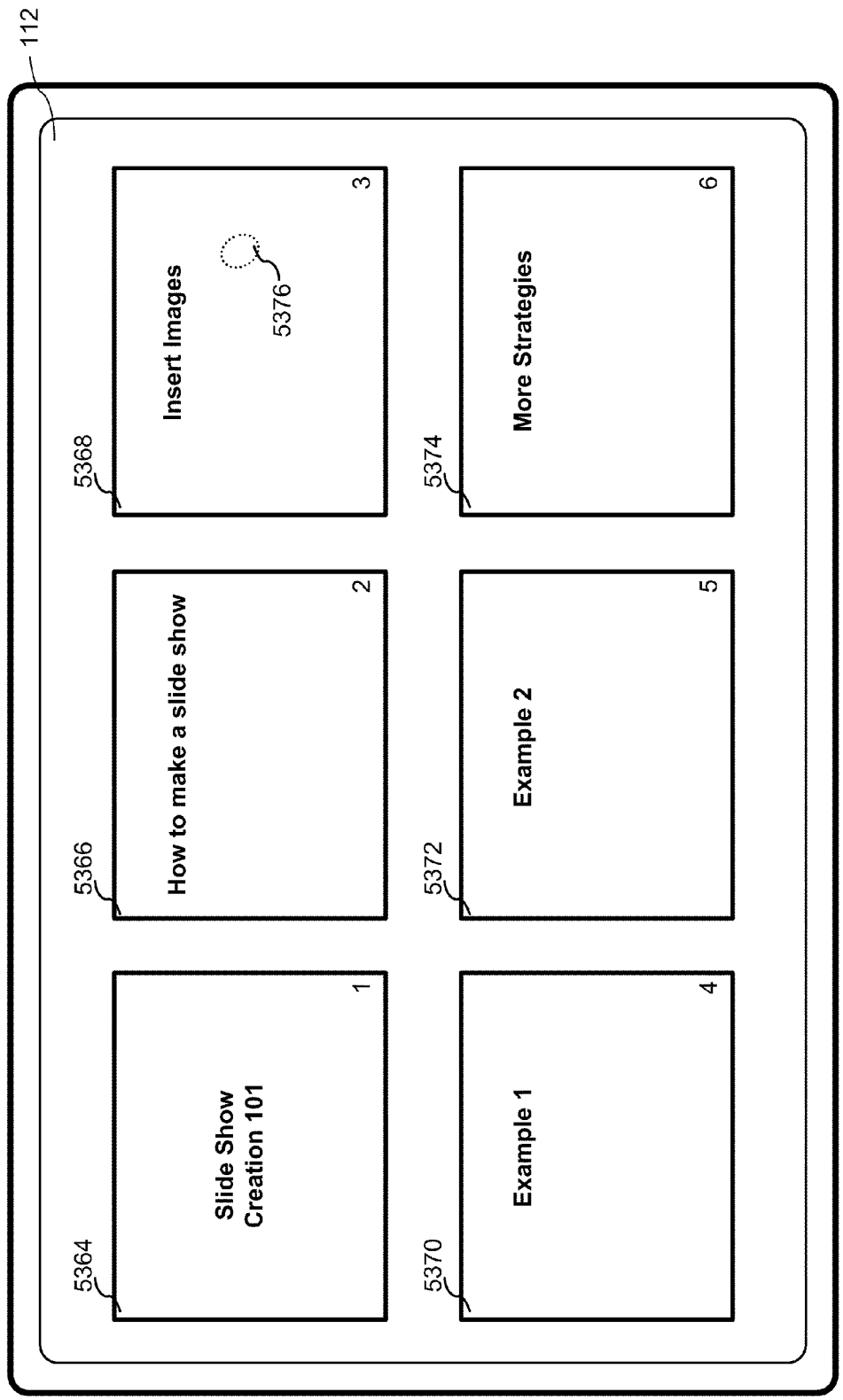
Figure 5GGG

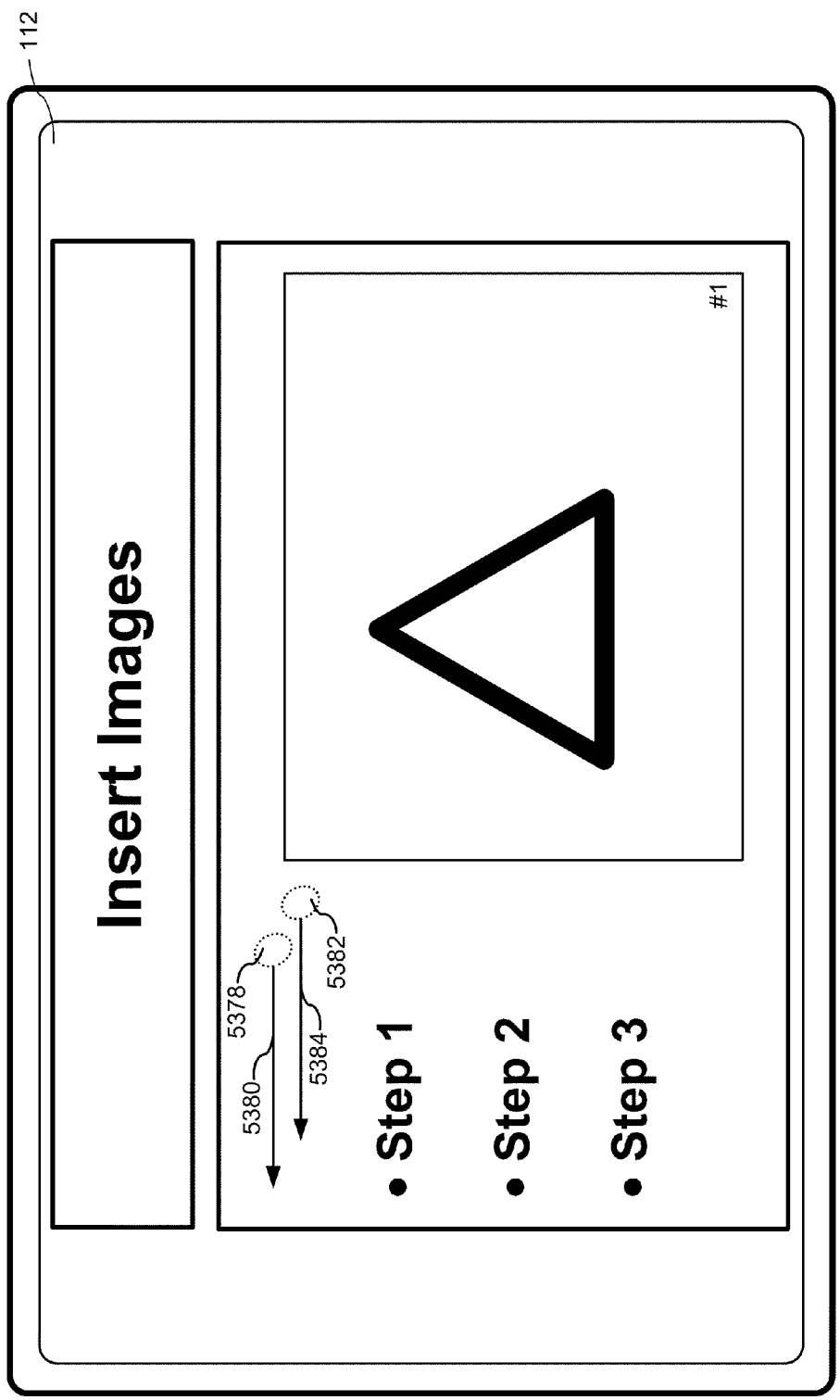
Figure 5HHH

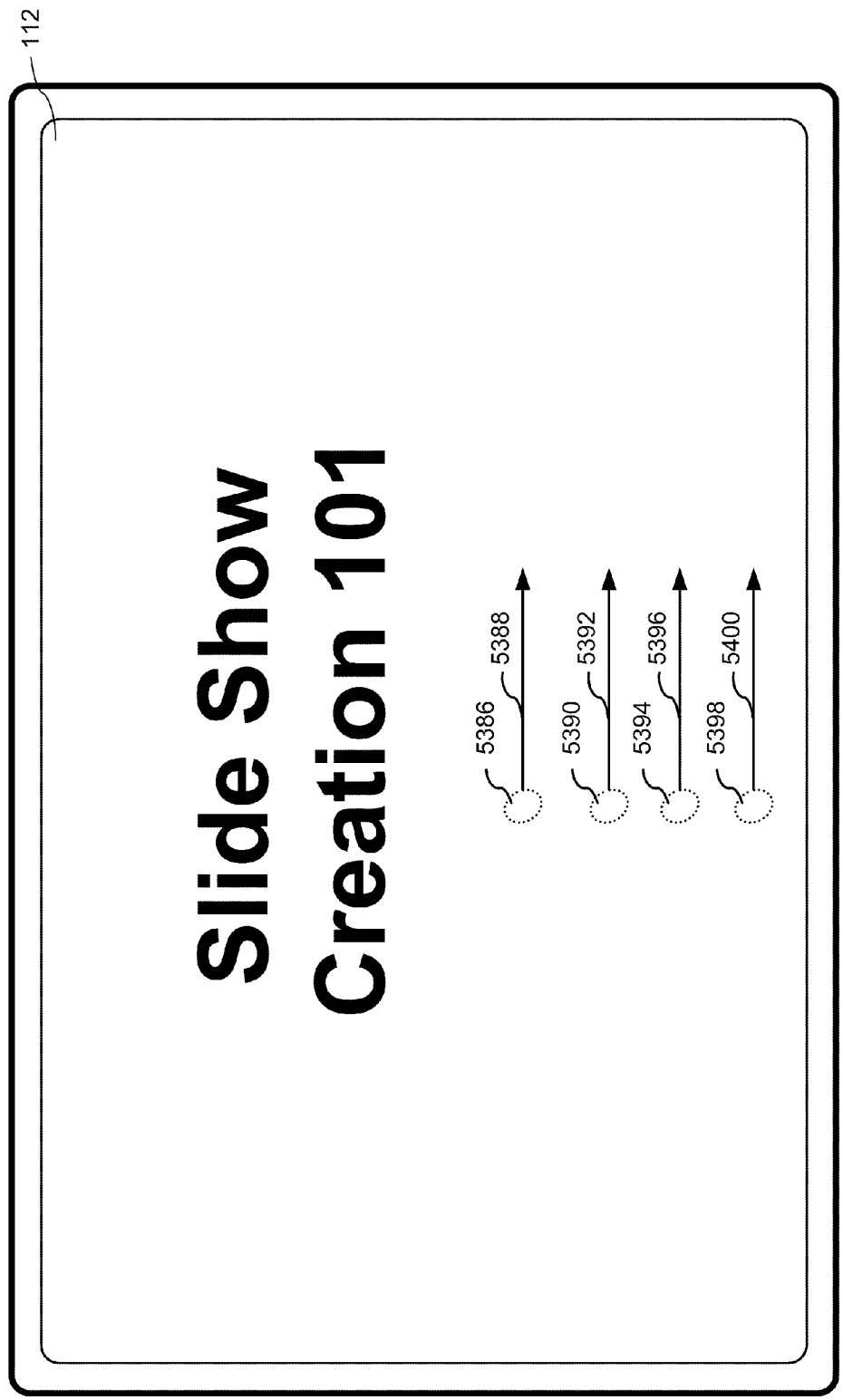
Figure 5III

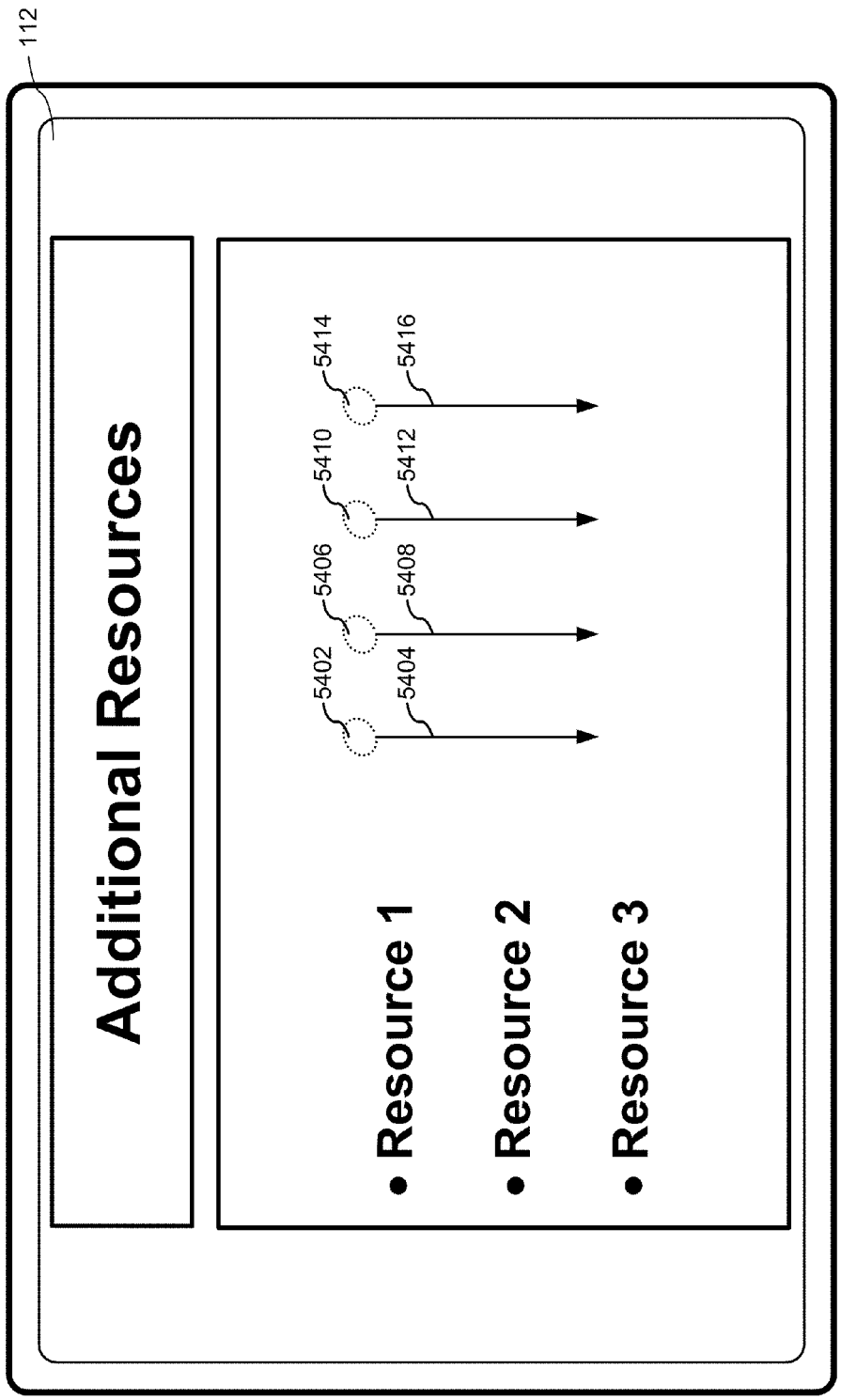
Figure 5JJJ

DEVICE, METHOD, AND GRAPHICAL USER INTERFACE FOR DISPLAYING EMPHASIS ANIMATIONS FOR AN ELECTRONIC DOCUMENT IN A PRESENTATION MODE

RELATED APPLICATION

This application claims priority to U.S. Provisional Patent Application Ser. No. 61/246,091, filed Sep. 25, 2009, entitled "Device, Method, and Graphical User Interface for Displaying Emphasis Animations for an Electronic Document in a Presentation Mode," which is incorporated herein by reference in its entirety.

TECHNICAL FIELD

The disclosed embodiments relate generally to electronic devices with touch-sensitive surfaces, and more particularly, to electronic devices with touch-sensitive surfaces where the device displays an electronic document in a presentation mode of an electronic document authoring application.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to display electronic documents in electronic document authoring applications to one or more users.

Exemplary user electronic documents include presentation documents (e.g., digital slide shows), word-processing documents, spreadsheet documents, desktop publishing documents, etc. Exemplary electronic document authoring applications include a drawing application, or office productivity applications such as: a presentation application (e.g., Keynote from Apple Inc. of Cupertino, Calif.), a word-processing application (e.g., Pages from Apple Inc. of Cupertino, Calif.), or a spreadsheet application (e.g., Numbers from Apple Inc. of Cupertino, Calif.).

But existing methods for displaying electronic documents in electronic document authoring applications are cumbersome and inefficient. For example, in presentation applications, a user must typically specify the order in which elements of the electronic document will be displayed, and which emphasis animations, if any, will be displayed when creating a presentation document. Similarly, in a word-processing or spreadsheet application, a user is typically unable to emphasize text, images or other elements of the electronic document without editing the electronic document. However, performing such additional steps (e.g., specifying the order in which elements are displayed, selecting emphasis animations while editing the electronic document, and/or emphasizing text or images by editing the electronic document) in order to emphasize elements in the electronic document is tedious and creates a significant cognitive burden on a user when the user is preparing electronic document to present to another user or actually presenting the electronic document to another user. In addition, existing methods take longer than necessary and/or require advance preparation, thereby wasting energy. This latter consideration is particularly important in battery-operated devices.

Accordingly, there is a need for computing devices with faster, more efficient methods and interfaces for emphasizing elements of electronic documents by displaying emphasis animations for electronic documents in an electronic document authoring application. Such methods and interfaces may complement or replace conventional methods for emphasizing elements of electronic documents in an electronic document authoring application. Such methods and interfaces reduce the cognitive burden on a user and produce a more efficient human-machine interface. For battery-operated computing devices, such methods and interfaces conserve power and increase the time between battery charges.

SUMMARY

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word-processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display. The method includes displaying a first portion of an electronic document in a presentation mode of an electronic document authoring application. The first portion of the electronic document includes predefined activation regions for a plurality of presentation emphasis objects. The method further includes, while displaying the first portion of the electronic document: detecting a first input by a user on a respective predefined activation region for a first presentation emphasis object in the plurality of presentation emphasis objects; and, in response to detecting the first input on the respective predefined activation region for the first presentation emphasis object: selecting a first emphasis animation for the first presentation emphasis object based on the first input; displaying the first emphasis animation; and displaying the first presentation emphasis object.

In accordance with some embodiments, a graphical user interface on a multifunction device with a display, a memory, and one or more processors to execute one or more programs stored in the memory includes a first portion of an electronic document in a presentation mode of an electronic document authoring application. The first portion of the electronic document includes predefined activation regions for a plurality of presentation emphasis objects. While displaying the first portion of the electronic document: a first input by a user is detected on a respective predefined activation region for a first presentation emphasis object in the plurality of presentation emphasis objects; and, in response to detecting the first input on the respective predefined activation region for the first presentation emphasis object: a first emphasis animation is selected for the first presentation emphasis object based on the first input; the first emphasis is displayed animation; and the first presentation emphasis object is displayed.

In accordance with some embodiments, a multifunction device includes a display, one or more processors, memory, and one or more programs. The one or more programs are stored in the memory and configured to be executed by the one or more processors. The one or more programs include instructions for displaying a first portion of an electronic document in a presentation mode of an electronic document authoring application. The first portion of the electronic document includes predefined activation regions for a plurality of presentation emphasis objects. While displaying the first portion of the electronic document, the one or more programs further include instructions for: detecting a first input by a user on a respective predefined activation region for a first presentation emphasis object in the plurality of presentation emphasis objects; and, in response to detecting the first input on the respective predefined activation region for the first presentation emphasis object: selecting a first emphasis animation for the first presentation emphasis object based on the first input; displaying the first emphasis animation; and displaying the first presentation emphasis object.

In accordance with some embodiments, a computer readable storage medium has stored therein instructions which when executed by a multifunction device with a display, cause the device to display a first portion of an electronic document in a presentation mode of an electronic document authoring application. The first portion of the electronic document includes predefined activation regions for a plurality of presentation emphasis objects. While displaying the first portion of the electronic document, the instructions also cause the device to detect a first input by a user on a respective predefined activation region for a first presentation emphasis object in the plurality of presentation emphasis objects; and, in response to detecting the first input on the respective predefined activation region for the first presentation emphasis object: select a first emphasis animation for the first presentation emphasis object based on the first input; display the first emphasis animation; and display the first presentation emphasis object.

In accordance with some embodiments, a multifunction device includes: a display and means for displaying a first portion of an electronic document in a presentation mode of an electronic document authoring application. The first portion of the electronic document includes predefined activation regions for a plurality of presentation emphasis objects. While displaying the first portion of the electronic document the device also includes: means for detecting a first input by a user on a respective predefined activation region for a first presentation emphasis object in the plurality of presentation emphasis objects; and, means, responsive to detecting the first input on the respective predefined activation region for the first presentation emphasis object, for: selecting a first emphasis animation for the first presentation emphasis object based on the first input; displaying the first emphasis animation; and displaying the first presentation emphasis object.

In accordance with some embodiments, an information processing apparatus for use in a multifunction device with a display includes: means for displaying a first portion of an electronic document in a presentation mode of an electronic document authoring application. The first portion of the electronic document includes predefined activation regions for a plurality of presentation emphasis objects. While displaying the first portion of the electronic document the apparatus also includes: means for detecting a first input by a user on a respective predefined activation region for a first presentation emphasis object in the plurality of presentation emphasis objects; and, means, responsive to detecting the first input on the respective predefined activation region for the first presentation emphasis object, for: selecting a first emphasis animation for the first presentation emphasis object based on the first input; displaying the first emphasis animation; and displaying the first presentation emphasis object.

In accordance with some embodiments, a method is performed at a multifunction device with a display. The method includes displaying a first portion of an electronic document in a presentation mode of an electronic document authoring application. The first portion of the electronic document includes predefined activation regions for a plurality of presentation emphasis objects. The method further includes, while displaying the first portion of the electronic document: detecting a first input by a user on a respective predefined activation region associated with a subset of the plurality of presentation emphasis objects; and in response to detecting the first input on the respective predefined activation region: selecting, based on the first input, a first presentation emphasis object of the subset of presentation emphasis objects and a first emphasis animation for the first presentation emphasis object; displaying the first emphasis animation; and displaying the first presentation emphasis object.

In accordance with some embodiments, a graphical user interface on a multifunction device with a display, a memory, and one or more processors to execute one or more programs stored in the memory includes a first portion of an electronic document in a presentation mode of an electronic document authoring application. The first portion of the electronic document includes predefined activation regions for a plurality of presentation emphasis objects. While displaying the first portion of the electronic document: a first input by a user is detected on a respective predefined activation region associated with a subset of the plurality of presentation emphasis objects; and in response to detecting the first input on the respective predefined activation region: a first presentation emphasis object of the subset of presentation emphasis objects and a first emphasis animation for the first presentation emphasis object are selected based on the first input; the first emphasis animation is displayed; and the first presentation emphasis object is displayed.

In accordance with some embodiments, a multifunction device includes a display, one or more processors, memory, and one or more programs. The one or more programs are stored in the memory and configured to be executed by the one or more processors. The one or more programs include instructions for: displaying a first portion of an electronic document in a presentation mode of an electronic document authoring application. The first portion of the electronic document includes predefined activation regions for a plurality of presentation emphasis objects. While displaying the first portion of the electronic document, the one or more programs further include instructions for: detecting a first input by a user on a respective predefined activation region associated with a subset of the plurality of presentation emphasis objects; and in response to detecting the first input on the respective predefined activation region: selecting, based on the first input, a first presentation emphasis object of the subset of presentation emphasis objects and a first emphasis animation for the first presentation emphasis object; displaying the first emphasis animation; and displaying the first presentation emphasis object.

In accordance with some embodiments, a computer readable storage medium has stored therein instructions which when executed by a multifunction device with a display, cause the device to display a first portion of an electronic document in a presentation mode of an electronic document authoring application. The first portion of the electronic document includes predefined activation regions for a plurality of presentation emphasis objects. While displaying the first portion of the electronic document, the instructions also cause the device to: detect a first input by a user on a respective predefined activation region associated with a subset of the plurality of presentation emphasis objects; and in response to detecting the first input on the respective predefined activation region: select, based on the first input, a first presentation emphasis object of the subset of presentation emphasis objects and a first emphasis animation for the first presentation emphasis object; display the first emphasis animation; and display the first presentation emphasis object.

In accordance with some embodiments, a multifunction device includes: a display and means for displaying a first portion of an electronic document in a presentation mode of an electronic document authoring application. The first portion of the electronic document includes predefined activation regions for a plurality of presentation emphasis objects. While displaying the first portion of the electronic document, the device also includes means for detecting a first input by a user on a respective predefined activation region associated with a subset of the plurality of presentation emphasis objects; and means, responsive to detecting the first input on the respective predefined activation region, for: selecting, based on the first input, a first presentation emphasis object of the subset of presentation emphasis objects and a first emphasis animation for the first presentation emphasis object; displaying the first emphasis animation; and displaying the first presentation emphasis object.

In accordance with some embodiments, an information processing apparatus for use in a multifunction device with a display includes means for displaying a first portion of an electronic document in a presentation mode of an electronic document authoring application. The first portion of the electronic document includes predefined activation regions for a plurality of presentation emphasis objects. While displaying the first portion of the electronic document, the apparatus also includes means for detecting a first input by a user on a respective predefined activation region associated with a subset of the plurality of presentation emphasis objects; and means, responsive to detecting the first input on the respective predefined activation region, for: selecting, based on the first input, a first presentation emphasis object of the subset of presentation emphasis objects and a first emphasis animation for the first presentation emphasis object; displaying the first emphasis animation; and displaying the first presentation emphasis object.

Thus, multifunction computing devices with displays are provided with faster, more efficient methods and interfaces for emphasizing elements of electronic documents by displaying emphasis animations for electronic documents in an electronic document authoring application, thereby increasing the effectiveness, efficiency, and user satisfaction with such devices. Such methods and interfaces may complement or replace conventional methods for displaying electronic documents in electronic document authoring applications.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
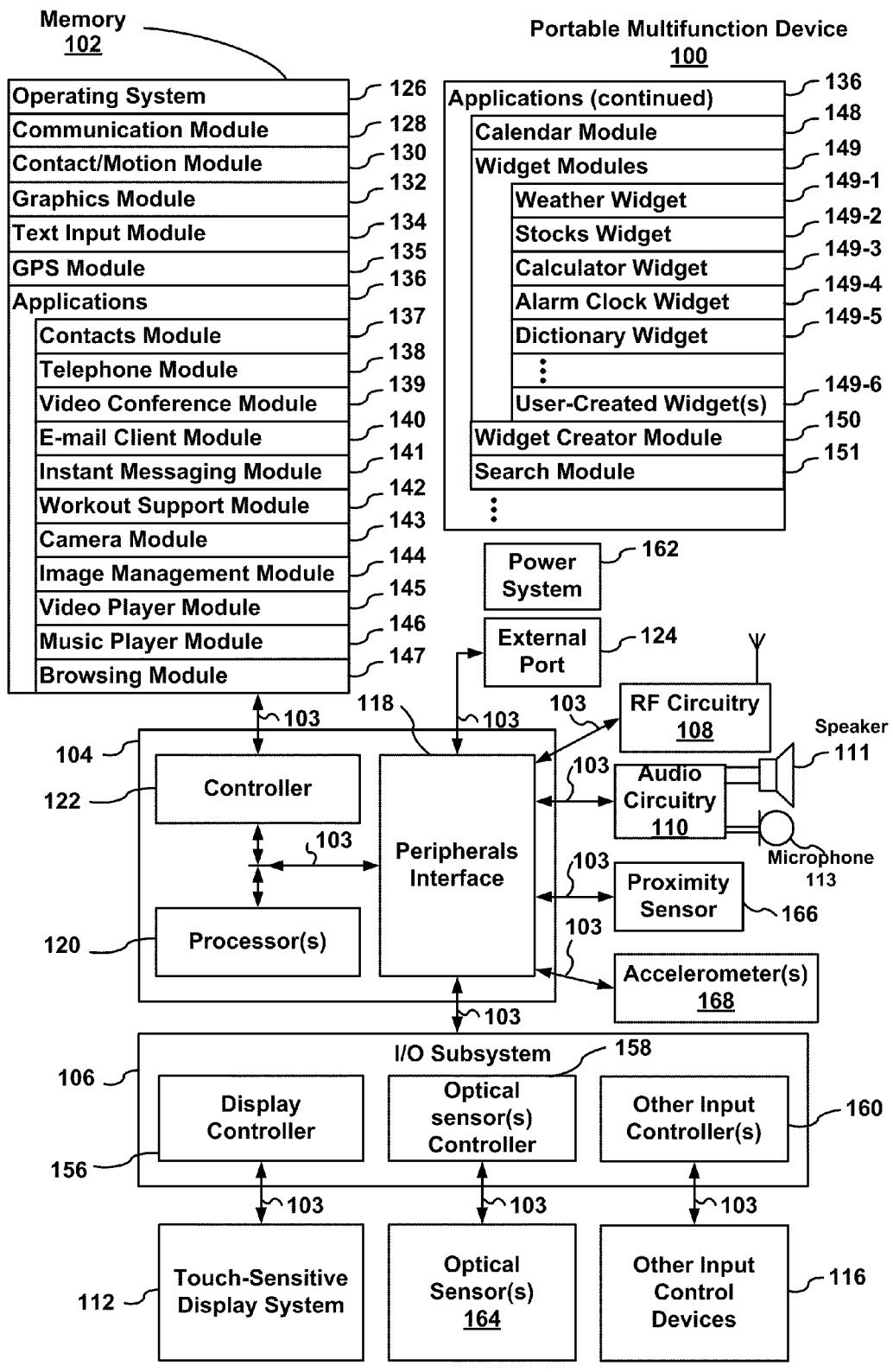
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone® and iPod Touch® devices from Apple Inc. of Cupertino, Calif. Other portable devices such as laptops or tablet computers with touch-sensitive surfaces (e.g., touch screen displays and/or touch pads) may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word-processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
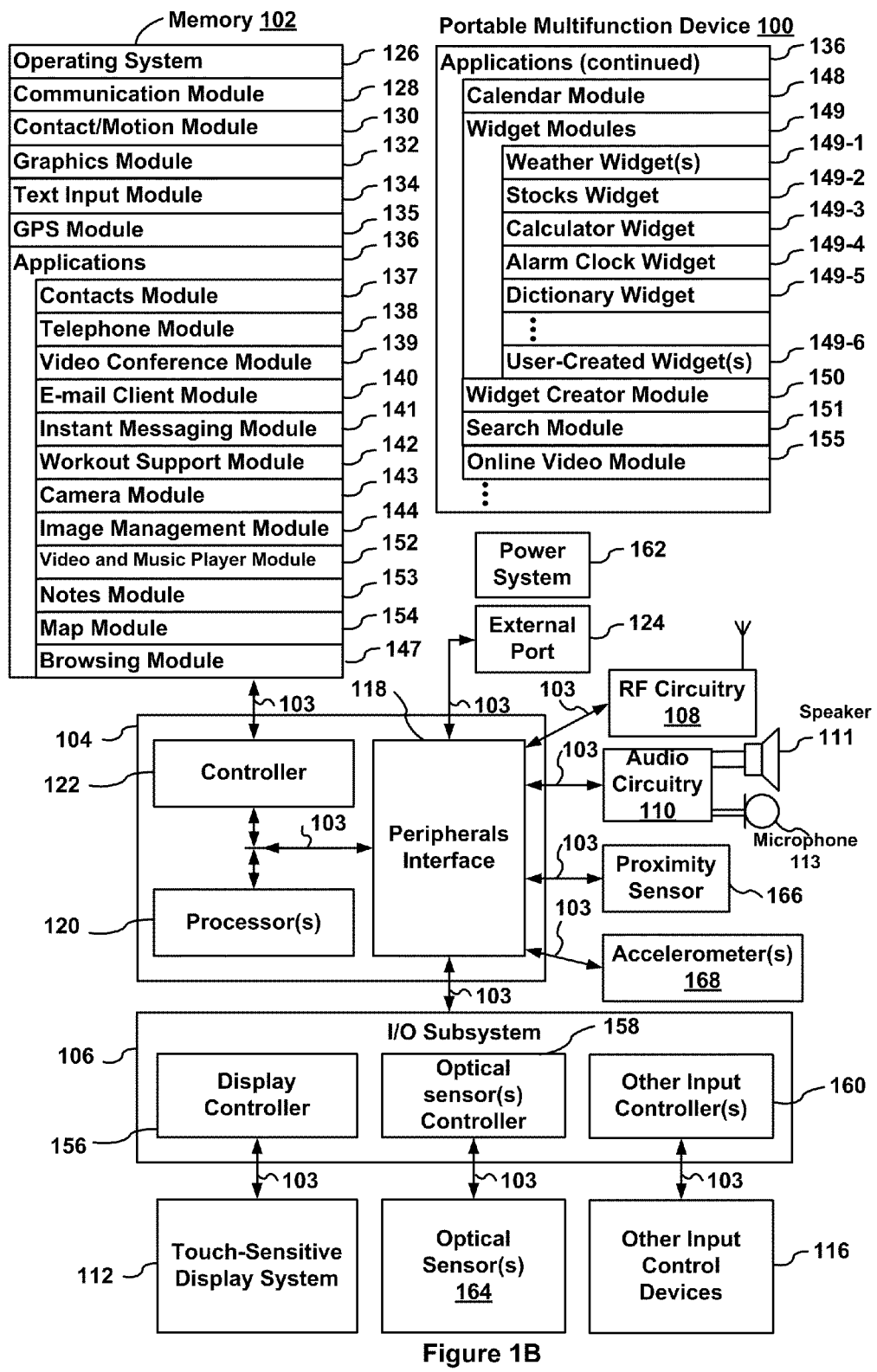

Attention is now directed towards embodiments of portable devices with touch-sensitive displays. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HS-DPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of the touch screen 112 may be analogous to the multi-touch sensitive touchpads described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive touchpads do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (e.g., icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for still and/or video image acquisition.

In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call).

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

The contact/motion module 130 may detect contact with the touch screen 112 (in conjunction with the display controller 156) and other touch-sensitive devices (e.g., a touchpad or physical click wheel). The contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). The contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 detects contact on a touchpad. In some embodiments, the contact/motion module 130 and the controller 160 detects contact on a click wheel.

The contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. In some embodiments, the contact/motion module 130 differentiates between a flick gesture (where a velocity of the finger-dragging event is above a predefined threshold, e.g., over the whole gesture or only at the finger-up event), and a tap and drag gesture (where a velocity of the finger-dragging event is below a predefined threshold, e.g., over the whole gesture or only at the finger-up event). In some embodiments, the contact/motion module 130 differentiates between a plurality of finger gestures having similar elements using one or more predetermined conditions, as described in greater detail in U.S. patent application Ser. No. 12/567,703, which is hereby incorporated by reference in its entirety.

The graphics module 132 includes various known software components for rendering and displaying graphics on the touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, the graphics module 132 stores data representing graphics to be used. Each graphic may be assigned a corresponding code. The graphics module 132 receives, from applications etc., one or more codes specifying graphics to be displayed along with, if necessary, coordinate data and other graphic property data, and then generates screen image data to output to display controller 156.

The text input module 134, which may be a component of graphics module 132, provides soft keyboards for entering text in various applications (e.g., contacts 137, e-mail 140, IM 141, browser 147, and any other application that needs text input).

The GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);

a telephone module 138;

a video conferencing module 139;

an e-mail client module 140;

an instant messaging (IM) module 141;

a workout support module 142;

a camera module 143 for still and/or video images;

an image management module 144;

a video player module 145;

a music player module 146;

a browser module 147;

a calendar module 148;

widget modules 149, which may include weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which merges video player module 145 and music player module 146;

notes module 153;

map module 154; and/or online video module 155.

Examples of other applications 136 that may be stored in memory 102 include other word-processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, the workout support module 142 may be used to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications corresponds to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
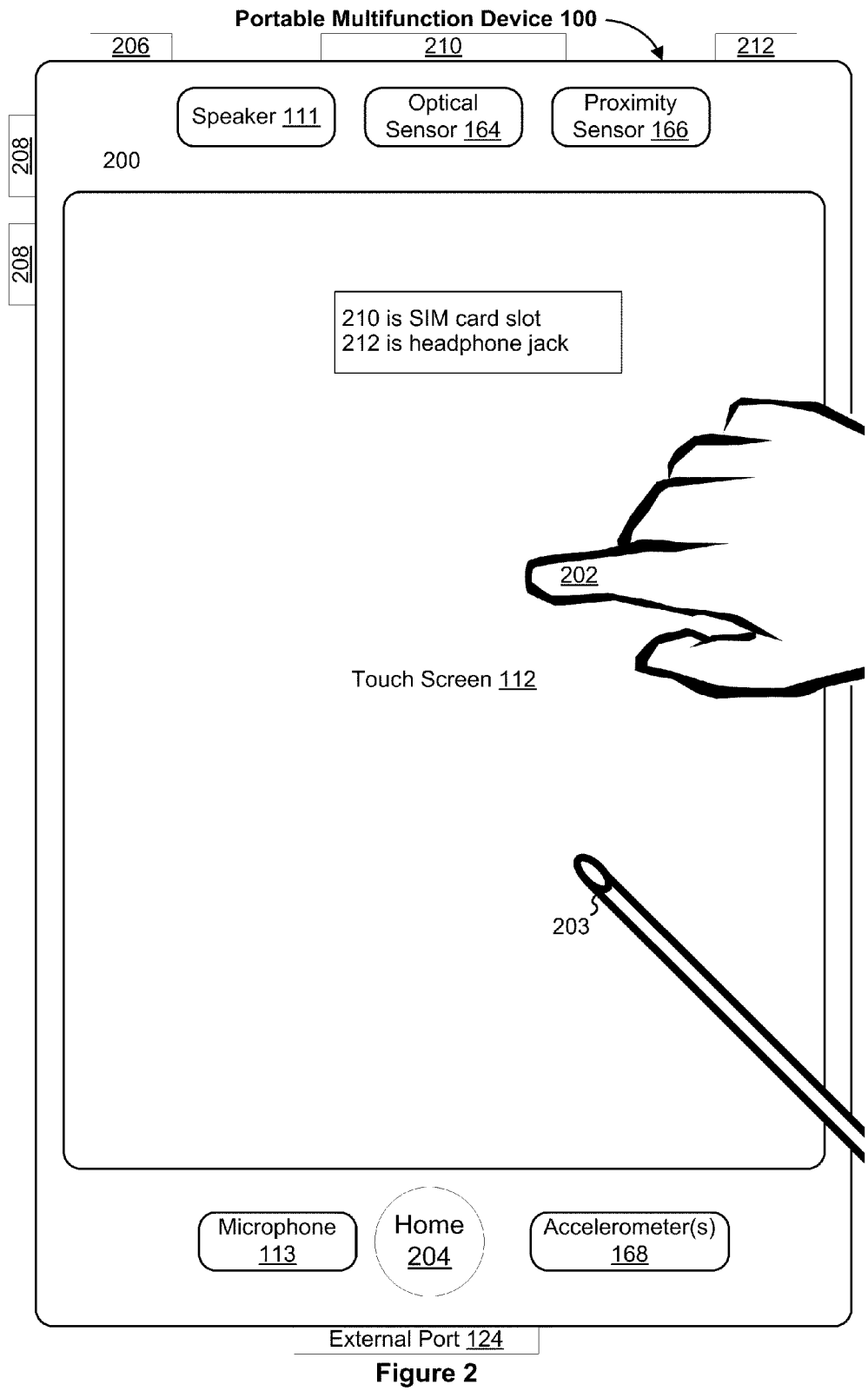
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Figure 3:
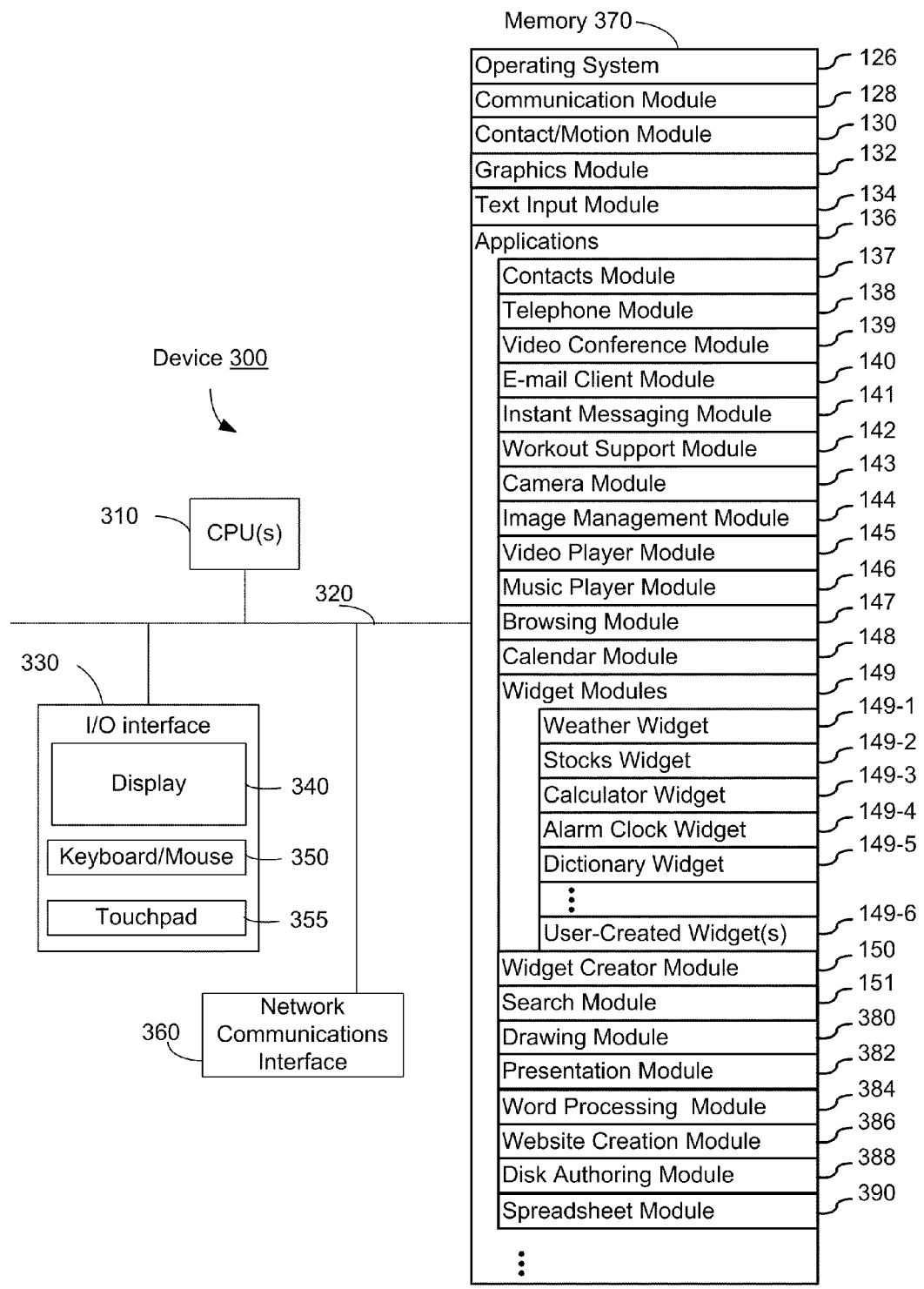
FIG. 3 is a block diagram of an exemplary multifunction device with a display and a touch-sensitive surface in accordance with some embodiments.

FIG. 3 is a block diagram of an exemplary multifunction device with a display and a touch-sensitive surface in accordance with some embodiments. Device 300 need not be portable. In some embodiments, the device 300 is a laptop computer, a desktop computer, a tablet computer, a multimedia player device, a navigation device, an educational device (such as a child's learning toy), a gaming system, or a control device (e.g., a home or industrial controller). The device 300 typically includes one or more processing units (CPU's) 310, one or more network or other communications interfaces 360, memory 370, and one or more communication buses 320 for interconnecting these components. The communication buses 320 may include circuitry (sometimes called a chipset) that interconnects and controls communications between system components. The device 300 includes an input/output (I/O) interface 330 comprising a display 340, which is typically a touch screen display. The I/O interface 330 also may include a keyboard and/or mouse (or other pointing device) 350 and a touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from the CPU(s) 310. In some embodiments, memory 370 stores programs, modules, and data structures analogous to the programs, modules, and data structures stored in the memory 102 of portable multifunction device 100 (FIG. 1), or a subset thereof. Furthermore, memory 370 may store additional programs, modules, and data structures not present in the memory 102 of portable multifunction device 100. For example, memory 370 of device 300 may store drawing module 380, presentation module 382, word-processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on a portable multifunction device 100.

Figure 4A:
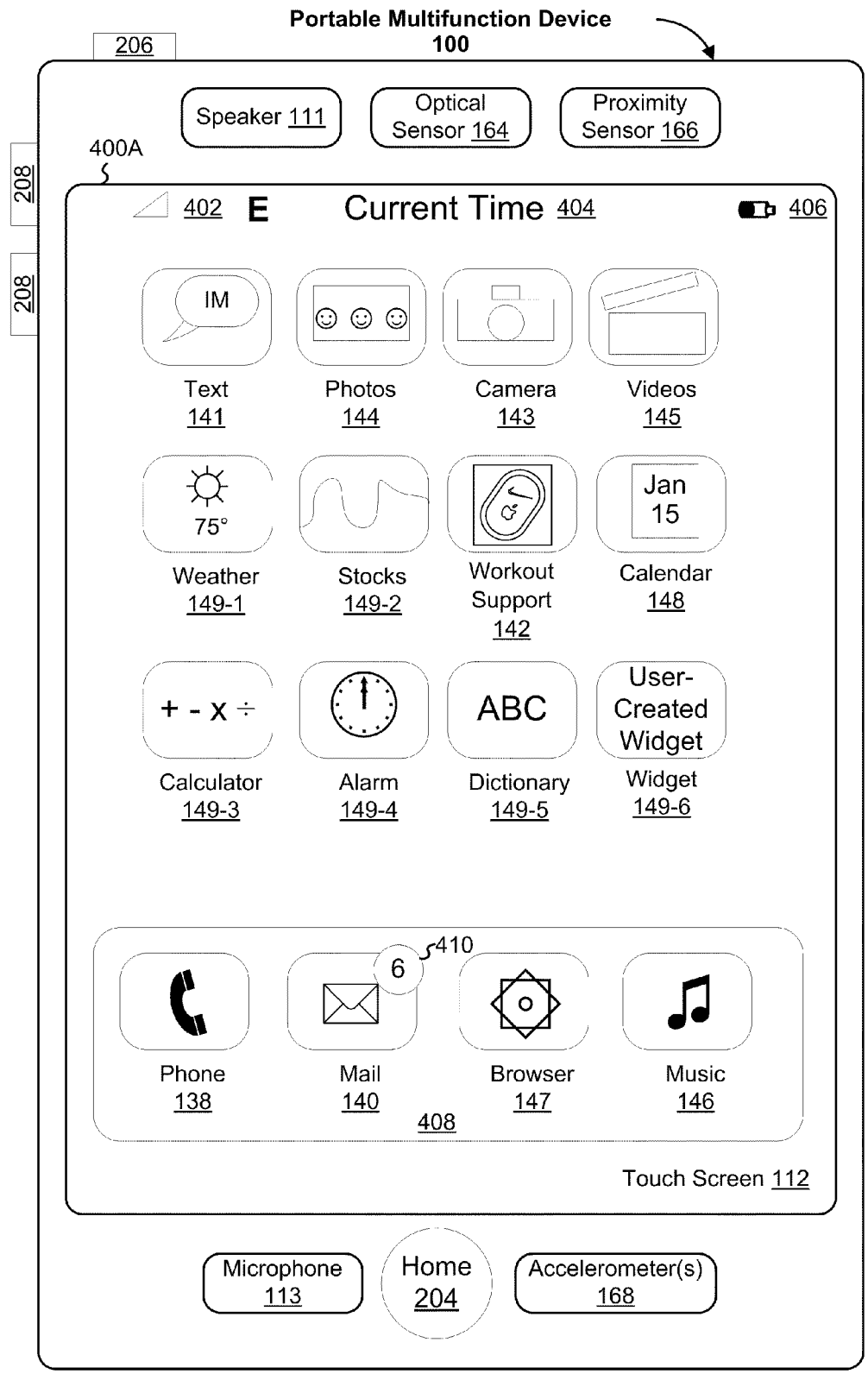
FIGS. 4A and 4B illustrate exemplary user interfaces for a menu of applications on a portable multifunction device in accordance with some embodiments.
Figure 4B:
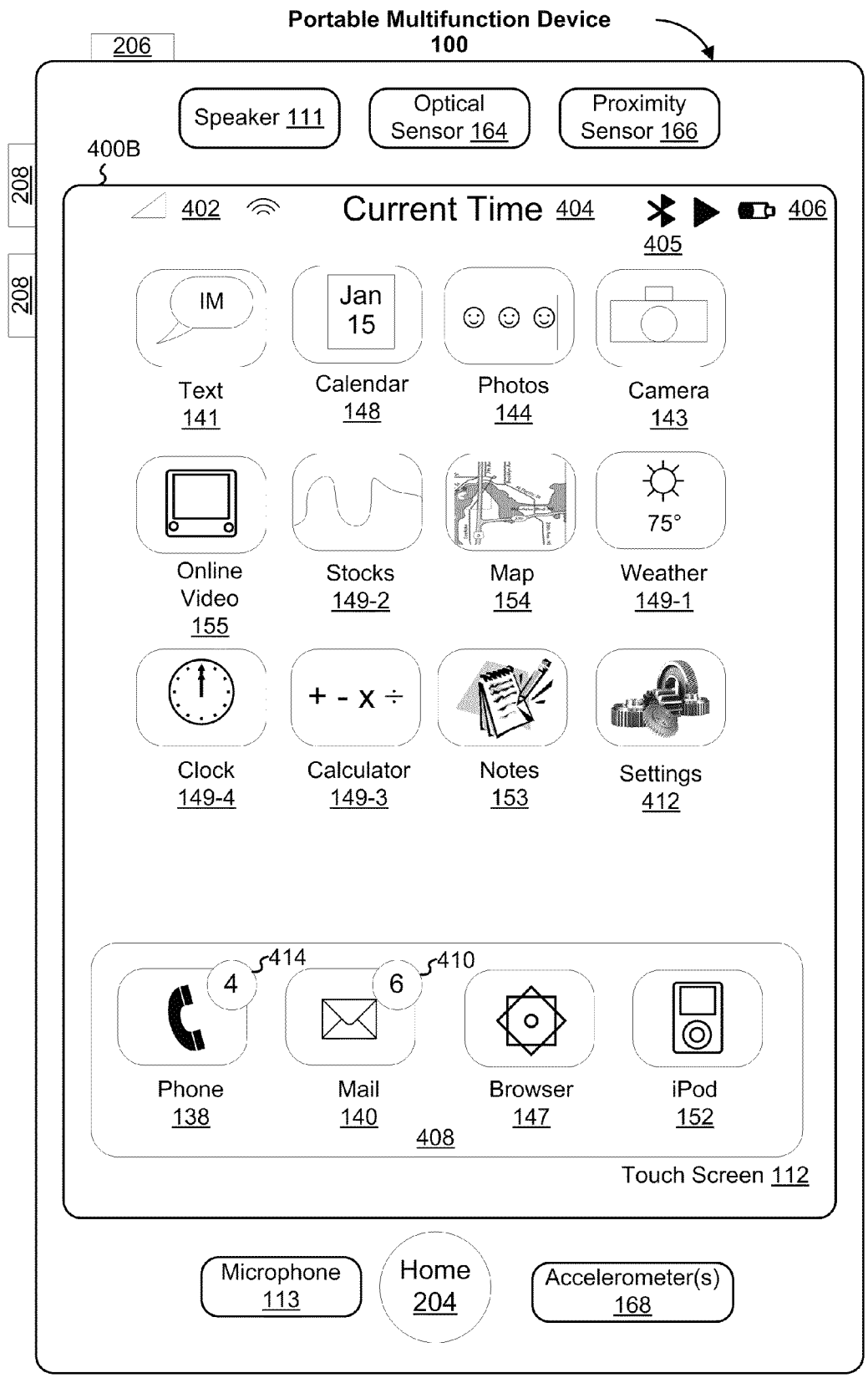

FIGS. 4A and 4B illustrate exemplary user interfaces for a menu of applications on a portable multifunction device 100 in accordance with some embodiments. Similar user interfaces may be implemented on device 300. In some embodiments, user interface 400A includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Phone 138, which may include an indicator 414 of the number of missed calls or voicemail messages;
  - E-mail client 140, which may include an indicator 410 of the number of unread e-mails;
  - Browser 147; and
  - Music player 146; and
- Icons for other applications, such as:
  - IM 141;
  - Image management 144;
  - Camera 143;
  - Video player 145;
  - Weather 149-1;
  - Stocks 149-2;
  - Workout support 142;
  - Calendar 148;
  - Calculator 149-3;
  - Alarm clock 149-4;
  - Dictionary 149-5; and
  - User-created widget 149-6.

In some embodiments, user interface 400B includes the following elements, or a subset or superset thereof:

- 402, 404, 405, 406, 141, 148, 144, 143, 149-3, 149-2, 149-1, 149-4, 410, 414, 138, 140, and 147, as described above;
- Map 154;
- Notes 153;
- Settings 412, which provides access to settings for the device 100 and its various applications 136, as described further below;
- Video and music player module 152, also referred to as iPod (trademark of Apple Inc.) module 152; and
- Online video module 155, also referred to as YouTube (trademark of Google, Inc.) module 155.

Figure 4C:
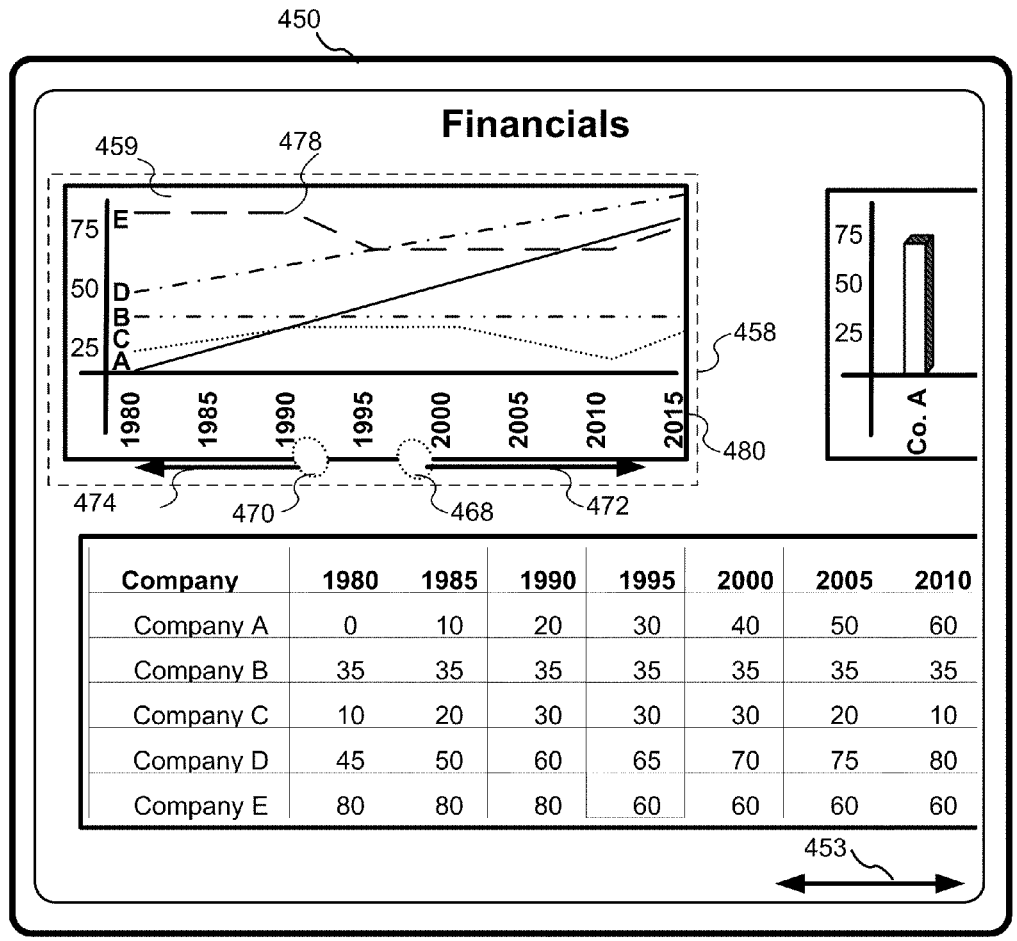
FIG. 4C illustrates an exemplary user interface for a multifunction device with a touch-sensitive surface that is separate from the display in accordance with some embodiments.
Figure 4C:
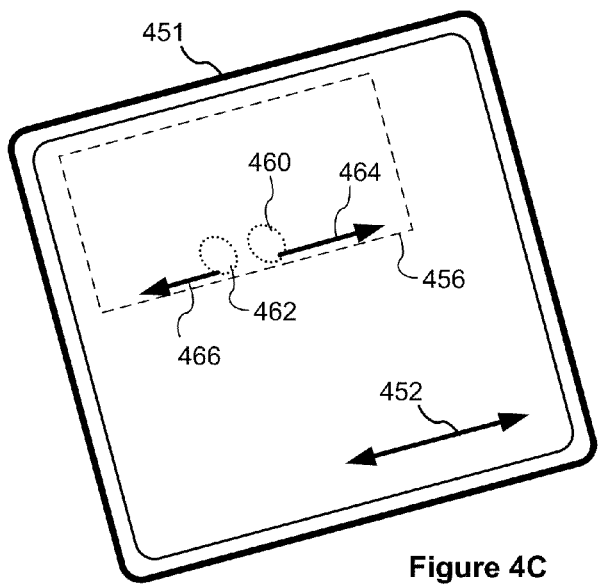

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on a touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470).

For example, in FIG. 4C, the device displays a first portion of an electronic document (e.g., a spreadsheet document) in a presentation mode of an electronic document authoring application (e.g., Numbers). The first portion of the electronic document includes predefined activation regions for a plurality of presentation emphasis objects. While displaying the first portion of the electronic document on the display 450, the device detects a first input by a user on a respective predefined activation region 456 that corresponds to a predefined region 458 on the display 450 for a first presentation emphasis object (e.g., the chart 459 in FIG. 4C) in the plurality of presentation emphasis objects. In some embodiments, the first input is a de-pinch gesture (e.g., a two-finger gesture where the two fingers move away from each other). For example, in FIG. 4C the device detects a first contact 460 on the touch-sensitive surface that corresponds to a first location 468 on the display 450. The device also detects a second contact 462 on the touch-sensitive surface that corresponds to a second location 470 on the display. The device also detects movement 464 of the first contact 460 on the touch-sensitive surface 451 that corresponds to movement 472 on the display 450, and detects movement 466 of the second contact 462 on the touch-sensitive surface 451 that corresponds to movement 474 on the display 450, where the movement 464 of the first contact 460 is in a direction opposite of the movement 466 of the second contact 462, and the two contacts move away from each other. In these embodiments, the respective predefined activation region 458 includes a first representation of a chart 459 that includes a visual representation of a data series (e.g., graph line 478 in FIG. 4C). The first representation of the chart includes a first axis 480 with a first range of values (e.g., 1980-2015).

In response to detecting the first input (e.g., the two finger de-pinch gesture) on the respective predefined activation region (e.g., activation region 458 in FIG. 4C) for the first presentation emphasis object: the device selects a first emphasis animation for the first presentation emphasis object based on the first input, the device displays the first emphasis animation, and displays the first presentation emphasis object, as described in greater detail below for a touch screen display with reference to FIGS. 5TT-5UU. In this way, user inputs (e.g., contacts 460 and 462) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5JJJ illustrate exemplary user interfaces for emphasizing elements of an electronic document by displaying emphasis animations for the electronic document in an electronic document authoring application in accordance with some embodiments. The user interfaces in these figures are used to illustrate the processes described below, including the processes in FIGS. 6A-6Q and FIG. 7.

Figure 5A:
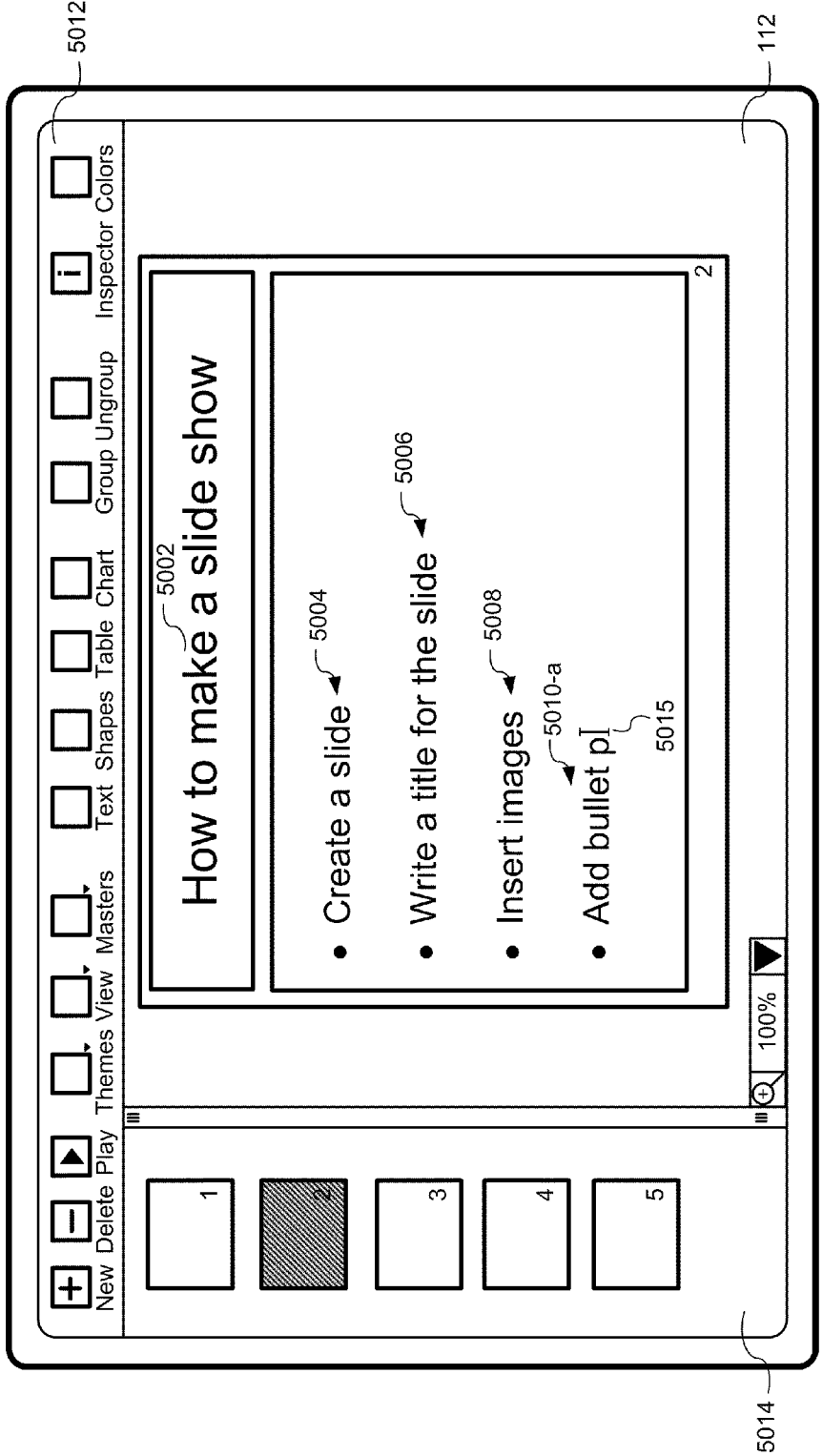
FIGS. 5A-5JJJ illustrate exemplary user interfaces for emphasizing elements of electronic documents by displaying emphasis animations for electronic documents in an electronic document authoring application in accordance with some embodiments.
Figure 5B:
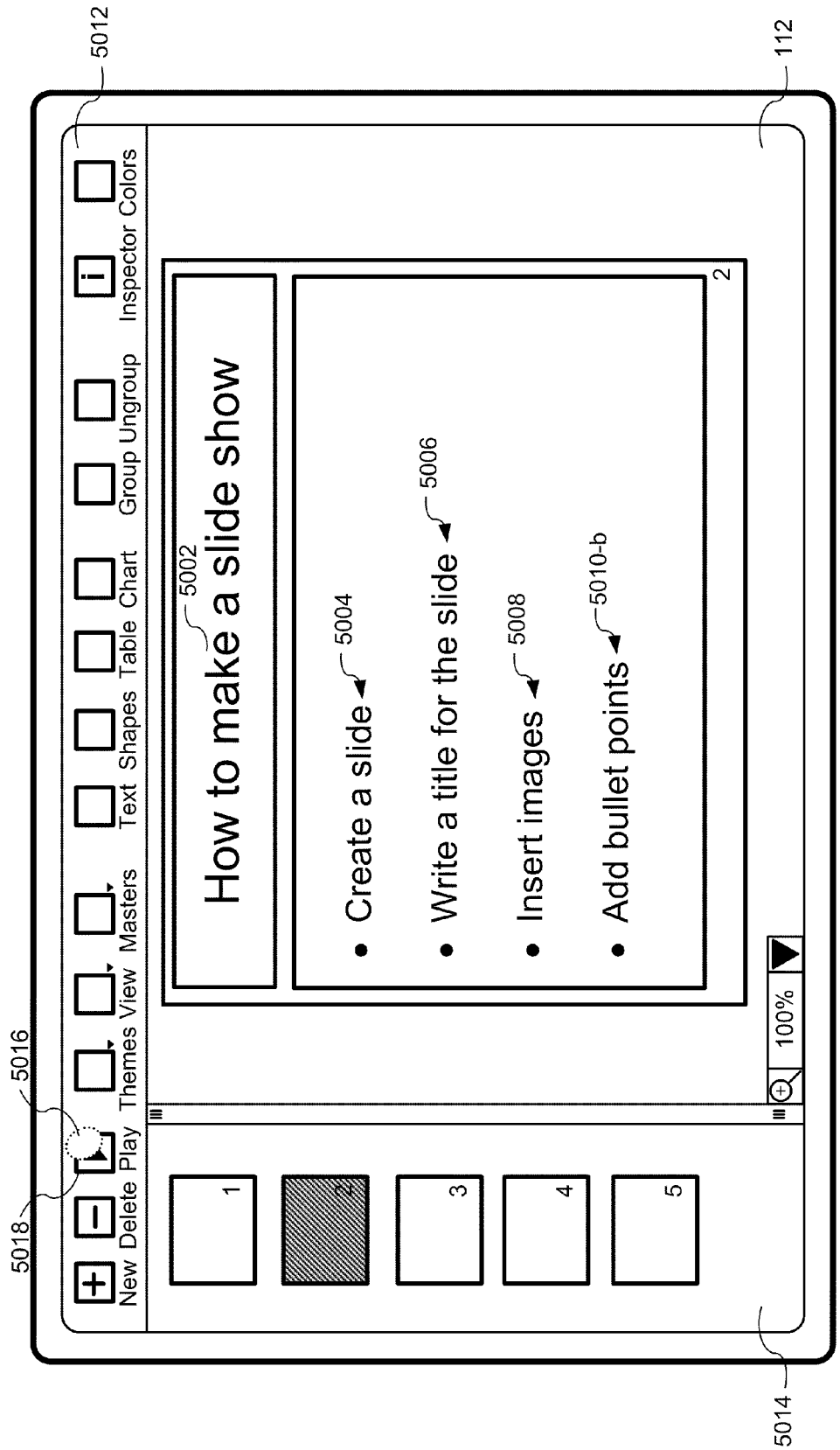

FIGS. 5A-5B illustrate exemplary user interfaces for editing a presentation document while a presentation application is in an editing mode (e.g., by adding text to a bulleted list item 5010-*a* in FIG. 5A to create bulleted list item 5010-*b* in FIG. 5B) and detecting an input (e.g., tap gesture 5016 with "Play" icon 5018 in FIG. 5B) and responding the input by entering a presentation mode in accordance with some embodiments.

Figure 5C:
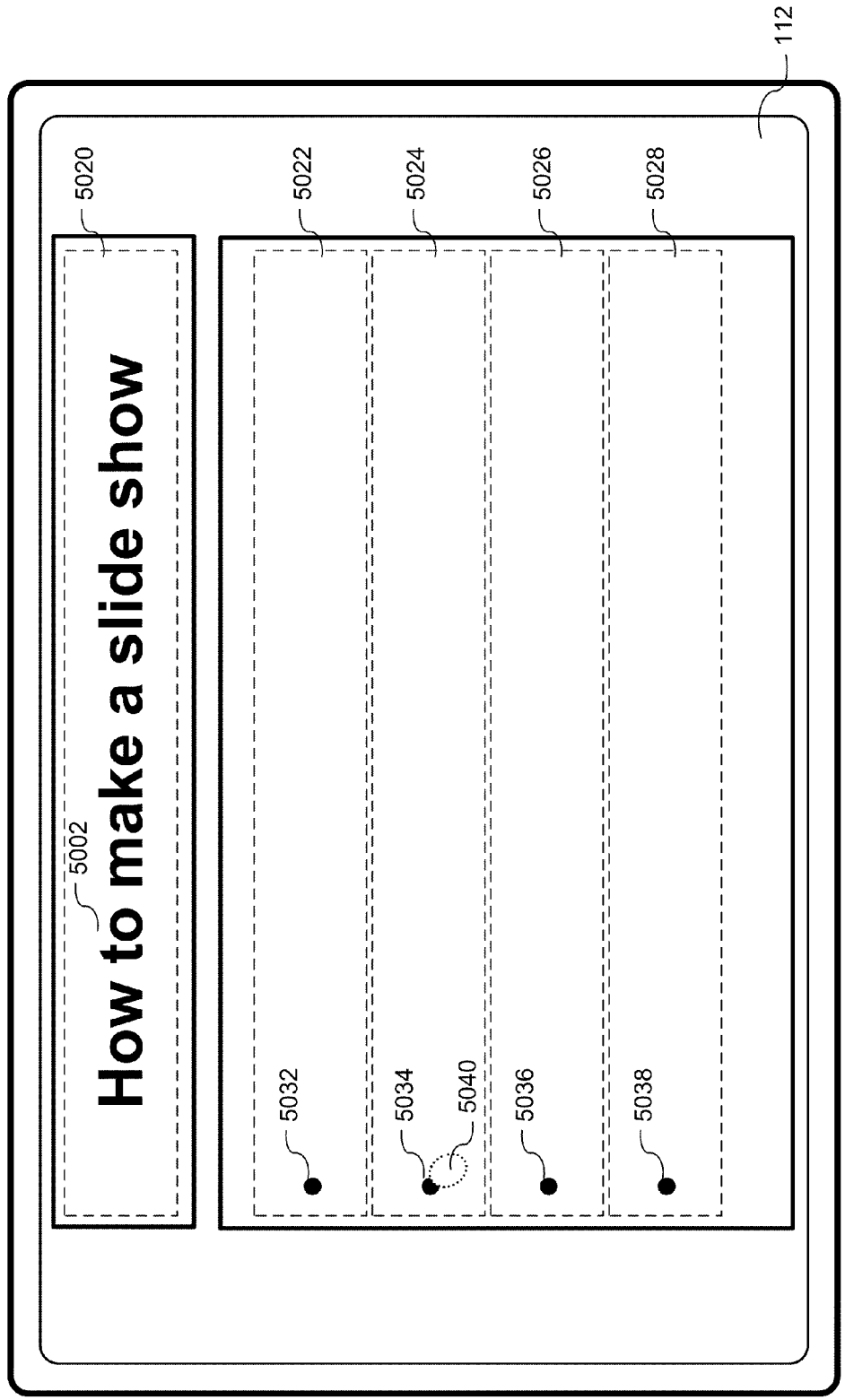
Figure 5D:
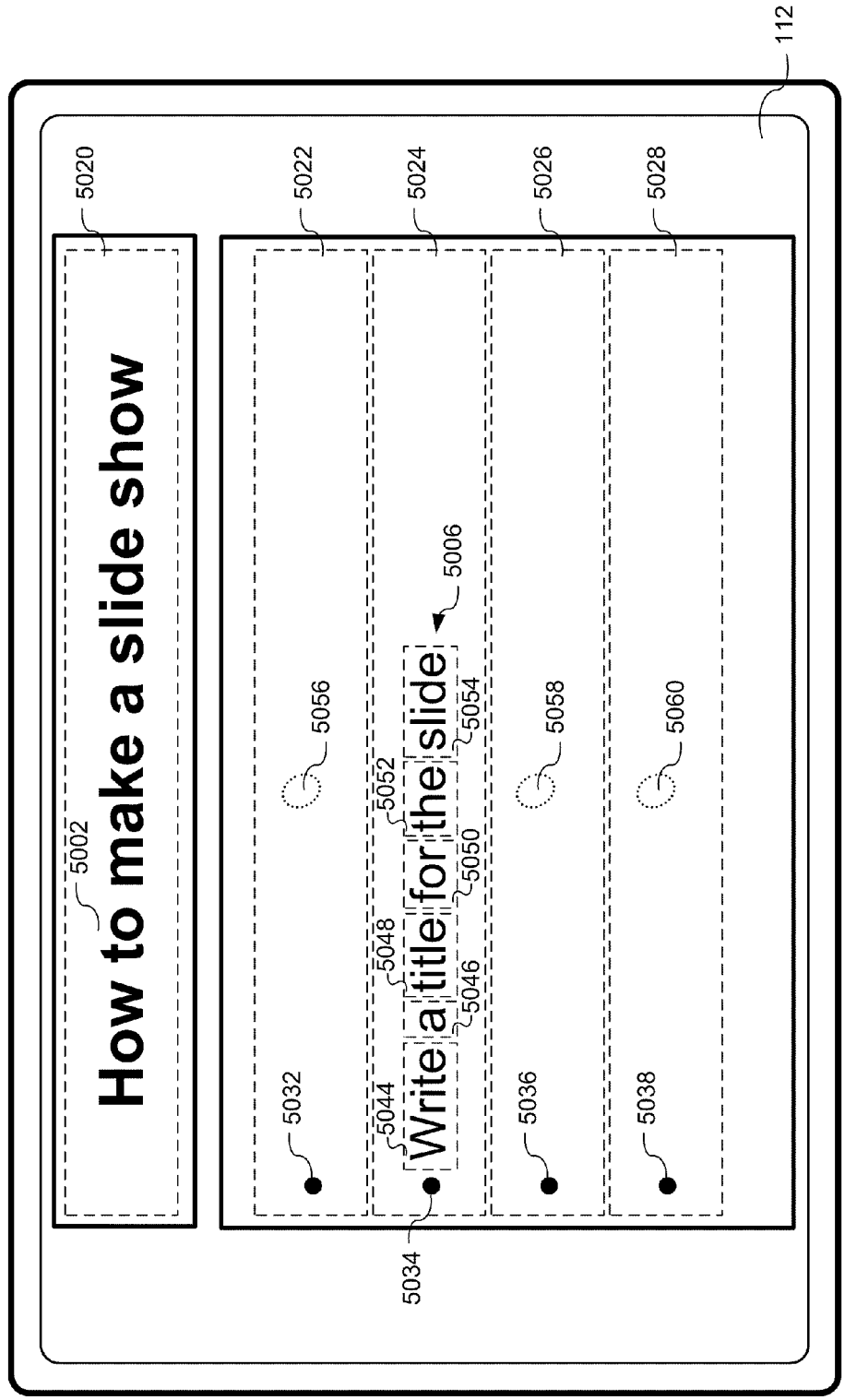
Figure 5E:
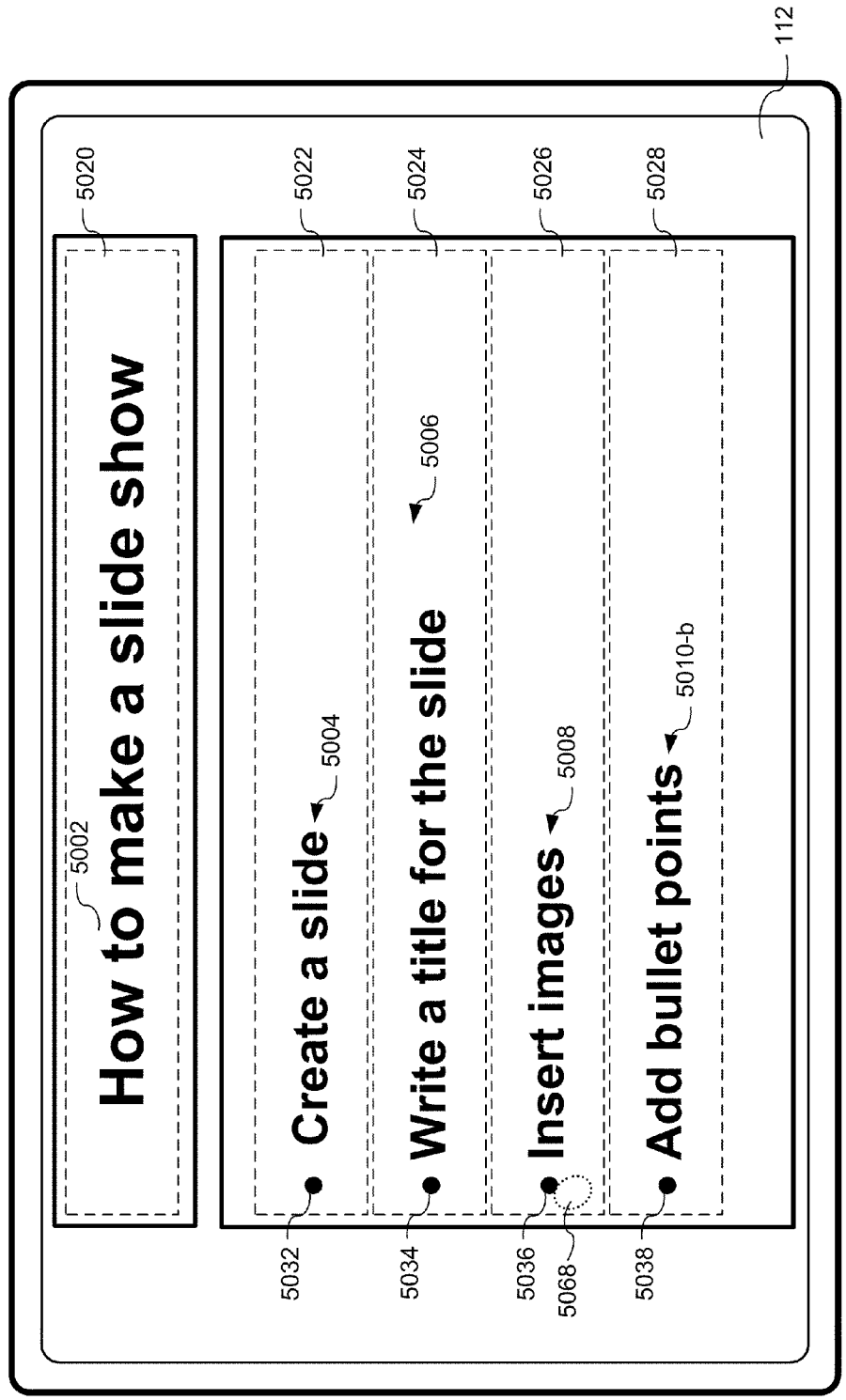

FIGS. 5C-5E illustrate exemplary user interfaces for selecting and displaying presentation emphasis objects (e.g., bulleted list items 5004, 5006, 5008, and 5010-*b* in FIG. 5E) and emphasis animations in response to user inputs on respective activation regions for the presentation emphasis objects while a presentation application is in a presentation mode in accordance with some embodiments. For example, in response to tap gesture 5040 on activation region 5024 in FIG. 5C, a bulleted list item 5006 is displayed in FIG. 5D; in response to tap gesture 5056 on activation region 5022 in FIG. 5D, a bulleted list item 5004 is displayed in FIG. 5E; in response to tap gesture 5058 on activation region 5026 in FIG. 5D, a bulleted list item 5008 is displayed in FIG. 5E; and in response to tap gesture 5060 on activation region 5028 in FIG. 5D, a bulleted list item 5010-*b* is displayed in FIG. 5E.

Figure 5F:
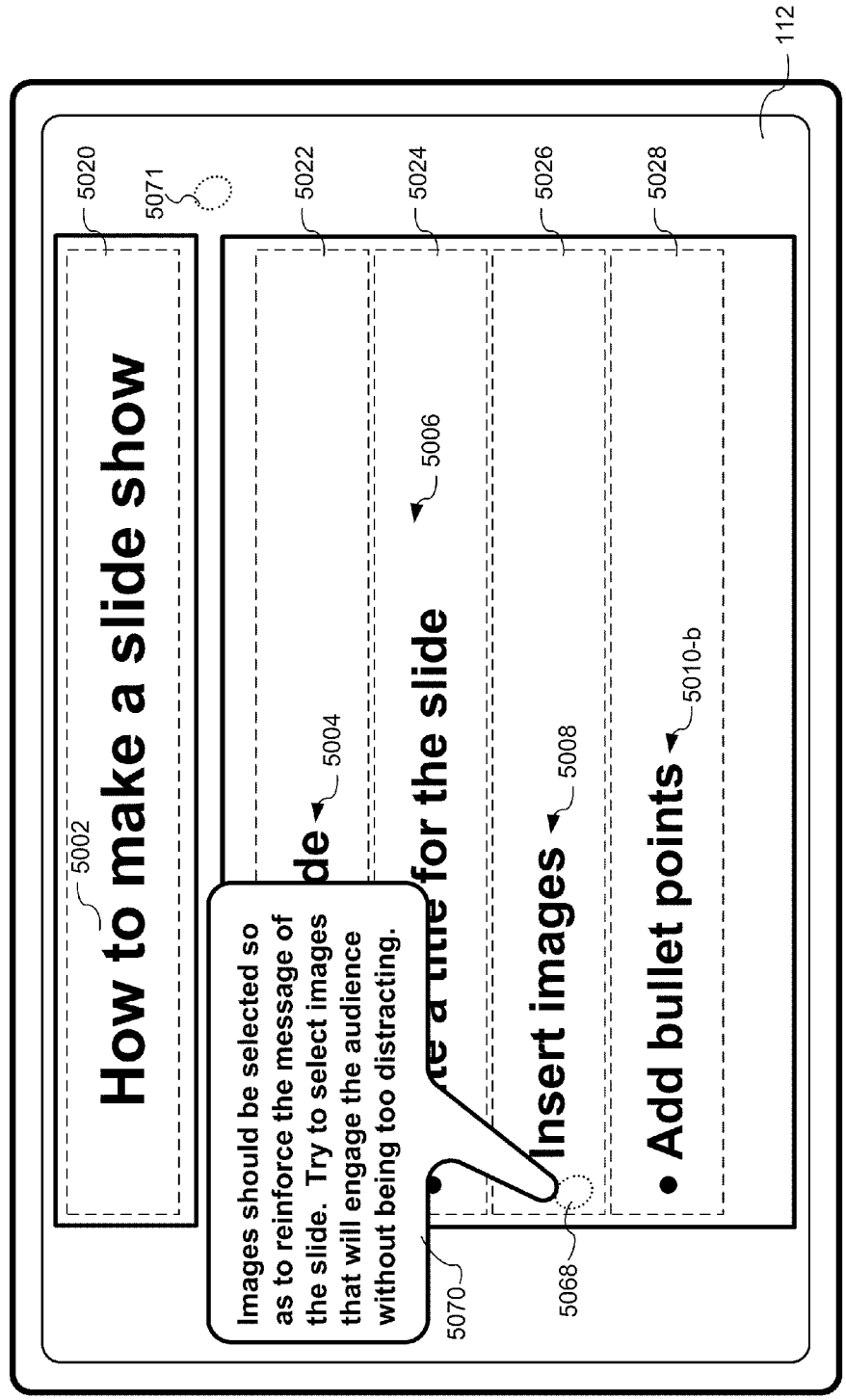

FIGS. 5E-5F illustrate exemplary user interfaces for selecting and displaying presentation emphasis objects (e.g., annotation 5070 in FIG. 5F) and emphasis animations in response to user inputs on respective activation regions for the presentation emphasis objects while a presentation application is in a presentation mode in accordance with some embodiments. For example, in response to tap and hold gesture 5068 on activation region 5026 in FIG. 5E, an annotation 5070 is displayed in FIG. 5F.

Figure 5G:
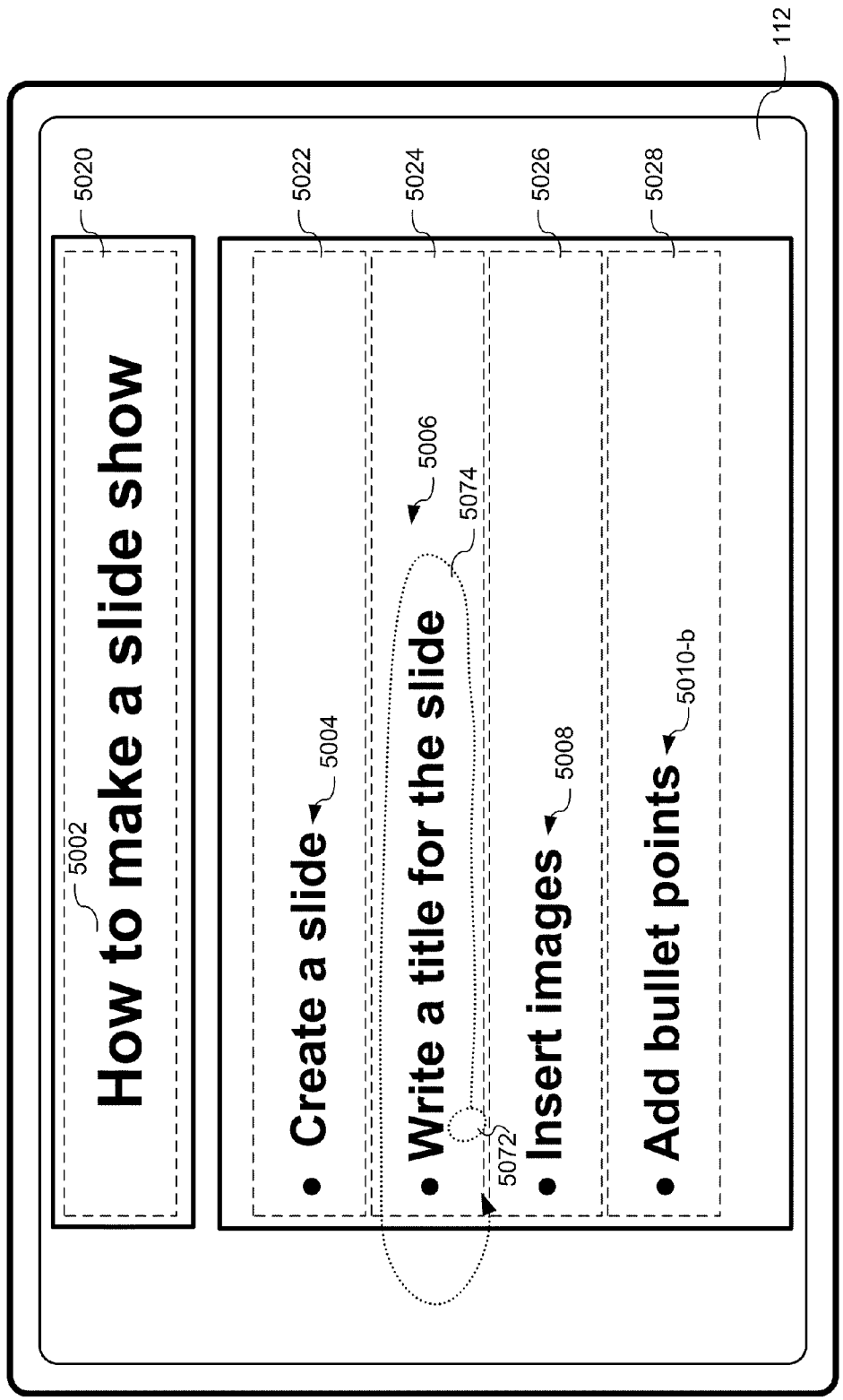
Figure 5H:
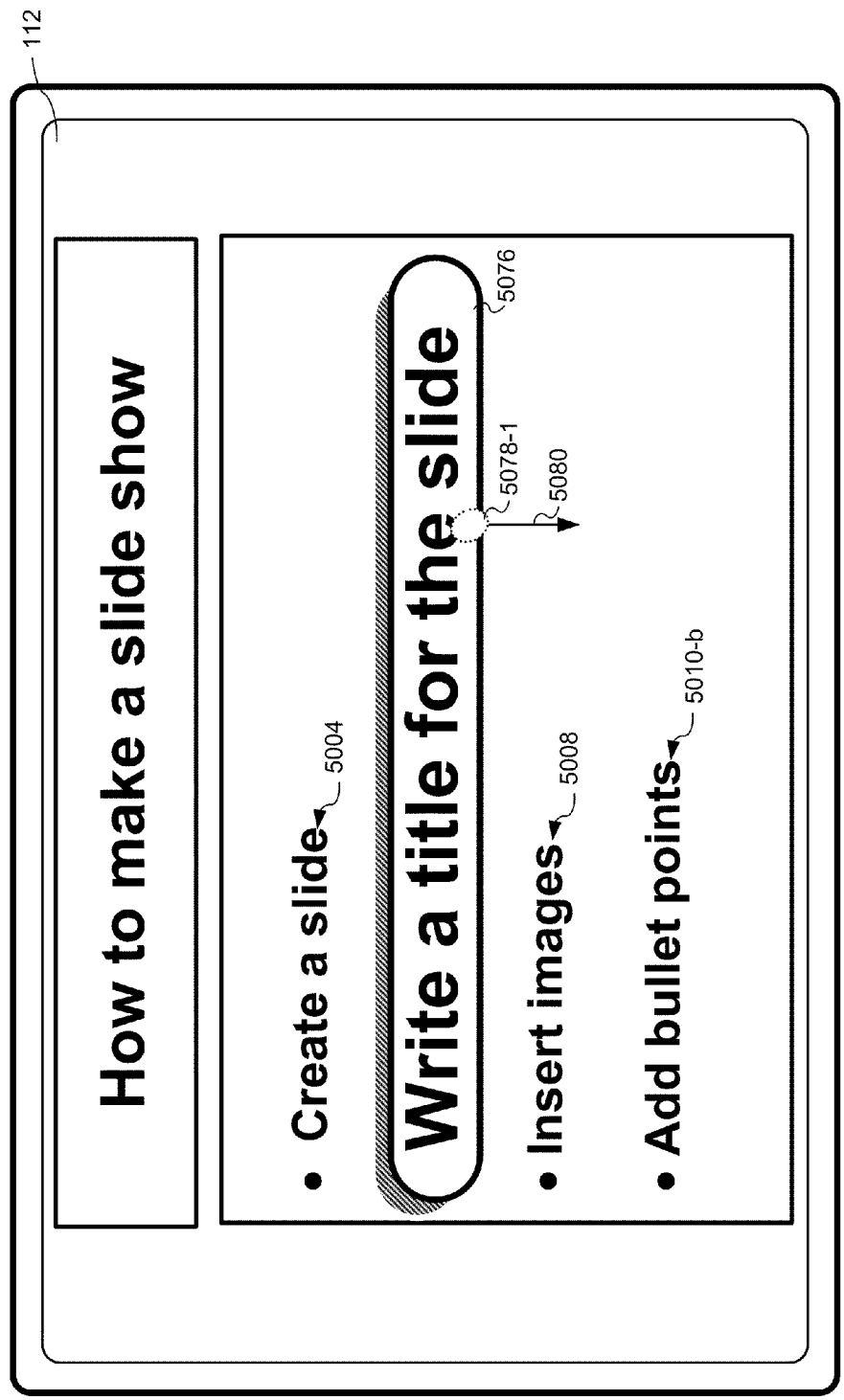
Figure 5I:
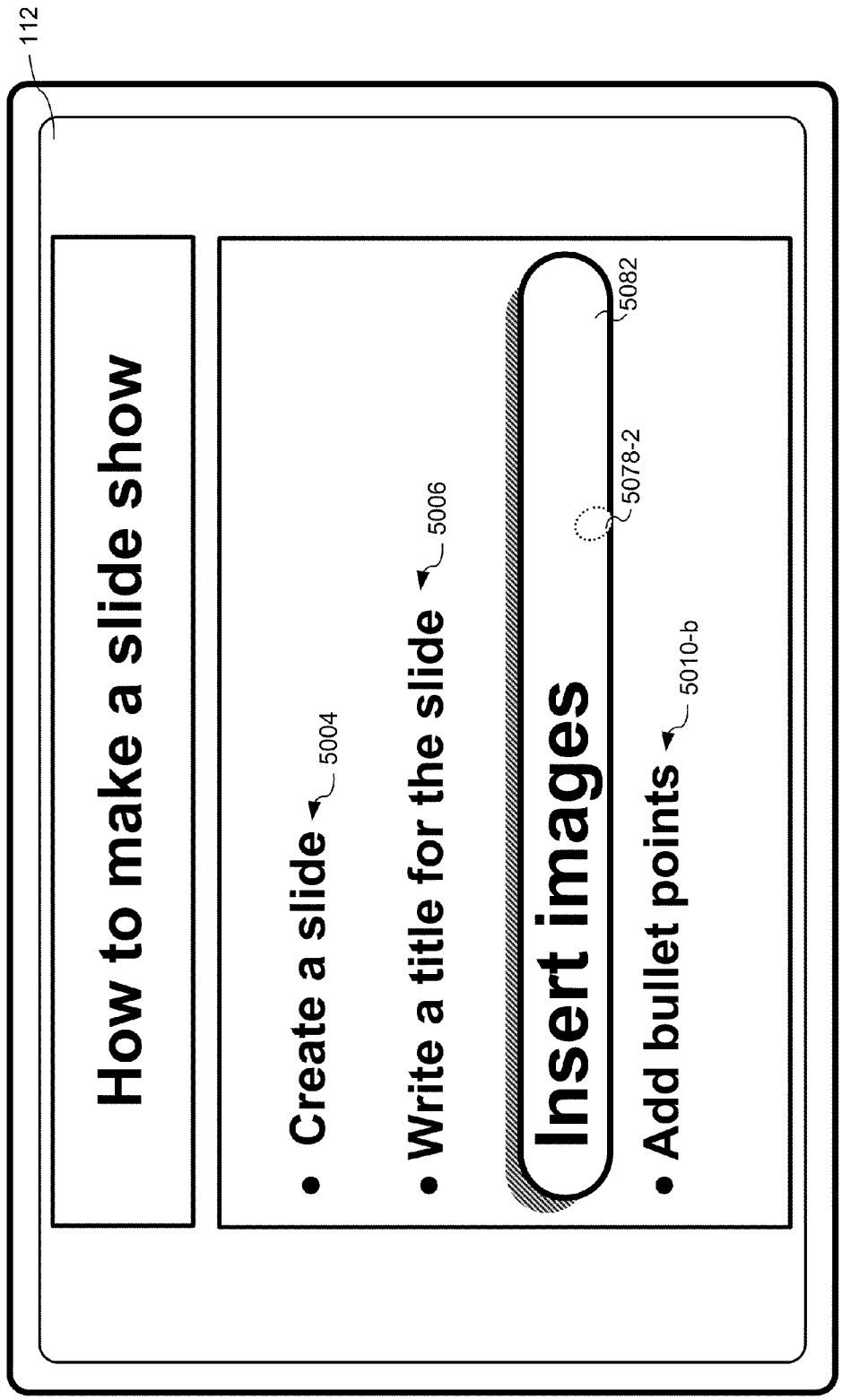

FIGS. 5G-5I illustrate exemplary user interfaces for selecting and displaying a first presentation emphasis object (e.g., a first enlarged representation of one of the bulleted list items 5076 in FIG. 5H) and emphasis animations in response to a first user input on respective activation regions for the presentation emphasis objects (e.g., in response to a circling gesture including contact 5072 and movement 5074 on activation region 5024 in FIG. 5G, a first enlarged representation 5076 is displayed in FIG. 5H), and subsequently ceasing to display the first presentation emphasis object (e.g., first enlarged representation 5076 in FIG. 5H) and displaying a second presentation emphasis object (e.g., second enlarged representation 5082 in FIG. 5I) in response to a second user input (e.g., a tap and drag gesture including a contact 5078 with the first enlarged representation 5076, and subsequent movement 5080 of the contact in FIG. 5H) while a presentation application is in a presentation mode in accordance with some embodiments.

Figure 5J:
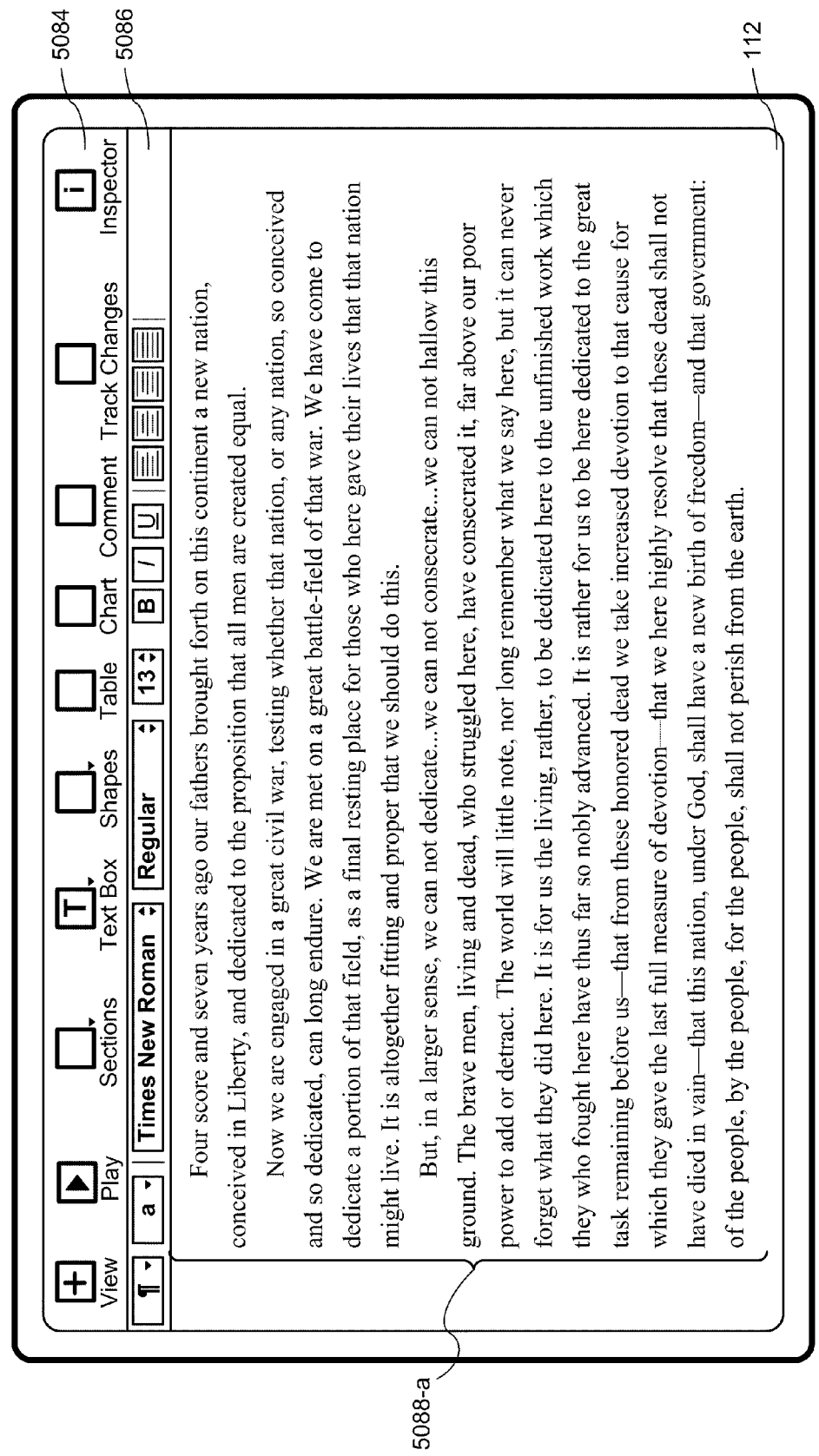
Figure 5K:
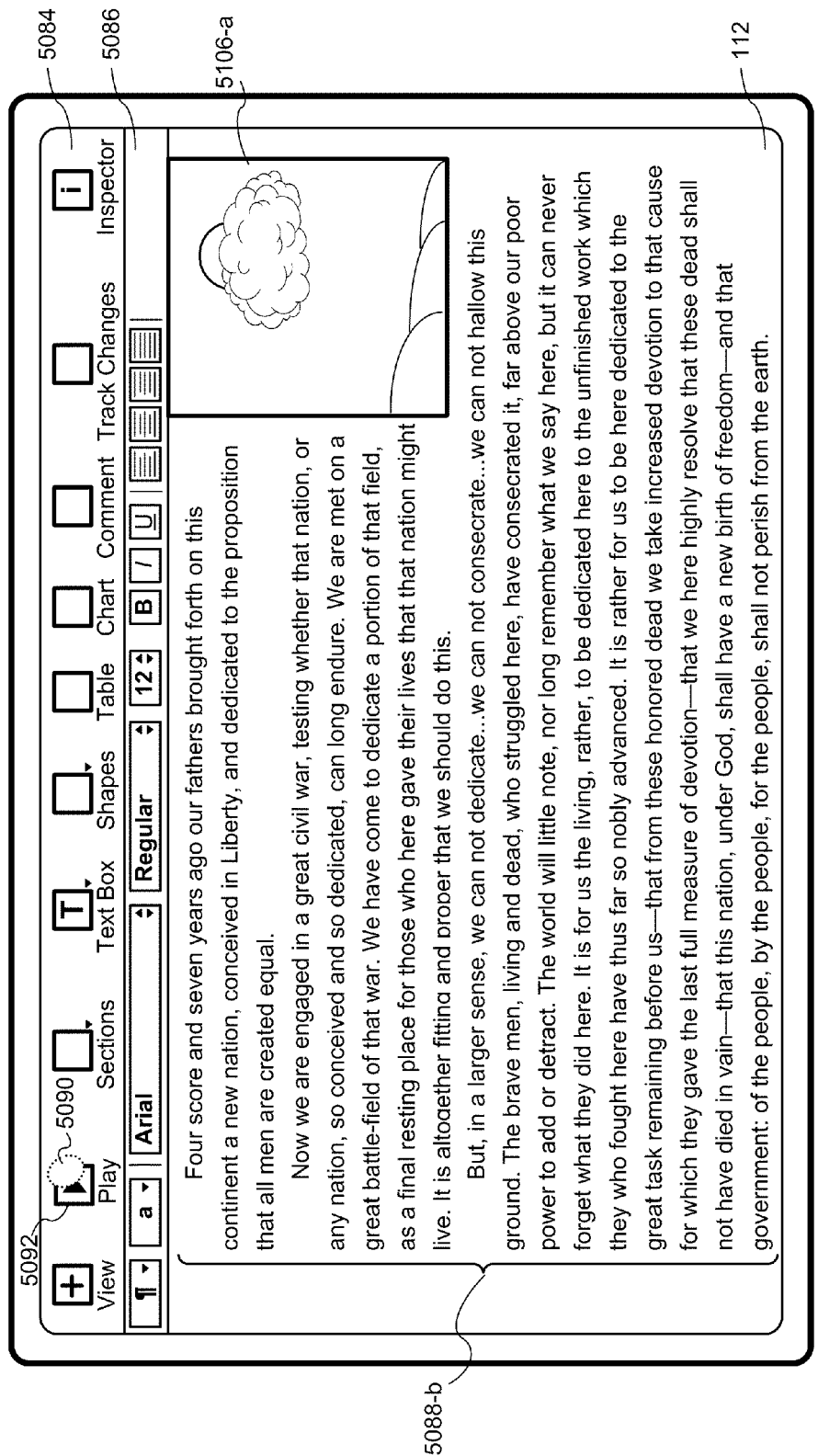

FIGS. 5J-5K illustrate exemplary user interfaces for editing a word-processing document while a word-processing application is in an editing mode (e.g., by changing the style and size of text 5088-*a* in FIG. 5J to text 5088-*b* in FIG. 5K and adding an image 5106-*a* to the word-processing document, as illustrated in FIG. 5K) and detecting an input (e.g., tap gesture 5090 with "Play" icon 5092 in FIG. 5K) and responding to the input by entering a presentation mode in accordance with some embodiments.

Figure 5L:
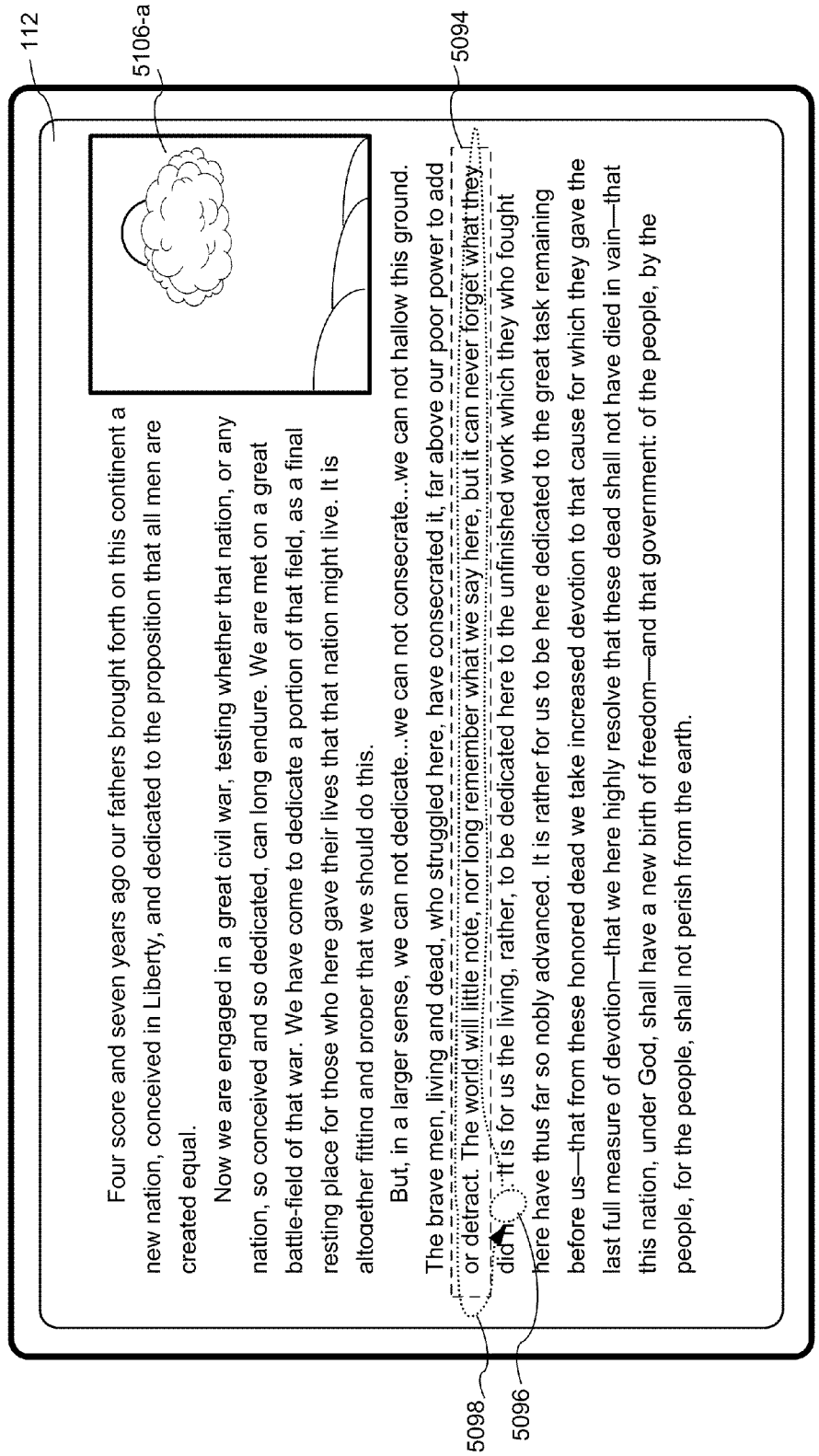
Figure 5M:
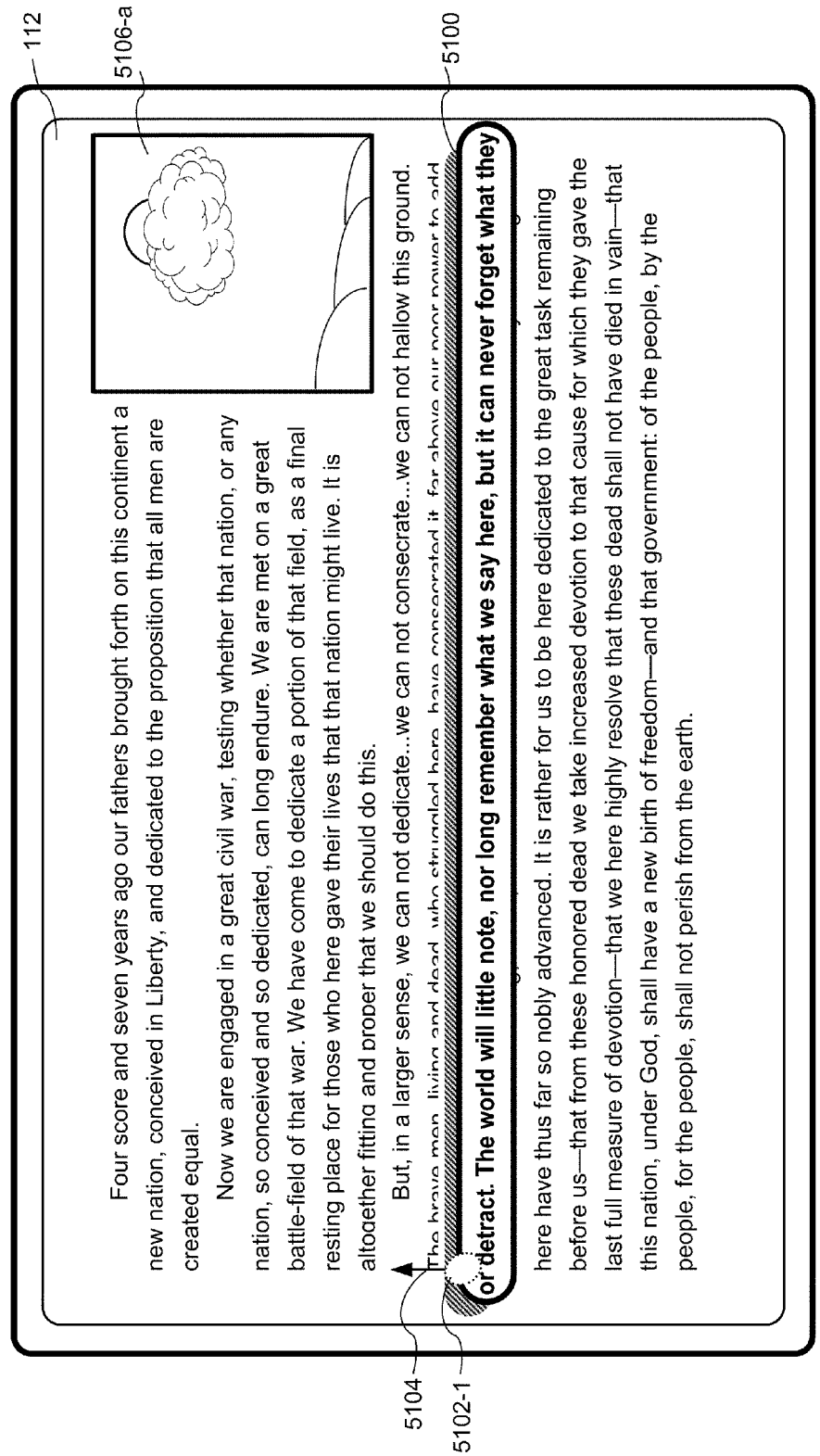
Figure 5N:
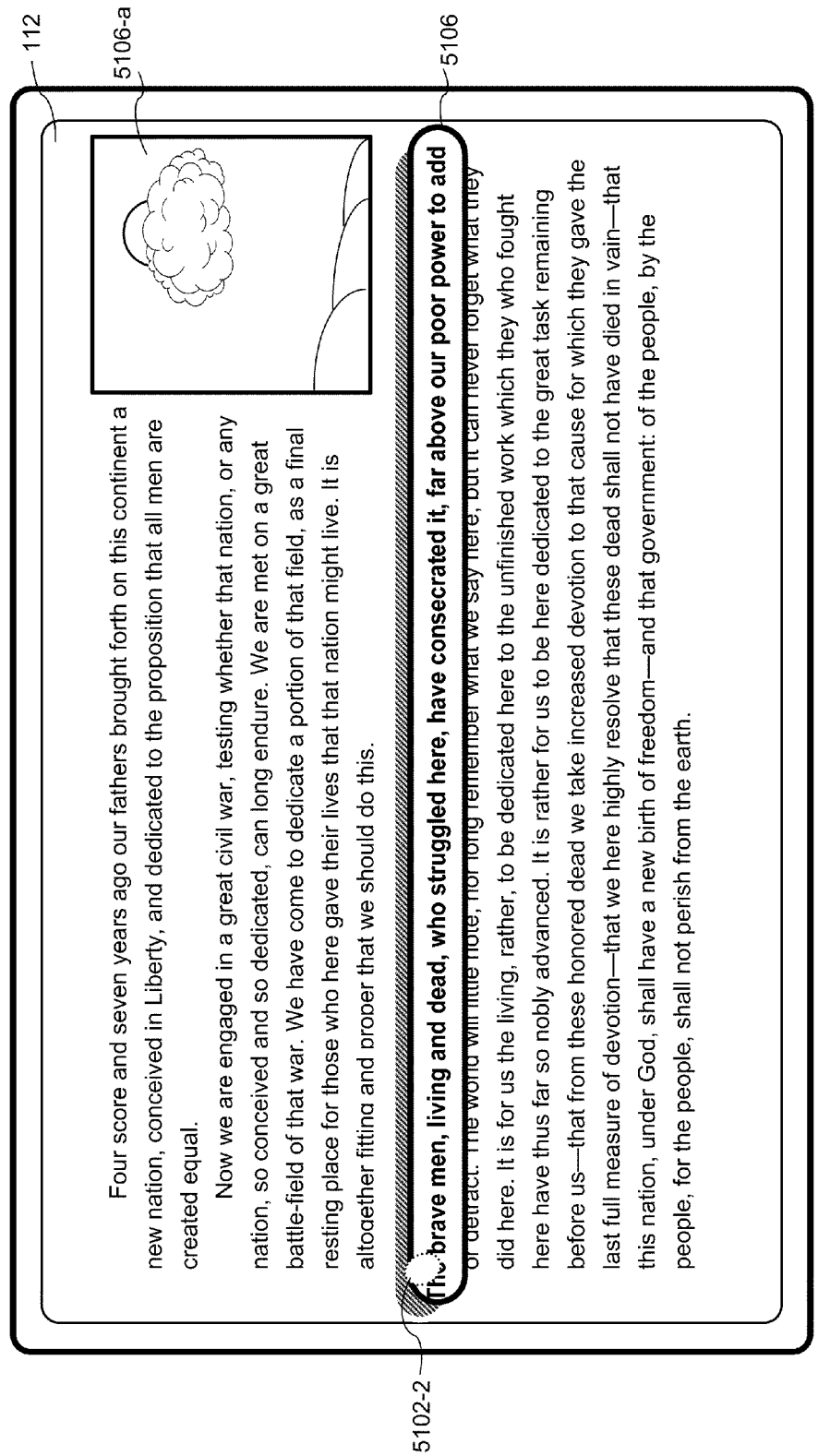

FIGS. 5L-5N illustrate exemplary user interfaces for selecting and displaying a first presentation emphasis object (e.g., a first enlarged representation of one of the lines of text 5100 in FIG. 5M) and emphasis animation in response a first user input on respective activation region for the first presentation emphasis object (e.g., in response to a circling gesture including contact 5096 and movement 5098 on activation region 5094 in FIG. 5L, a first enlarged representation 5100 is displayed in FIG. 5M), and subsequently ceasing to display the first presentation emphasis object (e.g., first enlarged representation 5100 in FIG. 5M) and displaying a second presentation emphasis object (e.g., second enlarged representation 5106 in FIG. 5N) in response to a second user input (e.g., a tap and drag gesture including a contact 5102 with the first enlarged representation 5100, and subsequent movement 5104 of the contact in FIG. 5M) while a presentation application is in a presentation mode in accordance with some embodiments.

FIGS. 5O-5R illustrate exemplary user interfaces for selecting and displaying presentation emphasis objects (e.g., enlarged image 5106-*b* in FIG. 5P, 5106-*c* in FIG. 5Q, and 5106-*d* in FIG. 5R) and emphasis animations in response to user inputs on respective activation regions for the presentation emphasis objects while a presentation application is in a presentation mode in accordance with some embodiments. For example, in response to a de-pinch gesture in FIG. 5O on image 5106-*a*, the device displays one of: a full screen image 5106-*b* in FIG. 5P, an enlarged image 5106-*c* in FIG. 5Q, or a cropped image 5106-*d* in FIG. 5R. The de-pinch gesture includes a first contact 5108 at an initial first contact location 5108-1 and a second contact 5110 at an initial first contact location 5110-1, and movement 5112 of the first contact 5108 to a current first contact location 5108-2 and movement 5114 of the second contact 5110 to a current second contact location 5110-2 in FIG. 5P (e.g., for the full screen image 5106-*b*), 5Q (e.g., for the enlarged image 5106-*c*), or 5R (e.g., for the cropped image 5106-*d*).

Figure 5O:
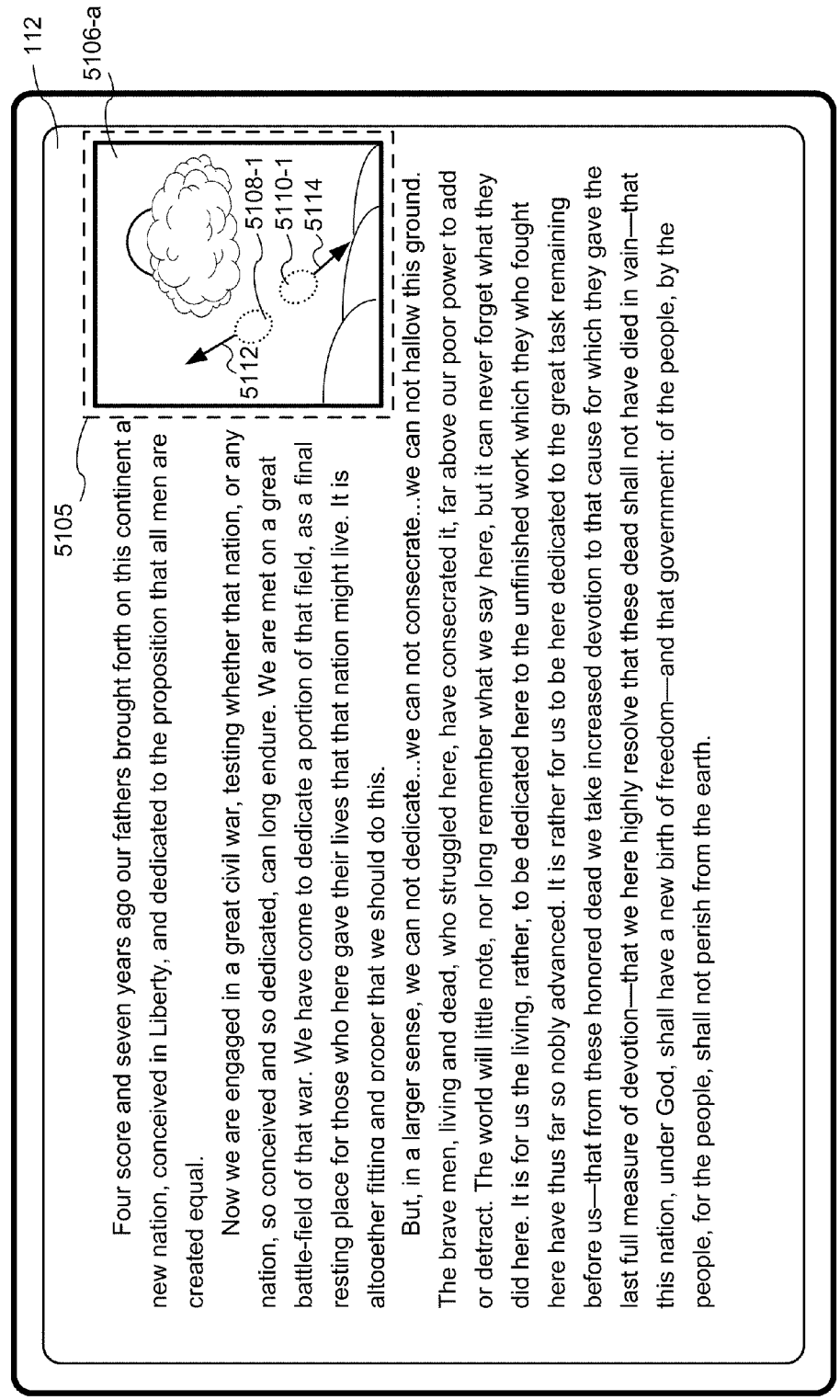
Figure 5P:
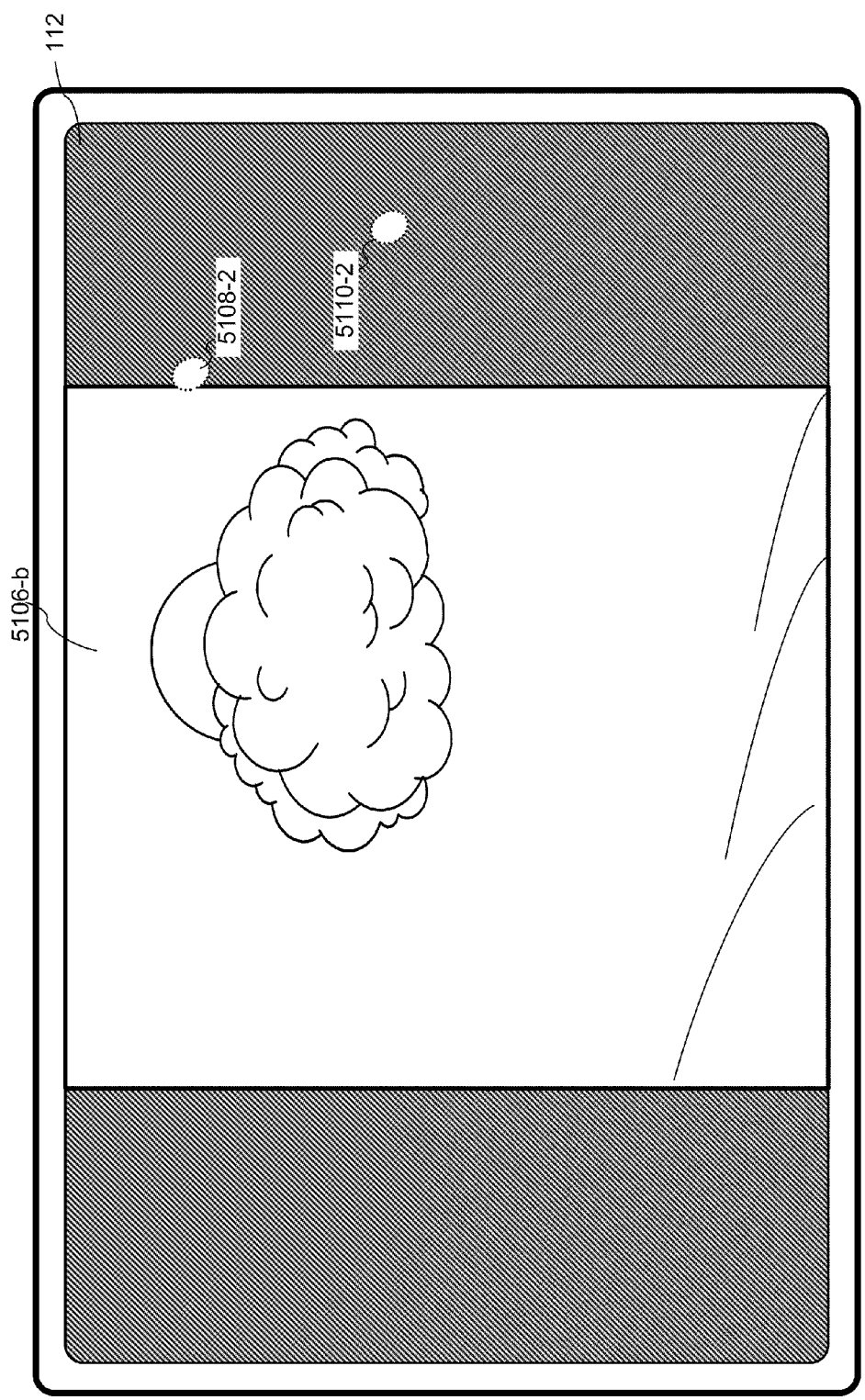
Figure 5Q:
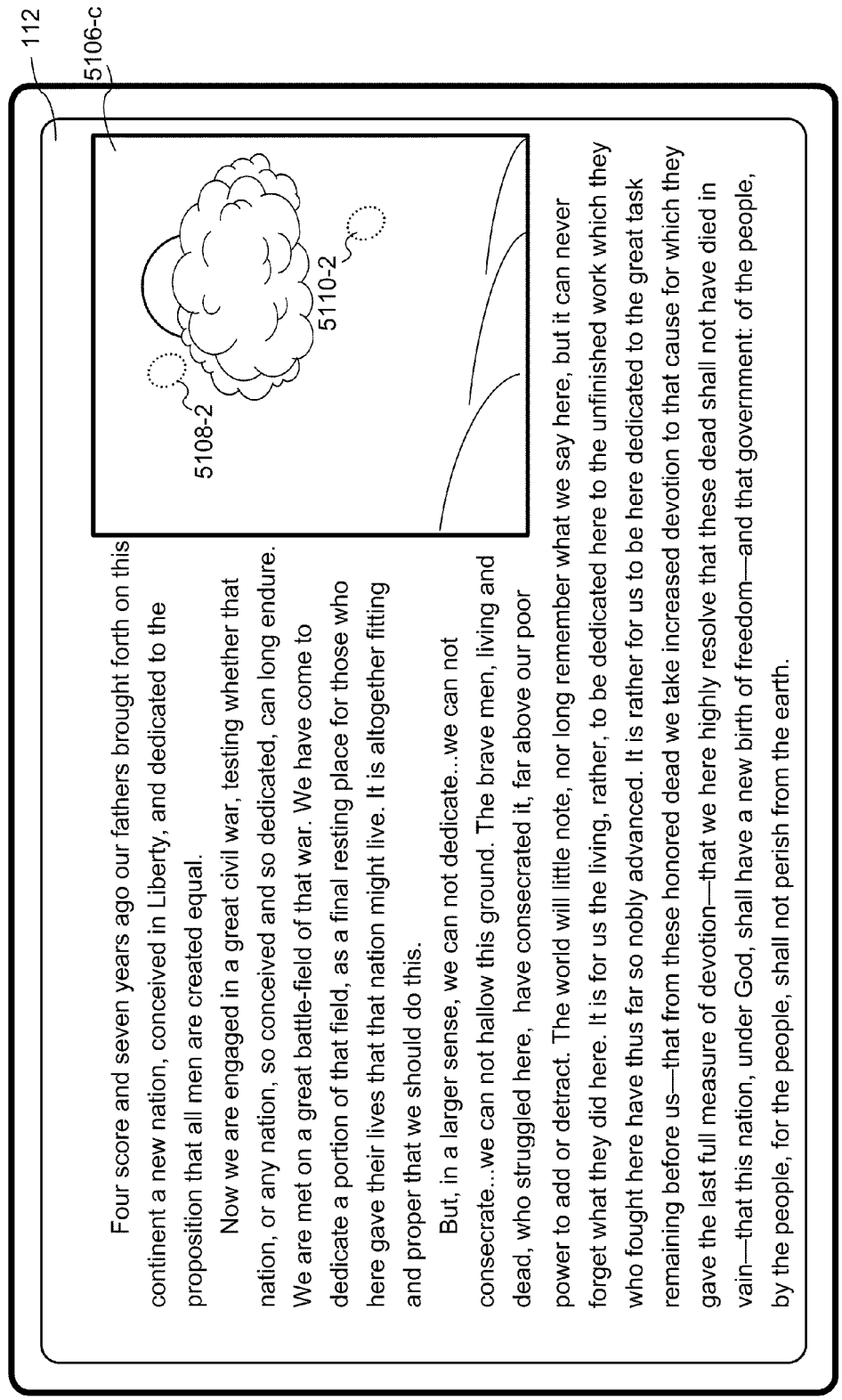
Figure 5R:
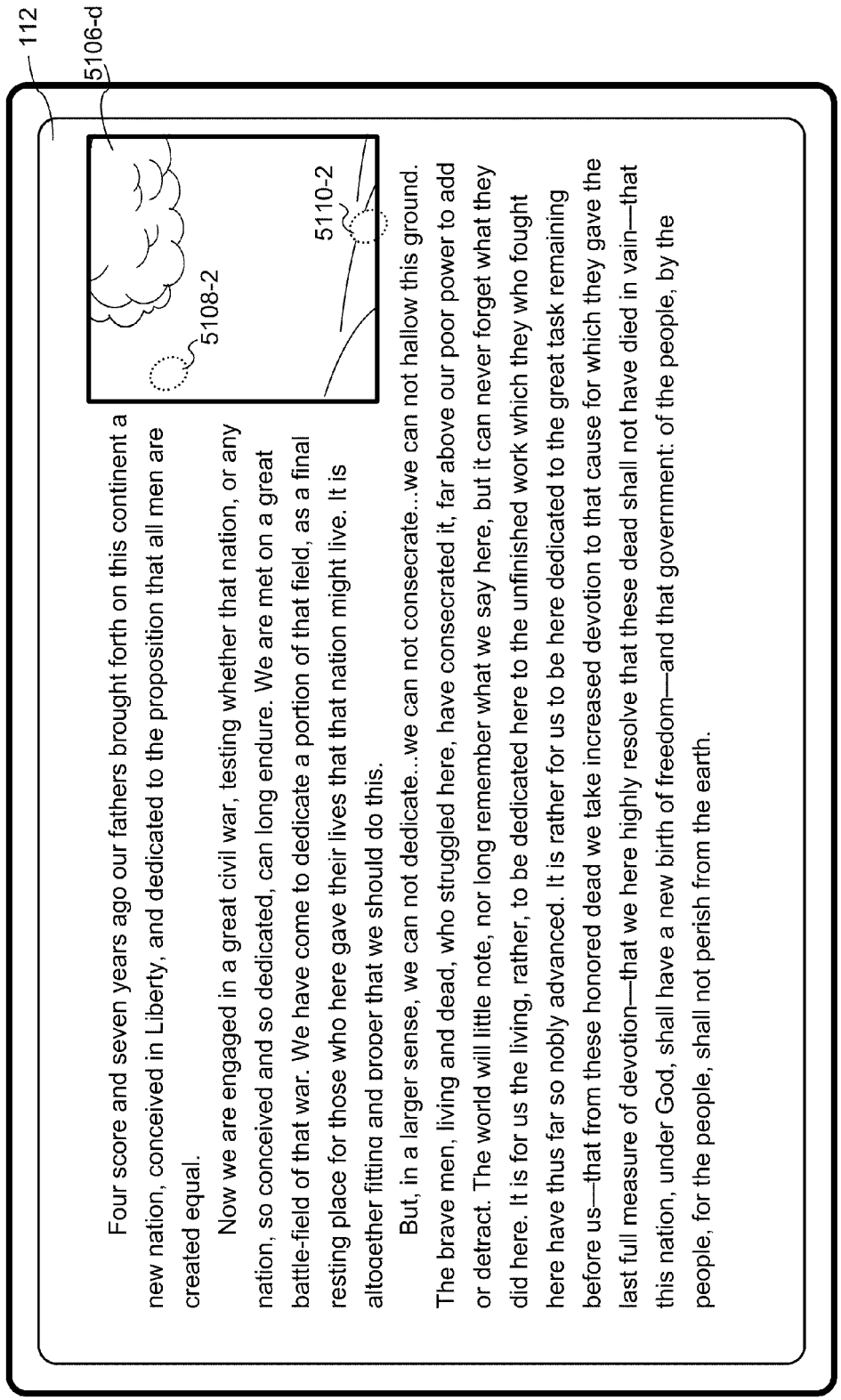
Figure 5S:
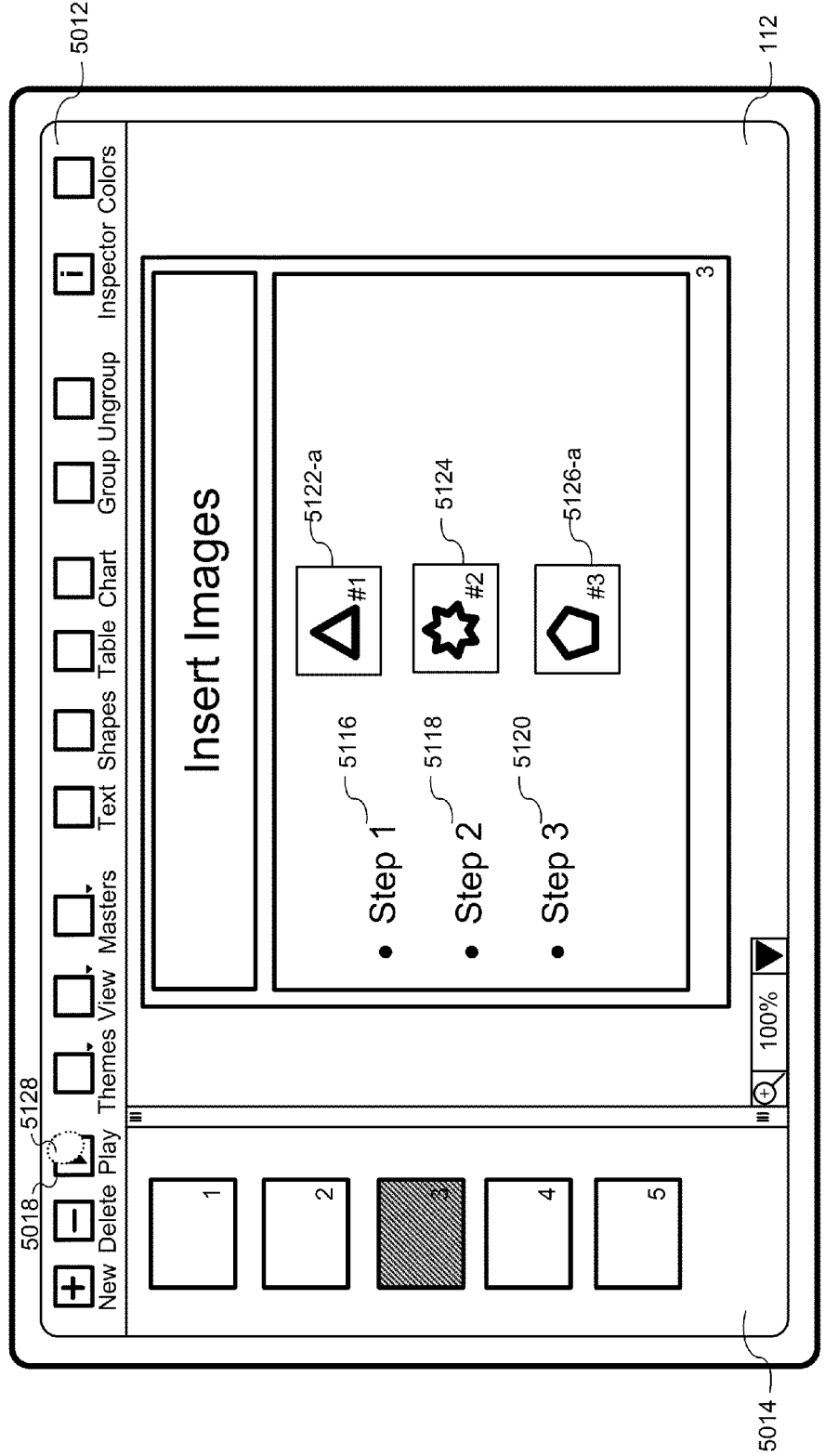

FIG. 5S illustrates exemplary user interfaces for editing a presentation document while a presentation application is in an editing mode (e.g., associating image 5122-*a* with bulleted list item 5116, associating image 5124 with bulleted list item 5118, associating image 5126-*a* with bulleted list item 5120 in FIG. 5S) and detecting an input (e.g., tap gesture 5128 with "Play" icon 5018 in FIG. 5S) and responding to the input by entering a presentation mode in accordance with some embodiments.

Figure 5T:
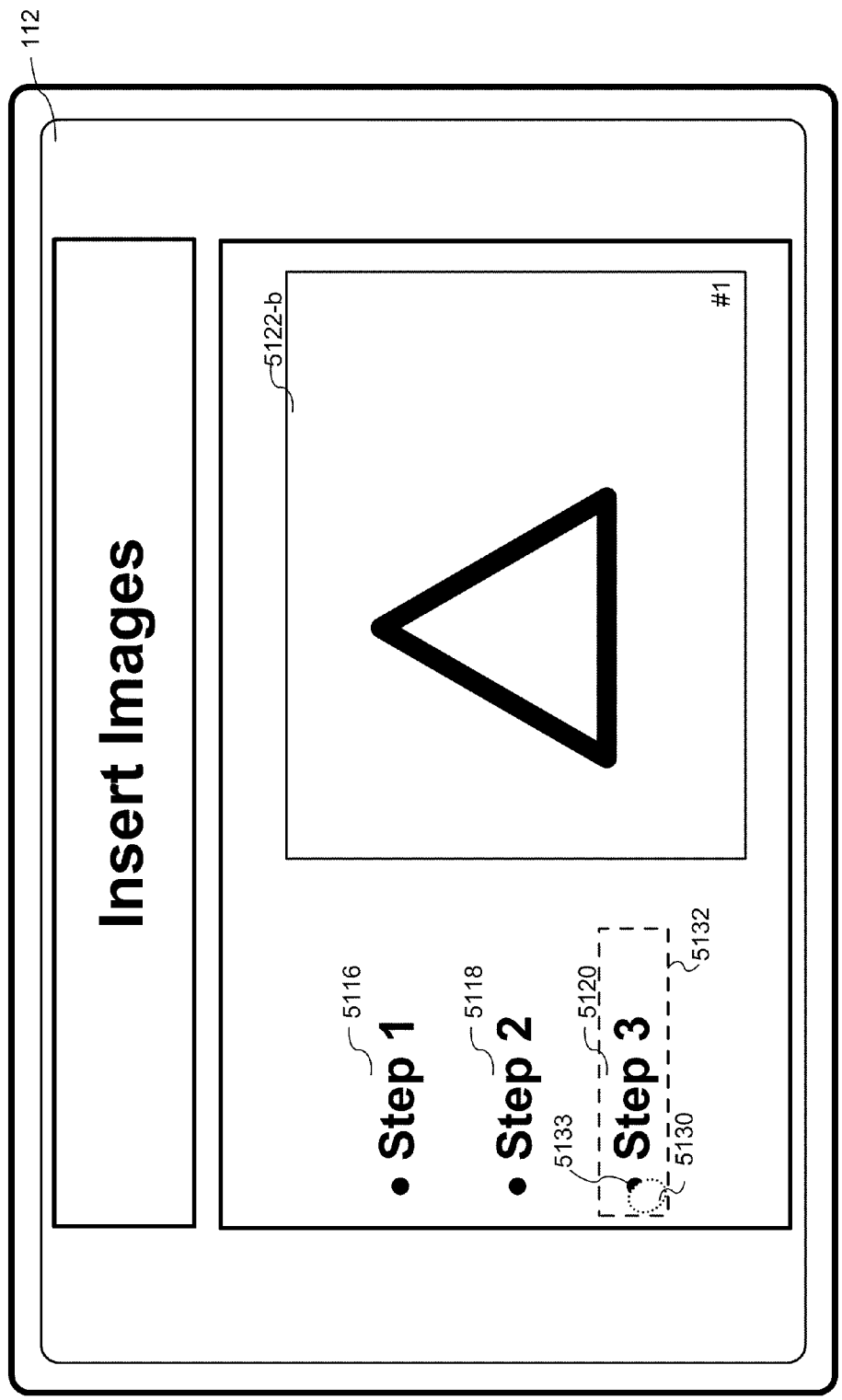
Figure 5U:
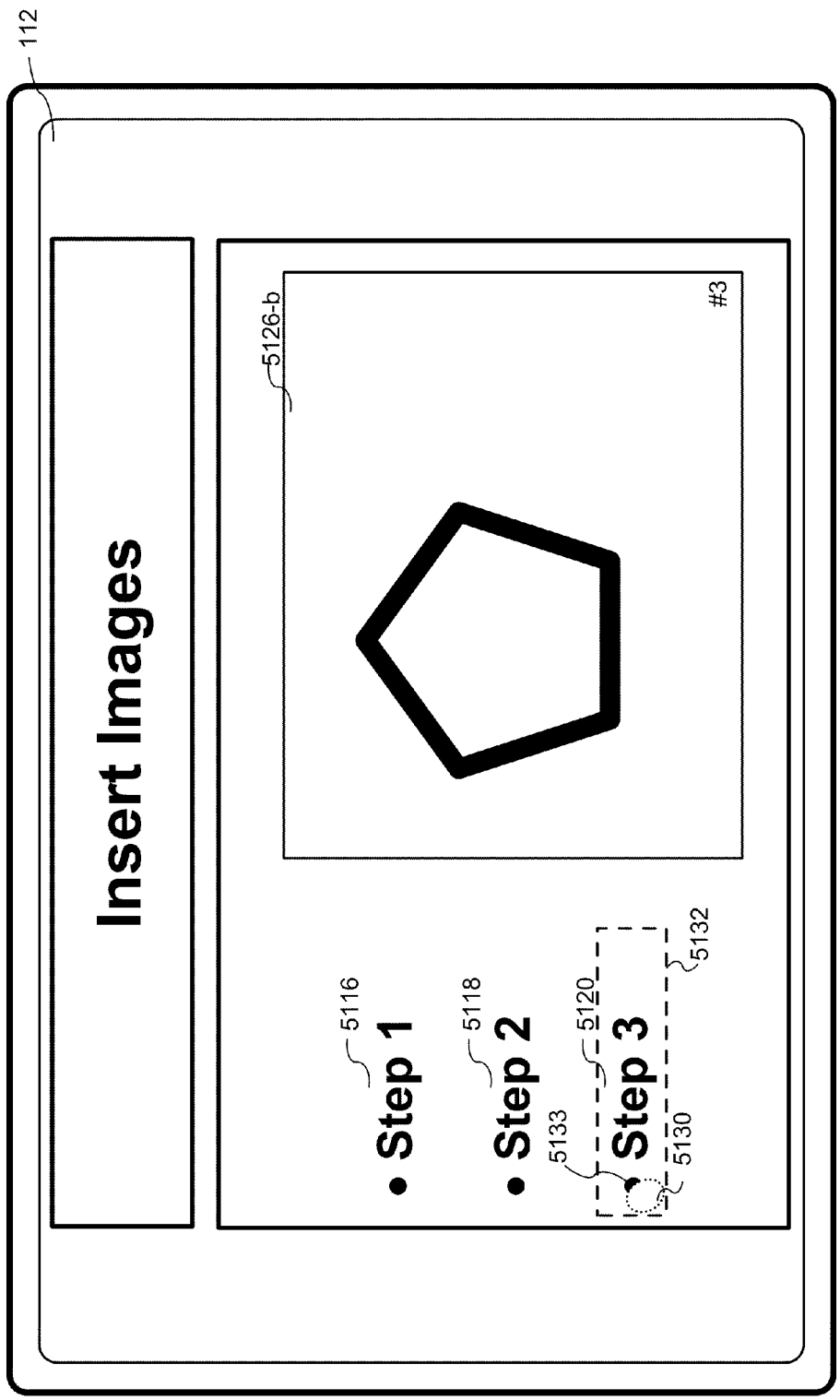

FIGS. 5T-5U illustrate exemplary user interfaces for selecting and displaying a presentation emphasis object (e.g., image 5126-*b* in FIG. 5U) and emphasis animations in response to user input (e.g., tap and hold gesture 5130 with activation region 5132 in FIGS. 5T-5U) received on a first portion of a presentation document while a presentation application is in a presentation mode in accordance with some embodiments.

Figure 5V:
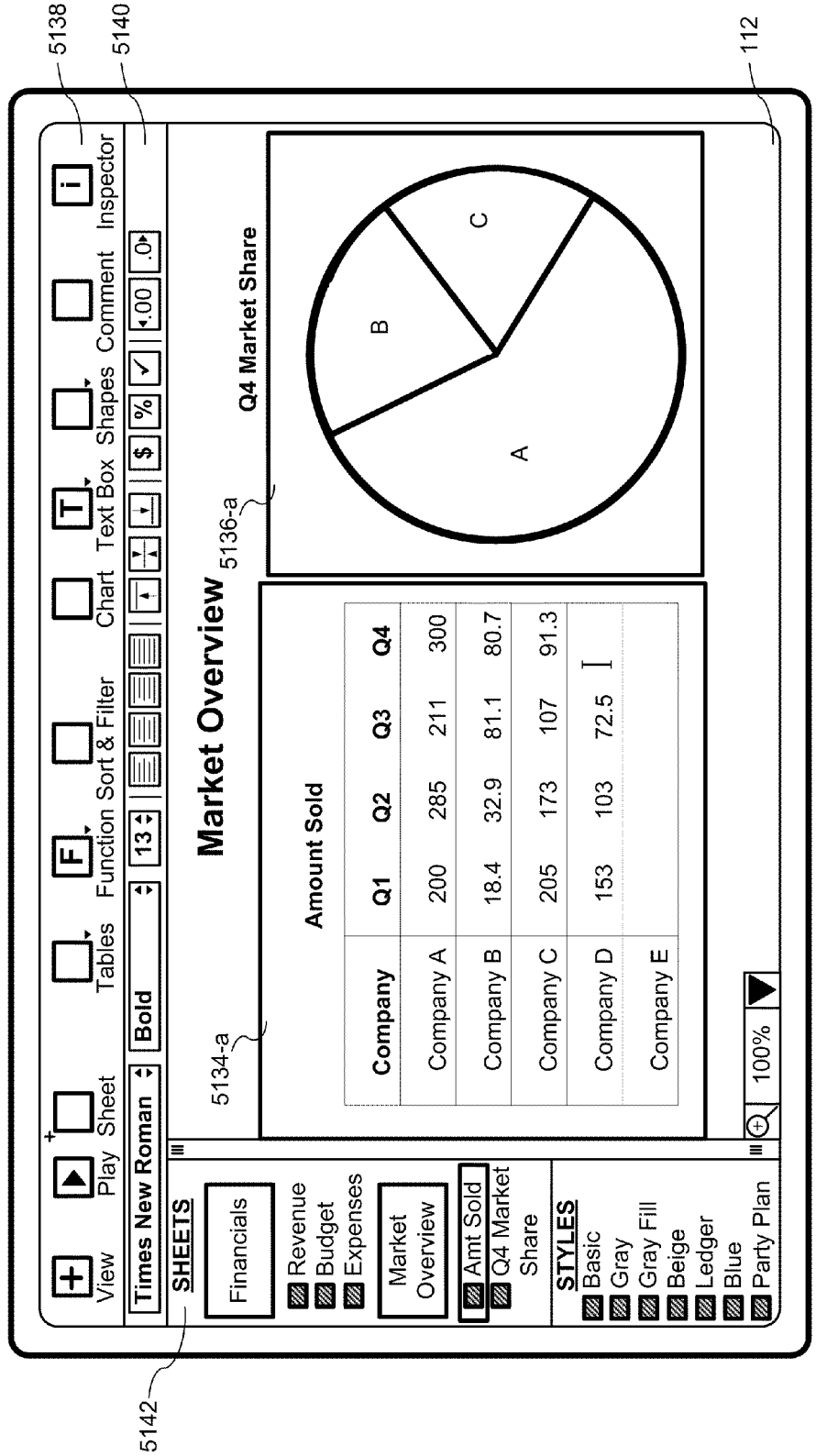
Figure 5W:
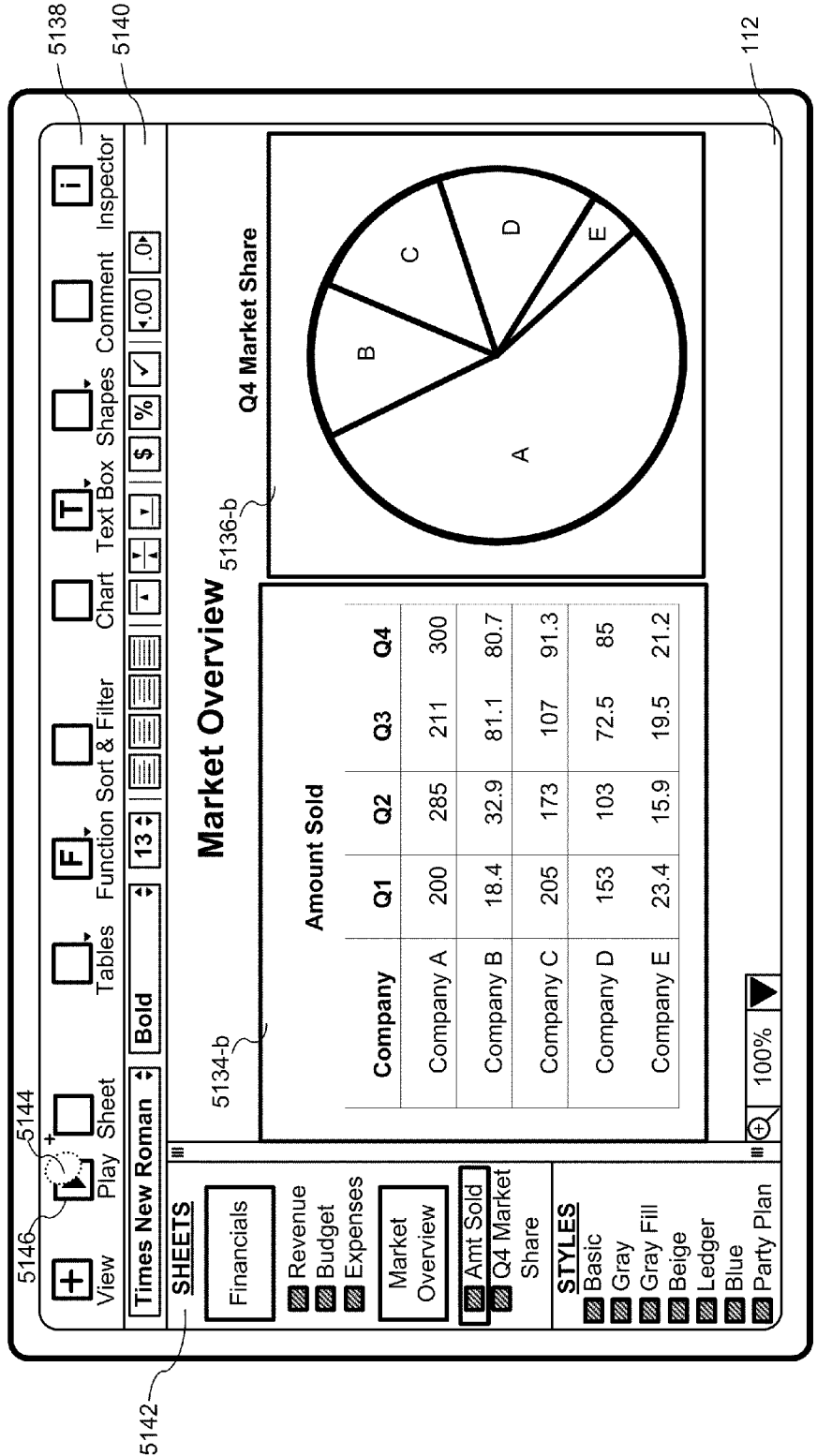

FIGS. 5V-5W illustrate exemplary user interfaces for editing a spreadsheet document while a spreadsheet application is in an editing mode (e.g., by adding numerical values to empty cells of a table 5134-*a* in FIG. 5V to create table 5134-*b* in FIG. 5W) and detecting an input (e.g., tap gesture 5144 with "Play" icon 5146 in FIG. 5W) and responding to the input by entering a presentation mode in accordance with some embodiments.

Figure 5X:
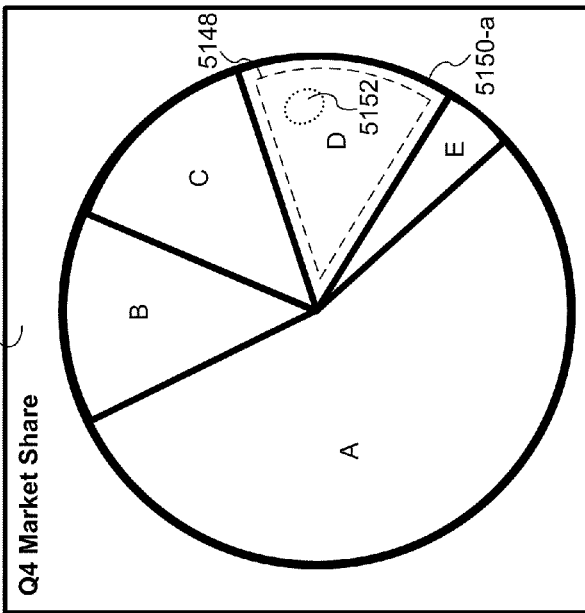
Figure 5Y:
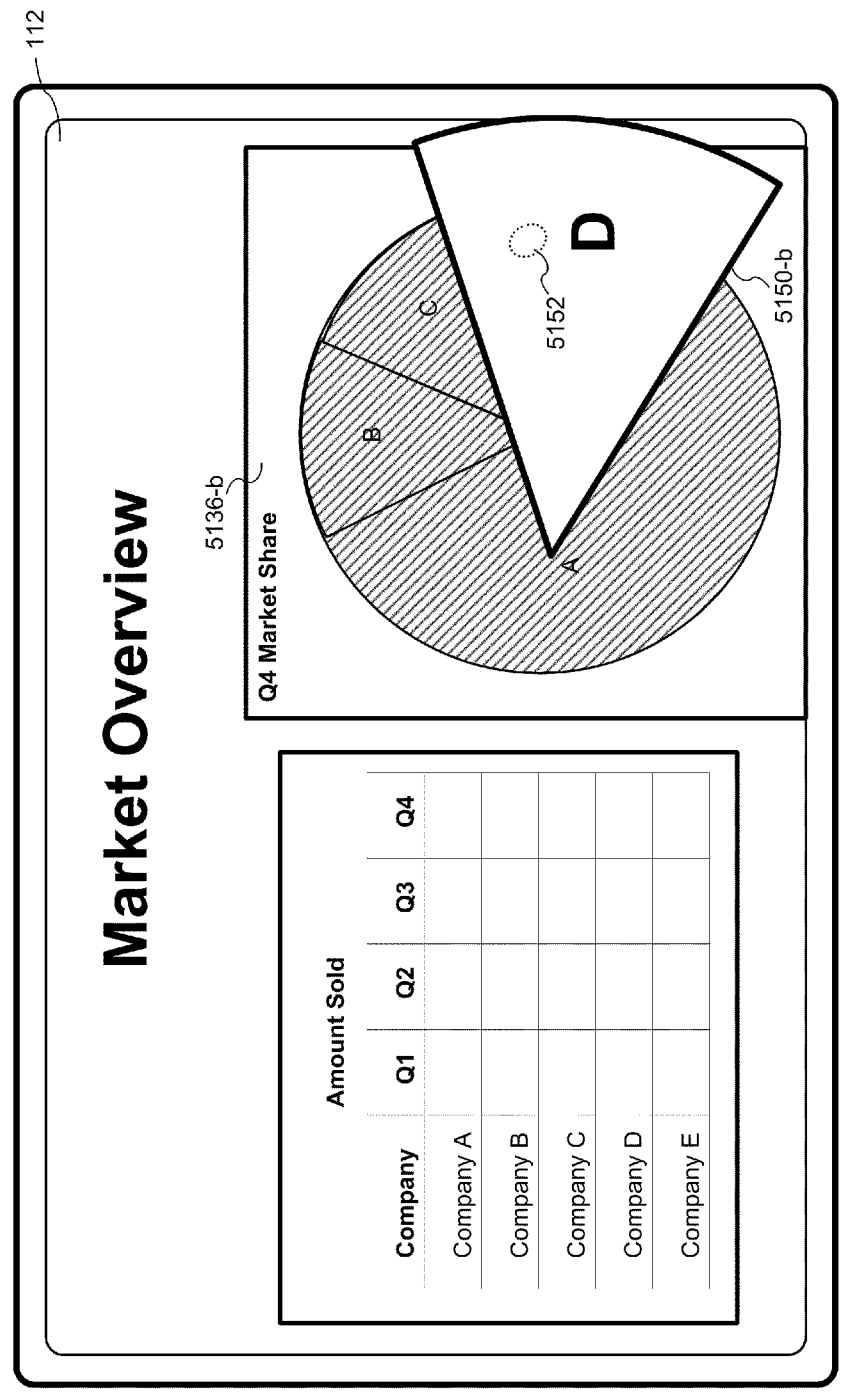

FIGS. 5X-5Y illustrate exemplary user interfaces for selecting and displaying presentation emphasis objects (e.g., expanded pie wedge 5150-*b* in FIG. 5Y) and emphasis animations in response to user inputs (e.g., tap and hold gesture 5152 with activation region 5148 in FIGS. 5X-5Y) received on a first portion of a spreadsheet document while a spreadsheet application is in a presentation mode in accordance with some embodiments.

Figure 5Z:
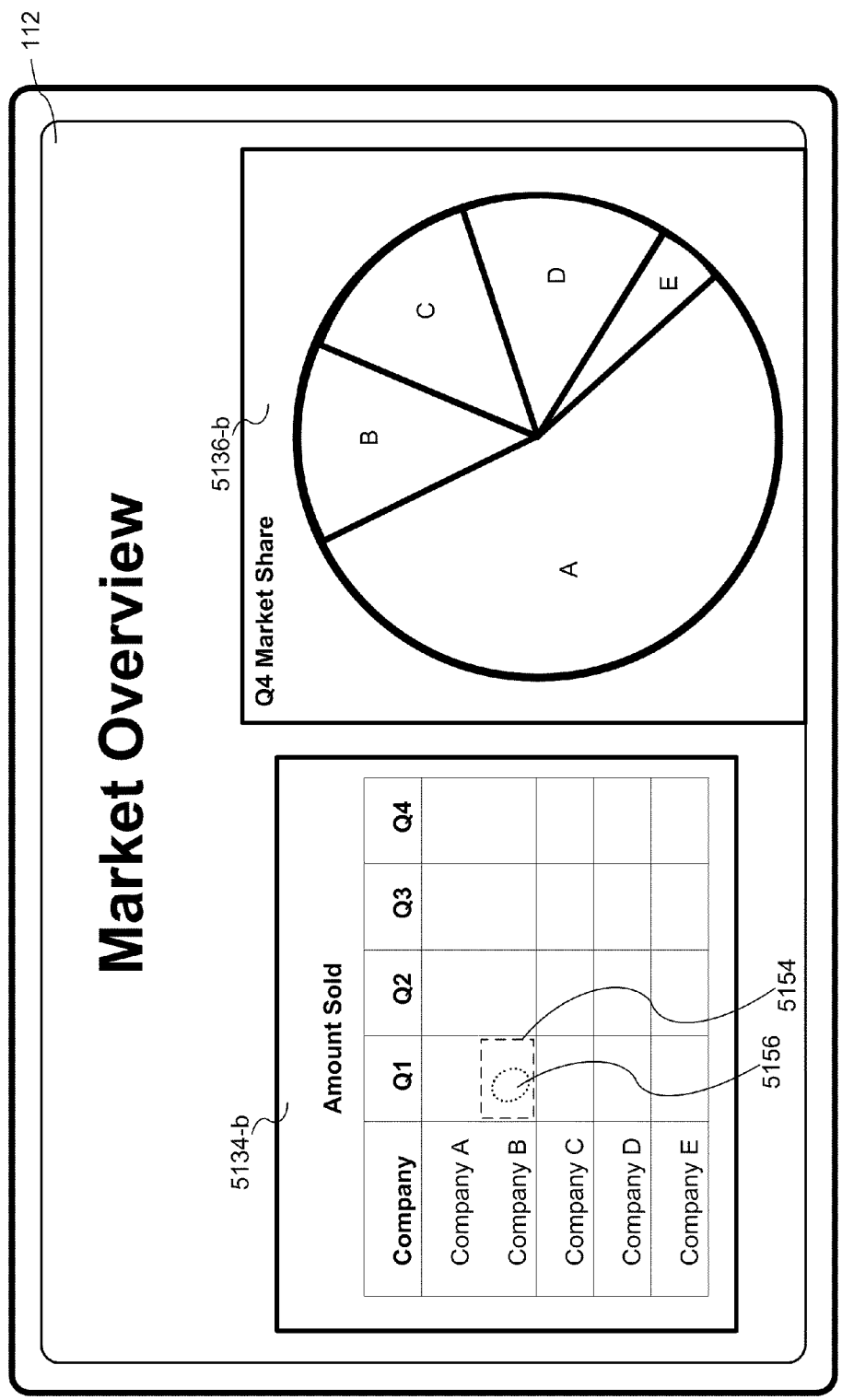
Figure 5A:
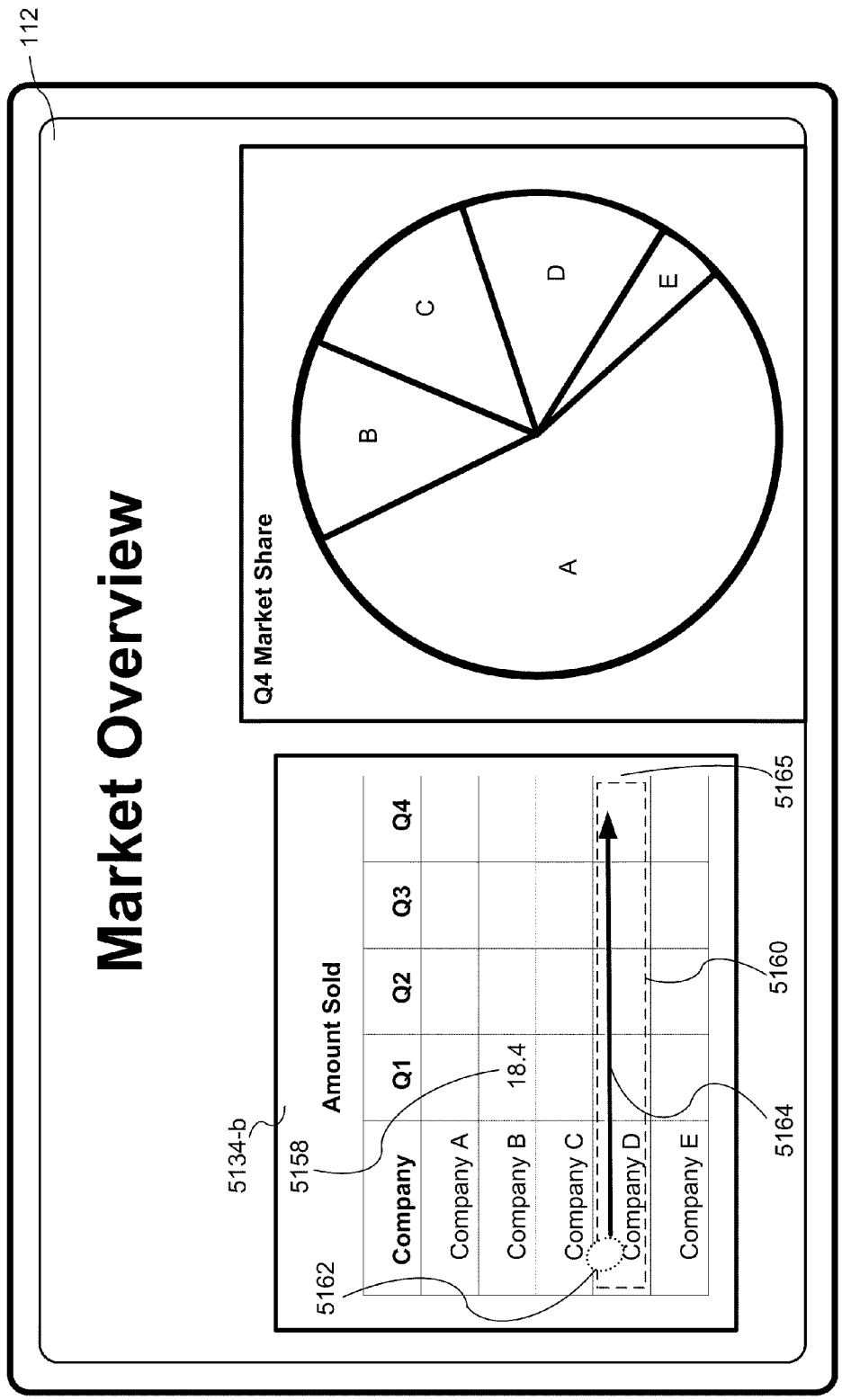
Figure 5B:
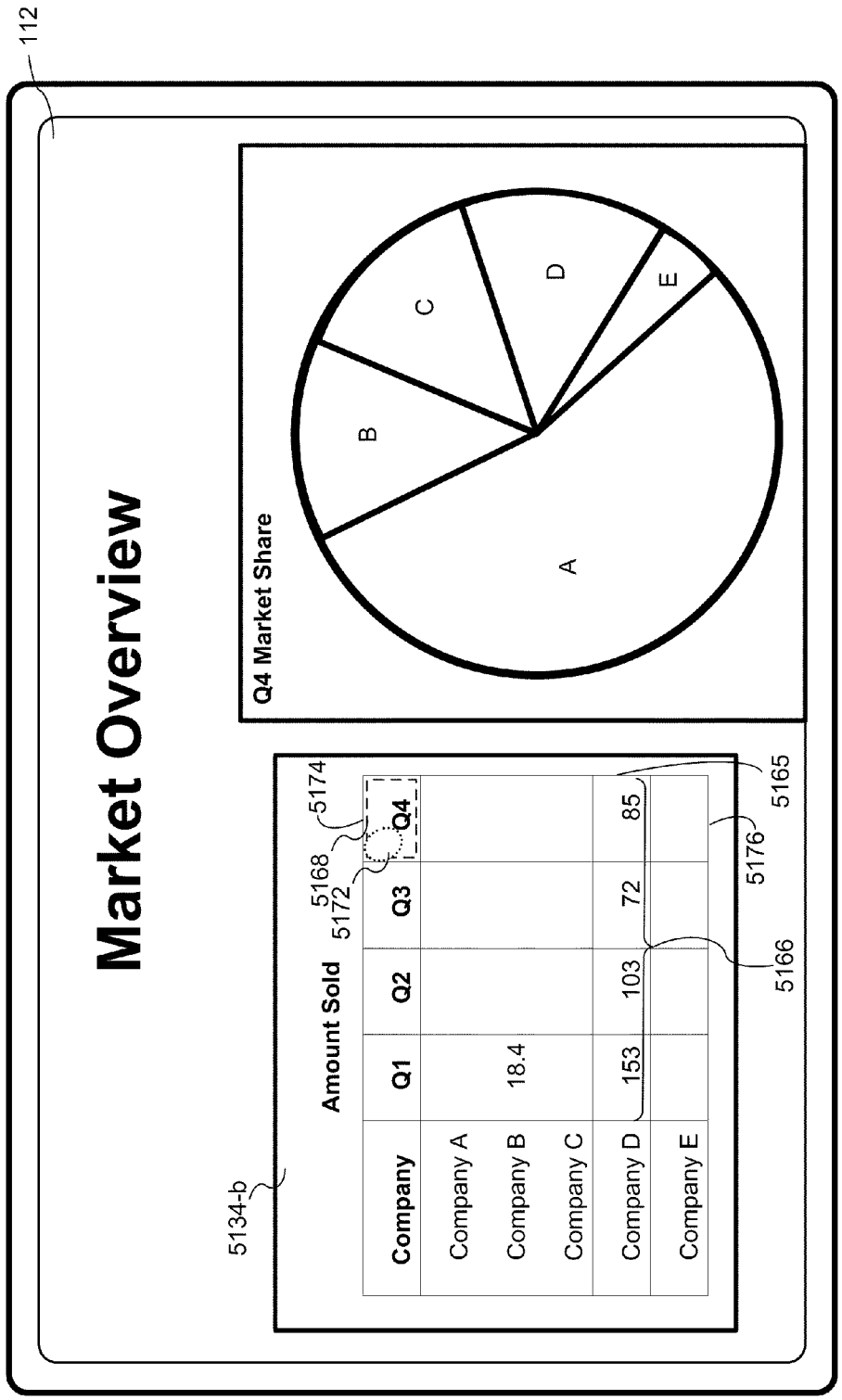
Figure 5C:
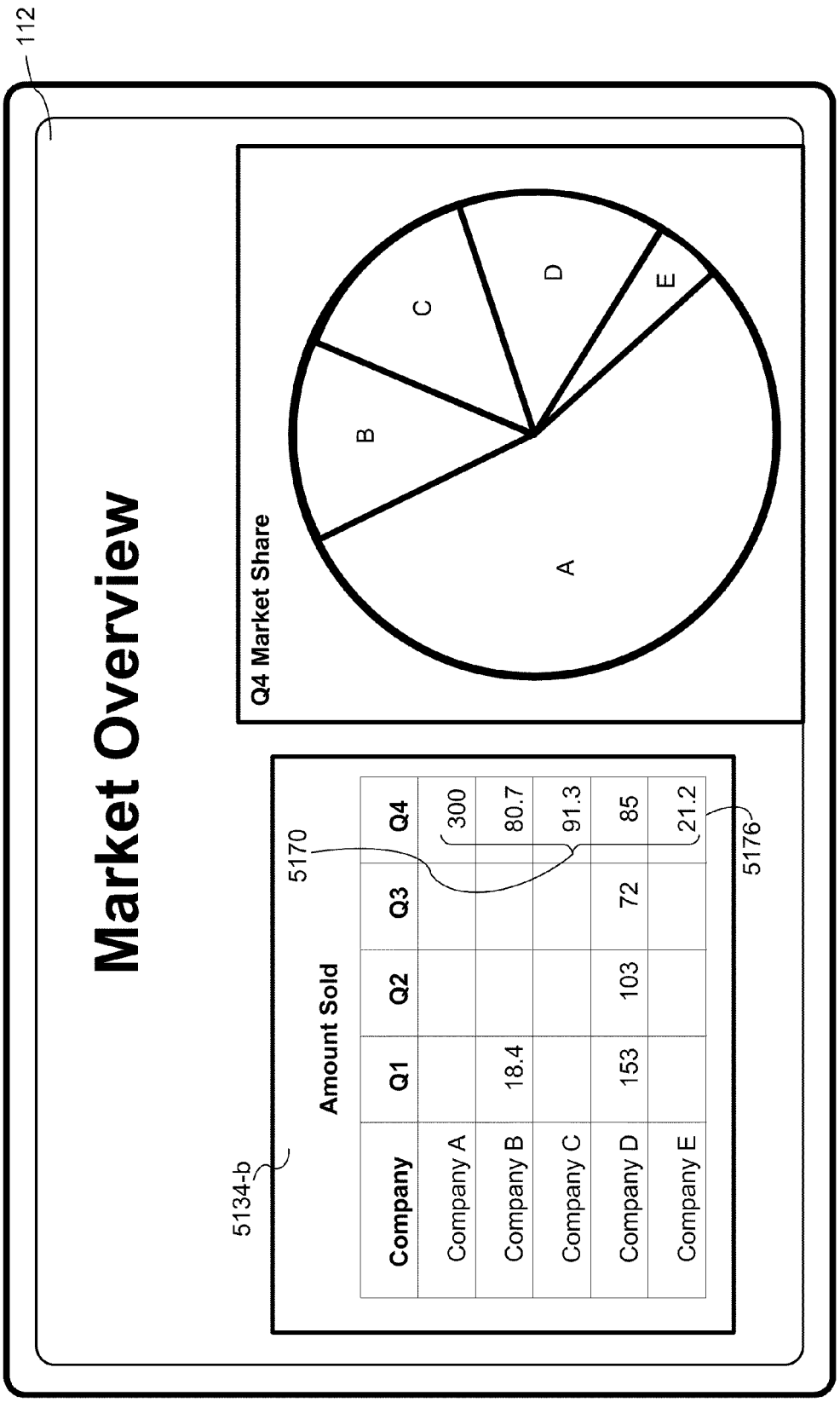
Figure 5D:
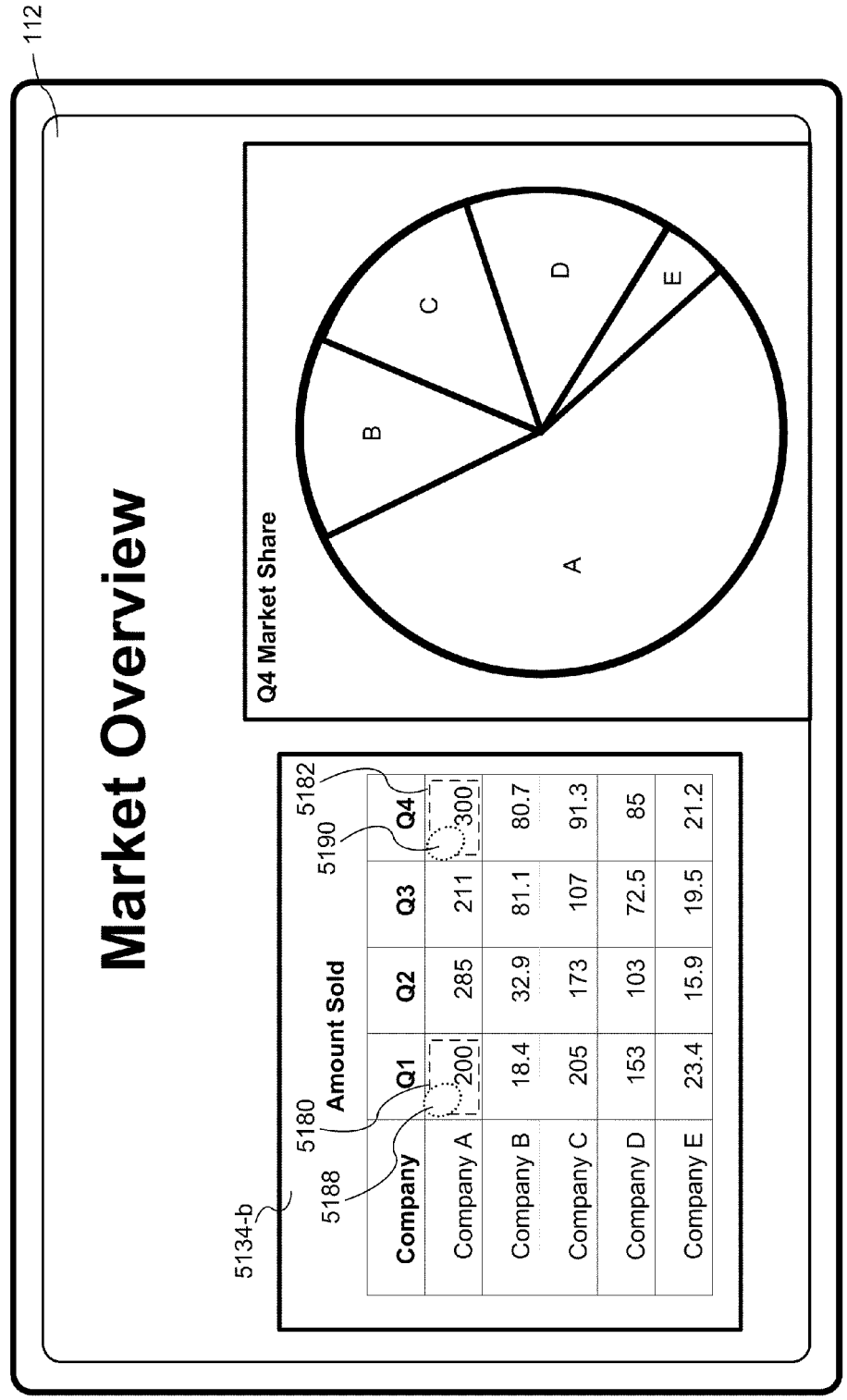
Figure 5E:
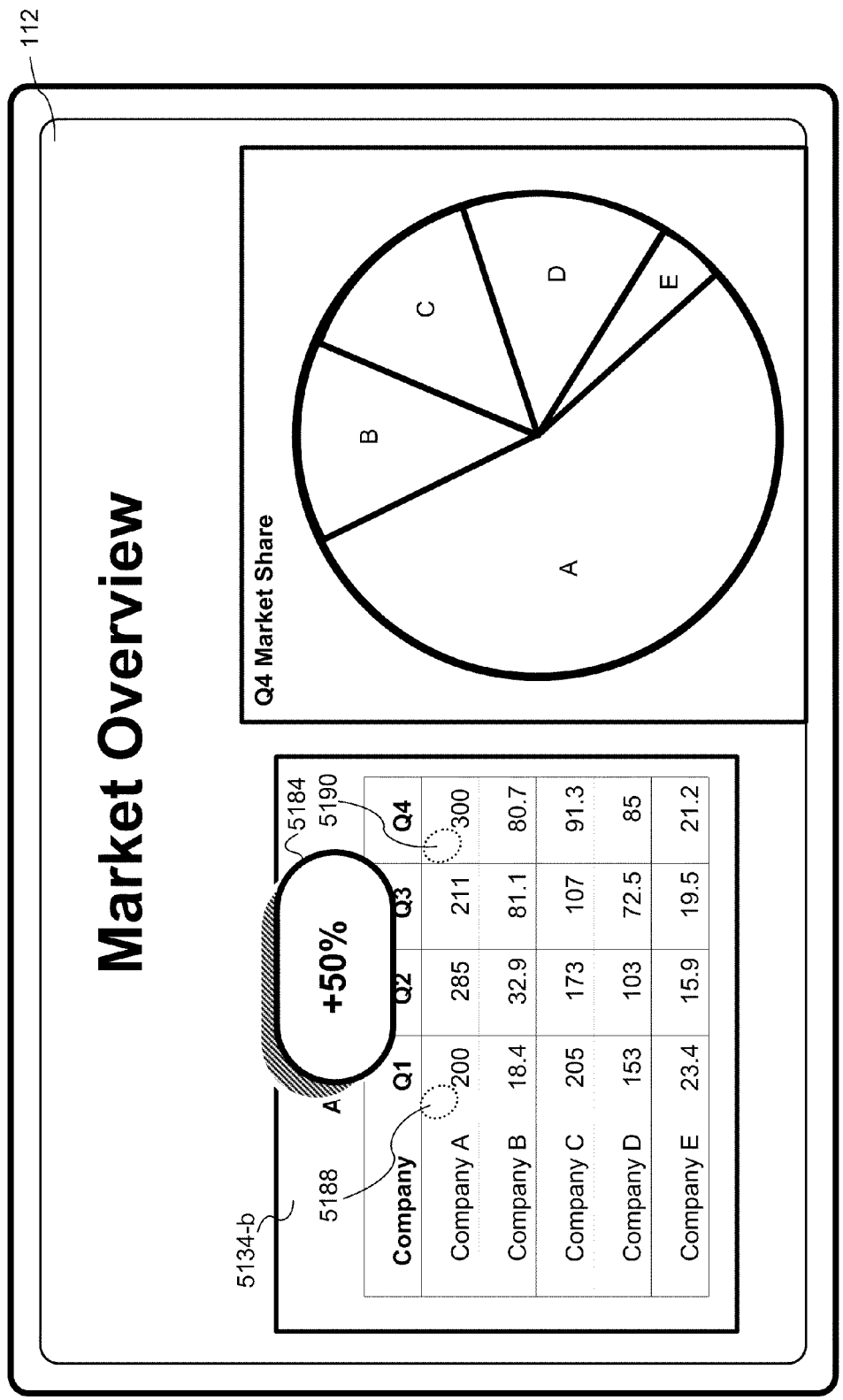
Figure 5F:
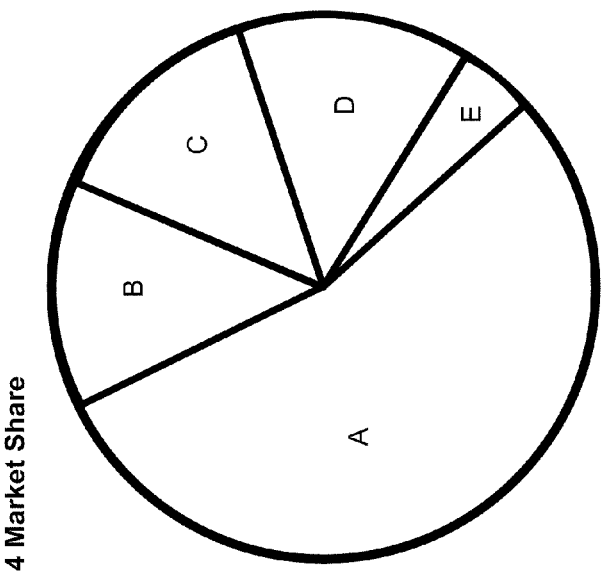
Figure 5G:
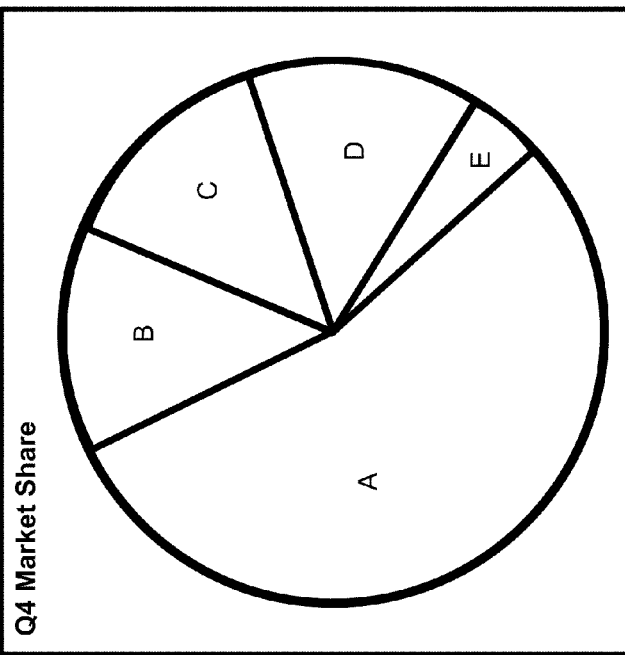
Figure 5H:
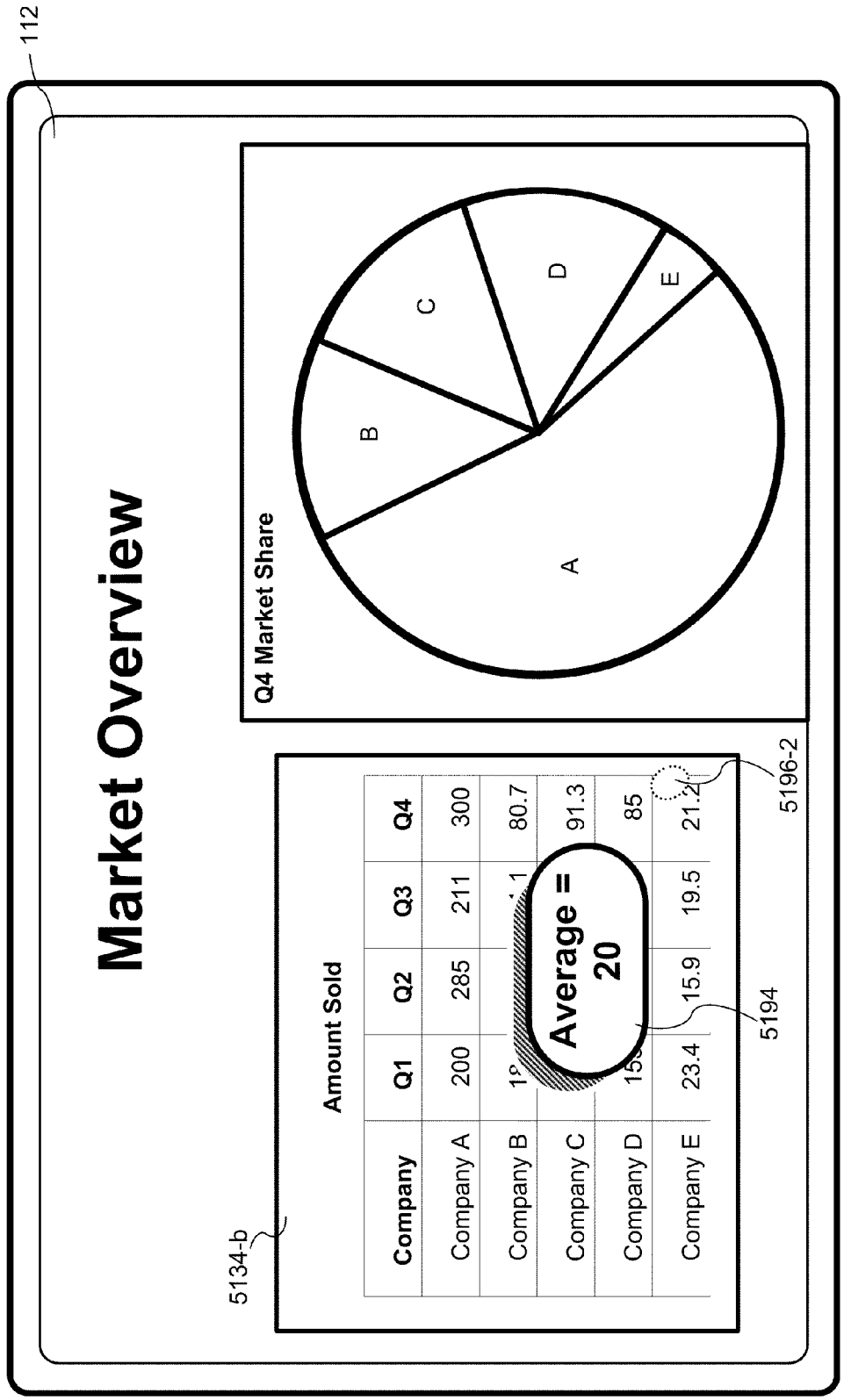
Figure 5I:
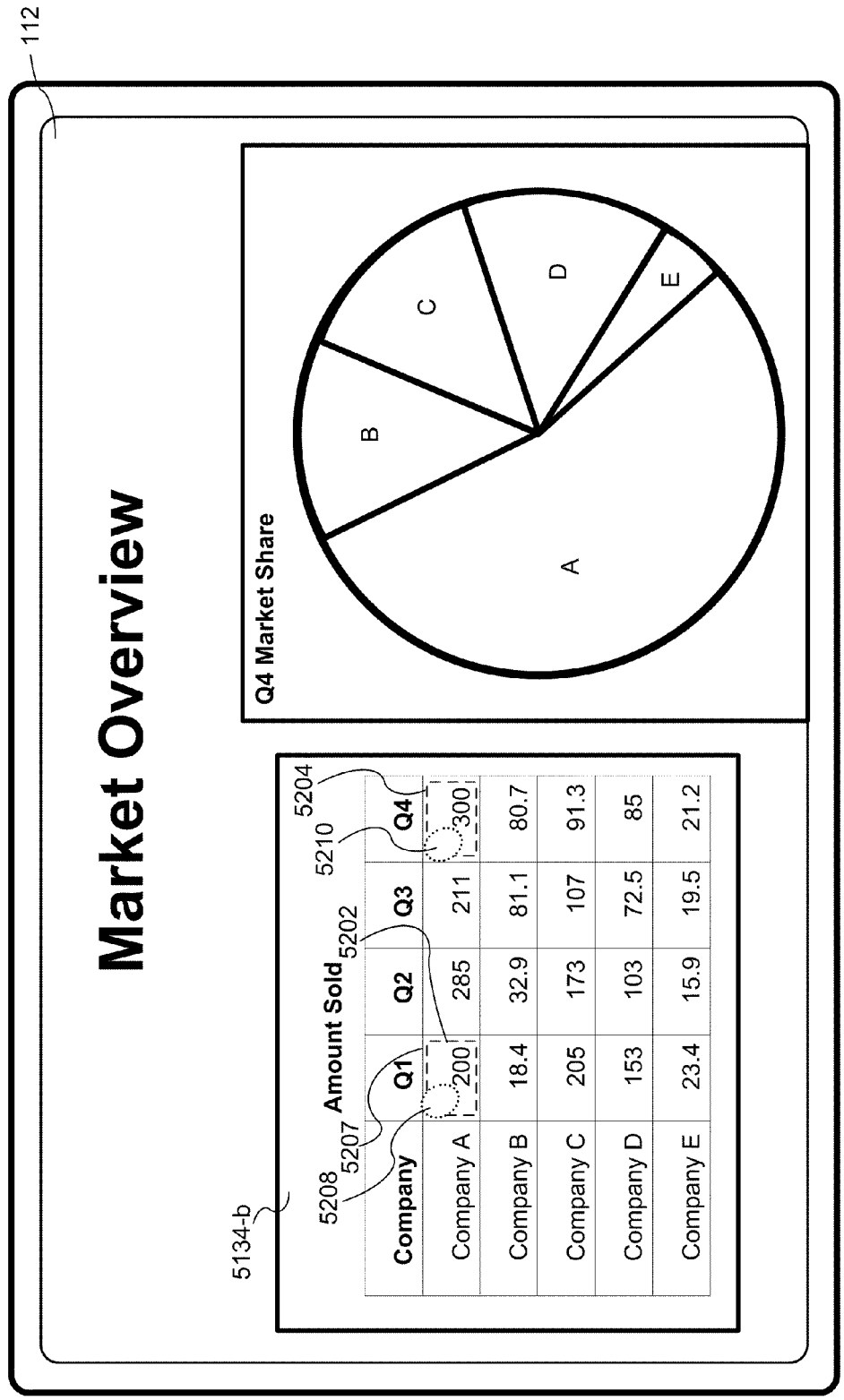
Figure 5J:
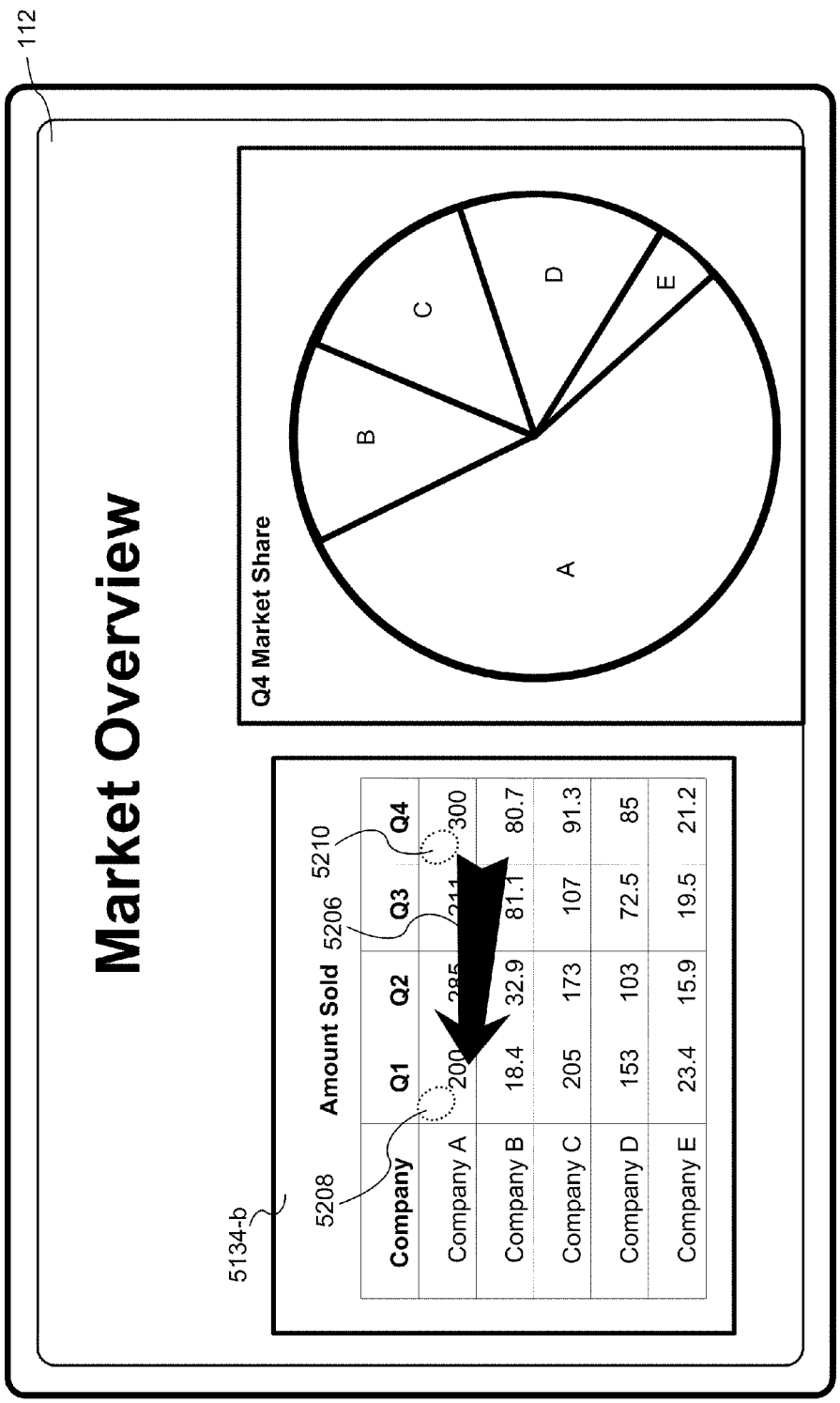
Figure 5K:
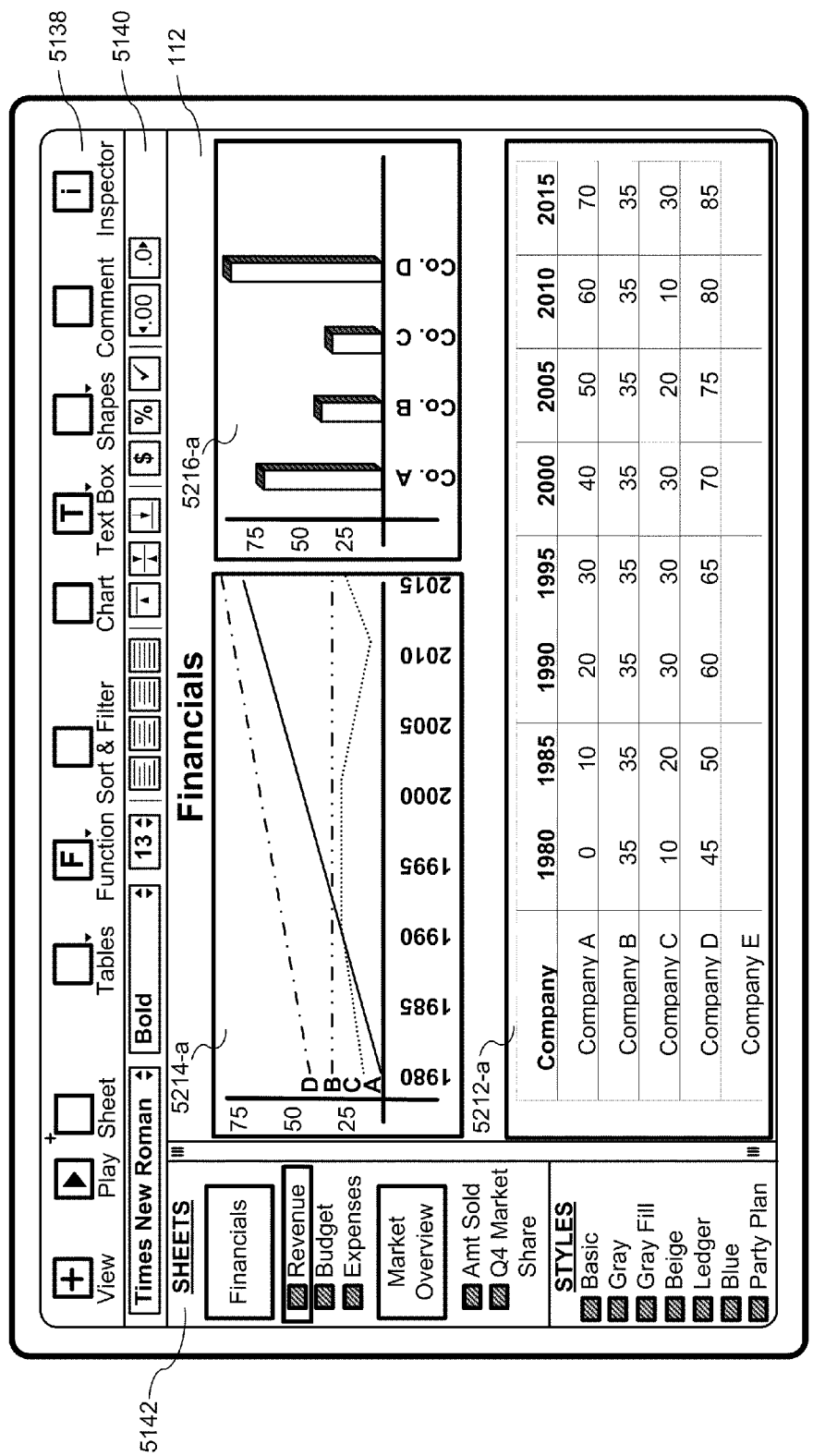
Figure 5L:
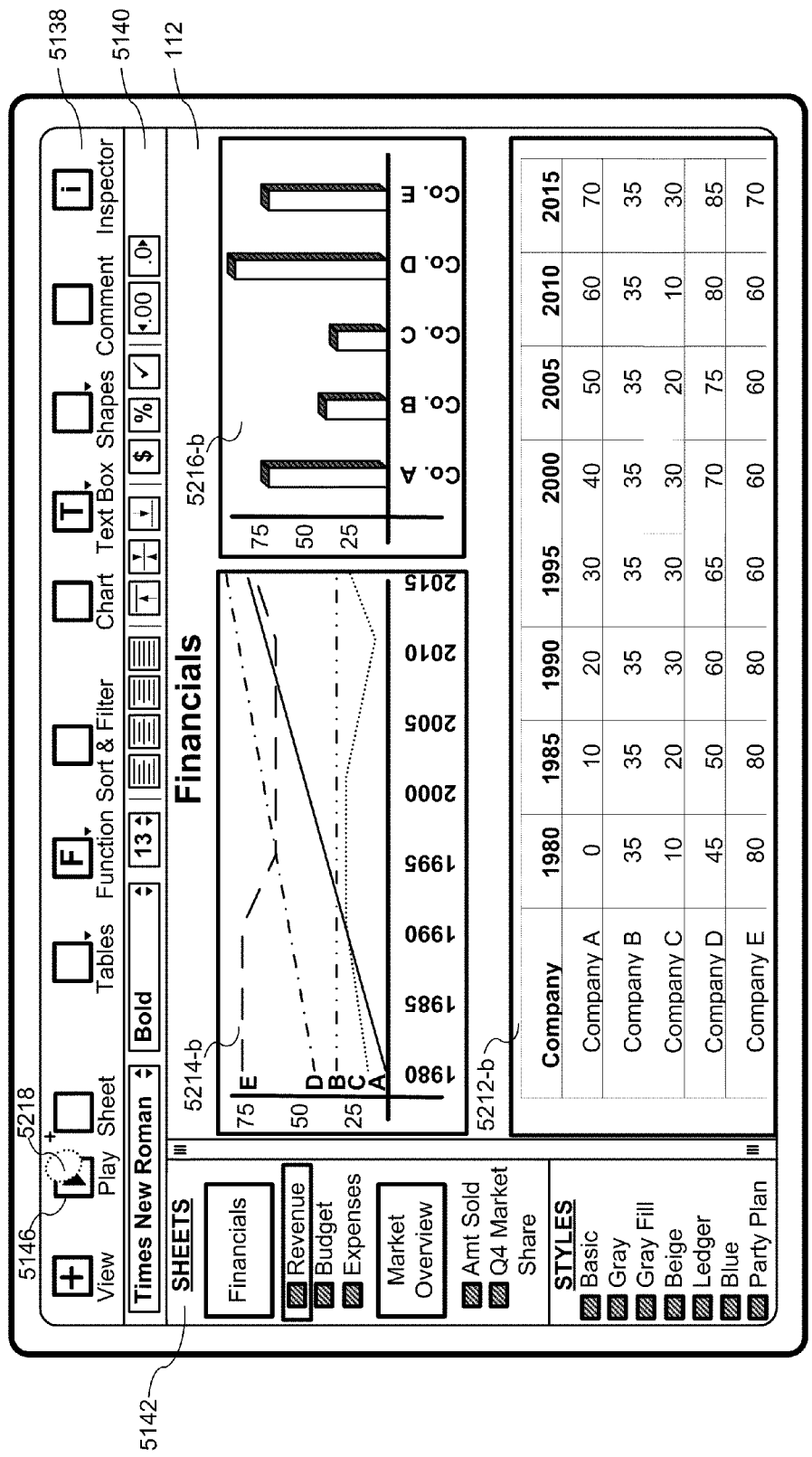
Figure 5M:
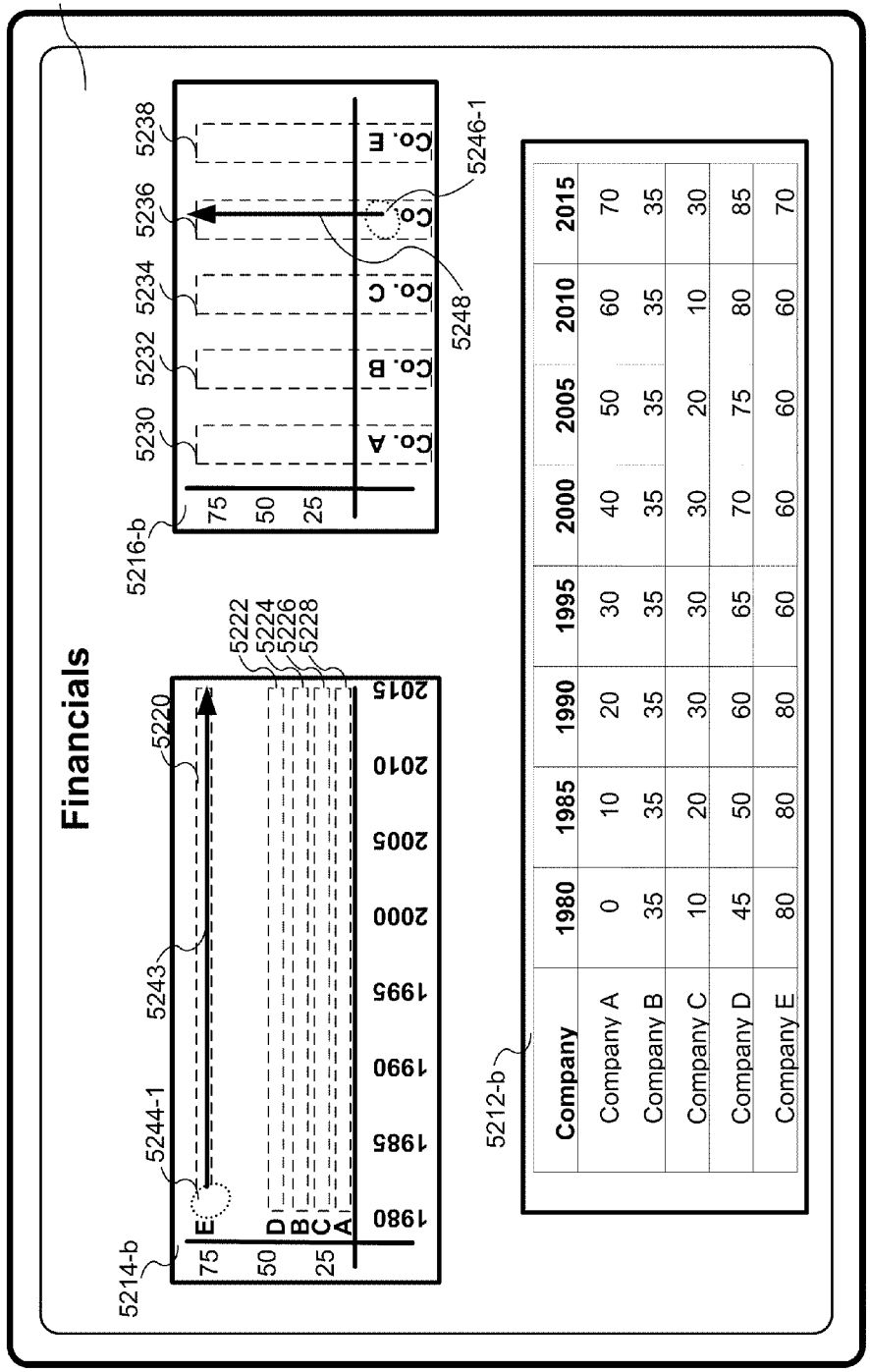
Figure 5P:
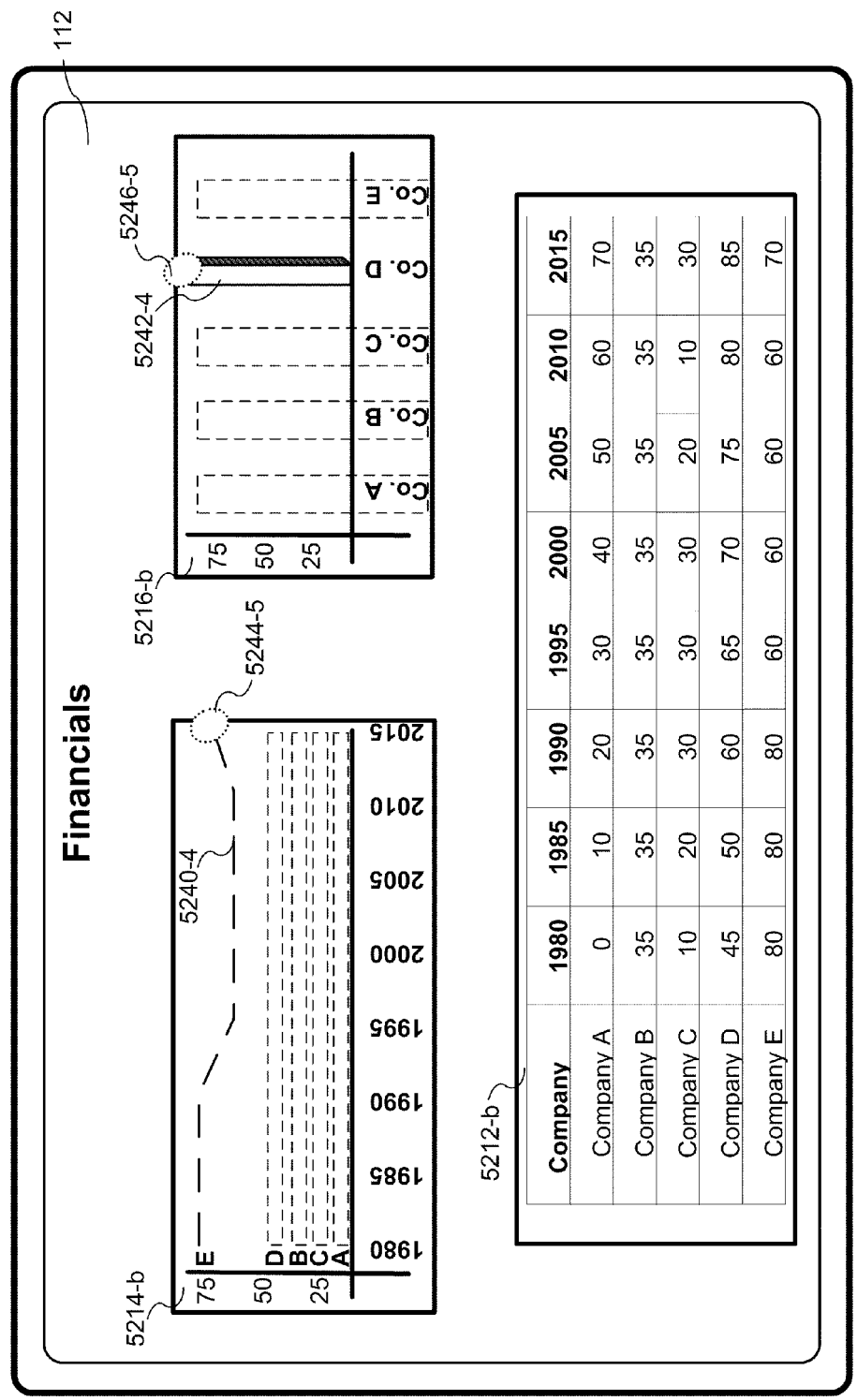
Figure 5Q:
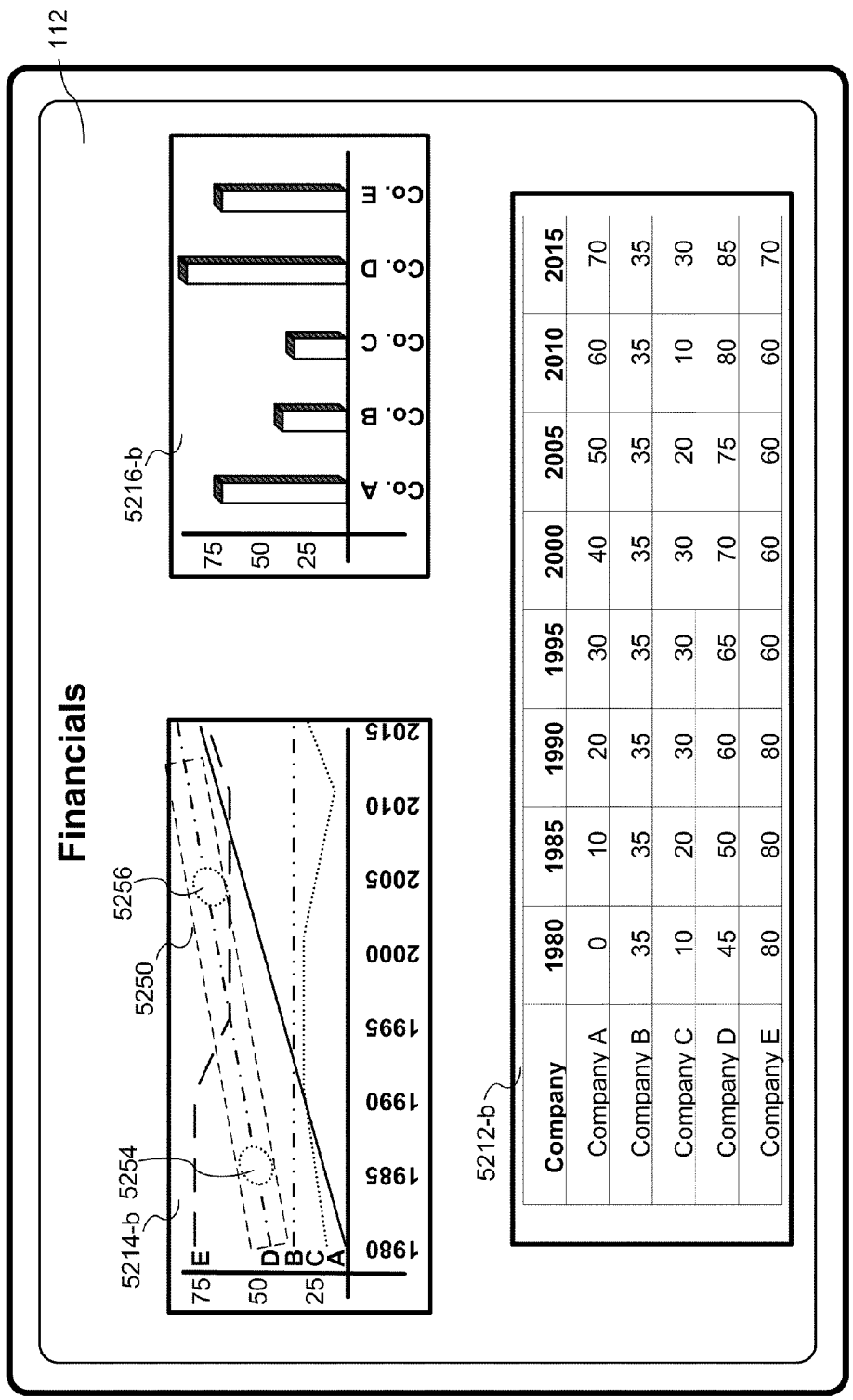
Figure 5R:
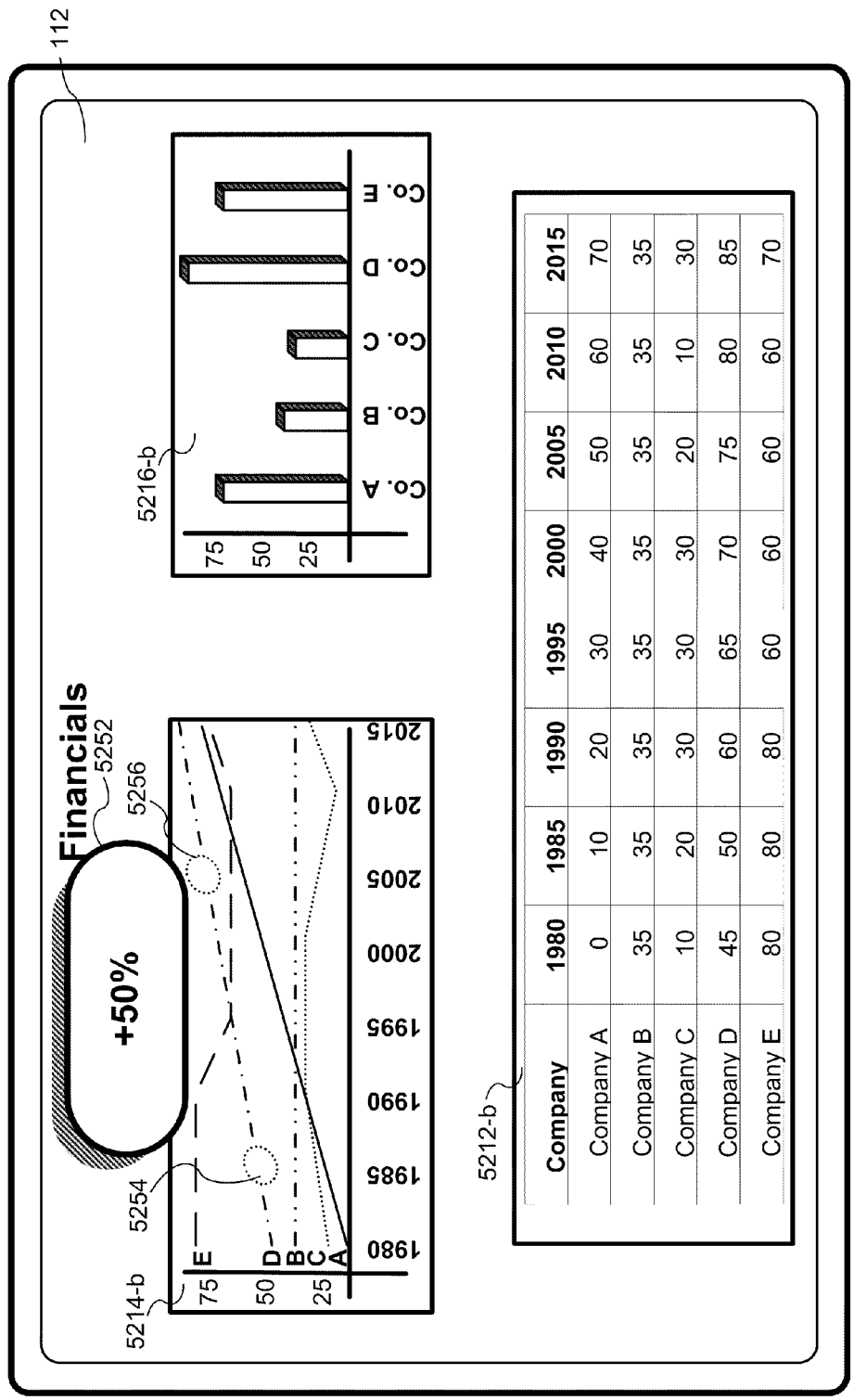
Figure 5S:
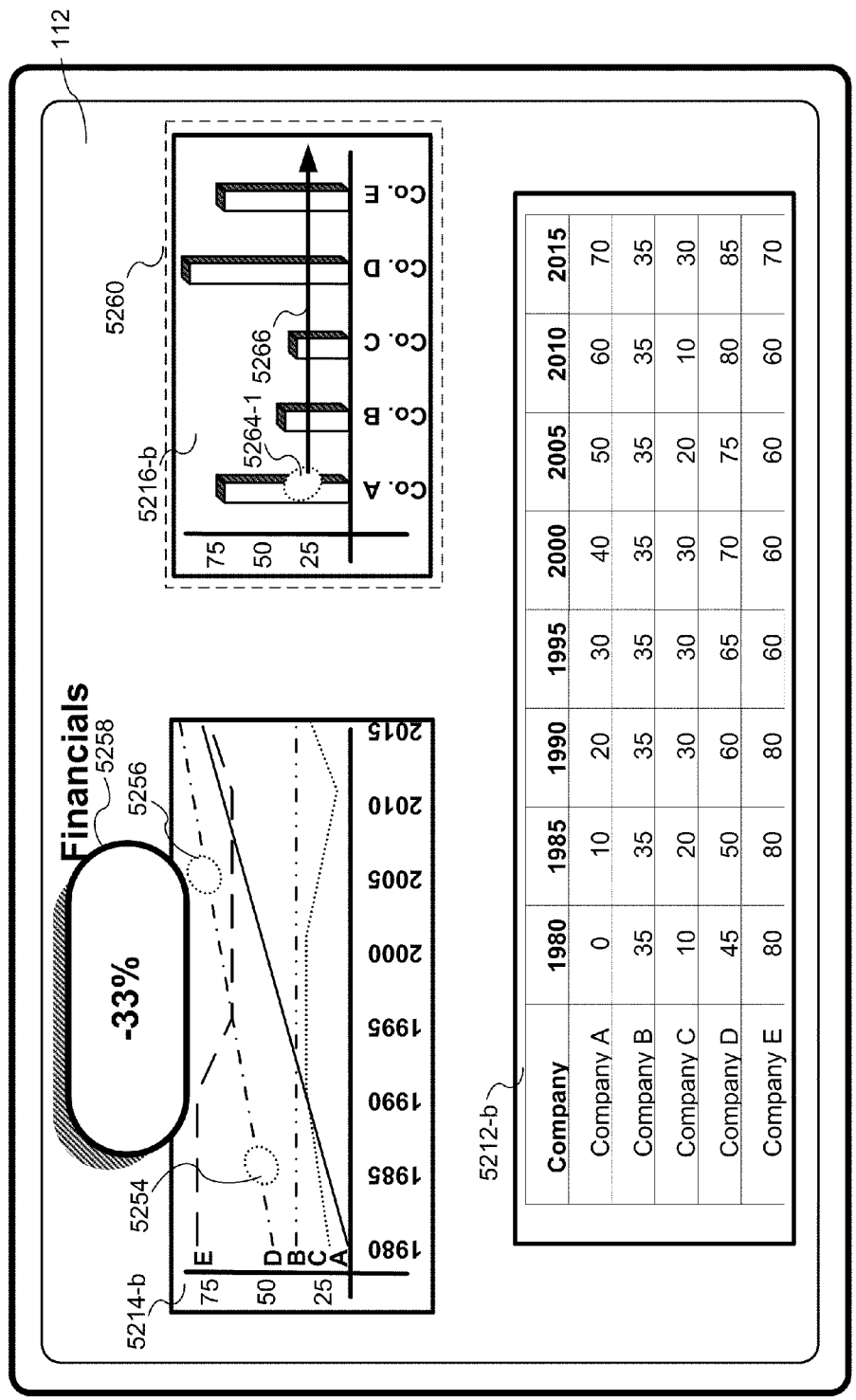
Figure 5T:
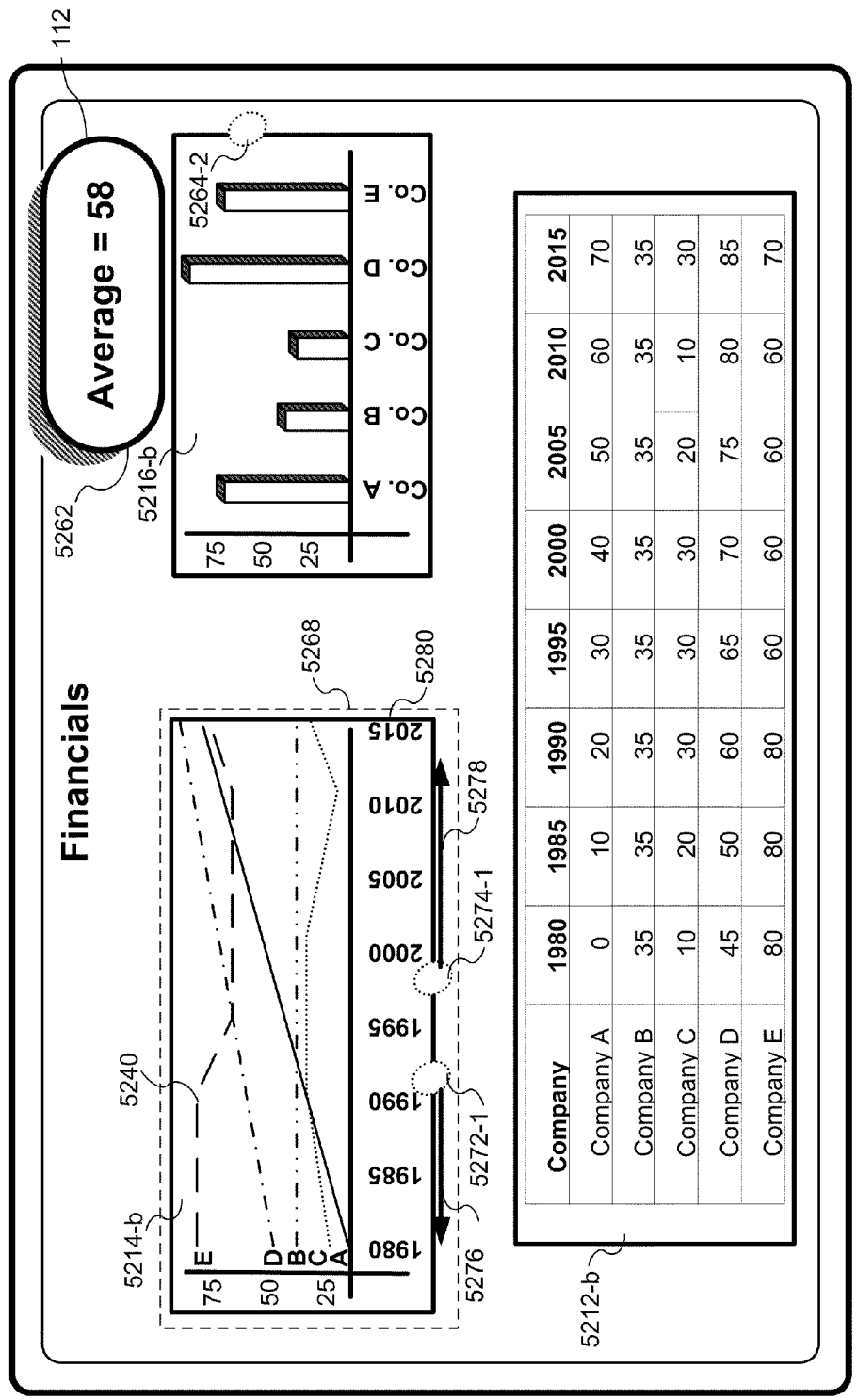
Figure 5U:
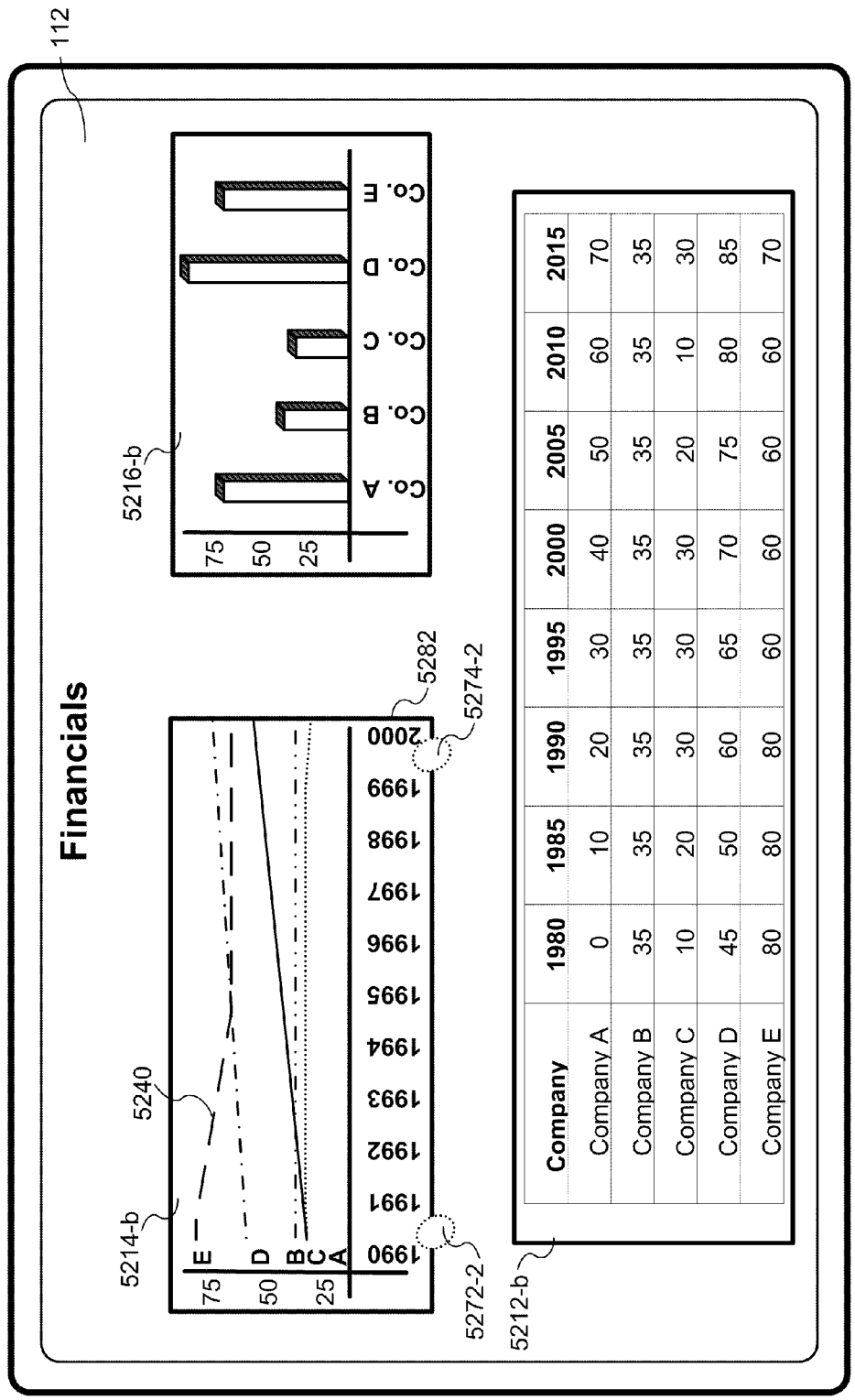
Figure 5V:
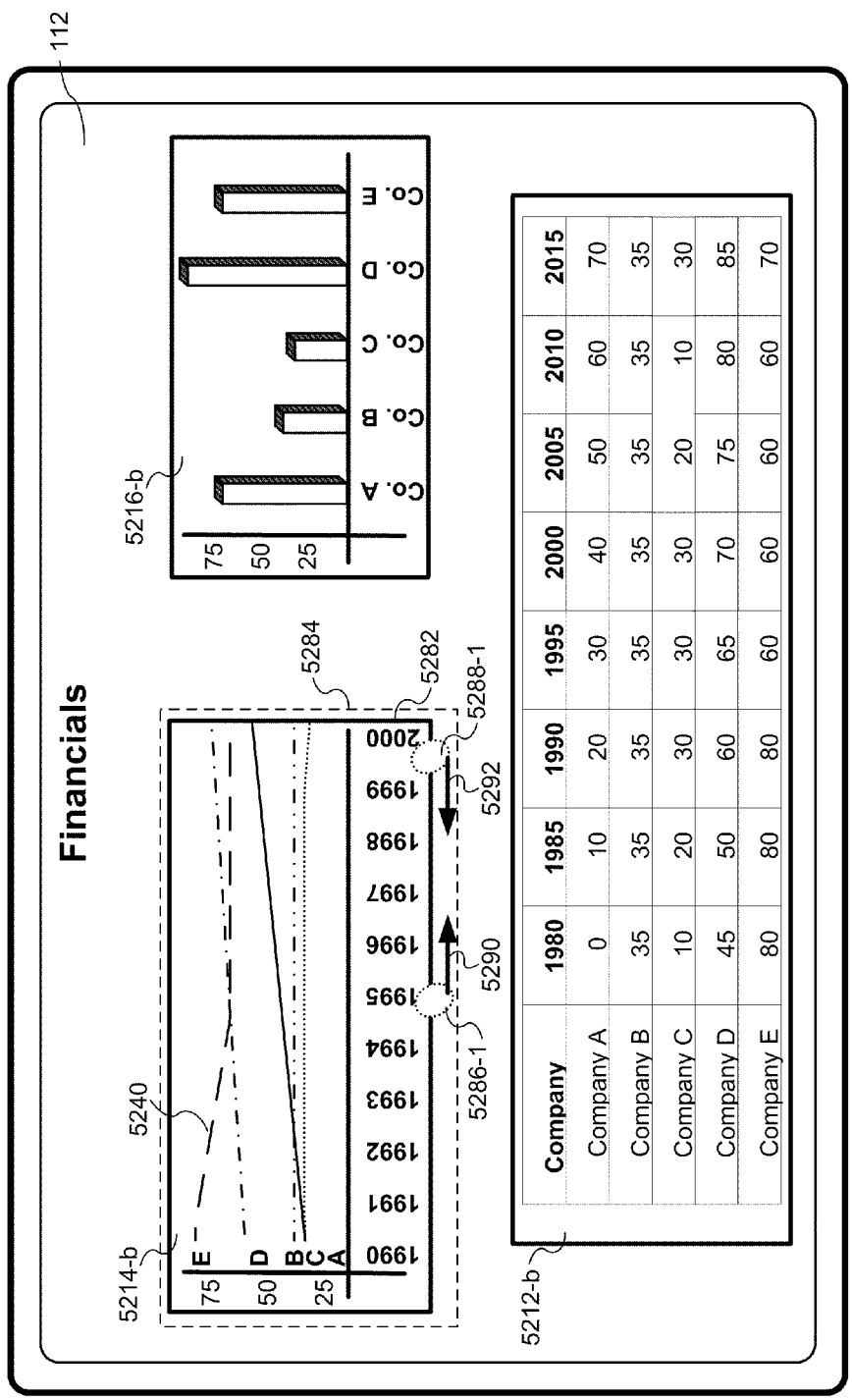
Figure 5W:
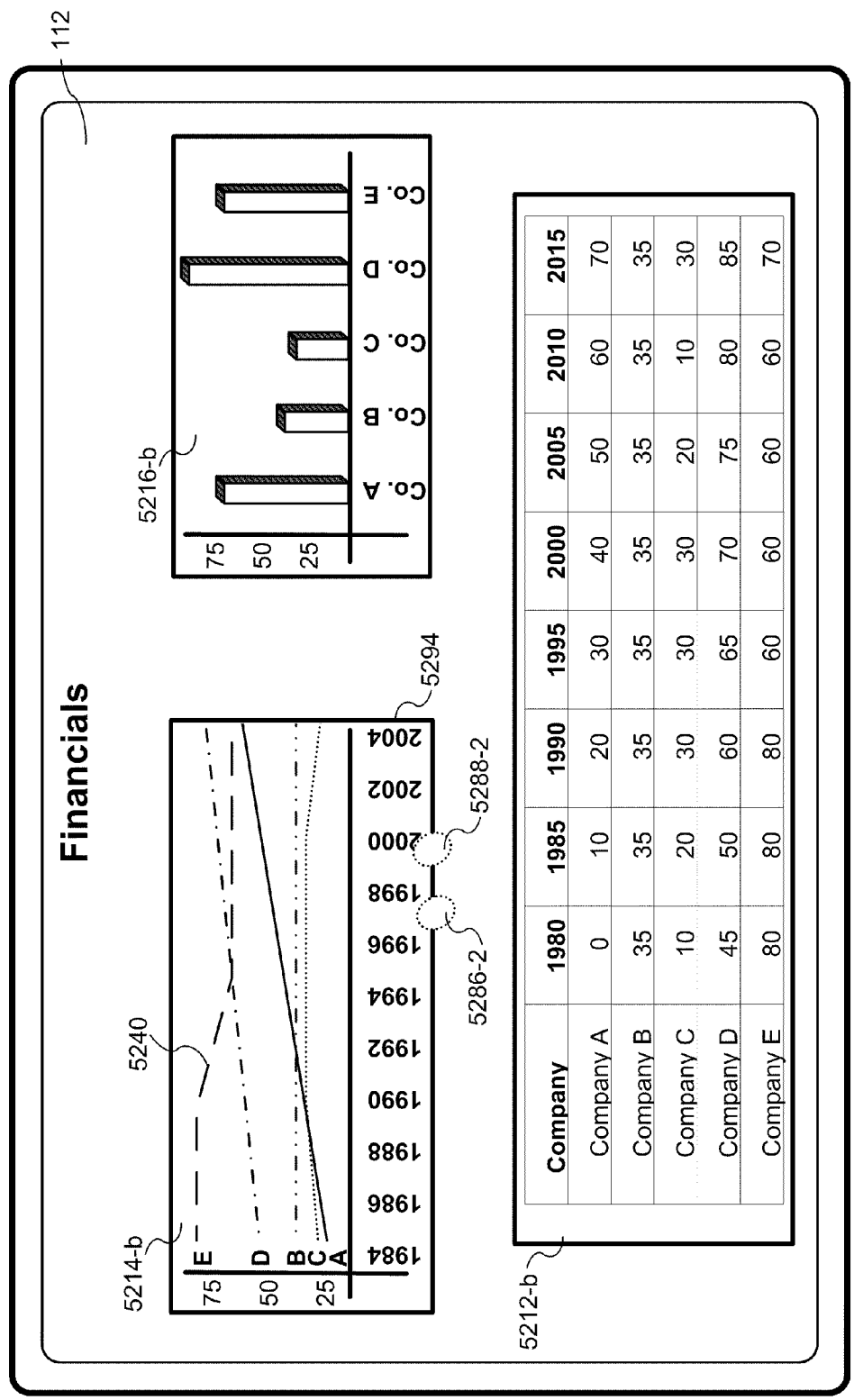
Figure 5X:
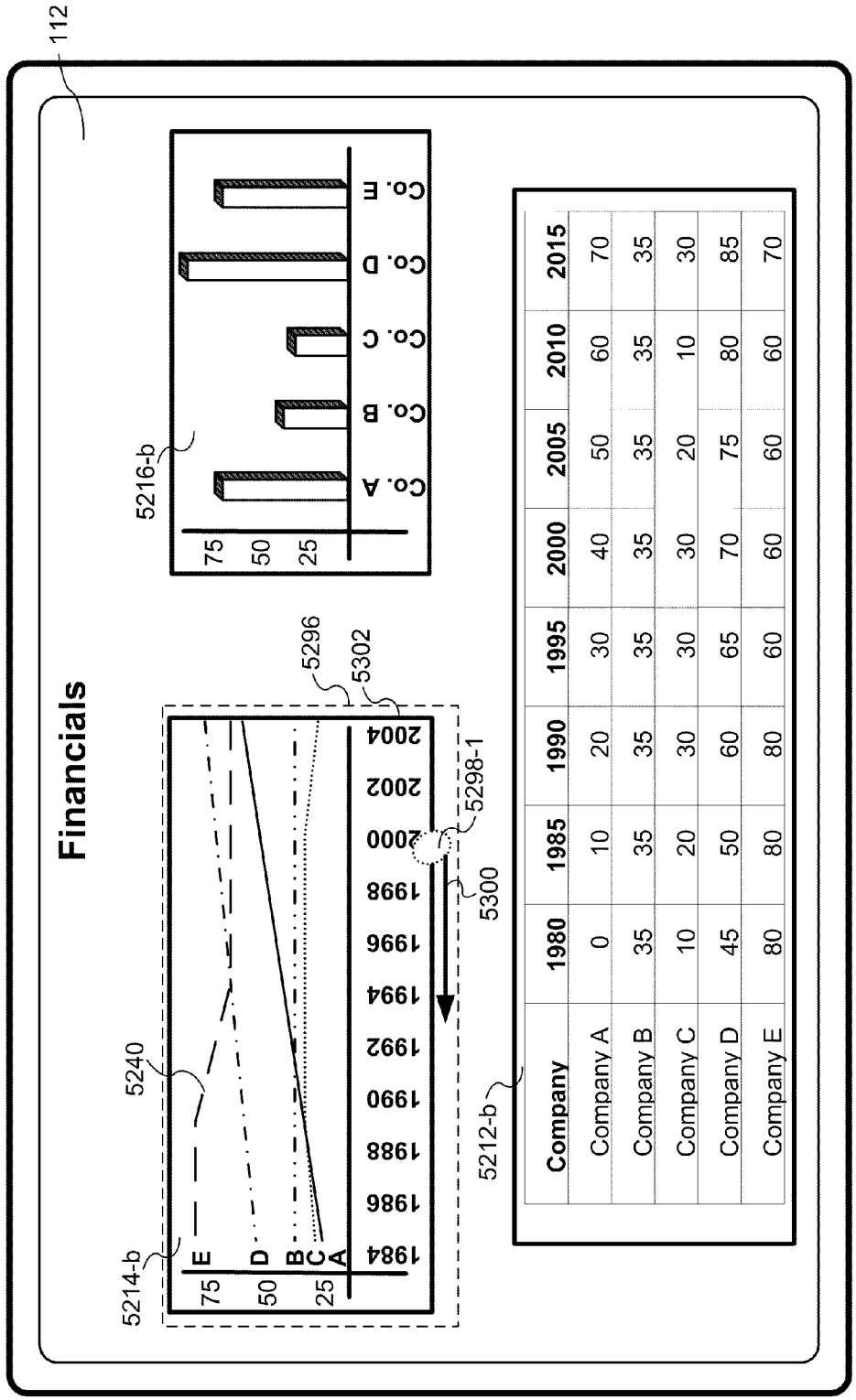
Figure 5Y:
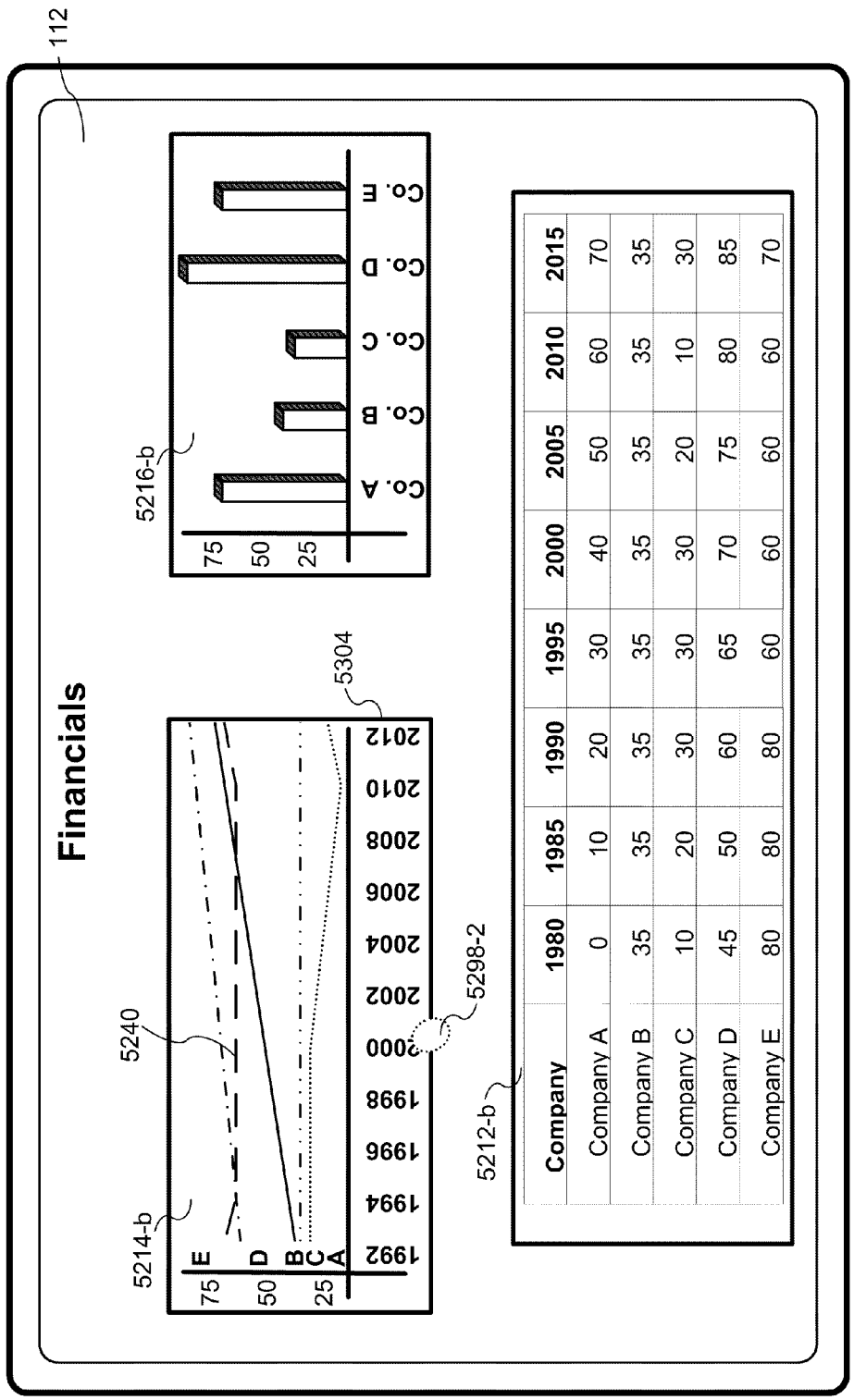
Figure 5Z:
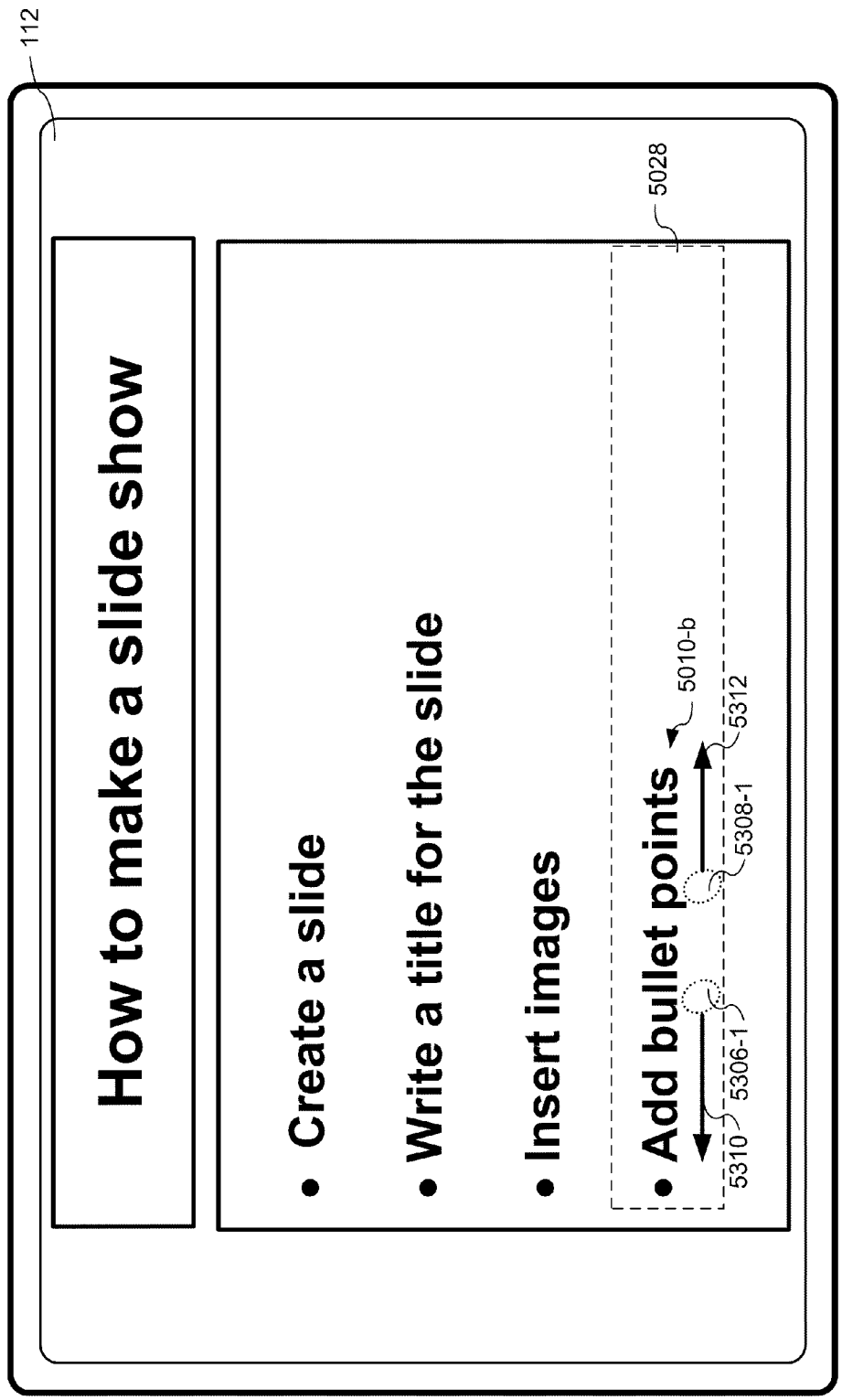

FIGS. 5Z-5CC illustrate exemplary user interfaces for selecting and displaying presentation emphasis objects (e.g., the numerical values in the cells of table 5134-*b* in FIGS. 5Z-5CC) and emphasis animations in response to user inputs (e.g., tap gesture 5156 with activation region 5154 in FIG. 5Z; tap and drag gesture including contact 5162 and movement 5164 along an activation region 5160 for a row 5165 of the table 5134-*b* in FIG. 5AA; tap gesture 5172 with an activation region 5168 for a column header for a column 5174 in FIG. 5BB) received on a first portion of a spreadsheet document while a spreadsheet application is in a presentation mode in accordance with some embodiments.

FIGS. 5DD-5HH illustrate exemplary user interfaces for selecting and displaying presentation emphasis objects (e.g., the numerical values calculated based on the values in the cells of table 5134-*b* in FIGS. 5D-5II such as: "+50%" 5184 in FIG. 5EE, "−33%" 5186 in FIG. 5FF, and "Average=20" 5194 in FIG. 5HH) and emphasis animations in response to user inputs (e.g., tap gesture 5188 with activation region 5180 and tap gesture 5190 with activation region 5182 in FIGS. 5DD-5FF; tap and drag gesture including contact 5196 and movement 5198 of the contact within an activation region 5192 for a row 5200 of the table 5134-*b* in FIG. 5GG-5HH) received on a first portion of a spreadsheet document while a spreadsheet application is in a presentation mode in accordance with some embodiments.

FIGS. 5II-5JJ illustrate exemplary user interfaces for selecting and displaying presentation emphasis objects (e.g., the arrow 5206 in FIG. 5JJ) and emphasis animations in response to user inputs (e.g., tap gesture 5208 with activation region 5202 and tap gesture 5210 with activation region 5204 in FIG. 5II) received on a first portion of a spreadsheet document while a spreadsheet application is in a presentation mode in accordance with some embodiments.

FIGS. 5KK-5LL illustrate exemplary user interfaces for editing a spreadsheet document while a spreadsheet application is in an editing mode (e.g., by adding numerical values to empty cells of a table 5212-*a* in FIG. 5KK to create table 5212-*b* in FIG. 5LL) and detecting an input (e.g., tap gesture 5218 with "Play" icon 5144 in FIG. 5LL) and responding the input by entering a presentation mode in accordance with some embodiments.

FIGS. 5MM-5PP illustrate exemplary user interfaces for selecting and displaying presentation emphasis objects (e.g., the graph line 5240 in FIGS. 5NN and 5PP or the bar 5242 in FIGS. 5OO and 5PP) and emphasis animations in response to user inputs (e.g., tap and drag gesture including contact 5244 and movement 5243 along an activation region 5220 in a graph 5214-*b* in FIGS. 5NN and 5PP; or tap and drag gesture including contact 5246 and movement 5248 along an activation region 5236 in a bar chart 5216-*b* in FIGS. 5OO-5PP) received on a first portion of a spreadsheet document while a spreadsheet application is in a presentation mode in accordance with some embodiments.

FIGS. 5QQ-5TT illustrate exemplary user interfaces for selecting and displaying presentation emphasis objects (e.g., the numerical values calculated based on the values associated with locations on the graph 5124-*b* and bar chart 5126-*b* in FIGS. 5QQ-5TT, such as: "+50%" 5252 in FIG. 5RR, "−33%" 5258 in FIG. 5SS, and "Average=58" 5262 in FIG. 5TT) and emphasis animations in response to user inputs (e.g., tap gesture 5254 with activation region 5250 and tap gesture 5256 with activation region 5250 in FIGS. 5QQ-5SS; tap and drag gesture including contact 5264 and movement 5266 of the contact within an activation region 5260 for a bar chart 5216-*b* in FIG. 5SS) received on a first portion of a spreadsheet document while a spreadsheet application is in a presentation mode in accordance with some embodiments.

FIGS. 5TT-5YY illustrate exemplary user interfaces for selecting and displaying presentation emphasis objects and emphasis animations in response to user inputs received on a first portion of a spreadsheet document while a spreadsheet application is in a presentation mode in accordance with some embodiments. For example, in response to a de-pinch gesture including contacts 5272 and 5274 in activation region 5268 and movement 5276 and 5278 of the contacts away from each other in FIG. 5TT, the device displays graph 5214-*b* in FIG. 5UU. As another example, in response to a pinch gesture including contacts 5286 and 5288 in activation region 5284 and movement 5290 and 5292 of the contacts away from each other in FIG. 5VV, the device displays graph 5214-*b* in FIG. 5WW. As another example, in response to a swipe gesture including contact 5298 in activation region 5296 and movement 5300 in a first direction in FIG. 5XX, the device displays graph 5214-*b* in FIG. 5YY.

FIGS. 5ZZ-5AAA illustrate exemplary user interfaces for deemphasizing displayed objects in an electronic document (e.g., in FIG. 5AAA the elements of the electronic document other than a single bulleted list item 5010-*b* in FIG. 5AAA) in response to detecting a first input by a user on a predefined activation region in the electronic document while the electronic document is an a presentation mode of an electronic document authoring application in accordance with some embodiments. For example, in response to a de-pinch gesture including contacts 5306 and 5308 in an activation region 5028 associated with the single bulleted list item 5010-*b* and movement of the contacts 5310 and 5312 away from each other in FIG. 5ZZ, the device deemphasizes 5AAA the elements of the electronic document other than a single bulleted list item 5010-*b* in FIG. 5AAA.

FIGS. 5BBB-5EEE illustrate exemplary user interfaces for navigating from a first portion of an electronic document to a second portion of an electronic document using a navigation pane by in accordance with some embodiments. For example, In FIG. 5BBB, the device detects a swipe gesture (e.g., contact 5314 and movement 5316) from the side of the screen 112, and displays a navigation pane 5318 in FIG. 5CCC; in response to another swipe gesture (e.g., contact 5332 and movement 5334) on the navigation pane 5318 in FIG. 5CCC, the device scrolls the navigation pane 5318 in FIG. 5DDD; the device detects a tap gesture 5342 on an icon 5338 in the navigation pane in FIG. 5DDD that corresponds to the second portion of the electronic document, and in response displays a second portion of the electronic document (e.g., the slide displayed in FIG. 5EEE).

FIGS. 5EEE-5HHH illustrate exemplary user interfaces for navigating from a first portion of an electronic document to a second portion of an electronic document using a displayed array of icons in accordance with some embodiments. For example, in FIG. 5EEE, the device detects a five-finger pinch gesture including contacts (e.g., 5344, 5346, 5348, 5350 and 5352 in FIG. 5EEE) and movement (e.g., 5354, 5356, 5358, 5360 and 5362 in FIG. 5EEE) of the contacts; in response to the five-finger pinch gesture, the device displays an array of icons (e.g., 5364, 5366, 5368, 5370, 5372 and 5374 in FIG. 5GG) that are each associated with a portion of the electronic document; the device detects an input (e.g., tap gesture 5376 in FIG. 5GGG) on one of the icons (e.g., 5368 in FIG. 5GGG) and in response displays a second portion of the electronic document (e.g., the slide displayed in FIG. 5HHH).

FIGS. 5HHH-5III illustrate exemplary user interfaces for navigating from a first portion of an electronic document to a predefined second portion of an electronic document in response to a predefined gesture in accordance with some embodiments. For example, in FIG. 5HHH the predefined gesture is a double swipe gesture (e.g., a first contact 5378 and movement 5380 of the first contact, followed by a second contact 5382 and movement 5384 of the second contact in FIG. 5HHH), and the device displays the first slide in the presentation document (e.g., the slide displayed in FIG. 5III). As another example, in FIG. 5III the predefined gesture is a four finger swipe gesture (e.g., four contacts (e.g., 5386, 5390, 5394, 5398 in FIG. 5III) and movement (e.g., 5388, 5392, 5396, 5400 in FIG. 5III) of the contacts across the display in FIG. 5III), and the device displays the last slide in the presentation document (e.g., the slide displayed in FIG. 5JJJ).

FIG. 5JJJ illustrates exemplary user interfaces for temporarily ceasing to display the first portion of an electronic document in response to a predefined gesture (e.g., a four finger downward swipe including four contacts 5402, 5406, 5410, 5414 and movement 5404, 5408, 5412, 5416 of the contacts across the display in FIG. 5JJJ), and the device temporarily ceases to display the slide in FIG. 5JJJ in accordance with some embodiments.

Figure 6A:
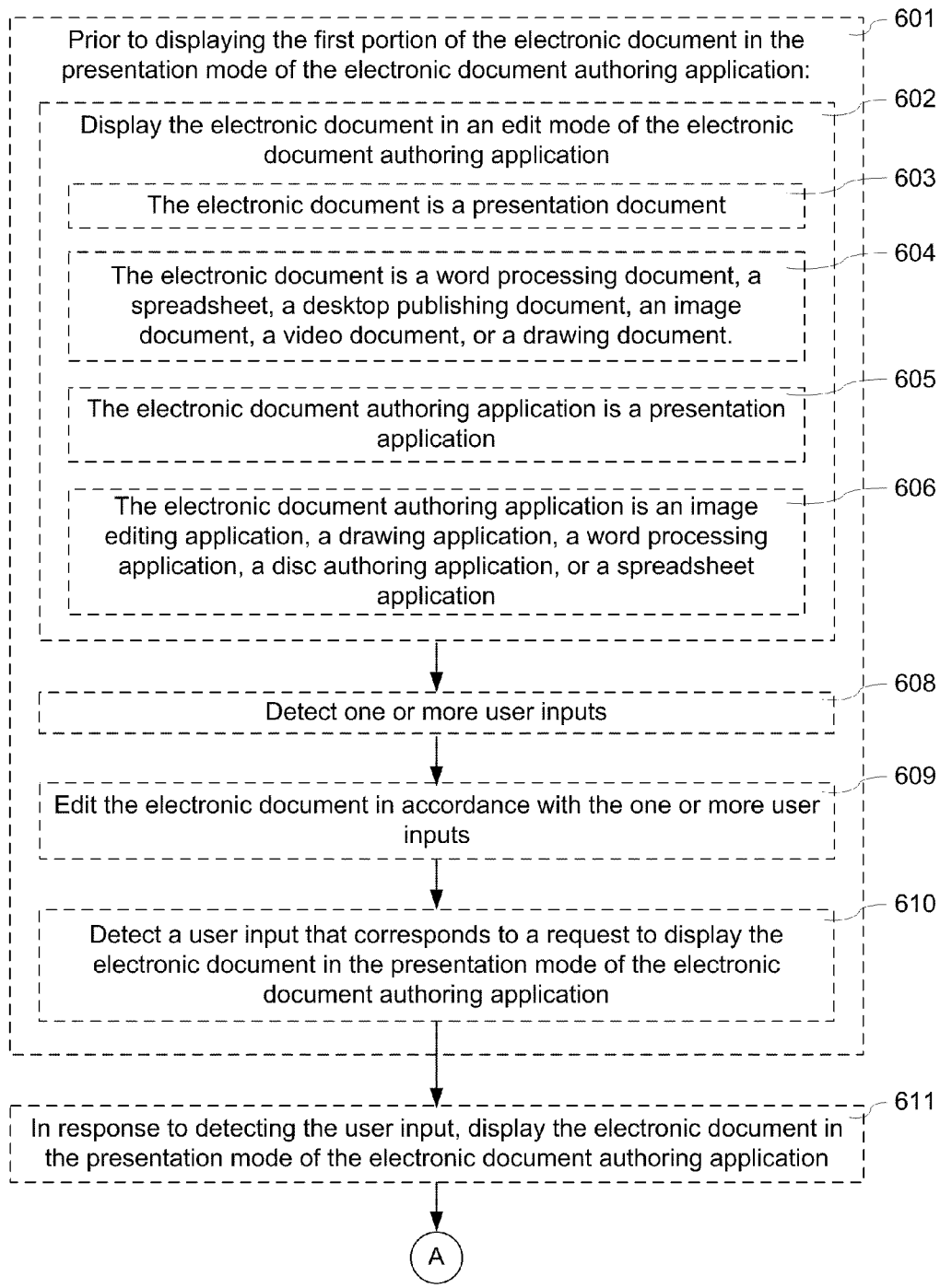
FIGS. 6A-6Q are flow diagrams illustrating a method of emphasizing elements of an electronic document by displaying emphasis animations for the electronic document in an electronic document authoring application in accordance with some embodiments.
Figure 6B:
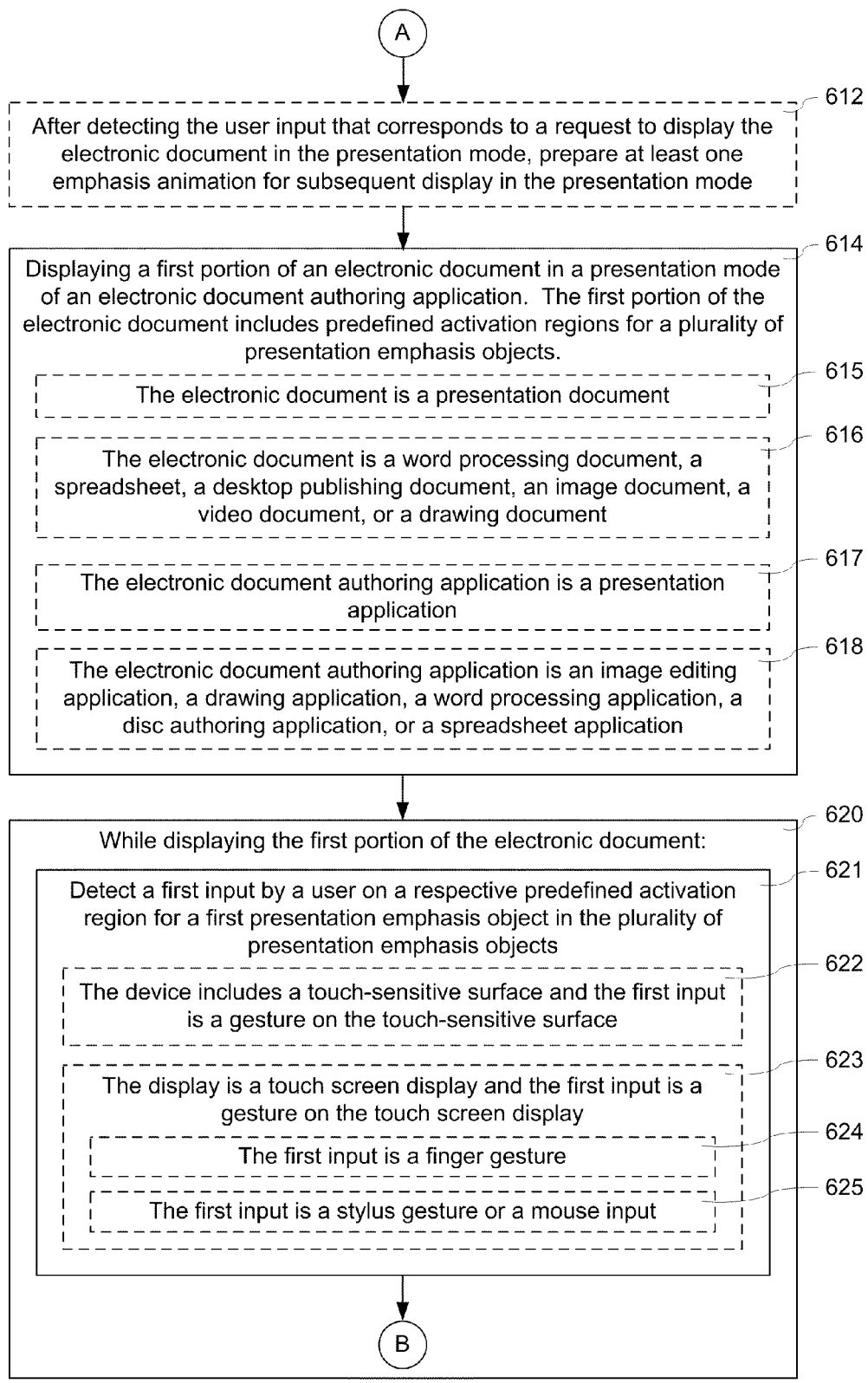
Figure 6C:
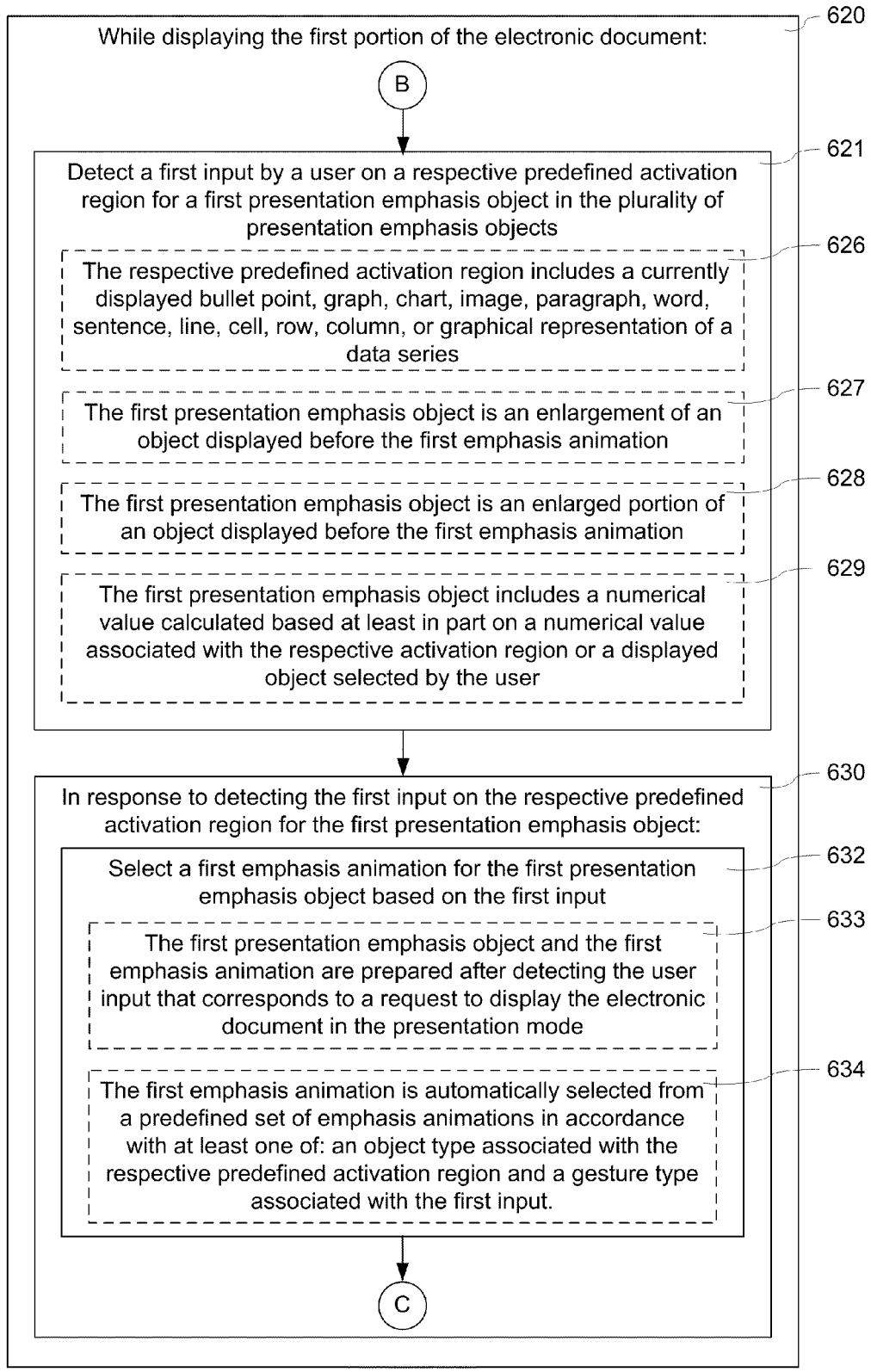
Figure 6D:
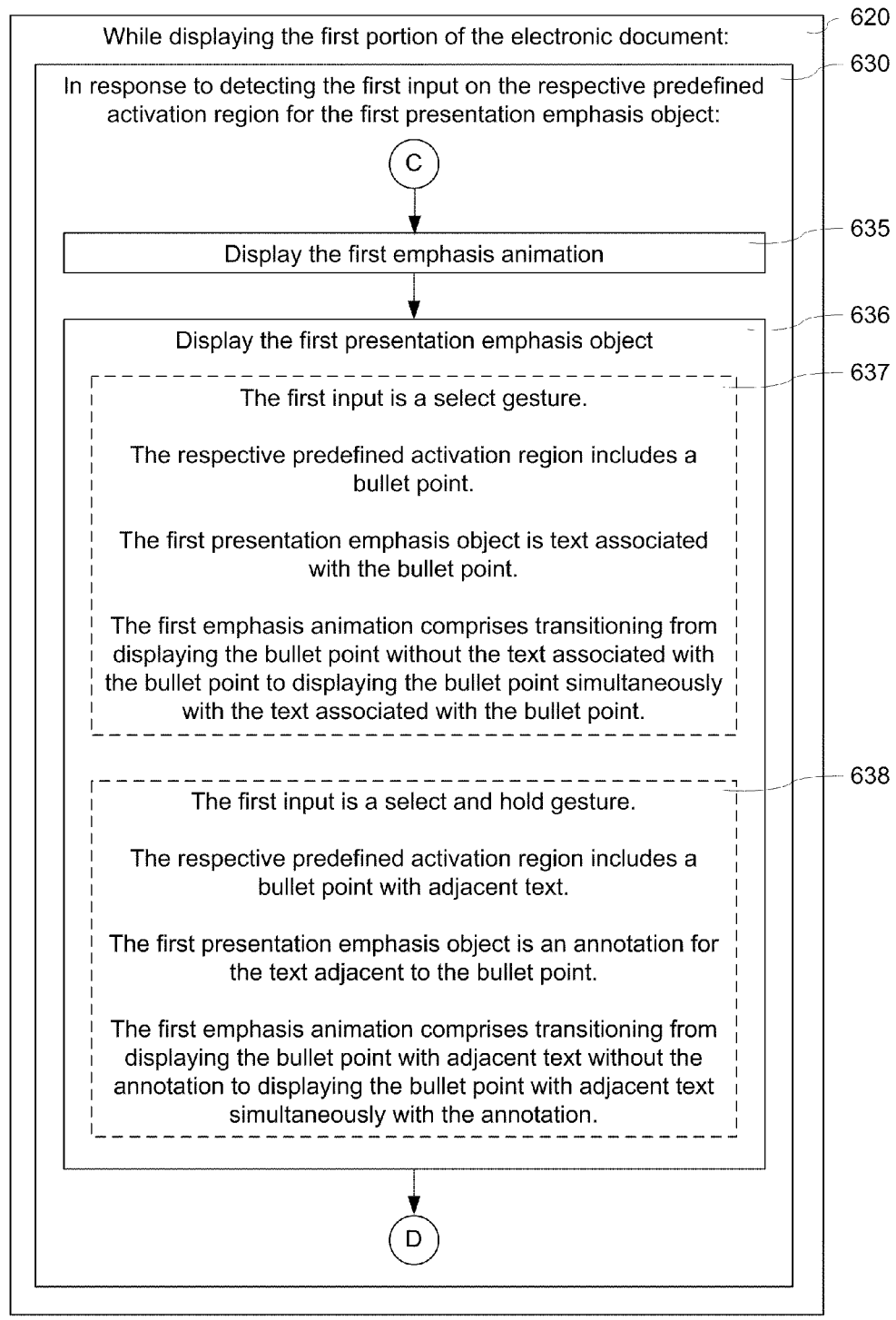
Figure 6E:
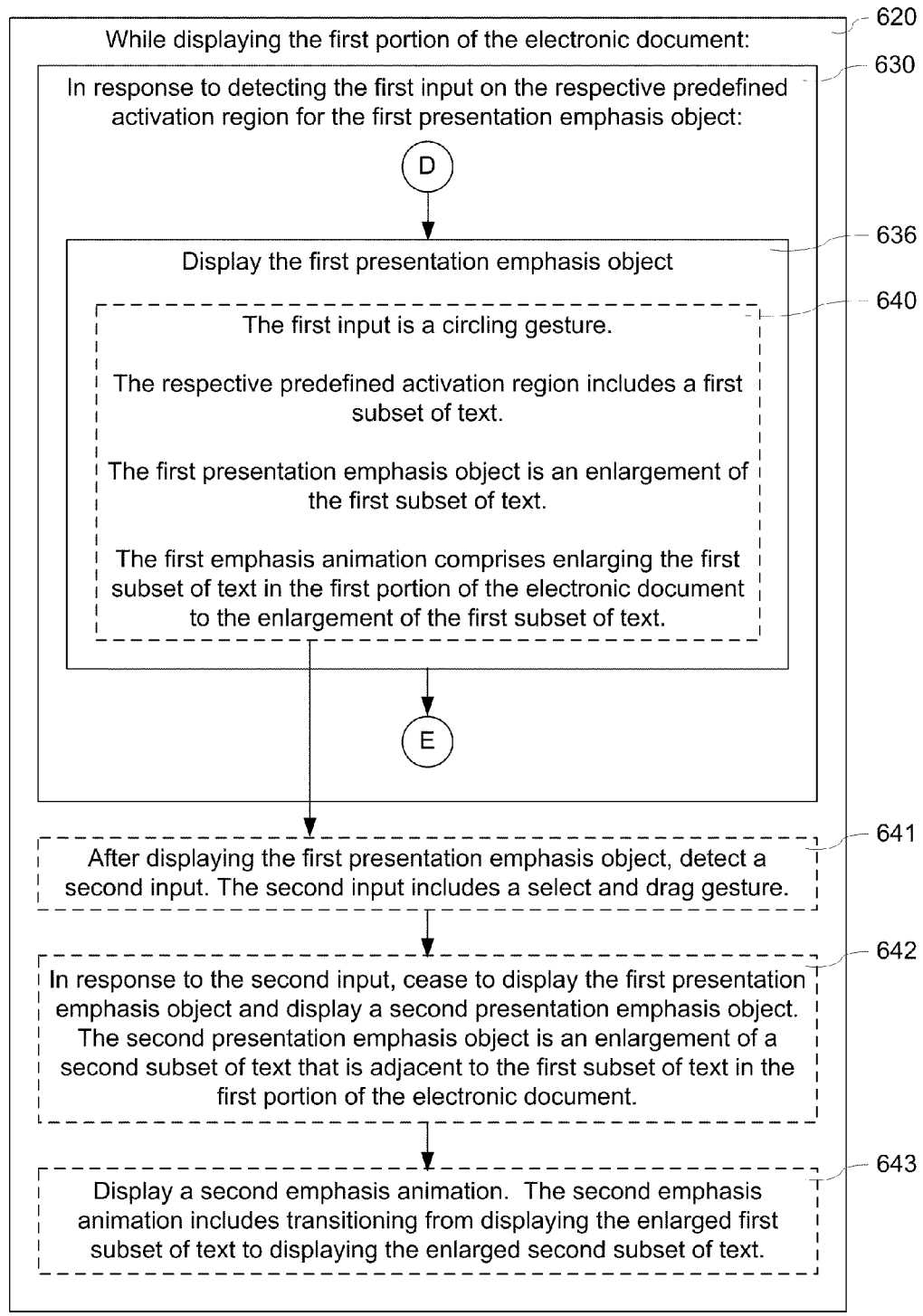
Figure 6F:
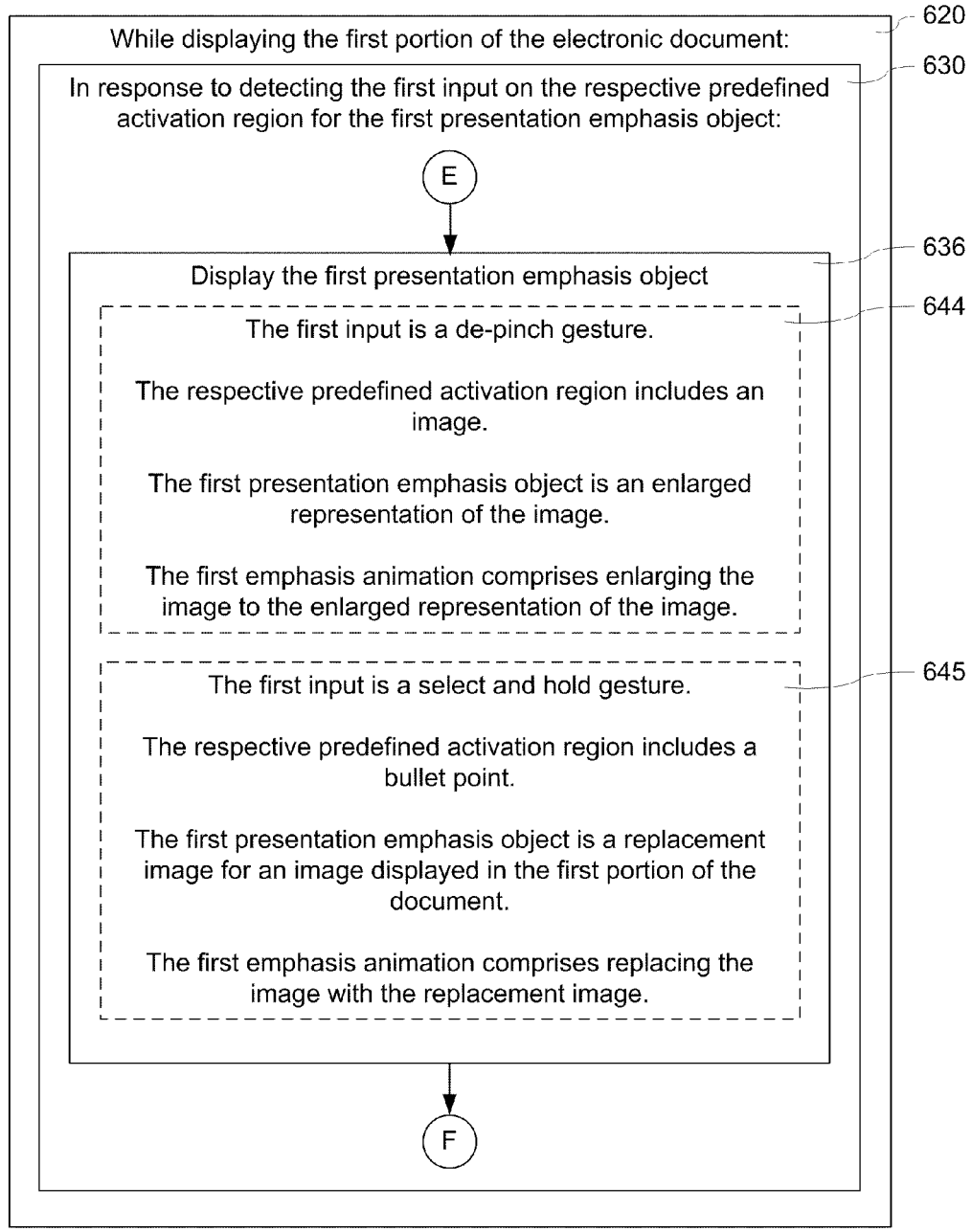
Figure 6G:
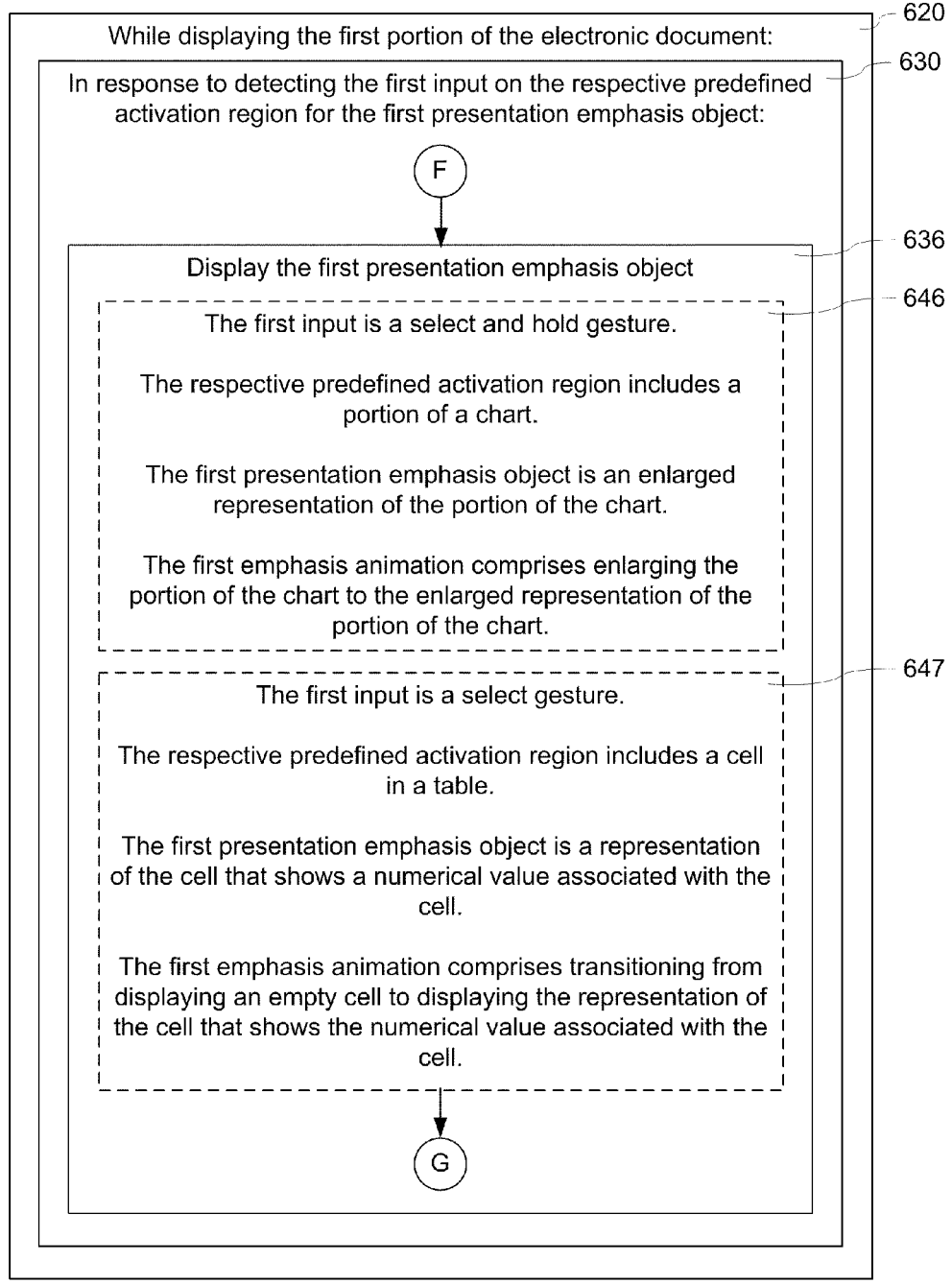
Figure 6H:
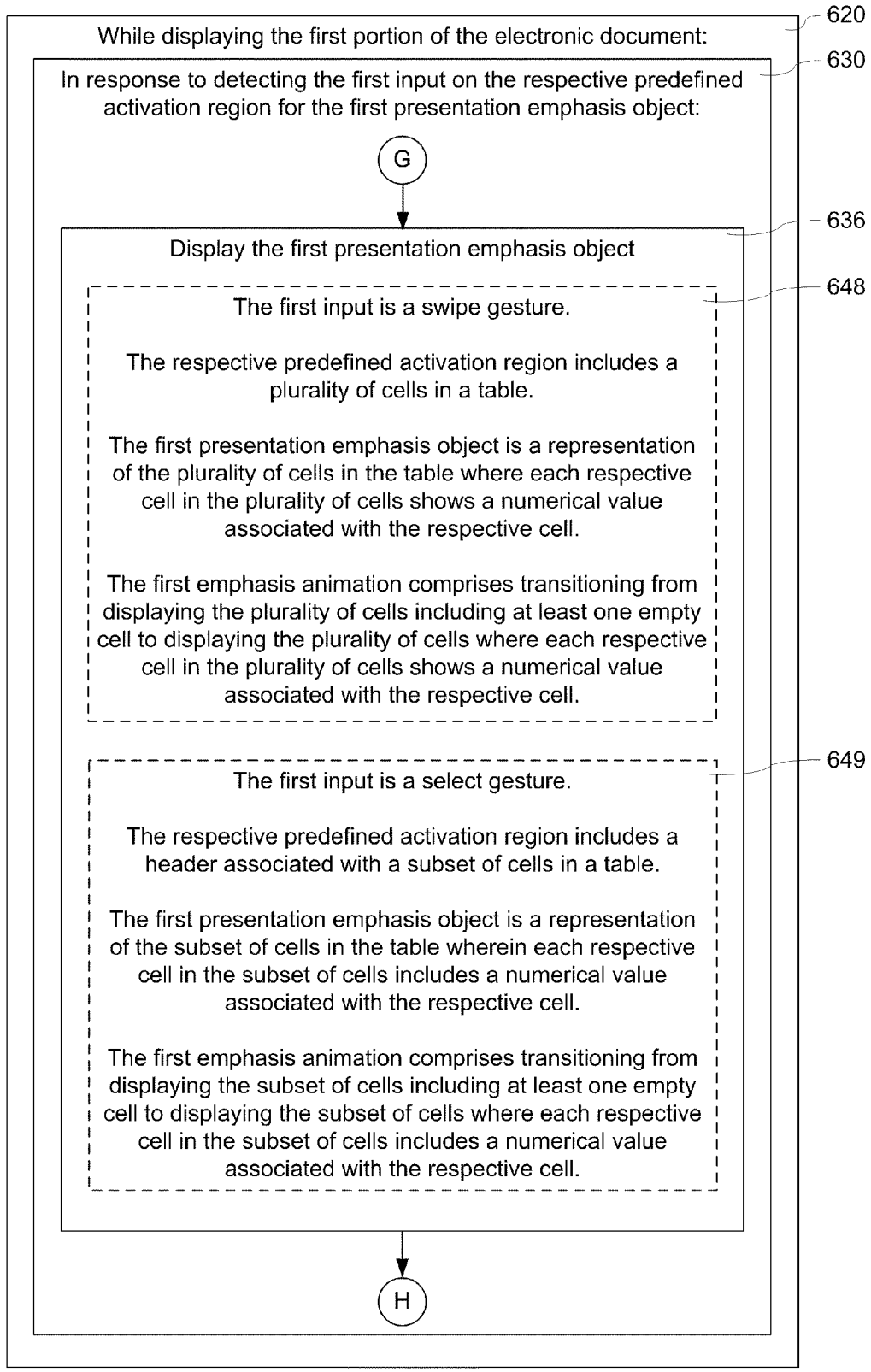
Figure 6I:
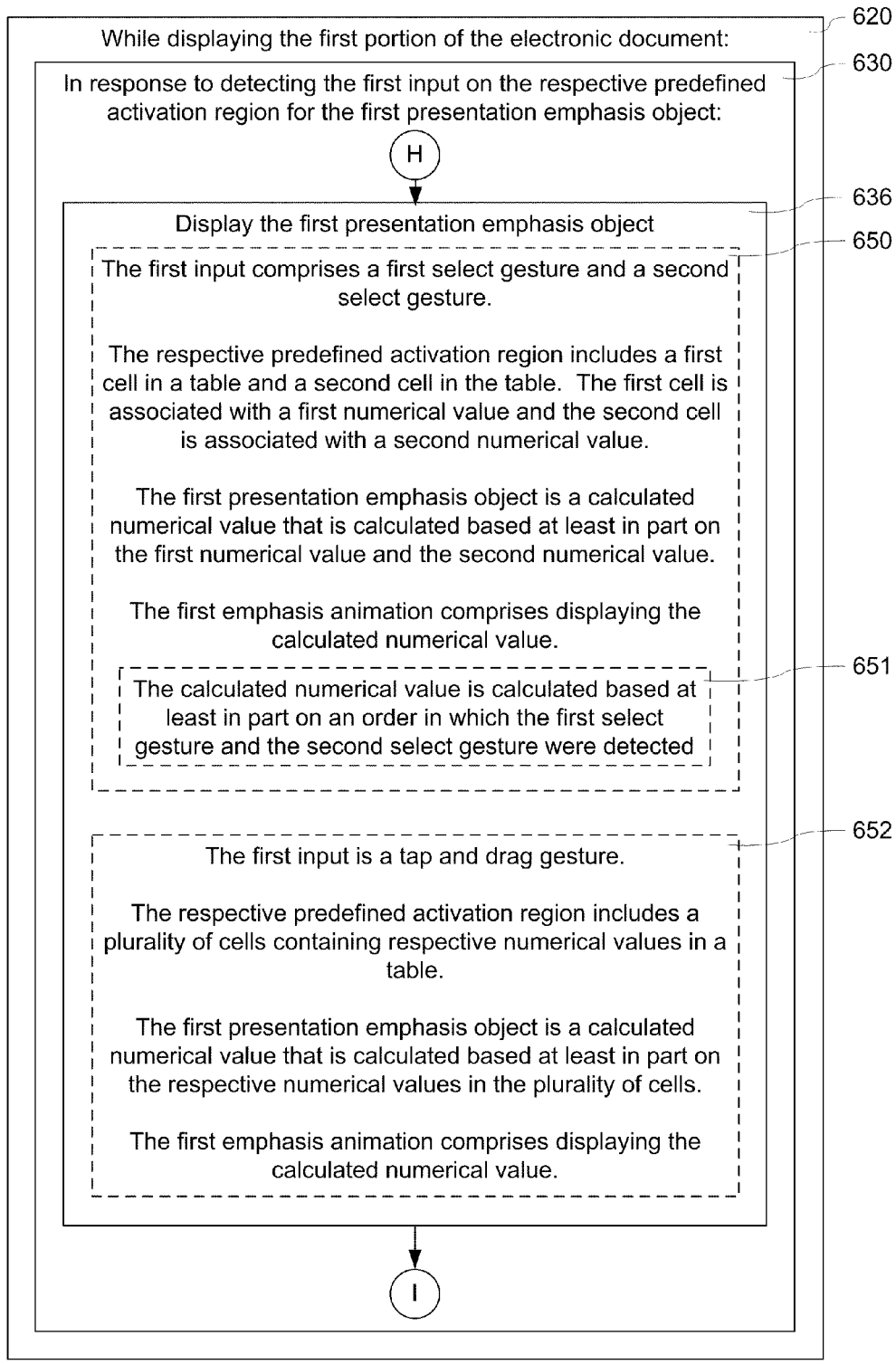
Figure 6J:
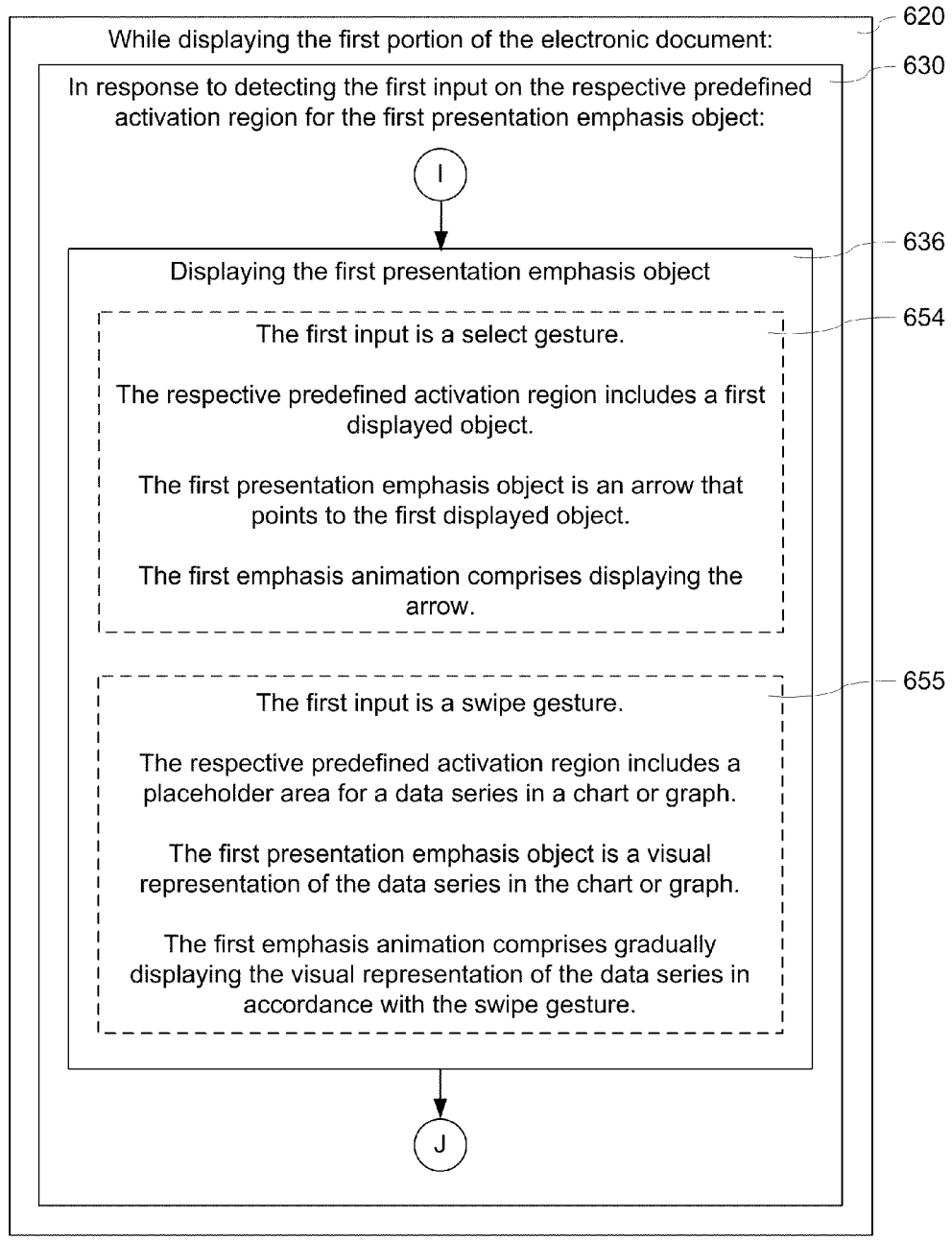
Figure 6K:
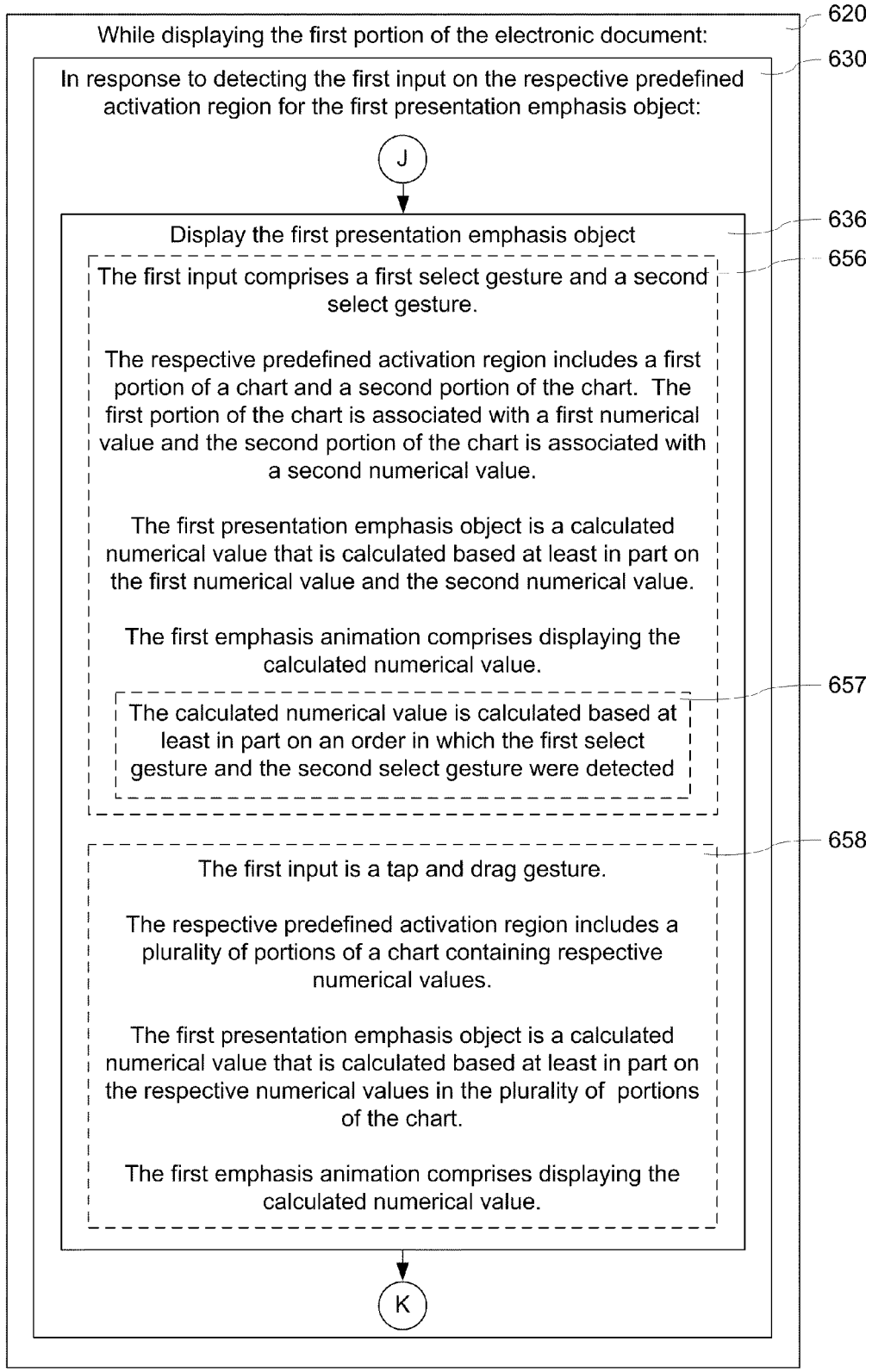
Figure 6L:
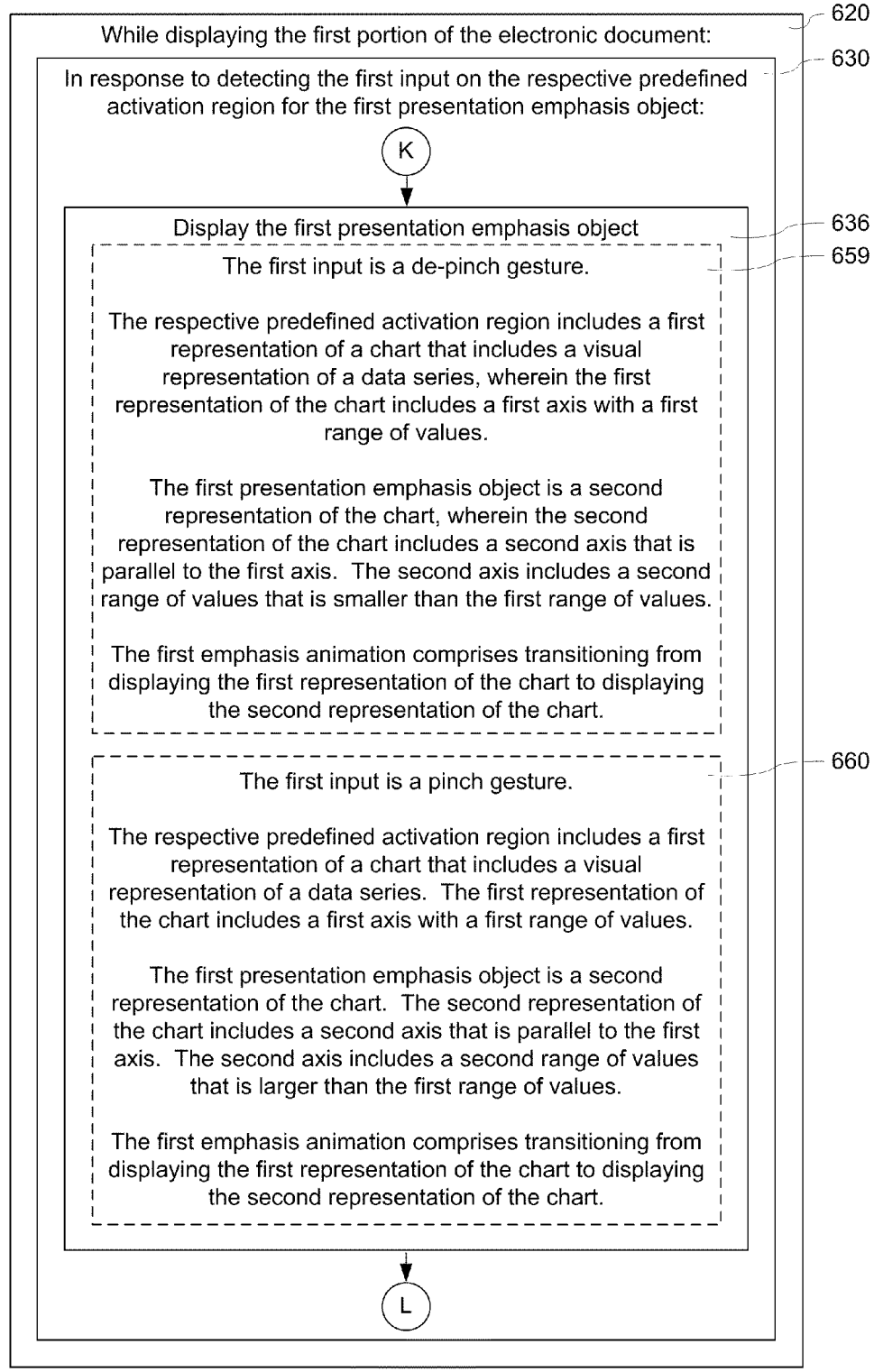
Figure 6M:
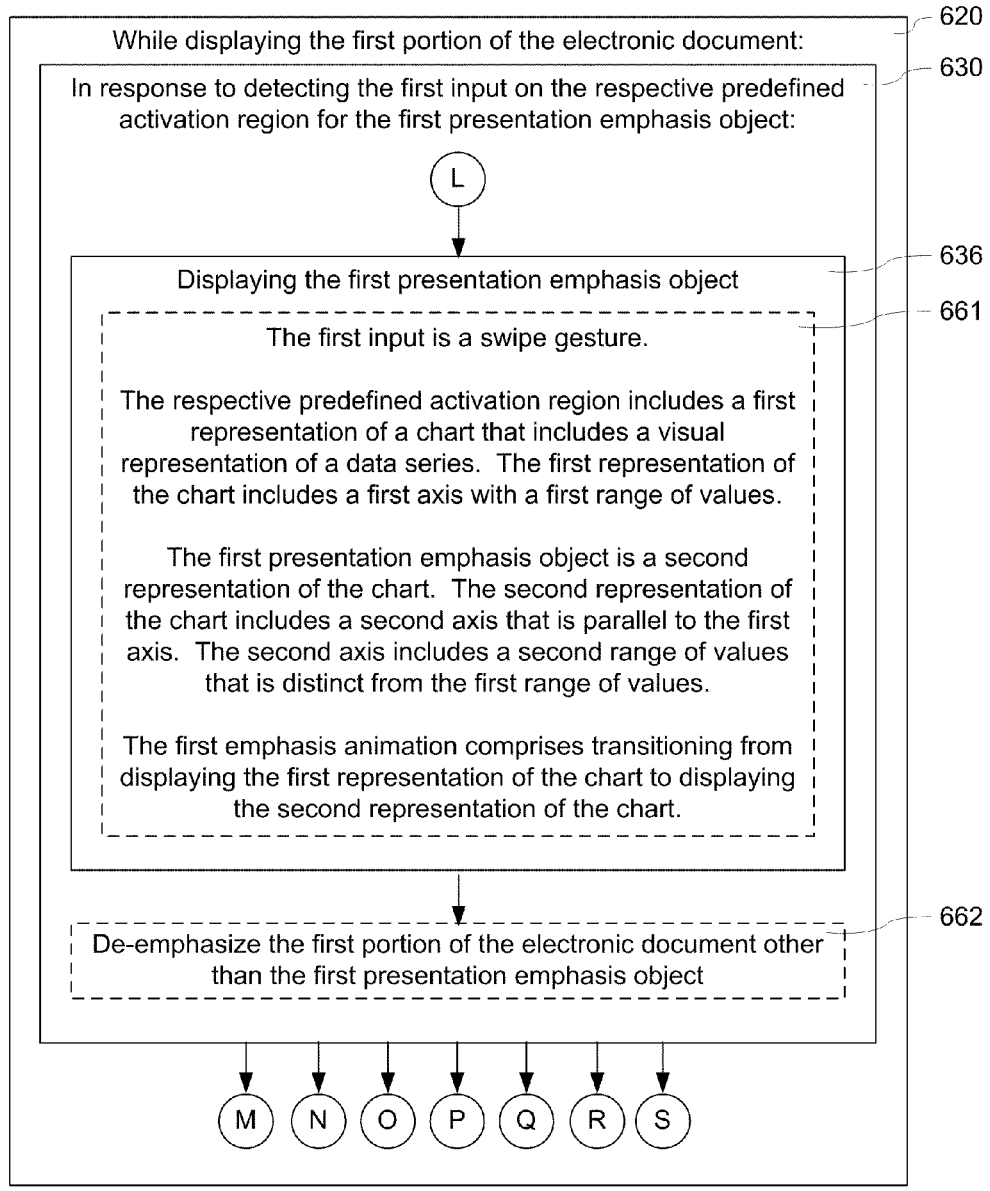
Figure 6N:
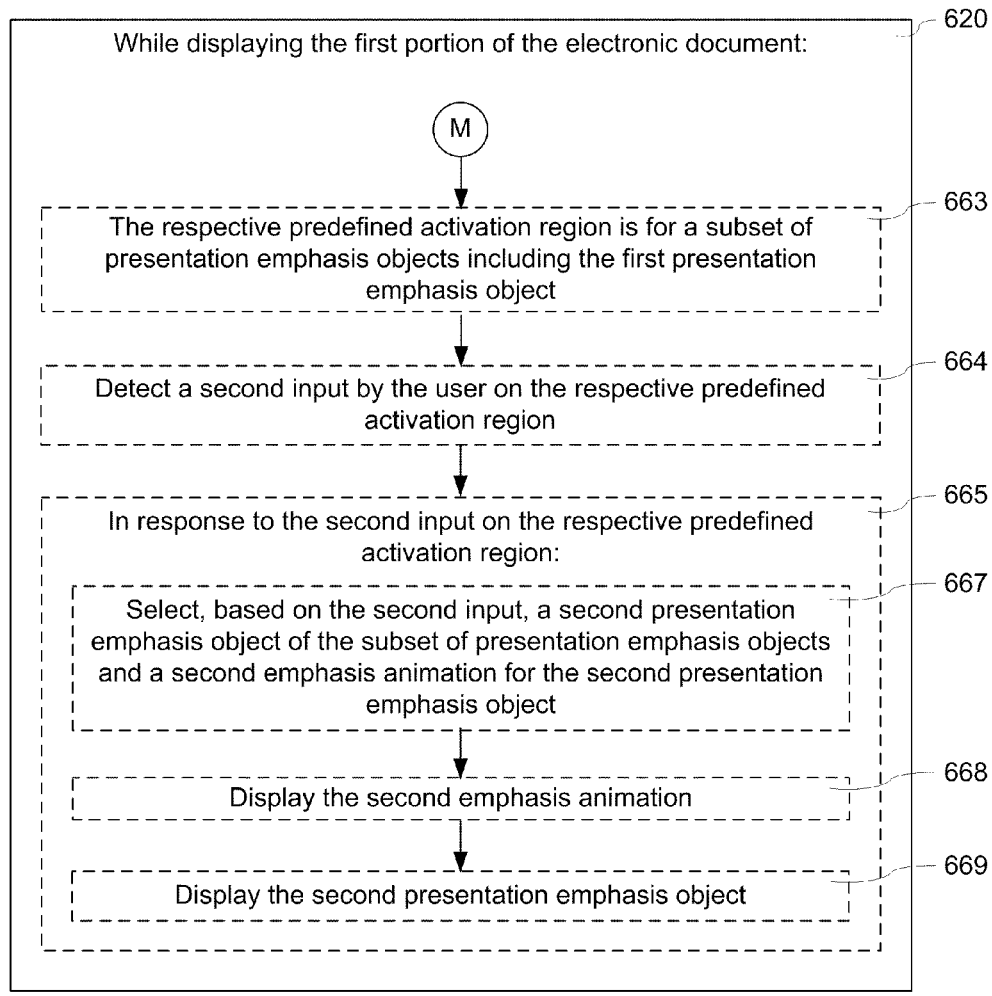
Figure 6O:
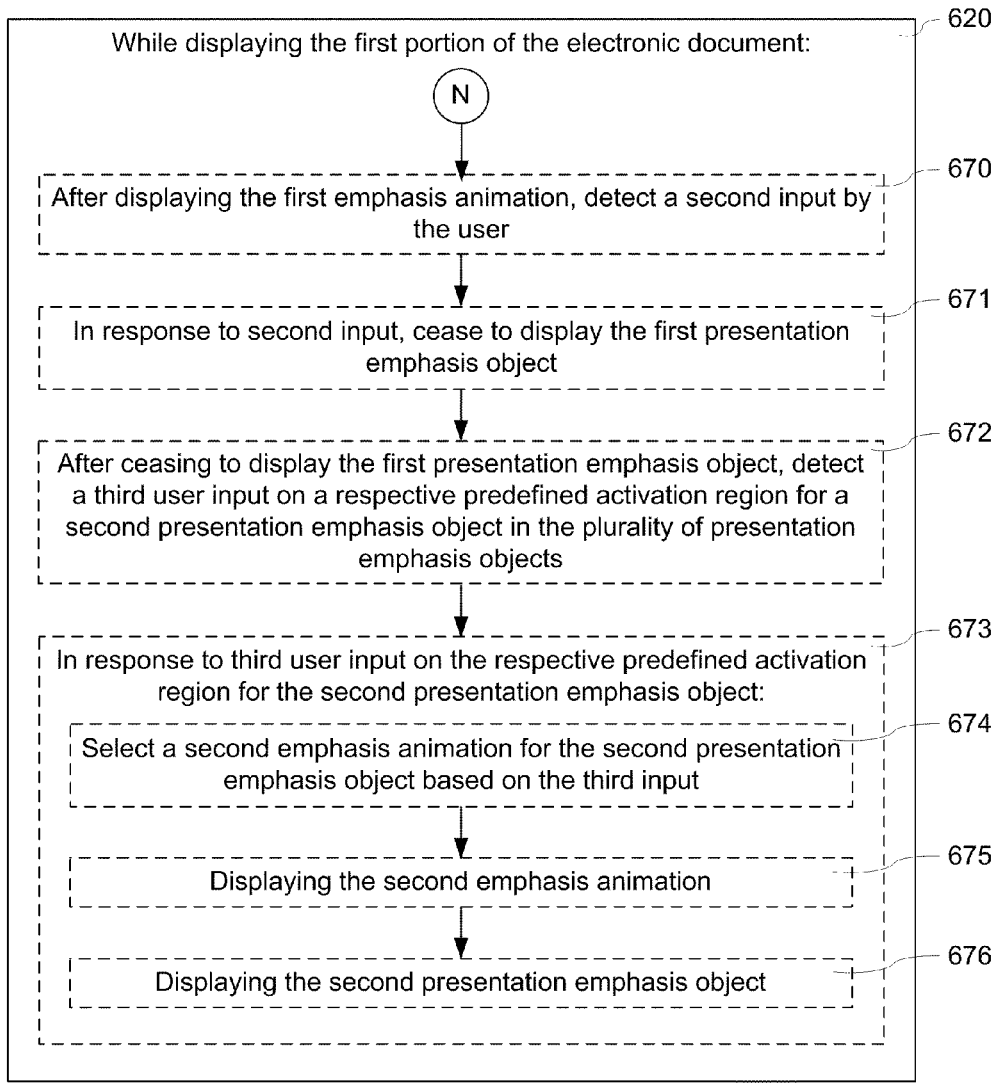
Figure 6P:
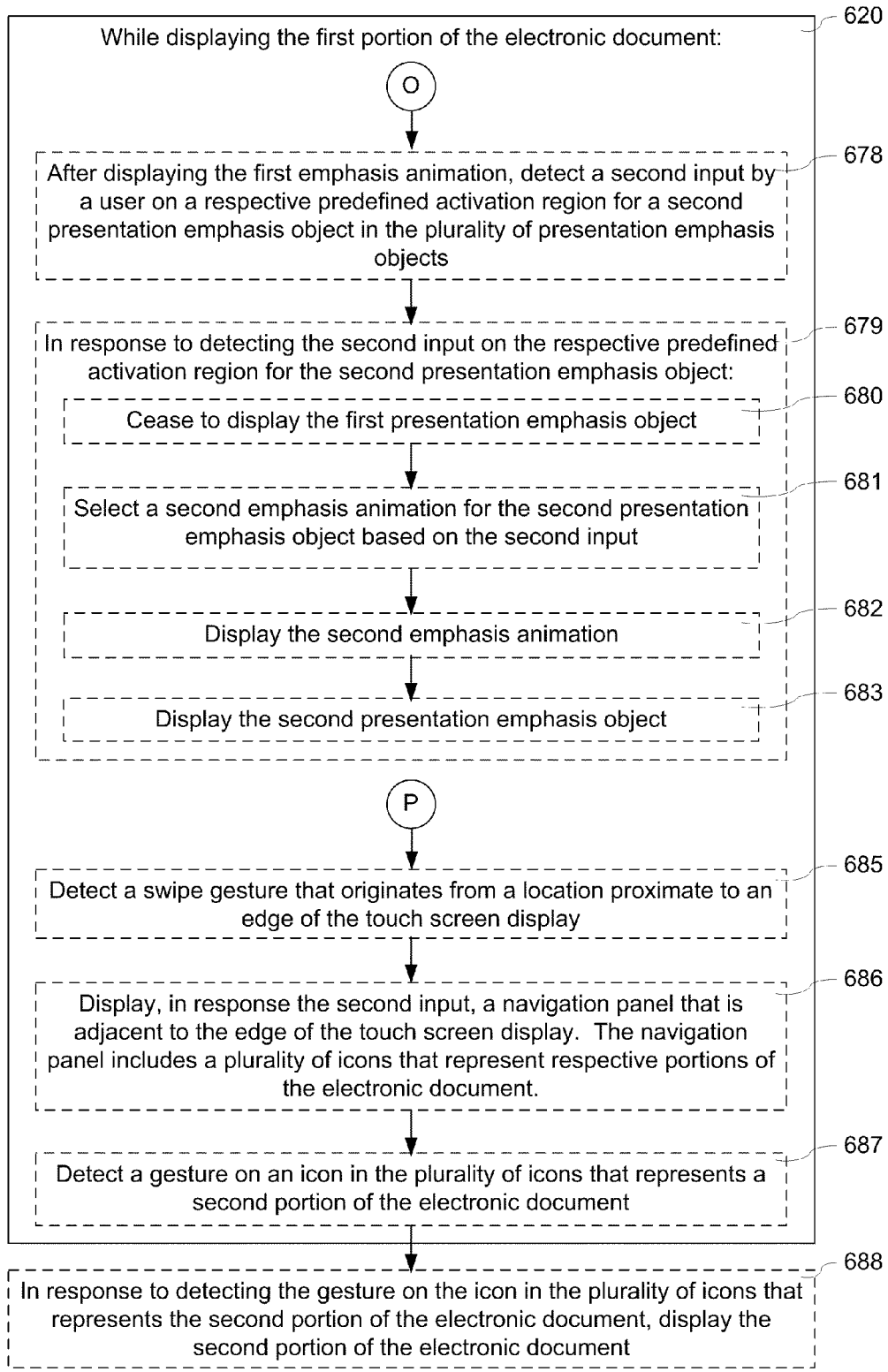
Figure 6Q:
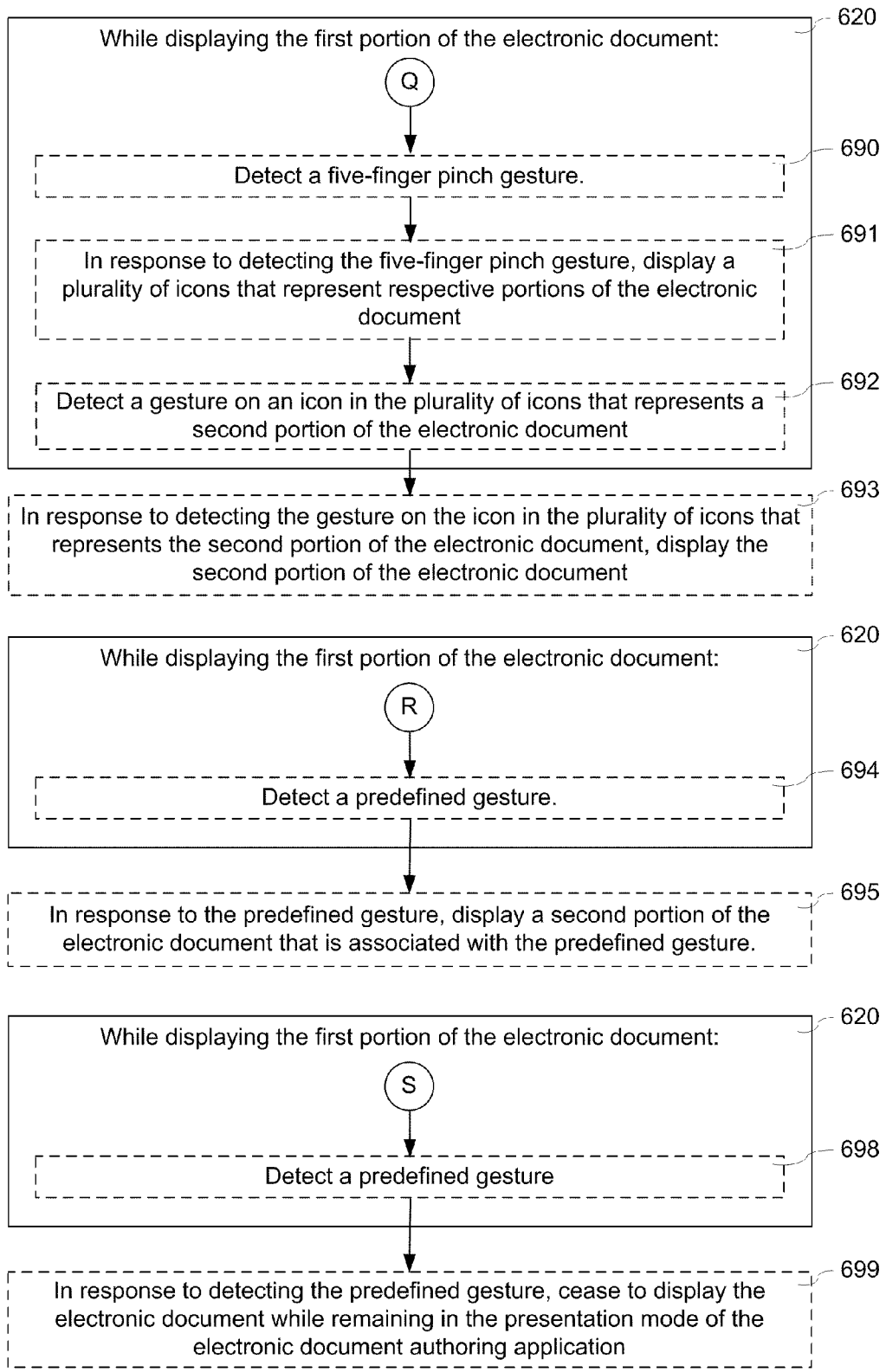

FIGS. 6A-6Q are flow diagrams illustrating a method 600 of emphasizing elements of an electronic document by displaying emphasis animations for the electronic document in an electronic document authoring application in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display (e.g., 112 in FIGS. 5A-5JJJ) and the touch-sensitive surface is on the display. In some embodiments, the display is separate from the touch-sensitive surface. Some operations in method 600 may be combined and/or the order of some operations may be changed.

As described below, the method 600 provides an intuitive way to emphasize elements of an electronic document by displaying emphasis animations for the electronic document in an electronic document authoring application in accordance with some embodiments. The method reduces the cognitive burden on a user when displaying an electronic document in an electronic document authoring application to another user, thereby creating a more efficient human-machine interface. For battery-operated computing devices, enabling a user to emphasize elements of an electronic document faster and more efficiently conserves power and increases the time between battery charges.

In some embodiments, operations 602-610 are performed (601) prior to displaying the first portion of the electronic document in the presentation mode of the electronic document authoring application. It should be understood that, in some embodiments, operations analogous to operations 602-610 are also performed after the electronic document has been displayed in presentation mode and returned to edit mode. In other words, in these embodiments, the electronic document authoring application has at least two modes, an edit mode and a presentation mode, where the edit mode is for editing the electronic document and the presentation mode is for presenting the electronic document, and the device can switch back and forth between the edit mode and the presentation mode in response to user inputs.

The device displays (602) the electronic document in an edit mode of the electronic document authoring application. For example, in FIGS. 5A-5B, the device displays a presentation application in edit mode. In some embodiments, the electronic document is (603) a presentation document (e.g., an electronic slideshow document, as illustrated in FIGS. 5A-5B). In some embodiments, the electronic document is (604) a word-processing document, a spreadsheet, a desktop publishing document, an image document, a video document, or a drawing document. In some other embodiments, the electronic document is a webpage.

In some embodiments, the electronic document authoring application is (605) a presentation application. In some embodiments, the electronic document authoring application is (606) an image editing application (e.g., Aperture or iPhoto from Apple Inc. of Cupertino, Calif.), a drawing application, a word-processing application (e.g., Pages from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.). In some other embodiments, the electronic document authoring application is a website creation application (e.g., iWeb from Apple Inc. of Cupertino, Calif.). In some embodiments, the electronic document authoring application is an office productivity application (i.e., a word-processing application, a spreadsheet application or a presentation application).

In some embodiments, the device detects (608) one or more user inputs. In some embodiments, the device edits (609) the electronic document in accordance with the one or more user inputs (e.g., as described in greater detail below with reference to FIGS. 5A-5B, 5J-5K, 5S, 5V-5W, and 5KK-5LL). In some embodiments, editing the electronic document comprises: adding a displayed object; modifying a displayed object; and/or deleting a displayed object (e.g., deleting, inserting, changing the format, changing the size, or changing the position of text, images, charts, graphs, tables, etc.). For example, in FIG. 5A, a presentation application is displayed in edit mode. An electronic document that is a presentation is displayed with a plurality display objects including a title 5002 and a bulleted list including one or more items (e.g., 5004, 5006, 5008 and 5010 in FIGS. 5A-5B). Additionally, in this example, one or more command regions 5012 are displayed, which include icons for performing commands within the presentation application. In this example, a navigation region 5014 is also displayed, where the navigation region 5014 includes representations of other slides in the presentation. While in this editing mode, the user can add text to slides, add additional slides, add images, delete images, etc. from the presentation. In this example, text is being added to the currently selected slide (e.g., a cursor 5015 is displayed, and the user is adding text input via a keyboard). Thus, in FIG. 5A, the fourth bulleted list item 5010-*a* reads "Add bullet p" while in FIG. 5B, after the text has been added, the fourth bulleted list item 5010-*b* reads "Add bullet points." Similarly, it should be understood that, while the electronic document authoring application is in edit mode, text could be deleted or other display objects and could be added or deleted from another slide in the presentation.

In some embodiments editing the electronic document does not comprise explicitly specifying or selecting emphasis animations for any of the displayed objects. For example, the user does not specify the order in which the bulleted list items (e.g., 5004, 5006, 5008, and 5010 in FIGS. 5A-5B) will be displayed in a presentation mode and/or does not specify any animation that will be displayed when the bulleted list item is displayed in presentation mode. In some embodiments, the electronic document authoring application does not have the capability to specify emphasis animations for displayed objects (e.g., typically in a word-processing application or a spreadsheet application there is no way to specify or select emphasis animations for displayed objects). In some embodiments, the electronic document authoring application includes the capability to add emphasis animations, but the user does not specify or select emphasis animations to associate with displayed objects.

In some embodiments, the device detects (610) a user input that corresponds to a request to display the electronic document in the presentation mode of the electronic document authoring application. As one example, the device detects an input (e.g., tap gesture 5016 in FIG. 5B) including a "play" icon (e.g., 5018 in FIG. 5B) in a command region (e.g., 5012 in FIG. 5B) of the electronic document authoring application. As another example, the device detects selection of an option from a drop down menu to go into a slide show or other presentation mode. In some embodiments presentation is a primary function of the application (e.g., giving an electronic presentation to one or more listeners). For example, for a presentation application (e.g., Keynote by Apple Inc. of Cupertino, Calif.), the electronic document is a presentation that is typically authored specifically for the purpose of being presented to others. In some embodiments presentation mode is an added feature that allows for more effective collaboration, such as discussing a draft of a word-processing document (e.g., using Pages by Apple Inc. of Cupertino, Calif.) or spreadsheet document (e.g., using Numbers by Apple Inc. of Cupertino, Calif.) with a co-worker.

In some embodiments, in response to detecting the user input (e.g., tap gesture 5016 in FIG. 5B), the device displays (611) the electronic document in the presentation mode of the electronic document authoring application (e.g., the slide illustrated in FIG. 5C). In some embodiments while the electronic document authoring application is in presentation mode, the actions of the user do not cause the electronic document authoring application to edit any of the display objects. In other words, the user is prevented from editing the electronic document while the electronic document is in presentation mode. Thus, in these embodiments, in order to edit the electronic document, the user must submit an input that causes the computing device to enter an edit mode of the electronic document authoring application (e.g., pressing the "esc" key on a keyboard, selecting an "exit presentation" button, shaking the device, etc.).

In some embodiments, after detecting the user input (e.g., tap gesture 5016 in FIG. 5B) that corresponds to a request to display the electronic document in the presentation mode, the device prepares (612) at least one emphasis animation for subsequent display in the presentation mode. In some embodiments, the emphasis animations are prepared in response to detecting the user input (e.g., tap gesture 5016 in FIG. 5B) that corresponds to a request to display the electronic document in the presentation mode (e.g., the animation frames are generated and temporarily stored in a cache on the device when the electronic document authoring application enters presentation mode). In other embodiments, one or more emphasis animations are prepared after receiving an input to display the emphasis animation (e.g., the frames for a respective emphasis animation are generated in response to the user providing an input that selects the respective emphasis animation). In other words, in these embodiments, the emphasis animations are not pre-generated in edit mode.

The device displays (614) a first portion of an electronic document (e.g., the "How to make a slide show" slide displayed on display 112 in FIG. 5C, or a page in a spreadsheet or word-processing document) in a presentation mode (e.g., a read-only mode, where no edits can take place in the electronic document) of an electronic document authoring application (e.g., Keynote, Pages, Numbers, Powerpoint, MS Word, Excel, MS Publisher, Adobe Photoshop, Adobe Acrobat, etc.). The first portion of the electronic document (e.g., the "How to make a slide show" slide displayed on touch screen display 112 in FIG. 5C) includes predefined activation regions for a plurality of presentation emphasis objects (e.g., activation region 5020 is for the slide title 5002, activation region 5022 is for bulleted list item "Create a slide" 5004 in FIG. 5E, activation region 5024 is for bulleted list item "Write a title for the slide" 5006 in FIG. 5E, activation region 5026 is for bulleted list item "Insert images" 5008 in FIG. 5E, and activation region 5028 is for bulleted list item "Add bullet points" 5010-*b* in FIG. 5E). It should be understood that when the first portion of the electronic document is initially displayed, the presentation emphasis objects are typically not displayed. Instead, in these embodiments, as explained below, a respective presentation emphasis object typically appears in response to detecting a user input (e.g., a tap gesture) on a predefined activation region for the respective presentation emphasis object. Additionally, as illustrated in FIG. 5E, in some embodiments, the presentation emphasis objects (e.g., 5006 in FIG. 5D) continue to be displayed as displayed objects (e.g., 5006 in FIG. 5E) in the presentation mode after they are initially displayed on the touch screen display 112.

As described in greater detail above, in some embodiments, the electronic document is (615) a presentation document. Similarly, as described in greater detail above, in some embodiments, the electronic document is (616) a word-processing document, a spreadsheet, a desktop publishing document, an image document, a video document, or a drawing document. Additionally, as described in greater detail above, in some embodiments, the electronic document authoring application is (617) a presentation application. Likewise, as described in greater detail above, in some embodiments, the electronic document authoring application is (618) an image editing application, a drawing application, a word-processing application, a disc authoring application, or a spreadsheet application, or an office productivity application (i.e., a word-processing application, a spreadsheet application, or a presentation application).

In some embodiments, operations 621-682, 686-688, 692 and 696 are performed while displaying (620) the first portion of the electronic document (e.g., the "How to make a slide show" slide displayed on touch screen display 112 in FIG. 5C). The device detects (621) a first input (e.g., tap gesture 5040 in FIG. 5C) by a user on a respective predefined activation region (e.g., 5024 in FIG. 5C) for a first presentation emphasis object (e.g., 5006 in FIG. 5D) in the plurality of presentation emphasis objects. In some embodiments, the first input is a tap gesture or mouse click on a currently displayed object (e.g., bullet point 5034 in FIG. 5C) in the first portion of the electronic document or an activation region (e.g. 5024 in FIG. 5C) for the first presentation emphasis object.

In some embodiments, the device includes (622) a touch-sensitive surface and the first input is a gesture (e.g., tap gesture 5040 in FIG. 5C) on the touch-sensitive surface (e.g., a touch pad that is separate from the touch screen display, or a touch screen display as described below). In some embodiments, the display is (623) a touch screen display (e.g., 112 in FIG. 5C) and the first input is a gesture (e.g., tap gesture 5040 in FIG. 5C) on the touch screen display (e.g., 112 in FIG. 5C). In some embodiments, first input is (624) a finger gesture (e.g., a tap, pinch, de-pinch, swipe, double swipe, triple swipe, press and hold, circle, draw a closed loop, rotation of two or more simultaneous finger contacts, multiple simultaneous stationary finger inputs, or other multi-touch gesture). In some embodiments, all of the user inputs are finger gestures. In some embodiments, some of the user inputs are finger gestures, while other user inputs are stylus gestures and/or mouse inputs. In some embodiments, the first input is (625) a stylus gesture or a mouse input. In other words, in some embodiments a combination of finger gestures, stylus gestures and mouse inputs are detected.

In some embodiments, the respective predefined activation region includes (626) a currently displayed bullet point, graph, chart, image, paragraph, word, sentence, line, cell, row, column, shape, line, embedded web view, movie, or graphical representation of a data series (e.g., a pie wedge, chart bar, graph line, etc.). In other words, the bullet point, graph, chart, image, paragraph, word, sentence, line, cell, row, column, shape, line, embedded web view, movie, or graphical representation of a data series is displayed prior to detecting the first input. It should be understood that in some embodiments the activation regions are overlapping. Similarly, in some embodiments, one activation region will be contained entirely within another activation region. For example, one activation region (e.g., 5024 in FIG. 5D) includes an entire bulleted list item (e.g., all of the text associated with a single bullet point) while each word of the bulleted list item has its own activation region (e.g., "Write" has activation region 5044, "a" has activation region 5046, "title" has activation region 5048, "for" has activation region 5050, "the" has activation region 5052, and "slide" has activation region 5054 in FIG. 5D), so that the entire bulleted list item can be emphasized, or a single word in the bulleted list item can be emphasized.

In some embodiments, the first presentation emphasis object is (627) an enlargement of an object displayed immediately before the first emphasis animation, as illustrated in FIGS. 5G-5H (e.g., an enlarged graph, chart, image, paragraph, word, sentence, line, cell, row, column, or graphical representation of a data series). In some embodiments, the first presentation emphasis object is (628) an enlarged portion of an object displayed immediately before the first emphasis animation, as illustrated in FIGS. 5X-5Y (e.g., an enlarged portion of a graph, chart, image, paragraph, word, sentence, line, cell, row, column, or graphical representation of a data series). In some embodiments, presentation emphasis objects are not enlargements of previously displayed objects or portions thereof. For example, an object that was not previously displayed may be displayed. In some embodiments, the first presentation emphasis object includes (629) a numerical value calculated based at least in part on a numerical value associated with the respective activation region or a displayed object selected by the user, as illustrated in FIGS. 5MM-5YY.

In some embodiments, operations 632-640 and 644-662 are performed in response to detecting (630) the first input (e.g., tap gesture 5040 in FIG. 5C) on the respective predefined activation region (e.g., 5024 in FIG. 5C) for the first presentation emphasis object (e.g., 5006 in FIG. 5D).

The device selects (632) a first emphasis animation for the first presentation emphasis object based on the first input, examples of such emphasis animations are illustrated in FIGS. 5MM-5PP, as described in greater detail below. In some embodiments, the first emphasis animation is one of a plurality of animations for the first presentation emphasis object. In these embodiments, detecting a first type of input (e.g., a press and hold gesture on a bullet point for a bulleted list item) on the respective predefined activation region for the first presentation emphasis object results in selection and display of a first emphasis animation (e.g., display of an annotation for the bulleted list item), detecting a second type of input (e.g., a circling gesture around the bulleted list item) on the respective predefined activation region for the first presentation emphasis object results in selection and display of a second emphasis animation (e.g., displaying an expanded representation of the bulleted list item as though it is under a magnifying glass), and so on. In some embodiments, while displaying the electronic document in presentation mode, the emphasis animations for the presentation emphasis objects may be activated "on the fly" by the user in a user-selected order.

It should be understood that this flexibility enables a user to tailor their presentation to their audience in real time. For example, a user performs one or more gestures of a first gesture type (e.g., tap gestures) to display a plurality of bulleted list items in the bulleted list, as described in greater detail below with reference to FIGS. 5C-5E. Subsequently, in this example, the user performs a gesture of a second gesture type (e.g., a circling gesture) to emphasize one particular bulleted list item, as described in greater detail below with reference to FIGS. 5G-5I. In contrast, existing presentation applications present animations in a fixed, predefined order during the presentation. In other words, animations in existing presentation applications are part of a sequence of "builds" that are defined by a user of the electronic document authoring application in the edit mode of the electronic document authoring application. In contrast, in accordance with some embodiments, the device automatically and dynamically determines emphasis animations for presentation emphasis objects based on the users inputs while the electronic document authoring application is in presentation mode.

In some embodiments, the first presentation emphasis object and the first emphasis animation are prepared (633) after detecting the user input that corresponds to a request to display the electronic document in the presentation mode. In some embodiments, the emphasis animations are prepared "on the fly" as the computing device receives user inputs (i.e., the animation frames are generated by the device on an as-needed basis). In some embodiments, at least a subset of the emphasis animations are not specifically selected by the user while in edit mode, but are instead generated automatically after the electronic document authoring application has entered presentation mode. In other words, the user does not select predefined animations to create a sequence of slide builds in a presentation application.

In some embodiments, at least a subset of the emphasis animations are generated automatically after the electronic document authoring application has entered presentation mode based on displayed objects in the electronic document (e.g., based on displayed objects that were prepared by the user while in edit mode). For example, when the device enters presentation mode for a presentation document, as illustrated in FIGS. 5B-5C, the device automatically begins generating animation frames for displaying each of the bulleted list items (e.g., 5006, 5004, 5008, and 5010-b in FIG. 5E), as described in greater detail below with reference to FIGS. 5C-5E. In some embodiments, the device also begins generating animation frames for emphasizing one or more of the bulleted list items, as described in greater detail below with reference to FIGS. 5G-5I. In some embodiments, the device identifies the most likely presentation emphasis objects and associated emphasis animations that will be selected to be displayed by the user and pregenerates at least a subset of the most likely presentation emphasis objects and associated emphasis animations (e.g., for a bulleted list, the emphasis animations of the bullet points appearing would be pregenerated, while the animations for displaying an enlarged version of one of the bullet points or displaying a loupe around one of the bullet points would be generated on-the-fly).

In some embodiments, the first emphasis animation is automatically selected (634) from a predefined set of emphasis animations in accordance with at least one of: an object type associated with the respective predefined activation region and a gesture type associated with the first input. For example, as described below in greater detail with reference to FIGS. 5A-5AAA, for different gesture types (e.g., tap gesture, swipe gesture, circling gesture, pinch gesture, de-pinch gesture, etc.) and different object types (e.g., bulleted list item, table cell, image, chart, graph, etc.) different emphasis animations are automatically selected.

The device displays (635) the first emphasis animation (e.g., as illustrated in FIGS. 5C-5D, the bulleted list item 5006 including the text "Write a title for the slide" appears in response to detecting a tap gesture 5040 on the activation region 5024 associated with the text). The device displays (636) the first presentation emphasis object (e.g., the bulleted list item 5006 including text "Write a title for the slide" in FIG. 5D). In some embodiments, the first emphasis animation includes an animation of a currently displayed object (or portion thereof) that transitions to the presentation emphasis object. Exemplary emphasis animations and presentation emphasis objects are described in greater detail below.

In some embodiments, the device displays a first portion of an electronic document (e.g., the presentation document in FIGS. 5C-5E) in a presentation mode of an electronic document authoring application (e.g., Keynote). The first portion of the electronic document includes predefined activation regions for a plurality of presentation emphasis objects. While displaying the first portion of the electronic document, the device detects a first input by a user on a respective predefined activation region (e.g., 5024 in FIG. 5C) for a first presentation emphasis object (e.g., bulleted list item 5006 in FIG. 5D) in the plurality of presentation emphasis objects. In some embodiments, the first input is a select gesture (e.g., tap gesture 5040 in FIG. 5C). In these embodiments, the respective predefined activation region includes a bullet point (e.g., 5034 in FIG. 5C). For example, the first portion of the electronic document displayed in the presentation mode includes a bulleted list, where at least some of the bullet points (e.g., 5032, 5034, 5036 and 5038 in FIG. 5C) are displayed without the text associated with the bullet point (e.g., the entire bulleted list item is not displayed). In these embodiments, the first presentation emphasis object is (637) bulleted list item associated with or adjacent to the bullet point. For example, in FIGS. 5C-5E, activation region 5020 is for title presentation emphasis object 5002, activation region 5022 is for a first bulleted list item 5004, activation region 5024 is for a second bulleted list item 5006, activation region 5026 is for a third bulleted list item 5008, and activation region 5028 is for a fourth bulleted list item 5010-b.

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first emphasis animation comprises transitioning from displaying the bullet point (e.g., bullet point 5034 in FIG. 5C) without the text associated with the bullet point to displaying the entire bulleted list item (e.g., 5006 in FIG. 5D) including the bullet point (e.g., 5034 in FIG. 5D). In some of these embodiments the first emphasis animation consists of simply displaying the entire bulleted list item (e.g., 5006 in FIG. 5D).

In other ones of these embodiments, the emphasis animation includes both displaying the entire bulleted list item (e.g., 5006 in FIG. 5D) as well as displaying a transition animation that shows a bulleted list item bouncing, spinning, growing, shrinking, flipping, sliding from a side of the display, or fading in to a position on the display proximate to the associated bullet point (e.g., 5034 in FIG. 5D), in order to draw attention to the text that is being displayed.

In some embodiments, in response to a plurality of tap gestures (e.g., tap gesture 5056 with activation region 5022, tap gesture 5058 with activation region 5058, and tap gesture 5060 with activation region 5028 in FIG. 5D) a plurality of presentation emphasis objects are displayed (e.g., bulleted list item 5004 including the text "Create a slide," bulleted list item 5008 including the text "Insert images," and bulleted list item 5010-b including the text "Add bullet points" in FIG. 5E). As discussed in greater detail above, in accordance with some embodiments, the order of the gestures determines which presentation emphasis objects are displayed. In other words, while the electronic document authoring application is in presentation mode, the user can determine the order in which the presentation emphasis objects (e.g., bulleted list items 5004, 5006, 5008, and 5010-b in FIG. 5E) are displayed by adjusting the order of the user inputs.

For example, if the user wanted to display the bulleted list items in order from top to bottom, the user would perform tap gesture 5056 in FIG. 5D, followed by tap gesture 5040 in FIG. 5C, followed by tap gesture 5058 in FIG. 5D, and finally tap gesture 5060 in FIG. 5D. However, if the user wanted to display the bulleted list items in order from bottom to top, the user would perform tap gesture 5058 in FIG. 5D, followed by tap gesture 5056 in FIG. 5D, followed by tap gesture 5040 in FIG. 5C, and finally tap gesture 5056 in FIG. 5D. Similarly, bulleted list items could be displayed in any order desired by the user in response to other orderings of the user inputs. Additionally, as illustrated in FIG. 5E, in some embodiments, the presentation emphasis objects (e.g., bulleted list items 5004, 5006, 5008, and 5010-b in FIG. 5E) continue to be displayed as displayed objects (e.g., "Create a slide" 5004, "Insert images" 5008, and "Add bullet points" 5010-b in FIG. 5F) in the presentation mode after they are initially displayed on the display.

In some embodiments, the device displays a first portion of an electronic document (e.g., the presentation document in FIGS. 5E-5F) in a presentation mode of an electronic document authoring application (e.g., Keynote). The first portion of the electronic document includes predefined activation regions for a plurality of presentation emphasis objects. While displaying the first portion of the electronic document, the device detects a first input by a user on a respective predefined activation region (e.g., 5026 in FIGS. 5E-5F) for a first presentation emphasis object (e.g., annotation 5070 in FIG. 5F) in the plurality of presentation emphasis objects. In some embodiments, the first input is a select and hold gesture (e.g., a tap and hold gesture 5068 in FIG. 5E-5F). In some embodiments, the respective predefined activation region includes a bulleted list item with a bullet point and adjacent text (e.g., 5008 in FIG. 5E-5F). In these embodiments, the first presentation emphasis object is (638) an annotation for the text adjacent to the bullet point. As one example, the annotation is a pop-up message (e.g., 5070 in FIG. 5F). The annotation (e.g., 5070 in FIG. 5F) includes additional explanatory information about the text of the first bulleted list item (e.g., 5008 in FIG. 5F) in the bulleted list. In other words, after the device displays the text of the bulleted list item in response to detecting a first gesture (e.g., a tap gesture 5058 in FIG. 5D on the activation region 5026 that includes the bullet point 5036 in FIG. 5D), the user may cause the device to display additional explanatory information about the bulleted list item by performing a different gesture (e.g., tap and hold gesture 5068 in FIG. 5E) on the bullet point (e.g., 5036 in FIG. 5E), and the additional information is displayed (e.g., annotation 5070 in FIG. 5F) by the device.

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first emphasis animation comprises transitioning from displaying the bulleted list item (e.g., 5008 in FIG. 5E) without the annotation to displaying the bulleted list item (e.g., 5008 in FIG. 5F) simultaneously with the annotation (e.g., 5070 in FIG. 5F). In some of these embodiments, the annotation is only displayed if entire first bulleted list item is already displayed. In some of these embodiments, if the entire first bulleted list item is not already displayed, any currently undisplayed portion of the bulleted list item (e.g., the text associated with the bulleted list item) is displayed as part of an emphasis animation. In some embodiments, the annotation includes an image. In some embodiments, the device ceases to display the presentation emphasis object (e.g., annotation 5070 in FIG. 5F) in response to an input from the user (e.g., tap gesture 5071 on the touch screen display 112 in FIG. 5F).

In some embodiments, the first input is a circling gesture (e.g., a first contact 5072 with the touch-sensitive surface and subsequent movement 5074 of the contact 5072 such that the contact 5072 traces a substantial portion of a closed loop around a portion of the predefined activation region 5024 in FIG. 5G). It should be understood that, in some embodiments, a circling gesture does not need to be a completed circle or loop, but rather any loop-like gesture that matches the rough profile of a loop or an almost closed loop is treated by the device as a circling gesture. If the loop-like gesture does not match this rough profile of a loop, then the device checks to see if the gesture matches any other gesture type (e.g., a circling gesture recognizer ignores the input and passes it to a gesture recognizer for another gesture type). In some embodiments, when a circling gesture is detected, the device picks the predefined activation region that is best represented by the enclosed or partially enclosed region (if the circling gesture results in an unclosed region, then the region is closed by connecting the starting and ending points of the gesture). As one example, the predefined activation region with the greatest area of intersection with the shape indicated by the circling gesture is selected.

In some embodiments, the respective predefined activation region (e.g., 5024 in FIG. 5G) includes a first subset of text such as a line of text, the text of a bulleted list item (e.g., "Write a title for the slide" for bulleted list item 5006 in FIG. 5G) or a single word. In some embodiments, the first presentation emphasis object (e.g., 5076 in FIG. 5H) is (640) an enlargement of the first subset of text (e.g., "Write a title for the slide" 5006 in FIG. 5G). In some embodiments, the first emphasis animation comprises enlarging the first subset of text in the first portion of the electronic document to the enlargement of the first subset of text. In some embodiments, the first presentation emphasis animation object (e.g., 5076 in FIG. 5H) includes the one or more words (e.g., "Write a title for the slide") displayed within a virtual magnifying glass (e.g., a loupe) where the virtual magnifying glass is positioned over the subset of text, and a magnified representation of the subset of text is shown through the virtual magnifying glass.

In some embodiments, after displaying the first presentation emphasis object (e.g., 5076 in FIG. 5H), the device detects (641) a second input. The second input includes a select and drag gesture (e.g., contact 5078 at a first contact location 5078-1 that corresponds to the displayed enlargement of the subset of text 5076 and subsequent movement 5080 in FIG. 5H of the contact 5078 in a first direction to a second contact location 5078-2 in FIG. 5I) In these embodiments, in response to the second input, the device ceases (642) to display the first presentation emphasis object (e.g., 5076 in FIG. 5H) and displays a second presentation emphasis object (e.g., 5082 in FIG. 5I). In these embodiments, the second presentation emphasis object is an enlargement of a second subset of text (e.g., bulleted list item 5008 including the text "Insert images" in FIG. 5B) that is adjacent to the first subset of text in the first portion of the electronic document (e.g., bulleted list item "Write a title for the slide" 5008 in FIG. 5B. In some embodiments, the device displays (643) a second emphasis animation. The second emphasis animation includes transitioning from displaying the enlarged first subset of text to displaying the enlarged second subset of text. In some of these embodiments, the second emphasis animation includes displaying an animated transition, so that it looks as though a virtual magnifying glass is moving over the first portion of the electronic document in accordance with select and drag gesture. As one example, the first subset of text is a bulleted list item including text in a presentation document and the second subset of text is the next bulleted list item in the bulleted list in a presentation document. As another example, the first subset of text is a word or line in a word-processing document and the second subset of text is the next word or the next line of text below the subset of text in a word-processing document.

As another example, the electronic document authoring application is a word-processing application (e.g., Pages). As discussed in greater detail above, in some embodiments, the electronic document authoring application is initially in an edit mode. In the edit mode, the device edits the electronic document (e.g., adding text, deleting text, adding images, modifying already existing text, etc.) based on user inputs (e.g., gestures or keyboard inputs, etc.). In some embodiments the word-processing application includes a command region (e.g., 5084 in FIGS. 5J-5K) including commands for editing and otherwise modifying the document. In some embodiments the word-processing application also includes a properties region (e.g., 5086 in FIGS. 5J-5K) for changing the properties of text (e.g., from text 5088-*a* in FIG. 5J to text 5088-*b* in FIG. 5K) or other elements in the word-processing document. For example, in FIG. 5J the user performs a command to add an image to a word-processing document that includes text, and in FIG. 5K, the image has been added to the word-processing document and to change the font and size of the text from "Times New Roman" "13 pt" in FIG. 5J to "Arial" "12 pt" in FIG. 5K.

Continuing the example, after editing the electronic document, the device receives an input (e.g., tap gesture 5090 on a "play" button 5092 in FIG. 5K) from the user. In response to the input, the device displays the electronic document in a presentation mode of the displays the electronic document, as illustrated in FIG. 5L. In some embodiments, this presentation mode has the same properties described above in greater detail. In some embodiments, the device displays a first portion of an electronic document (e.g., the word-processing document in FIGS. 5L-5N) in a presentation mode of an electronic document authoring application (e.g., Pages). The first portion of the electronic document includes predefined activation regions for a plurality of presentation emphasis objects. While displaying the first portion of the electronic document, the device detects a first input by a user on a respective predefined activation region (e.g., 5094 in FIG. 5L) for a first presentation emphasis object (e.g., 5100 in FIG. 5M) in the plurality of presentation emphasis objects. In some embodiments the input is a circling gesture (e.g., contact 5096 and movement 5098 of the contact in a substantially closed loop around the line of text).

In response to detecting the first input on the respective predefined activation region for the first presentation emphasis object: the device selects a first emphasis animation for the first presentation emphasis object based on the first input, the device displays the first emphasis animation, and displays the first presentation emphasis object. In some embodiments, the first presentation emphasis object (e.g., 5100 in FIG. 5M) is an enlargement of the first subset of text (e.g., "or detract. The world will little note, nor long remember what we say here, but it can never forget what they" in FIG. 5L) associated with the predefined activation region (e.g., 5094 in FIG. 5L). In some embodiments, the first emphasis animation comprises enlarging the first subset of text in the first portion of the electronic document to the enlargement of the first subset of text.

In some embodiments, the first presentation emphasis animation object (e.g., 5100 in FIG. 5M) includes the one or more words displayed within a virtual magnifying glass (e.g., a loupe) where the virtual magnifying glass is positioned over the subset of text, and a magnified representation of the subset of text is shown through the virtual magnifying glass. It should be understood that, in some embodiments, in response to a second input (e.g., contact 5102 at a first contact location 5102-1 and movement 5104 in FIG. 5M to a second contact location 5102-2 in FIG. 5N), the device ceases to display the first presentation emphasis object (e.g., 5100 in FIG. 5M) which includes the first subset of text (e.g., "or detract. The world will little note, nor long remember what we say here, but it can never forget what they" in FIG. 5L) and displays a second presentation emphasis object, (e.g., 5106 in FIG. 5N) where the second presentation emphasis object includes a second subset of the text (e.g. "The brave men, living and dead, who struggled here, have consecrated it, far above our poor power to add".) In these embodiments, a second emphasis animation is displayed, where the second emphasis animation includes displaying an animated transition, so that it looks as though a virtual magnifying glass is moving over the first portion of the electronic document in accordance with the second input (e.g., the select and drag gesture).

In some embodiments, the device displays a first portion of an electronic document (e.g., the word-processing document in FIGS. 5O-5R) in a presentation mode of an electronic document authoring application (e.g., Pages). The first portion of the electronic document includes predefined activation regions for a plurality of presentation emphasis objects. While displaying the first portion of the electronic document, the device detects a first input by a user on a respective predefined activation region (e.g., 5105 in FIGS. 5O-5R) for a first presentation emphasis object (e.g., 5106-b in FIG. 5P, 5106-c in FIG. 5Q, or 5106-d in FIG. 5R) in the plurality of presentation emphasis objects. In some embodiments, the first input is a de-pinch gesture (e.g., a two-finger gesture where the two fingers move away from each other). For example, in FIG. 5O the device detects a first contact 5108 at an initial first contact location 5108-1 and a second contact 5110 at an initial first contact location 5110-1, and movement 5112 of the first contact 5108 to a current first contact location 5108-2 (e.g., in FIG. 5P, 5Q, or 5R) and movement 5114 of the second contact 5110 to a current second contact location 5110-2 (e.g., in FIG. 5P, 5Q, or 5R). In these embodiments, the respective predefined activation region includes an image (e.g., 5106 in FIGS. 5O-5R).

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object is (644) an enlarged representation of the image (e.g., 5106-b in FIG. 5P, 5106-c in FIG. 5Q, or 5106-d in FIG. 5R). In these embodiments, the first emphasis animation comprises enlarging the image to the enlarged representation of the image. In some of these embodiments, enlarging the image includes making the image full-screen (e.g., image 5106-b in FIG. 5P). In some of these embodiments, the emphasis animation includes displaying the image expanding in accordance with the de-pinching gesture (e.g., image 5106-c in FIG. 5P), and any text is rearranged to accommodate the enlarged image. In some of these embodiments, the image is in a fixed size frame, so that only a portion of the expanded image is shown in the frame after the de-pinching gesture (e.g., image 5106-d in FIG. 5R).

It should be understood that, in some embodiments (e.g., for the presentation document shown in FIGS. 5C-5H associated with a presentation application such as Keynote) at least a subset of the displayed objects (e.g., bulleted list items 5004, 5006, 5008, 5010-b displayed in FIG. 5B) that were displayed and/or edited in the edit mode of the electronic document authoring application are typically not initially displayed when the first portion of the electronic document is initially displayed in the presentation mode of the electronic document authoring application (e.g., the bulleted list items 5004, 5006, 5008, 5010-b are not displayed in FIG. 5C). In these embodiments, at least a subset of the displayed objects that were displayed in the edit mode are displayed in the presentation mode in response to user inputs (e.g., in FIG. 5E, all of the bulleted list items 5004, 5006, 5008, 5010-b from FIG. 5B have been displayed in response to user inputs). In contrast, in some other embodiments (e.g., for the word-processing document shown in FIGS. 5J-5R of a word-processing application such as Pages) a majority or all of the displayed objects that were displayed or were displayed within a first portion of the document (e.g., a page, a spreadsheet, etc.) and/or edited in the edit mode of the electronic document authoring application (e.g., text 5088-b and the image 5106-a in FIG. 5K) are typically initially displayed when the first portion of the electronic document is initially displayed in the presentation mode of the electronic document authoring application (e.g., as illustrated in FIG. 5L). In these embodiments, emphasis animations primarily include displaying presentation emphasis objects and emphasis animations which emphasize the displayed objects in response to user inputs.

In some embodiments, as described in greater detail above, prior to displaying the first portion of the electronic document in a presentation mode of the electronic document authoring application: the device displays the electronic document in an edit mode of the electronic document authoring application, detects one or more user inputs; and edits the electronic document in accordance with the one or more user inputs. For example, in FIG. 5S, the device has edited a slide of a presentation application to create a bulleted list including a plurality of bulleted items (e.g., 5116, 5118, and 5120 in FIGS. 5S-5U), each of which is associated with a respective image (e.g., "Step 1" 5116 is associated with a first image 5122-*a*, "Step 2" 5118 is associated with a second image 5124, and "Step 3" 5120 is associated with a third image 5126-*a* in FIG. 5S). Additionally, in this example, one or more command regions 5012 are displayed, which include icons for performing commands within the presentation application. In this example, a navigation region 5014 is also displayed, the navigation region 5014 includes representations of other slides in the presentation.

In these embodiments, the device detects a user input that corresponds to a request to display the electronic document in the presentation mode of the electronic document authoring application. As one example, the device detects a tap gesture (e.g., contact 5128 in FIG. 5S) with a "play" icon (e.g., 5018 in FIG. 5S) in a command region (e.g., 5012 in FIG. 5S) of the electronic document authoring application. In response to detecting the user input, the device displays the electronic document (e.g., the presentation document in FIGS. 5T-5U) in the presentation mode of an electronic document authoring application (e.g., Keynote).

The first portion of the electronic document includes predefined activation regions for a plurality of presentation emphasis objects. While displaying the first portion of the electronic document, the device detects a first input (e.g., tap and hold gesture 5130 in FIGS. 5U-5T) by a user on a respective predefined activation region (e.g., 5132 in FIGS. 5T-5U) for a first presentation emphasis object (e.g., 5126-*b* in FIG. 5U) in the plurality of presentation emphasis objects. In some embodiments, the first input is a select and hold gesture. In these embodiments, the respective predefined activation region includes a bullet point (e.g., 5133 in FIGS. 5T-5U). For example in FIGS. 5U-5T the first input is a tap and hold gesture 5130 on an activation region 5132 including the bullet point 5133 for the "Step 3" bulleted list item 5120. Initially, when the first portion is displayed in presentation mode, an image (e.g., 5122-*b* in FIG. 5T) that is associated with a respective one of the bulleted list items (e.g., "Step 1" 5116 in FIG. 5T) is displayed. In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object is (645) a replacement image for an image displayed in the first portion of the document such as an image (e.g., 5126-*b* in FIG. 5U) that is associated with a different bulleted list item (e.g., 5120 in FIGS. 5T-5U) associated with the activation region (e.g., 5132 in FIG. 5U). In these embodiments, the first emphasis animation comprises replacing the image (e.g., the image 5122-*b* associated with the "Step 1" bulleted list item 5116) with the replacement image (e.g., the image 5126-*b* associated with the "Step 3" bulleted list item 5120).

In some embodiments, as described in greater detail above, prior to displaying the first portion of the electronic document in a presentation mode of the electronic document authoring application: the device displays the electronic document in an edit mode of the electronic document authoring application, detects one or more user inputs; and edits the electronic document in accordance with the one or more user inputs. For example, in FIG. 5V, the device has edited a worksheet of a spreadsheet application (e.g., Numbers) to create a table (e.g., 5134-*a* in FIG. 5V) including a plurality of cells, at least a subset of which have an associated numerical value (e.g., the cell corresponding to the amount sold for Company A in Q1 has an associated value of 200, which is displayed in the cell).

In some embodiments, cells which are empty have a numerical value that is equal to zero. In some embodiments the spreadsheet application includes a command region (e.g., 5138 in FIGS. 5V-5W) including commands for editing and otherwise modifying the document. In some embodiments the spreadsheet application also includes a properties region (e.g., 5140 in FIGS. 5V-5W) for changing the properties of text in cells of a table (e.g., 5134 in FIGS. 5V-5W) or other elements in the spreadsheet document. For example, in FIG. 5V the user performs a command to add additional numerical values to the table (e.g., modifying the initially displayed table 5134-*a* in FIG. 5V by adding numerical values to the previously empty cells to create the current table 5134-*b* in FIG. 5W) thereby also modifying a pie chart (e.g., modifying the initial pie chart 5136-*a* in FIG. 5V) by adding additional wedges (e.g., by adding wedge D and wedge E in to create the current pie chart 5136-*b* in FIG. 5W). In this example, a navigation region 5142 is also displayed, the navigation region 5142 includes representations of other worksheets in the spreadsheet document.

In these embodiments, the device detects a user input that corresponds to a request to display the electronic document in the presentation mode of the electronic document authoring application. As one example, the device detects a tap gesture (e.g., contact 5144 in FIG. 5W) with a "play" icon (e.g., 5146 in FIG. 5W) in a command region (e.g., 5138 in FIG. 5W) of the electronic document authoring application. In response to detecting the user input, the device displays the electronic document (e.g., the spreadsheet document in FIGS. 5X-5Y) in the presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., activation region 5148 within pie wedge D 5150-*a* in FIG. 5X) for a first presentation emphasis object (e.g., expanded pie wedge 5150-*b* in FIG. 5Y) in the plurality of presentation emphasis objects. In some embodiments, the first input is a select and hold gesture (e.g., a tap and hold gesture 5152 in FIG. 5X). In these embodiments, the respective predefined activation region includes a portion of a chart. In some of these embodiments, the chart is a pie chart (e.g., 5136-*b* in FIG. 5X), and the portion of the chart is one or more wedges of the pie chart (e.g., pie wedge D 5150-*a* in FIG. 5X). In response to detecting the first input (e.g., a tap and hold gesture 5152 in FIG. 5X) on the respective predefined activation region (e.g., 5152 in FIG. 5X) for the first presentation emphasis object: the device selects a first emphasis animation for the first presentation emphasis object based on the first input, the device displays the first emphasis animation, and displays the first presentation emphasis object. In these embodiments, the first presentation emphasis object is (646) an enlarged representation of the portion of the chart (e.g., enlarged pie wedge D 5150-*b* in FIG. 5Y). In these embodiments, the first emphasis animation comprises enlarging the portion of the chart to the enlarged representation of the portion of the chart. In some embodiments, the emphasis animation also includes changing the hue, saturation, brightness, contrast or sharpness of the enlarged portion of the chart in comparison with the rest of the chart so as to further emphasize the enlarged portion of the chart (e.g., in FIG. 5Y, the emphasis of the rest of the pie chart 5136-*b* has been adjusted relative to the emphasis of the enlarged pie wedge 5150-*b*).

In some embodiments, the device displays a first portion of an electronic document (e.g., the spreadsheet document in FIGS. 5Z-5AA) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5154 in FIG. 5Z) for a first presentation emphasis object (e.g., the table cell 5158 with number "18.4" in FIG. 5AA) in the plurality of presentation emphasis objects. In some embodiments, the first input is a select gesture (e.g., tap gesture 5156 with a cell associated with the presentation emphasis object in FIG. 5Z). In these embodiments, the respective predefined activation region includes a cell in a table. In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object (e.g., 5158 in FIG. 5AA) is (647) a representation of the cell that shows a numerical value (e.g., 18.4 in FIG. 5AA) associated with the cell in the table (e.g., 5134-*b* in FIG. 5AA). In some of these embodiments, the value is a value in a cell in a spreadsheet, table, comma delimited list or other data structure that is associated with the electronic document. In these embodiments, the first emphasis animation comprises transitioning from displaying an empty cell to displaying the representation of the cell that shows the numerical value associated with the cell, as illustrated in FIGS. 5Z and 5AA.

In some embodiments, the device displays a first portion of an electronic document (e.g., the spreadsheet document in FIGS. 5AA-5BB) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5160 in FIG. 5AA) for a first presentation emphasis object (e.g., the values 5166 in FIG. 5BB in the cells associated with the activation region 5160 in FIG. 5AA) in the plurality of presentation emphasis objects. In some embodiments, the first input is a flick gesture (e.g., a fast finger swipe gesture). In some embodiments, the first input is a tap and drag gesture (e.g., a contact 5162 with the display 112 and subsequent movement 5164 of the contact 5162 of the contact across the display, as illustrated in FIG. 5AA). In these embodiments, the respective predefined activation region includes a plurality of cells in a table. In some of these embodiments the plurality of cells is a plurality of contiguous cells of a spreadsheet or table (e.g., the cells in the row 5165 of table 5134-*b* for "Company D" in FIGS. 5AA-5BB).

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object is (648) a representation of the plurality of cells in the table where each respective cell in the plurality of cells shows a numerical value associated with the respective cell. For example, the device displays all of the values ("153," "103," "72," and "85") for a row (e.g., the row 5165 of table 5134-*b* for "Company D" in FIG. 5BB) or a column of a spreadsheet or table in the electronic document. In these embodiments, the first emphasis animation comprises transitioning from displaying the plurality of cells including at least one empty cell to displaying the plurality of cells where each respective cell in the plurality of cells shows a numerical value associated with the respective cell. In some of these embodiments, the swipe gesture includes movement of the contact through at least a portion of each of the plurality of cells (e.g., a swipe gesture along a row/column of empty or partially empty cells in the table reveals the numerical value of each cell in the row/column, as illustrated in FIG. 5AA).

In some embodiments, the device displays a first portion of an electronic document (e.g., the spreadsheet document in FIGS. 5BB-5CC) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5168 in FIG. 5BB) for a first presentation emphasis object (e.g., the values 5170 in FIG. 5CC in the cells associated with the activation region 5168 in FIG. 5BB) in the plurality of presentation emphasis objects. In some embodiments, the first input is a select gesture (e.g., tap gesture 5172 in FIG. 5BB). In these embodiments, the respective predefined activation region includes a header associated with a subset of cells in a table (e.g., column header 5174 in FIG. 5BB or a row header in the table).

In response to detecting the first input (e.g., tap gesture 5172 in FIG. 5BB) on the respective predefined activation region (e.g., 5168 in FIG. 5BB) for the first presentation emphasis object: the device selects a first emphasis animation for the first presentation emphasis object based on the first input, the device displays the first emphasis animation, and displays the first presentation emphasis object. In these embodiments, the first presentation emphasis object is (649) a representation of the subset of cells in the table (e.g., column 5176 in FIG. 5BB). Each respective cell in the subset of cells includes a numerical value associated with the respective cell. For example, the device displays all of the values (e.g., "300," "80.7," "91.3," "85," and "21.2") in a row or a column (e.g., the column for "Q4" 5176 in FIG. 5CC) of a spreadsheet or table associated with the electronic document. In these embodiments, the first emphasis animation comprises transitioning from displaying the subset of cells including at least one empty cell to displaying the subset of cells where each respective cell in the subset of cells includes a numerical value associated with the respective cell (e.g., a row of empty or partially empty cells in the table is filled in based on the first input). In other words, in some of these embodiments, if some of the cells already have displayed numerical values, the device continues to display those numerical values and displays new numerical values in other ones of the cells that were previously empty.

In some embodiments, the device displays a first portion of an electronic document (e.g., the spreadsheet document in FIGS. 5DD-5FF) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5180 or 5182 in FIG. 5DD) for a first presentation emphasis object (e.g., 5184 in FIG. 5EE or 5186 in FIG. 5FF) in the plurality of presentation emphasis objects. In some embodiments, the first input comprises a first select gesture (e.g., a tap gesture or a tap and hold gesture) and a second select gesture. As one example, in FIGS. 5DD-5FF, the first select gesture is a first tap and hold gesture 5188 and the second select gesture is a second tap and hold gesture 5190. As another example, in FIG. 5DD, the first select gesture is a tap and release gesture 5188 and the second select gesture is a tap and release gesture 5190 (e.g., for the example in FIGS. 5EE and 5FF, contacts 5188 and 5190 are no longer detected by the device). In these embodiments, the respective predefined activation region (e.g., 5180 in FIG. 5DD) includes a first cell in a table (e.g., 5134-*b* in FIGS. 5DD-5FF). In some of these embodiments, the respective predefined activation region (e.g., 5190 in FIG. 5DD) includes a second cell in the table (e.g., 5134-*b* in FIGS. 5DD-5FF). The first cell is associated with a first numerical value (e.g., 200) and the second cell is associated with a second numerical value (e.g., 300). In some of these embodiments, the first cell and the second cell are selected simultaneously by concurrent select and hold gestures by two different fingers. In some embodiments, the first cell and the second cell are selected by two sequential finger tap gestures.

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object (e.g., pop-up 5184 in FIG. 5EE or pop-up 5186 in FIG. 5FF) is (650) a calculated numerical value that is calculated based at least in part on the first numerical value and the second numerical value. In some of these embodiments, the calculated numerical value is a maximum, a minimum, an average, a percent change, or some other calculated value. For example, in FIG. 5EE, the presentation emphasis object includes the percentage change (e.g., 50%) for Company A from Q1 to Q2. In these embodiments, the first emphasis animation comprises displaying the calculated numerical value (e.g., 50%). In some of these embodiments, the calculated numerical value is displayed in a user interface element that is at least partly transparent and is displayed over the first portion of the electronic document (e.g., a heads up display is shown including the calculated number). In some of these embodiments, the calculated numerical value is displayed proximate to the first input (e.g., tap and hold gesture 5188 in FIG. 5EE).

In some of these embodiments, the calculated numerical value is calculated (651) based at least in part on an order in which the first select gesture and the second select gesture were detected. In other words, in some embodiments, the calculation is based on the order of the inputs. For example, where the percentage growth between two numbers is calculated, if the first select gesture includes a tap gesture 5188 on table cell which contains the number "200" followed by a second select gesture that includes a tap gesture 5190 on a table cell which contains the number "300," then the calculation is "(300−200)/200=+50%," as illustrated in FIG. 5EE. However, in this example, if the first select gesture includes a tap gesture 5190 on a table cell which contains the number "300" followed by a second select gesture that includes a tap gesture 5188 on a table cell which contains the number "200," then the calculation is "(200−300)/300=−33%," as illustrated in FIG. 5FF. In some of these embodiments, the number that is calculated is one of percentage increase, percentage decrease, multiplier, ratio, etc.

In some embodiments, the device displays a first portion of an electronic document (e.g., the spreadsheet document in FIGS. 5GG-5HH) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5192 in FIG. 5GG) for a first presentation emphasis object (e.g., 5194 in FIG. 5HH) in the plurality of presentation emphasis objects. In some embodiments, the first input is a tap and drag gesture (e.g., a finger tap and drag gesture including a contact 5196 at a first contact location 5196-1 on the display and subsequent movement 5198 in FIG. 5GG of the contact to a second contact location 5196-2 on the display in FIG. 5HH). In these embodiments, the respective predefined activation region includes a plurality of cells (e.g., the cells of the row 5200 for "Company E" in FIG. 5GG) containing respective numerical values (e.g., "23.4," "15.9," "19.5," and "21.2") in a table (e.g., 5134-*b* in FIGS. 5GG-5HH). In some of these embodiments, these values are a plurality of values in contiguous cells of a spreadsheet or table.

In response to detecting the first input (e.g., a finger tap and drag gesture including a contact 5196 at a first contact location 5196-1 on the display 112 and subsequent movement 5198 of the contact to a second contact location 5196-2 on the display 112) on the respective predefined activation region (e.g., 5192 in FIG. 5GG) for the first presentation emphasis object: the device selects a first emphasis animation for the first presentation emphasis object based on the first input, the device displays the first emphasis animation, and displays the first presentation emphasis object (e.g., pop-up 5194 in FIG. 5HH). In these embodiments, the first presentation emphasis object is (652) a calculated numerical value (e.g., 20) that is calculated based at least in part on the respective numerical values in the plurality of cells (e.g., an average of the values of the cells associated with the tap and drag gesture in FIG. 5GG). In some of these embodiments, the calculated numerical value is a maximum, a minimum, an average, a percent change, or some other calculated value. In some of these embodiments, the tap and drag gesture is across two cells (e.g., a contact with the touch screen display and a movement of the contact across the touch screen display, where the path of movement passes through a first cell and a second cell). In some of these embodiments, the tap and drag gesture is across more than two cells (e.g., a whole column or row of cells, as illustrated in FIG. 5GG). In these embodiments, the first emphasis animation comprises displaying the calculated numerical value (e.g., 5194 in FIG. 5HH).

In some embodiments, the device displays a first portion of an electronic document (e.g., the spreadsheet document in FIGS. 5II-5JJ) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5202 or 5204 in FIG. 5II) for a first presentation emphasis object (e.g., 5206 in FIG. 5JJ) in the plurality of presentation emphasis objects. In some embodiments, the first input is a select gesture (e.g., a tap gesture or a tap and hold gesture). In these embodiments, the respective predefined activation region includes a first displayed object (e.g., a cell 5207 in table 5134-*b* in FIG. 5II). As one example, in FIGS. 5II-5JJ, the first input is a first tap and hold gesture 5208 and a second select gesture is detected, where the second select gesture includes a second tap and hold gesture 5210. As another example, in FIG. 5II, the first select gesture is a tap and release gesture 5208 and a second select gesture is detected, where the second select gesture includes a tap and release gesture 5210 (e.g., for this example, in FIGS. 5JJ, contacts 5208 and 5210 are no longer detected by the device).

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object (e.g., 5206 in FIG. 5JJ) is (654) an arrow that points to the first displayed object (e.g., a cell 5207 in table 5134-*b* in FIG. 5II). In these embodiments, the first emphasis animation comprises displaying the arrow. In some of these embodiments, the emphasis animation includes an arrow "growing" to point at the first displayed object.

In some embodiments, as described in greater detail above, prior to displaying the first portion of the electronic document in a presentation mode of the electronic document authoring application: the device displays the electronic document in an edit mode of the electronic document authoring application, detects one or more user inputs; and edits the electronic document in accordance with the one or more user inputs. For example, in FIG. 5KK, the device has edited a worksheet of a spreadsheet application (e.g., Numbers) to create a table (e.g., 5212 in FIGS. 5KK-5LL) including a plurality of cells, at least a subset of the cells having associated numerical values (e.g., the cell corresponding to the Revenue for Company A in 2005 has an associated value of 50, which is displayed in the cell in FIGS. 5KK-5LL). In some embodiments, cells which are empty have a numerical value that is equal to zero. In some embodiments the spreadsheet application includes a command region (e.g., 5138 in FIGS. 5KK-5LL) including commands for editing and otherwise modifying the document. In some embodiments the spreadsheet application also includes a properties region (e.g., 5140 in FIGS. 5KK-5LL) for changing the properties of text in cells of a table (e.g., 5212 in FIGS. 5KK-5LL) or other elements in the spreadsheet document. For example, in FIG. 5LL the user performs a command to add additional numerical values to the table (e.g., modifying the initially displayed table 5212-*a* in FIG. 5KK by adding numerical values to the previously empty cells to create the current table 5212-*b* in FIG. 5LL) thereby also modifying other charts/graphs in the spreadsheet (e.g., adding a line to initial graph 5214-*a* and adding a bar to initial bar chart 5216-*a* in FIG. 5KK) by adding additional graphical representations of the added data sets (e.g., by adding graph line E to create current graph 5214-*b* and adding a bar for Company E to create current bar chart 5216-*b* in FIG. 5LL). In this example, a navigation region 5142 is also displayed, the navigation region 5142 includes representations of other worksheets in the spreadsheet document.

In these embodiments, the device detects a user input that corresponds to a request to display the electronic document in the presentation mode of the electronic document authoring application. As one example, the device detects a tap gesture (e.g., contact 5218 in FIG. 5LL) with a "play" icon (e.g., 5146 in FIG. 5LL) in a command region (e.g., 5138 in FIG. 5LL) of the electronic document authoring application. In response to detecting the user input, the device displays the electronic document (e.g., the spreadsheet document in FIGS. 5MM-5YY) in the presentation mode of an electronic document authoring application (e.g., Numbers). The first portion of the electronic document includes predefined activation regions (e.g., 5220, 5222, 5224, 5226, 5228, 5230, 5232, 5234, 5236, and 5238 in FIG. 5MM) for a plurality of presentation emphasis objects (e.g., activation regions 5220, 5222, 5224, 5226, 5228 are for respective ones of the graph lines of the graph 5214-*b* and activation regions 5230, 5232, 5234, 5236, and 5238 are for respective ones of the bars of the bar chart 5216-*b* in FIG. 5MM). While displaying the first portion of the electronic document, the device detects a first input by a user on a respective predefined activation region (e.g., 5220 or 5236 in FIGS. 5MM-5OO) for a first presentation emphasis object (e.g., activation region 5220 is for graph line 5240 in FIGS. 5NN and 5PP; and activation region 5236 is for bar 5242 in FIGS. 5OO-5PP) in the plurality of presentation emphasis objects.

In some embodiments, the first input is a flick gesture (e.g., fast finger swipe gesture including movement 5243 of a contact 5244 from an initial contact location 5244-1 in FIG. 5MM through a plurality of intermediate contact positions 5244-2 in FIG. 5NN-1, 5244-3 in FIG. 5NN-2, 5244-4 in FIG. 5NN-3 to a final contact position 5244-5 in FIG. 5PP). In some embodiments, the first input is a tap and drag gesture (e.g., a tap and drag gesture including movement 5243 of a contact 5244 from an initial contact location 5244-1 in FIG. 5MM through a plurality of intermediate contact positions 5244-2 in FIG. 5NN-1, 5244-3 in FIG. 5NN-2, 5244-4 in FIG. 5NN-3 to a final contact position 5244-5 in FIG. 5PP). In some embodiments, the respective predefined activation region includes a placeholder area for a data series in a chart or graph. In some embodiments the placeholder area for a data series is an empty chart or graph (e.g., 5214-*b* or 5216-*b* in FIG. 5MM. In other words, the empty chart or graph is a chart or graph with axes but no data, or a portion of a chart or graph with no displayed data.

In response to detecting the first input on the respective predefined activation region for the first presentation emphasis object: the device selects a first emphasis animation for the first presentation emphasis object based on the first input (e.g., finger swipe gesture including movement 5243 of a contact 5244 from an initial contact location 5244-1 in FIG. 5MM through a plurality of intermediate contact positions 5244-2 in FIG. 5NN-1, 5244-3 in FIG. 5NN-2, 5244-4 in FIG. 5NN-3 to a final contact position 5244-5 in FIG. 5PP), the device displays the first emphasis animation, and displays the first presentation emphasis object. In these embodiments, the first presentation emphasis object is (655) a visual representation of the data series in the chart or graph (e.g., a bar 5242 in FIGS. 5OO and 5PP in a bar chart, a graph line 5240 in FIGS. 5NN and 5PP, etc.). In these embodiments, the first emphasis animation comprises gradually displaying the visual representation of the data series in accordance with the swipe gesture. (e.g., the visual representation of the data series grows as the contact moves along the touch screen display). In some of these embodiments, it appears that the visual representation of the data series is being "drawn" or revealed by the movement of the contact.

For example, in FIG. 5MM, the device detects a contact 5244-1 with an activation region 5220 and then detects a finger swipe gesture including movement 5243 of the contact 5244 from the initial contact location 5244-1 in FIG. 5MM through a plurality of intermediate contact positions 5244-2 in FIG. 5NN-1, 5244-3 in FIG. 5NN-2, 5244-4 in FIG. 5NN-3 to a final contact position 5244-5 in FIG. 5PP. In response to detecting the swipe gesture, the device gradually displays the graph line 5240 associated with the activation region 5220 (e.g., an initial portion of the graph line 5240-1 in FIG. 5NN-1 is displayed as the contact 5244 begins to move along the activation region 5220, additional portions of the graph line 5240-2 in FIG. 5NN-2 and 5240-3 in FIG. 5NN-3 are displayed as the contact 5244 moves further along the activation region, until the contact 5244 has reached the end of the graph line and the entire graph line 5240-4 is displayed in FIG. 5PP).

As another example, in FIG. 5MM, the device detects a contact 5246-1 with an activation region 5236 and then detects a finger swipe gesture including movement 5248 of the contact 5246 from the initial contact location 5246-1 in FIG. 5MM through a plurality of intermediate contact positions 5246-2 in FIG. 5OO-1, 5246-3 in FIG. 5OO-2, 5246-4 in FIG. 5OO-3 to a final contact position 5246-5 in FIG. 5PP. In response to detecting the swipe gesture, the device gradually displays the bar 5242 associated with the activation region 5236 (e.g., an initial portion of the bar 5242-1 in FIG. 5OO-1 is displayed as the contact 5246 begins to move along the activation region 5236, additional portions of the bar 5242-2 in FIGS. 5OO-2 and 5242-3 in FIG. 5OO-3 are displayed as the contact 5246 moves further along the activation region, until the contact 5246 has reached the end of the bar and the entire bar 5242-4 is displayed in FIG. 5PP).

In some embodiments, the device displays a first portion of an electronic document (e.g., the spreadsheet document in FIGS. 5QQ-5SS) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5250 in FIG. 5QQ) for a first presentation emphasis object (e.g., pop-up 5252 in FIG. 5RR) in the plurality of presentation emphasis objects. In some embodiments, the first input comprises a first select gesture (e.g., a tap gesture or a tap and hold gesture 5254 in FIGS. 5QQ-5SS) and a second select gesture (e.g., tap and hold gesture 5256 in FIGS. 5QQ-5SS. In these embodiments, the respective predefined activation region includes a first portion of a chart and a second portion of the chart. The first portion of the chart is associated with a first numerical value (e.g., the graph line for Company D is associated with the value 50 in 1985) and the second portion of the chart is associated with a second numerical value (e.g., the graph line for Company D is associated with the value 75 in 2005). In some embodiments, the first portion and the second portion are bars in a bar chart or a data points in a graph. In some of these embodiments, the first portion of the chart and the second portion of the chart are selected simultaneously by concurrent select and hold gestures (e.g., 5254 and 5256 in FIG. 5RR) by two different fingers. In some of these embodiments, the first portion of the chart and the second portion of the chart are selected by two sequential finger tap gestures.

In response to detecting the first input on the respective predefined activation region for the first presentation emphasis object: the device selects a first emphasis animation for the first presentation emphasis object based on the first input, the device displays the first emphasis animation, and displays the first presentation emphasis object. In these embodiments, the first presentation emphasis object (e.g., the pop-up "50%" 5252 in FIG. 5RR) is (656) a calculated numerical value that is calculated based at least in part on the first numerical value and the second numerical value. In some of these embodiments, the calculated numerical value is a maximum, a minimum, an average, a percent change (e.g., 50% increase), or some other calculated value. In these embodiments, the first emphasis animation comprises displaying the calculated numerical value. In some embodiments, the calculated numerical value is displayed in a user interface element that is at least partly transparent and is displayed over the first portion of the electronic document (e.g., a heads up display is shown including the calculated number). In some of these embodiments, the calculated numerical value (e.g., "50%" in FIG. 5RR) is displayed proximate to the first input.

In some of these embodiments, the calculated numerical value is calculated (657) based at least in part on an order in which the first select gesture and the second select gesture were detected. In other words, in some embodiments, the calculation is based on the order of the inputs (e.g., in embodiments where the percentage growth between two numbers is calculated, if the first select gesture includes a tap gesture 5254 in FIG. 5RR on a first portion of a chart which represents the number "50" followed by a second select gesture that includes a tap gesture 5256 in FIG. 5RR on a portion of the chart which represents the number "75," then the calculation is "(75−50)/50=+50%," and the presentation emphasis object 5252 includes this calculated value (e.g., +50%). In contrast, if the first select gesture includes a tap gesture 5256 in FIG. 5SS on a first portion of the chart which represents the number "75" followed by a second select gesture that includes a tap gesture 5254 in FIG. 5SS on a portion of the chart which represents the number "50," then the calculation is "(50−75)/75=−33%," and the presentation emphasis object 5258 includes this calculated value (e.g., −33%). In some of these embodiments, the number that is calculated is one of percentage increase, percentage decrease, multiplier, ratio, etc.

In some embodiments, the device displays a first portion of an electronic document (e.g., the spreadsheet in FIGS. 5SS-5TT) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5260 in FIG. 5SS) for a first presentation emphasis object (e.g., pop-up 5262 in FIG. 5TT) in the plurality of presentation emphasis objects. In some embodiments, the first input is a tap and drag gesture (e.g., a finger tap and drag gesture including a contact 5264 at a first contact location 5264-1 and subsequent movement 5266 in FIG. 5SS of the contact across the display 112 to a second contact location 5264-2 in FIG. 5TT). In these embodiments, the respective predefined activation region includes a plurality of portions of a chart (e.g., the movement 5266 is through a plurality of bars in a bar chart in FIG. 5SS) containing respective numerical values (e.g., a plurality of values in contiguous bars of a bar chart).

In response to detecting the first input (e.g., a finger tap and drag gesture including a contact 5264 at a first contact location 5264-1 and subsequent movement 5266 in FIG. 5SS of the contact across the display 112 to a second contact location 5264-2 in FIG. 5TT) on the respective predefined activation region (e.g., 5260 in FIG. 5SS) for the first presentation emphasis object: the device selects a first emphasis animation for the first presentation emphasis object based on the first input, the device displays the first emphasis animation, and displays the first presentation emphasis object (e.g., pop-up 5262 in FIG. 5TT). In these embodiments, the first presentation emphasis object is (658) a calculated numerical value (e.g., 58) that is calculated based at least in part on the respective numerical values in the plurality of portions of the chart. In some of these embodiments, the calculated numerical value is a maximum, a minimum, an average, a percent change, or some other calculated value. In some of these embodiments, the tap and drag gesture is across two bars (e.g., a contact with the touch screen display and a movement of the contact across the touch screen display, where the path of movement passes through a first bar and a second bar). In some of these embodiments, the tap and drag gesture is across more than two bars. In these embodiments, the first emphasis animation comprises displaying the calculated numerical value. For example, in the present example, the calculated value is an average value of the bars in the bar chart that the contact passes through (e.g. 58) during the tap and drag gesture.

In some embodiments, the device displays a first portion of an electronic document (e.g., the spreadsheet document in FIGS. 5TT-5UU) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5268 in FIG. 5TT) for a first presentation emphasis object (e.g., the chart 5214-*b* in FIG. 5UU) in the plurality of presentation emphasis objects. In some embodiments, the first input is a de-pinch gesture (e.g., a two-finger gesture where the two fingers move away from each other). For example, in FIG. 5TT the device detects a first contact 5272 and a second contact 5274, and detects movement 5276 of the first contact 5272 from an initial position of the first contact 5272-1 in FIG. 5TT to a current position of the first contact 5272-2 in FIG. 5UU, and detects movement 5278 of the second contact 5274 from an initial position of the second contact 5274-1 in FIG. 5TT to a current position of the second contact 5274-2 in FIG. 5UU, where the movement 5276 of the first contact 5272 is in a direction opposite of the movement 5278 of the second contact 5274, and the two contacts move away from each other. In these embodiments, the respective predefined activation region includes a first representation of a chart (e.g., 5214-*b* in FIGS. 5TT-5UU) that includes a visual representation of a data series (e.g., graph line 5240 in FIGS. 5TT-5UU). The first representation of the chart includes a first axis (e.g., 5280 in FIG. 5TT) with a first range of values (e.g., 1980-2015).

In response to detecting the first input (e.g., the de-pinch gesture) on the respective predefined activation region (e.g., activation region 5268 in FIG. 5TT) for the first presentation emphasis object: the device selects a first emphasis animation for the first presentation emphasis object based on the first input, the device displays the first emphasis animation, and displays the first presentation emphasis object (e.g., the chart 5214-*b* in FIG. 5UU). In these embodiments, the first presentation emphasis object is (659) a second representation of the chart (e.g., 5214-*b* in FIG. 5UU). The second representation of the chart includes a second axis (e.g., 5282 in FIG. 5UU) that is parallel to the first axis (e.g., 5280 in FIG. 5TT). The second axis (e.g., 5282 in FIG. 5UU) includes a second range of values that is smaller than the first range of values. For example if the first range of values is 1980 to 2015, then the second range of values is a subset of those values (e.g., 1990 to 2000). In these embodiments, the first emphasis animation comprises transitioning from displaying the first representation of the chart to displaying the second representation of the chart (e.g., a de-pinching gesture on a chart or an axis of the chart "stretches" the axis). For example, the device shows the visual representation of the data series expanding as the axis of the first representation of the chart stretches to become the corresponding axis of the second representation of the chart. In some of these embodiments, the other axes of the chart remain the same. In other words, the de-pinching gesture along one axis only stretches that axis of the chart.

In some embodiments, the device displays a first portion of an electronic document (e.g., the spreadsheet document in FIGS. 5VV-5WW) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5284 in FIG. 5VV) for a first presentation emphasis object (e.g., the chart 5214-*b* in FIG. 5VV) in the plurality of presentation emphasis objects. In some embodiments, the first input is a pinch gesture (e.g., a two-finger gesture where the two fingers move towards each other). For example, in FIG. 5VV the device detects a first contact 5286 and a second contact 5288, and detects movement 5290 of the first contact 5286 from an initial position of the first contact 5286-1 in FIG. 5VV to a current position of the first contact 5286-2 in FIG. 5WW, and detects movement 5292 of the second contact 5288 from an initial position of the second contact 5288-1 in FIG. 5VV to a current position of the second contact 5288-2 in FIG. 5WW, where the movement 5290 of the first contact 5286 is in a direction opposite of the movement 5292 of the second contact 5288, and the two contacts move towards each other. In these embodiments, the respective predefined activation region includes a first representation of a chart that includes a visual representation of a data series. The first representation of the chart (e.g., 5214-*b* in FIG. 5VV) includes a first axis (e.g., 5282 in FIG. 5VV) with a first range of values (e.g., 1990-2000).

In response to detecting the first input (e.g., the pinch gesture) on the respective predefined activation region (e.g., 5284 in FIG. 5VV) for the first presentation emphasis object: the device selects a first emphasis animation for the first presentation emphasis object based on the first input, the device displays the first emphasis animation, and displays the first presentation emphasis object (e.g., the chart 5214-*b* in FIG. 5WW). In these embodiments, the first presentation emphasis object is (660) a second representation of the chart (e.g., the chart 5214-*b* in FIG. 5WW). The second representation of the chart includes a second axis (e.g., 5294 in FIG. 5WW) that is parallel to the first axis (e.g., 5282 in FIG. 5VV), and the second axis (e.g., 5294 in FIG. 5WW) includes a second range of values that is larger than the first range of values. For example if the first range of values is 1990 to 2000, then the second range of values is a superset that includes those values and additional values (e.g., 1984 to 2004). The first emphasis animation comprises transitioning from displaying the first representation of the chart (e.g., 5214-*b* in FIG. 5VV) to displaying the second representation of the chart (e.g., 5214-*b* in FIG. 5WW). In other words, the pinching gesture on the chart or an axis (e.g., 5282 in FIG. 5VV) of the chart "compresses" the axis. For example, the device shows the visual representation of the data series (e.g., graph line 5240 in FIGS. 5VV-5WW) expanding as the axis of the first representation of the chart is compressed to become the corresponding axis of the second representation of the chart. In some of these embodiments, the other axes of the chart remain the same. In other words, the pinching gesture along one axis only compresses that axis of the chart.

In some embodiments, the device displays a first portion of an electronic document (e.g., the spreadsheet document in FIGS. 5XX-5YY) in a presentation mode of an electronic document authoring application (e.g., Numbers). The first portion of the electronic document includes predefined activation regions for a plurality of presentation emphasis objects. While displaying the first portion of the electronic document, the device detects a first input by a user on a respective predefined activation region (e.g., 5296 in FIG.

5XX) for a first presentation emphasis object (e.g., 5214-*b* in FIG. 5YY) in the plurality of presentation emphasis objects. In some embodiments, the first input is a swipe gesture (e.g., a finger swipe gesture). For example, when the gesture is a flick gesture the device detects a contact 5298 at a first contact location 5298-1 on the touch screen display 112 and subsequent movement 5300 in FIG. 5XX of the contact 5298 to a second contact location 5298-2 in FIG. 5YY. In some embodiments, the first input is a tap and drag gesture. For example, when the gesture is a swipe gesture the device detects a contact 5298 at a first contact location 5298-1 on the touch screen display 112 and subsequent movement 5300 in FIG. 5XX of the contact 5298 to a second contact location 5298-2 in FIG. 5YY. In some embodiments, the respective predefined activation region (e.g., 5296 in FIG. 5XX) includes a first representation of a chart (e.g., 5214-*b* in FIG. 5XX) that includes a visual representation of a data series (e.g., 5240 in FIG. 5XX). The first representation of the chart includes a first axis (e.g., 5302 in FIG. 5XX) with a first range of values (e.g., 1984-2004).

In response to detecting the first input (e.g., the tap and drag gesture) on the respective predefined activation region (e.g., 5296 in FIG. 5XX) for the first presentation emphasis object: the device selects a first emphasis animation for the first presentation emphasis object based on the first input, the device displays the first emphasis animation, and displays the first presentation emphasis object (e.g., 5214-*b* in FIG. 5YY). In these embodiments, the first presentation emphasis object is (661) a second representation of the chart (e.g., 5214-*b* in FIG. 5YY). The second representation of the chart (e.g., 5214-*b* in FIG. 5YY) includes a second axis (e.g., 5304 in FIG. 5YY) that is parallel to the first axis (e.g., 5302 in FIG. 5XX), and the second axis (e.g., 5304 in FIG. 5YY) includes a second range of values (e.g., 1992-2012) that is distinct from the first range of values (e.g., 1984-2004). For example if the first range of values is 1984 to 2004, then the second range of values is a different set of values with the same range size (e.g., 1992 to 2012). In these embodiments, the first emphasis animation comprises transitioning from displaying the first representation of the chart (e.g., 5214-*b* in FIG. 5XX) to displaying the second representation of the chart (e.g., 5214-*b* in FIG. 5YY). In some of these embodiments, the other axes of the chart remain the same. In other words, the swipe gesture along one axis only scrolls the chart data along the one axis. For example, the device shows the visual representation of the data series scrolling as the axis of the first representation of the chart is scrolled to become the corresponding axis of the second representation of the chart.

In some embodiments, in response to detecting the first input on the respective predefined activation region for the first presentation emphasis object, the device de-emphasizes (662) the first portion of the electronic document other than the first presentation emphasis object. For example, in FIG. 5ZZ, a slide of a presentation document is displayed in presentation mode. In this example, the first input is a de-pinch gesture on a bulleted list item 5010-*b*. For example, in FIG. 5ZZ the device detects a first contact 5306 and a second contact 5308, and detects movement 5310 of the first contact 5306 from an initial position of the first contact 5306-1 in FIG. 5ZZ to a current position of the first contact 5306-2 in FIG. 5AAA, and detects movement 5312 of the second contact 5308 from an initial position of the second contact 5308-1 in FIG. 5ZZ to a current position of the second contact 5308-2 in FIG. 5AAA, where the movement 5310 of the first contact 5306 is in a direction opposite of the movement 5312 of the second contact 5308, and the two contacts move away from each other. In response to this de-pinching input on the bulleted list item 5010-*b* in FIG. 5ZZ, the device fades the user interface user interface elements in the first portion of the electronic document other than the first presentation emphasis object (e.g., bulleted list item 5010-*b* in FIG. 5ZZ) by reducing the brightness, contrast, saturation, and/or sharpness of these elements (e.g., text, images, and other graphics) relative to the brightness, contrast, saturation, and/or sharpness of the first presentation emphasis object, as illustrated in FIG. 5AAA, where the shaded user interface elements have been de-emphasized, while the first presentation emphasis object (e.g., bulleted list item 5010-*b* in FIG. 5AAA is not de-emphasized).

In some embodiments, the first emphasis animation is automatically selected from a predefined set of emphasis animations in accordance with at least one of: an object type associated with the respective predefined activation region and a gesture type associated with the first input. In some embodiments, the emphasis animation is automatically selected/generated (e.g., without the user selecting predefined animations to create a sequence of slide builds in a presentation application) in accordance with both an object type associated with the predefined activation region and a gesture type associated with the first input, as discussed previously with reference to operation 634 above. In other words, gestures with the same gesture type will result in a different emphasis animations depending on what object type is associated with the respective predefined activation region. For example, when the gesture type is "de-pinch gesture:" if the object type is an image, then the emphasis animation includes expanding the image, as illustrated in FIGS. 5O-5R; in contrast, if the object type is a chart, then for a "de-pinch gesture," the emphasis animation includes expanding the range of an axis of the chart, as illustrated in FIGS. 5TT-5UU. Similarly, gestures with different gesture types will result in different emphasis animations even if the object type associated with the respective predefined activation region for each of the gestures is the same. For example, when the gesture type of the first gesture is "a circling gesture" around a bulleted list item, the emphasis animation includes displaying an expanded representation of the bulleted list item, as illustrated in FIGS. 5G-5I; in contrast, if the gesture type of the first gesture is "a press and hold gesture" on the bulleted list item, the emphasis animation includes displaying an annotation for the bulleted list item, as illustrated in FIGS. 5E-5F.

In some embodiments, the respective predefined activation region is for (663) a subset of presentation emphasis objects including the first presentation emphasis object. In some embodiments, the device detects (664) a second input by the user on the respective predefined activation region. In some embodiments, operations 667-669 are performed in response to (665) the second input on the respective predefined activation region. In some embodiments, the device selects (667), based on the second input, a second presentation emphasis object of the subset of presentation emphasis objects and a second emphasis animation for the second presentation emphasis object. In some embodiments, the device displays (668) the second emphasis animation. In some embodiments, the device displays (669) the second presentation emphasis object. In some embodiments, the first presentation emphasis object and the second presentation emphasis object are distinct presentation emphasis objects. In other words, for two inputs on the same predefined activation region, different presentation emphasis objects and different emphasis animations are displayed.

For example, in some embodiments, the first input is a circling gesture on an activation region (e.g., 5026 in FIG. 5F) associated with a bulleted list item (e.g., 5008 in FIG. 5F), and an expanded representation of the bulleted list item is displayed on the display with an emphasis animation that is analogous to the emphasis animation described in greater detail above with reference to FIGS. 5G-5I, and the second input is a press and hold gesture on the same activation region (e.g., 5026 in FIG. 5F) and the emphasis animation includes displaying an annotation for the bulleted list item, as described in greater detail above with reference to FIGS. 5E-5F. Thus, two distinct successive emphasis animations with distinct presentation emphasis objects are performed based on different first and second inputs with a single activation region (e.g., 5026 in FIG. 5F).

In some embodiments, after displaying the first emphasis animation (e.g., displaying an annotation 5070 about a bulleted list item 5008 in FIG. 5F) the device detects (670) a second input by the user (e.g., tap gesture 5071 in FIG. 5F). In some embodiments, in response to second input the device ceases (671) to display the first presentation emphasis object (e.g., in response to a tap gesture, the currently displayed presentation emphasis object 5070 in FIG. 5F is dismissed, as illustrated in FIG. 5G). In some embodiments, an animation is displayed that includes a transition from displaying the first presentation emphasis object to displaying the first portion of the electronic document without the first presentation emphasis object. In some embodiments, after ceasing to display the first presentation emphasis object, the device detects (672) a third user input (e.g., circling gesture including contact 5072 and subsequent movement 5074 of the contact) on a respective predefined activation region (e.g., 5024 for a bulleted list item 5006 in FIG. 5G) for a second presentation emphasis object in (e.g., an enlarged representation 5076 in FIG. 5H of the bulleted list item 5006 in FIG. 5G) the plurality of presentation emphasis object.

In some embodiments, operations 674-676 are performed in response (673) to the third user input (e.g., circling gesture including contact 5072 and subsequent movement 5074 of the contact) on the respective predefined activation region e.g., 5024 for a bulleted list item 5006 in FIG. 5G) for the second presentation emphasis object. In some embodiments, the device selects (674) a second emphasis animation for the second presentation emphasis object based on the third input (e.g., circling gesture including contact 5072 and subsequent movement 5074 of the contact). In some embodiments, the device displays (675) the second emphasis animation. In some embodiments, the device displays (676) the second presentation emphasis object in (e.g., an enlarged representation 5076 in FIG. 5H of the bulleted list item 5006 in FIG. 5G). In other words, the device detects a first input, dynamically selects and displays a first emphasis animation and first presentation emphasis object based on the first input; detects a second input to dismiss the presentation emphasis object; and detects a third input and dynamically selects and displays a second emphasis animation and second presentation emphasis object based on the third input. An advantage of dynamically selecting emphasis animations and presentation emphasis objects based on user inputs is that the user can more effectively tell a story by determining (while in presentation mode) when to display initially hidden objects and which currently displayed objects should be emphasized to most effectively tell the story.

In some embodiments, after displaying the first emphasis animation (e.g., displaying an animation that includes expanding a pie wedge 5150-*b* of a pie chart 5136-*b*, as illustrated in FIGS. 5X-5Y and described in greater detail above) the device detects (678) a second input (e.g., tap gesture 5156 in FIG. 5Z) by a user on a respective predefined activation region (e.g., 5154 in FIG. 5Z) for a second presentation emphasis object (e.g., the cell including numerical value "18.4" in FIG. 5AA) in the plurality of presentation emphasis objects. In some embodiments, operations 680-683 are performed in response (679) to detecting the second input (e.g., tap gesture 5156 in FIG. 5Z) on the respective predefined activation region (e.g., 5154 in FIG. 5Z) for the second presentation emphasis object. In some embodiments, the device ceases (680) to display the first presentation emphasis object (e.g., in FIG. 5Z, the expanded pie wedge 5150-*b* is not displayed, and instead the pie chart is displayed with all of the pie wedges at their original size). In some embodiments, the device selects (681) a second emphasis animation for the second presentation emphasis object based on the second input (e.g., tap gesture 5156 in FIG. 5Z). In some embodiments, the device displays (682) the second emphasis animation. In some embodiments, the device displays (683) the second presentation emphasis object (e.g., the cell including numerical value "18.4" in FIG. 5AA). In other words, in this example, in response to detecting a gesture on an activation region for a second presentation emphasis object while the first emphasis object is displayed, the device dismisses (i.e., stops displaying) first emphasis object, selects and plays a second emphasis animation, and displays a second presentation emphasis object.

In some embodiments, the electronic document has multiple portions (e.g., multiple slides in a slideshow, or multiple pages in a word-processing document, or multiple spreadsheets in a spreadsheet document), and while the first portion is displayed only predefined activation regions in the first portion can be manipulated. Similarly, while a second portion of the electronic document is displayed, only predefined activation regions in the second portion can be manipulated. In some embodiments, while the electronic document authoring application is in presentation mode, the device shifts from display of the first portion of the electronic document to a second portion of the electronic document in response to a predefined gesture (e.g., a multi-finger swipe gesture). In some embodiments, while the document authoring application is in presentation mode, the device shifts from display of the first portion of the electronic document to a second portion of the electronic document in response to selection of a predefined element on the display (e.g., selecting a "next-page" button or an edge of the screen), as described in greater detail below with reference to FIGS. 5BBB-5JJJ.

In some embodiments, the device detects (685) a swipe gesture (e.g., contact 5314 and subsequent movement 5316 of the contact in FIG. 5BBB) that originates from a location proximate to an edge (e.g., the left edge) of the touch screen display (e.g., 112 in FIG. 5BBB). In some embodiments, the device displays (686), in response the second input, a navigation panel (e.g., 5318 in FIG. 5CCC) that is adjacent to the edge (e.g., the left edge) of the touch screen display (e.g., 112 in FIG. 5CCC). The navigation panel (e.g., 5318 in FIG. 5CCC) includes a plurality of icons (e.g., 5320, 5322, 5324, 5326, 5328, and 5330 in FIG. 5CCC) that represent respective portions of the electronic document (e.g., the top icon 5320 represents the first slide of a slide show, the icon 5322 below the top icon represents the second slide of the slide show, etc.). In some embodiments, the icons that represent respective portions of the electronic document are displayed in a scrollable list in the navigation panel (e.g., in response to a swipe gesture including contact 5332 on the navigation panel and subsequent movement 5334 of the contact in a first direction, the icons are scrolled, to display icons 5336, 5338 and 5340 that were not previously displayed, as illustrated in FIG. 5DDD).

In some embodiments, the device detects (687) a gesture (e.g., tap gesture 5342 in FIG. 5DDD) on an icon (e.g., icon 5338 in FIG. 5DD) in the plurality of icons that represents a second portion (e.g., an eighth slide in the slide show) of the electronic document. In some embodiments, in response to detecting the gesture (e.g., tap gesture 5342 in FIG. 5DDD) on the icon in the plurality of icons that represents the second portion of the electronic document, the device displays (688) the second portion of the electronic document (e.g., the eighth slide of the slide show in FIG. 5EEE). In other words, in response to a swipe gesture that starts at the left edge of a touch screen display, the device display a navigation pane on the left side of the touch screen display, where the navigation pane includes thumbnails of the slides in a slide show; and, in response to detecting a tap on a thumbnail of a slide, the device displays the slide associated with the selected thumbnail. In some embodiments, in response to detecting the gesture on the icon in the plurality of icons that represents the second portion (e.g., the selected slide) of the electronic document (e.g., the slide show), the display of the navigation panel is ceased.

In some embodiments, while displaying (620) the first portion (e.g., the portion of the electronic document displayed in FIG. 5EEE) of the electronic document (e.g., a presentation document), the device detects (690) a five-finger pinch gesture. For example, a first finger contact 5344 starts at a first location (e.g., 5344-1 in FIG. 5EEE) on the touch screen display and moves towards a region on the display (e.g., movement 5354 to contact location 5344-2 in FIG. 5FFF). Concurrently, a second finger contact 5346 starts at a first location (e.g., 5346-1 in FIG. 5EEE) on the touch screen display and moves towards the same region on the display (e.g., movement 5356 to contact location 5346-2 in FIG. 5FFF). Concurrently, a third finger contact 5348 starts at a first location (e.g., 5348-1 in FIG. 5EEE) on the touch screen display and moves towards the same region on the display (e.g., movement 5358 to contact location 5348-2 in FIG. 5FFF). Concurrently, a fourth finger contact 5350 starts at a first location (e.g., 5350-1 in FIG. 5EEE) on the touch screen display and moves towards the same region on the display (e.g., movement 5360 to contact location 5350-2 in FIG. 5FFF). Concurrently, a fifth finger contact 5352 starts at a first location (e.g., 5352-1 in FIG. 5EEE) on the touch screen display and moves towards the same region on the display (e.g., movement 5362 to contact location 5352-2 in FIG. 5FFF). While in the present example, all five fingers have been illustrated as moving, it should be understood that in some embodiments, one or more of the fingers does not move, and rather the other fingers move towards the stationary finger(s).

In some embodiments, in response to detecting the five-finger pinch gesture, the device displays (691) a plurality of icons (e.g., 5364, 5366, 5368, 5370, 5372 and 5374 in FIG. 5GGG) that represent respective portions of the electronic document (e.g., 5364 represents a first slide, 5366 represents a second slide, 5368 represents a third slide, 5370 represents a fourth slide, 5372 represents a fifth slide and 5374 represents a sixth slide in FIG. 5GGG). In some embodiments, the device detects (692) a gesture on an icon in the plurality of icons that represents a second portion of the electronic document (e.g., a tap gesture 5376 on a icon 5368 that represents a third slide in the presentation document in FIG. 5GGG). In response to detecting the gesture on the icon in the plurality of icons that represents the second portion of the electronic document, the device displays (693) the second portion of the electronic document (e.g., in FIG. 5HHH the third slide of the slide show is displayed). In other words, in these embodiments, the device displays a navigation pane that includes thumbnails of the slides in an array, detecting a tap on a thumbnail of a slide and, in response, displaying the slide associated with the selected thumbnail. In some embodiments, in response to detecting the gesture (e.g., tap gesture 5376 in FIG. 5GGG) on the icon (e.g., 5368 in FIG. 5GGG) in the plurality of icons that represents the second portion of the electronic document, the display of the plurality of icons (e.g., 5364, 5366, 5368, 5370, 5372, and 5374 in FIG. 5GGG) that represent respective portions of the electronic document is ceased (e.g., in FIG. 5HHH, the icons are no longer displayed).

In some embodiments, while displaying (620) the first portion of the electronic document, the device detects (694) a predefined gesture. In some embodiments, the predefined gesture is a gesture that is not used to trigger any other location-specific action. In some embodiments, the predefined gesture is a double-swipe gesture (e.g., a first swipe gesture and a subsequent a second swipe gesture, where the second swipe gesture is in substantially the same direction as the first swipe gesture and is detected within a predefined time period after the first swipe gesture is detected). For example, in FIG. 5HHH, the first swipe gesture includes a contact 5378 and subsequent movement 5380 of the first contact in a first direction, and the second swipe gesture includes a subsequent second contact 5382 and subsequent movement 5384 of the second contact in the first direction. In these embodiments, in response to the predefined gesture (e.g., the double swipe gesture), the device displays (695) a second portion of the electronic document that is associated with the predefined gesture. For example, in response to detecting the predefined gesture (e.g., the double-swipe gesture), the electronic document authoring application jumps to an initial portion of the electronic document (e.g., the first slide of a slide show, as illustrated in FIG. 5III).

It should be understood that in some embodiments, the predefined gesture is a multi-finger gesture (e.g., a four-finger swipe gesture) instead of the double swipe gesture discussed above. For example, in FIG. 5III, the predefined gesture includes a four finger swipe gesture including simultaneously detecting: a first swipe finger swipe including contact 5386 with the touch screen display 112 and movement 5388 of the contact across the display in a first direction, a second finger swipe including contact 5390 with the touch screen display 112 and movement 5392 of the contact across the display in the first direction, a third finger swipe including contact 5394 with the touch screen display 112 and movement 5396 of the contact across the display in the first direction, and a fourth finger swipe including contact 5398 with the touch screen display 112 and movement 5400 of the contact across the display in the first direction. In this example, in response to the predefined gesture (e.g., the four finger swipe gesture), the device displays a second portion of the electronic document that is associated with the predefined gesture. For example, in response to detecting the predefined gesture (e.g., the four finger swipe gesture), the electronic document authoring application jumps to a final portion of the electronic document (e.g., the last slide in the slide show, as illustrated in FIG. 5JJJ). It should be understood that, in some embodiments, the second portion of the document that is associated with the predefined gesture is determined at least in part based on the direction of the gesture (e.g., if the gesture is to the left or upwards, the predefined portion of the electronic document is a first portion of the electronic document; and if the gesture is to the right or downwards, the predefined portion of the electronic document is a last portion of the electronic document).

In some embodiments, while displaying (620) the first portion of the electronic document, the device detects (698) a predefined gesture. In some embodiments, the predefined gesture is a gesture that is not used to trigger any other location-specific action (e.g., a four-finger swipe gesture or a four-finger tap and drag gesture). For example, in FIG. 5JJJ, the predefined gesture includes a four finger swipe gestures, including simultaneously detecting: a first finger swipe including contact 5402 with the touch screen display 112 and movement 5404 of the contact across the display in a first direction, a second finger swipe including contact 5406 with the touch screen display 112 and movement 5408 of the contact across the display in the first direction, a third finger swipe including contact 5410 with the touch screen display 112 and movement 5412 of the contact across the display in the first direction, and a fourth finger swipe including contact 5414 with the touch screen display 112 and movement 5416 of the contact across the display in the first direction. In response to detecting the predefined gesture, the device ceases (699) to display the electronic document while remaining in the presentation mode of the electronic document authoring application (e.g., a predefined gesture for hiding the current view). In some embodiments, in response to another predefined gesture (e.g., a four finger swipe gesture in the opposite direction), the first portion of the electronic document is redisplayed (e.g., a predefined gesture for ceasing to hide the current view). In some embodiments, ceasing to display the electronic document includes displaying a black screen. In some embodiments, ceasing to display the first portion of the electronic document includes displaying a curtain over the display and displaying an animation of the curtain dropping over the display.

Figure 7:
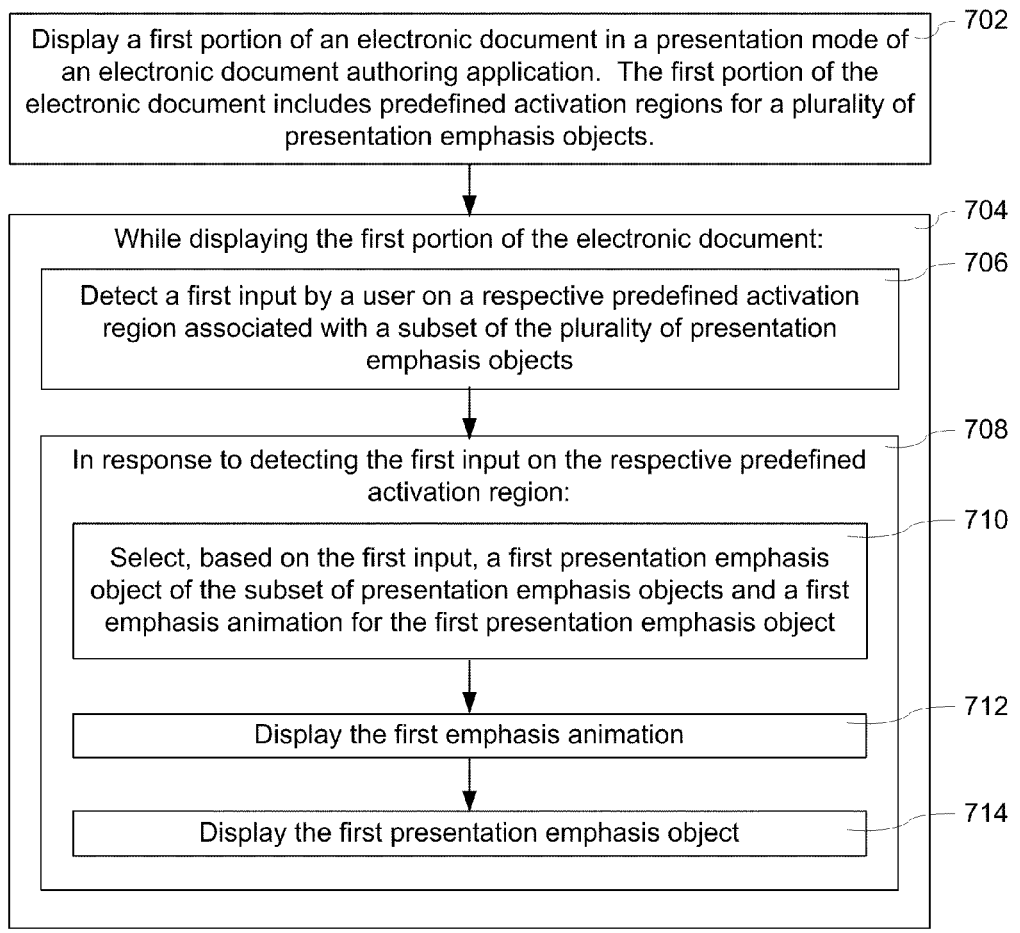
FIG. 7 is a flow diagram illustrating an alternative method of emphasizing elements of an electronic document by displaying emphasis animations for the electronic document in an electronic document authoring application in accordance with some embodiments.

FIG. 7 is a flow diagram illustrating a method 700 of emphasizing elements of an electronic document by displaying emphasis animations for the electronic document in an electronic document authoring application in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to emphasize elements of an electronic document by displaying emphasis animations for the electronic document in an electronic document authoring application in accordance with some embodiments. The method reduces the cognitive burden on a user when displaying an electronic document in the electronic document authoring application to another user, thereby creating a more efficient human-machine interface. For battery-operated computing devices, enabling a user to emphasize elements of an electronic document faster and more efficiently conserves power and increases the time between battery charges.

The device displays (702) a first portion of an electronic document (e.g., a slide in a presentation or a page in a spreadsheet or word-processing document, such as the "How to make a slide show" slide displayed on touch screen display 112 in FIG. 5C) in a presentation mode (e.g., a read-only mode, where no edits can take place in the electronic document) of an electronic document authoring application (e.g., Keynote, Pages, Numbers, Powerpoint, MS Word, Excel, MS Publisher, Adobe Photoshop, Adobe Acrobat, etc.). The first portion of the electronic document (e.g., the "How to make a slide show" slide displayed on touch screen display 112 in FIG. 5C) includes predefined activation regions for a plurality of presentation emphasis objects (e.g., activation region 5020 is for the slide title 5002, activation region 5022 is for the bulleted list item 5004 including the text "Create a slide" in FIG. 5E, activation region 5024 is for the bulleted list item 5006 including the text "Write a title for the slide" in FIG. 5E, activation region 5026 is for bulleted list item 5008 including the text "Insert images" in FIG. 5E, and activation region 5028 is for the bulleted list item 5010-*b* including the text "Add bullet points" in FIG. 5E). When the first portion of the electronic document is initially displayed, the presentation emphasis objects are typically not displayed. Instead, as explained in greater detail above, a respective presentation emphasis object typically appears in response to detecting a user input (e.g., a tap gesture) on a predefined activation region for the respective presentation emphasis object.

As described in greater detail above, in some embodiments, the electronic document is a presentation document. Similarly, as described in greater detail above, in some embodiments, the electronic document is a word-processing document, a spreadsheet, a desktop publishing document, an image document, a video document, or a drawing document. Additionally, as described in greater detail above, in some embodiments, the electronic document authoring application is a presentation application. Likewise, as described in greater detail above, in some embodiments, the electronic document authoring application is an image editing application, a drawing application, a word-processing application, a disc authoring application, or a spreadsheet application.

In accordance with some embodiments, operations 706-714 are performed while displaying (704) the first portion of the electronic document (e.g., the "How to make a slide show" slide displayed on touch screen display 112 in FIG. 5C). The device detects (706) a first input (e.g., tap gesture 5040 in FIG. 5C) by a user on a respective predefined activation region (e.g., 5024 in FIG. 5C) associated with a subset of the plurality of presentation emphasis objects (e.g., a first presentation emphasis object 5006 in FIG. 5C that includes the bulleted list item 5006 in FIG. 5B, and a second presentation emphasis object 5076 that includes an expanded representation of the bulleted list item 5006 in FIG. 5B). In some embodiments, the first input is a tap gesture or mouse click on a currently displayed object in the first portion of the electronic document or a hidden hit region for the first presentation emphasis object.

In accordance with some embodiments, operations 710-714 are performed in response (708) to detecting the first input (e.g., tap gesture 5040 in FIG. 5C) on the respective predefined activation region (e.g., 5024 in FIG. 5C). The device selects (710), based on the first input, a first presentation emphasis object of the subset of presentation emphasis objects and a first emphasis animation for the first presentation emphasis object (e.g., the device selects the first presentation emphasis object that includes the bulleted list item 5006, and displays the bulleted list item 5006 without any additional emphasis in FIG. 5E).

In some embodiments, the first emphasis animation is one of a plurality of animations for the first presentation emphasis object. In these embodiments, detecting a first type of input on the respective predefined activation region for the first presentation emphasis object results in selection and display of a first emphasis animation, detecting a second type of input on the respective predefined activation region for the first presentation emphasis object results in selection and display of a second emphasis animation, and so on, as described in greater detail above. Thus, while displaying the electronic document in presentation mode, the emphasis animations for the presentation emphasis objects may be activated "on the fly" by the user in a user-selected order. This flexibility enables a user to tailor their presentation to their audience in real time. In contrast, existing presentation applications present animations in a fixed, predefined order during the presentation. In other words, animations in existing presentation applications are part of a sequence of "builds" that are defined by a user of the electronic document authoring application in the edit mode of the application.

The device displays (712) the first emphasis animation. The device displays (714) the first presentation emphasis object (e.g., bulleted list item "Write a title for the slide" 5006 in FIG. 5E). In some embodiments, the first emphasis animation includes an animation of a currently displayed object (or portion thereof) that transitions to the presentation emphasis object. In some embodiments, the electronic document has multiple portions, and while the first portion is displayed only predefined activation regions in the first portion can be manipulated. Similarly, while a second portion of the electronic document is displayed, only predefined activation regions in the second portion can be manipulated. In some embodiments, while the document authoring application is in presentation mode, the device shifts from display of the first portion of the electronic document to a second portion of the electronic document in response to a predefined gesture (e.g., a multi-finger swipe gesture), as described in greater detail below.

Note that details of the processes described above with respect to method 600 (e.g., FIGS. 6A-6Q, and 5A-5JJJ) are also applicable in an analogous manner to the methods described above. For example, the presentation emphasis object and the emphasis animation described with reference to FIG. 7 may have one or more of the characteristics of the various presentation emphasis objects and emphasis animations described above with reference to method 600. For brevity, these details are not repeated here.

Additionally, it should be understood that while many of the preceding examples have been given with respect to particular electronic document authoring applications (e.g., a presentation application, a word-processing application, or a spreadsheet application), these examples are merely illustrative. For example, it should be understood that in accordance with some embodiments the emphasis animations and presentation emphasis objects displayed for a table or chart in response to user inputs while displaying the table or chart in a presentation mode of a spreadsheet application are the same as, or substantially similar to the emphasis animations and presentation emphasis objects displayed for a table or chart in response to user inputs while displaying the table or chart in a presentation mode of a presentation application, a word-processing application or some other electronic document authoring application. Similarly in some embodiments, the emphasis animations and presentation emphasis objects for images, bullet points, etc. are the same or similar across all of these various electronic document authoring applications.

The steps in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device, comprising:
   a touchscreen display;
   one or more processors;
   memory; and
   one or more programs, wherein the one or more programs are stored in the memory and configured to be executed by the one or more processors, the one or more programs including instructions for:
      running an electronic document authoring application, wherein:
         the electronic document authoring application has a plurality of modes of operation including an edit mode and a presentation mode; and
         while an electronic document authoring application is in the presentation mode, actions of a user do not cause the electronic document authoring application to edit documents in the electronic document authoring application;
      displaying, on the touchscreen display, a first portion of an electronic document in the presentation mode of the electronic document authoring application, wherein the first portion of the electronic document includes predefined activation regions for a plurality of presentation emphasis objects; and,
      while displaying the first portion of the electronic document in the presentation mode:
         detecting, on the touchscreen display, a first touch input that includes a finger gesture on a respective predefined activation region; and,
         in response to detecting the first touch input on the respective predefined activation region, performing a respective presentation operation proximate to the respective predefined activation region, wherein:
            in accordance with a determination that the first touch input is a first gesture on the respective predefined activation region, the respective presentation operation is a first presentation operation that includes:
               selecting a first emphasis animation for a first presentation emphasis object based on the first touch input;
               displaying the first emphasis animation; and
               displaying the first presentation emphasis object; and
            in accordance with a determination that the first touch input is a second gesture, distinct from the second gesture, on the respective predefined activation region, the respective operation is a second presentation operation different from the first presentation operation.

2. The device of claim 1, including instructions for, prior to displaying the first portion of the electronic document in the presentation mode of the electronic document authoring application:

displaying the electronic document in the edit mode of the electronic document authoring application;
detecting one or more user inputs;
editing the electronic document in accordance with the one or more user inputs;
detecting a user input that corresponds to a request to display the electronic document in the presentation mode of the electronic document authoring application; and,
in response to detecting the user input, displaying the electronic document in the presentation mode of the electronic document authoring application.

3. The device of claim 1, wherein:
the first touch input comprises a first select input and a second select input;
the respective predefined activation region includes a first cell in a table, wherein the first cell is associated with a first numerical value and the second cell is associated with a second numerical value;
the first presentation emphasis object is a calculated numerical value that is calculated based at least in part on the first numerical value and the second numerical value; and
the first emphasis animation comprises displaying the calculated numerical value.

4. The device of claim 3, wherein:
the calculated numerical value is calculated based at least in part on an order in which the first select input and the second select input were detected.

5. The device of claim 1, wherein:
the first touch input comprises a first select input and a second select input;
the respective predefined activation region includes a first portion of a chart and a second portion of the chart, wherein the first portion of the chart is associated with a first numerical value and the second portion of the chart is associated with a second numerical value;
the first presentation emphasis object is a calculated numerical value that is calculated based at least in part on the first numerical value and the second numerical value; and
the first emphasis animation comprises displaying the calculated numerical value.

6. The device of claim 1, wherein:
the first touch input is a de-pinch gesture;
the respective predefined activation region includes a first representation of a chart that includes a visual representation of a data series, wherein the first representation of the chart includes a first axis with a first range of values;
the first presentation emphasis object is a second representation of the chart, wherein the second representation of the chart includes a second axis that is parallel to the first axis, wherein the second axis includes a second range of values that is smaller than the first range of values; and
the first emphasis animation comprises transitioning from displaying the first representation of the chart to displaying the second representation of the chart.

7. The device of claim 1, wherein:
the first touch input is a flick gesture;
the respective predefined activation region includes a first representation of a chart that includes a visual representation of a data series, wherein the first representation of the chart includes a first axis with a first range of values;
the first presentation emphasis object is a second representation of the chart, wherein the second representation of the chart includes a second axis that is parallel to the first axis, wherein the second axis includes a second range of values that is distinct from the first range of values; and
the first emphasis animation comprises transitioning from displaying the first representation of the chart to displaying the second representation of the chart.

8. The device of claim 1, wherein:
the first touch input is a flick gesture;
the respective predefined activation region includes a placeholder area for a data series in a chart or graph;
the first presentation emphasis object is a visual representation of the data series in the chart or graph; and
the first emphasis animation comprises gradually displaying the visual representation of the data series in accordance with the flick gesture.

9. The device of claim 1, wherein:
the respective predefined activation region is for a subset of presentation emphasis objects including the first presentation emphasis object and a second presentation emphasis object different from the first presentation emphasis object, and
the device includes instructions for, while displaying the first portion of the electronic document in the presentation mode;
detecting a second touch input that includes a finger gesture on the respective predefined activation region, wherein the second touch input is different from the first touch input; and
in response to the second touch input on the respective predefined activation region;
selecting, based on the second touch input, the second presentation emphasis object of the subset of presentation emphasis objects and a second emphasis animation for the second presentation emphasis object;
displaying the second emphasis animation; and
displaying the second presentation emphasis object.

10. The device of claim 1, including instructions for, after displaying the first emphasis animation:
detecting a second touch input that includes a finger gesture on a respective predefined activation region for a second presentation emphasis object in the plurality of presentation emphasis objects;
in response to second touch input on the respective predefined activation region for the second presentation emphasis object:
ceasing to display the first presentation emphasis object;
selecting a second emphasis animation for the second presentation emphasis object based on the second touch input;
displaying the second emphasis animation; and
displaying the second presentation emphasis object.

11. A method, comprising:
at a computing device with a touchscreen display:
running an electronic document authoring application, wherein:
the electronic document authoring application has a plurality of modes of operation including an edit mode and a presentation mode; and
while an electronic document authoring application is in the presentation mode, actions of a user do not cause the electronic document authoring application to edit documents in the electronic document authoring application;
displaying, on the touchscreen display, a first portion of an electronic document in the presentation mode of the electronic document authoring application, wherein the first portion of the electronic document includes predefined activation regions for a plurality of presentation emphasis objects; and, while displaying the first portion of the electronic document in the presentation mode:
　detecting, on the touchscreen display, a first touch input that includes a finger gesture on a respective predefined activation region; and,
　in response to detecting the first touch input on the respective predefined activation region, performing a respective presentation operation proximate to the respective predefined activation region, wherein:
　　in accordance with a determination that the first touch input is a first gesture on the respective predefined activation region, the respective presentation operation is a first presentation operation that includes:
　　　selecting a first emphasis animation for a first presentation emphasis object based on the first touch input;
　　　displaying the first emphasis animation; and
　　　displaying the first presentation emphasis object; and
　　in accordance with a determination that the first touch input is a second gesture, distinct from the second gesture, on the respective predefined activation region, the respective operation is a second presentation operation different from the first presentation operation.

12. A non-transitory computer readable storage medium storing one or more programs, the one or more programs comprising instructions, which when executed by a computing device with a touchscreen display, cause the device to:
　run an electronic document authoring application, wherein:
　　the electronic document authoring application has a plurality of modes of operation including an edit mode and a presentation mode; and
　　while an electronic document authoring application is in the presentation mode, actions of a user do not cause the electronic document authoring application to edit documents in the electronic document authoring application;
　display, on the touchscreen display, a first portion of an electronic document in the presentation mode of the electronic document authoring application, wherein the first portion of the electronic document includes predefined activation regions for a plurality of presentation emphasis objects; and,
　while displaying the first portion of the electronic document in the presentation mode:
　　detect, on the touchscreen display, a first touch input that includes a finger gesture on a respective predefined activation region; and,
　　in response to detecting the first touch input on the respective predefined activation region, perform a respective presentation operation proximate to the respective predefined activation region, wherein:
　　　in accordance with a determination that the first touch input is a first gesture on the respective predefined activation region, the respective presentation operation is a first presentation operation that includes:
　　　　select a first emphasis animation for the first presentation emphasis object based on the first touch input;
　　　　display the first emphasis animation; and
　　　　display the first presentation emphasis object; and
　　　in accordance with a determination that the first touch input is a second gesture, distinct from the second gesture, on the respective predefined activation region, the respective operation is a second presentation operation different from the first presentation operation.

13. The method of claim 11, including, prior to displaying the first portion of the electronic document in the presentation mode of the electronic document authoring application:
　displaying the electronic document in the edit mode of the electronic document authoring application;
　detecting one or more user inputs;
　editing the electronic document in accordance with the one or more user inputs;
　detecting a user input that corresponds to a request to display the electronic document in the presentation mode of the electronic document authoring application; and,
　in response to detecting the user input, displaying the electronic document in the presentation mode of the electronic document authoring application.

14. The method of claim 11, wherein:
　the first touch input comprises a first select input and a second select input;
　the respective predefined activation region includes a first cell in a table, wherein the first cell is associated with a first numerical value and the second cell is associated with a second numerical value;
　the first presentation emphasis object is a calculated numerical value that is calculated based at least in part on the first numerical value and the second numerical value; and
　the first emphasis animation comprises displaying the calculated numerical value.

15. The method of claim 14, wherein:
　the calculated numerical value is calculated based at least in part on an order in which the first select input and the second select input were detected.

16. The method of claim 11, wherein:
　the first touch input comprises a first select input and a second select input;
　the respective predefined activation region includes a first portion of a chart and a second portion of the chart, wherein the first portion of the chart is associated with a first numerical value and the second portion of the chart is associated with a second numerical value;
　the first presentation emphasis object is a calculated numerical value that is calculated based at least in part on the first numerical value and the second numerical value; and
　the first emphasis animation comprises displaying the calculated numerical value.

17. The method of claim 11, wherein:
　the first touch input is a de-pinch gesture;
　the respective predefined activation region includes a first representation of a chart that includes a visual representation of a data series, wherein the first representation of the chart includes a first axis with a first range of values;
　the first presentation emphasis object is a second representation of the chart, wherein the second representation of the chart includes a second axis that is parallel to the first axis, wherein the second axis includes a second range of values that is smaller than the first range of values; and the first emphasis animation comprises transitioning from displaying the first representation of the chart to displaying the second representation of the chart.

18. The method of claim 11, wherein:
the first touch input is a flick gesture;
the respective predefined activation region includes a first representation of a chart that includes a visual representation of a data series, wherein the first representation of the chart includes a first axis with a first range of values;
the first presentation emphasis object is a second representation of the chart, wherein the second representation of the chart includes a second axis that is parallel to the first axis, wherein the second axis includes a second range of values that is distinct from the first range of values; and
the first emphasis animation comprises transitioning from displaying the first representation of the chart to displaying the second representation of the chart.

19. The method of claim 11, wherein:
the first touch input is a flick gesture;
the respective predefined activation region includes a placeholder area for a data series in a chart or graph;
the first presentation emphasis object is a visual representation of the data series in the chart or graph; and
the first emphasis animation comprises gradually displaying the visual representation of the data series in accordance with the flick gesture.

20. The method of claim 11, wherein:
the respective predefined activation region is for a subset of presentation emphasis objects including the first presentation emphasis object and a second presentation emphasis object different from the first presentation emphasis object, and
the method includes, while displaying the first portion of the electronic document in the presentation mode;
detecting a second touch input that includes a finger gesture on the respective predefined activation region, wherein the second touch input is different from the first touch input; and
in response to the second touch input on the respective predefined activation region;
selecting, based on the second touch input, the second presentation emphasis object of the subset of presentation emphasis objects and a second emphasis animation for the second presentation emphasis object;
displaying the second emphasis animation; and
displaying the second presentation emphasis object.

21. The method of claim 11, including, after displaying the first emphasis animation:
detecting a second touch input that includes a finger gesture on a respective predefined activation region for a second presentation emphasis object in the plurality of presentation emphasis objects;
in response to second touch input on the respective predefined activation region for the second presentation emphasis object:
ceasing to display the first presentation emphasis object;
selecting a second emphasis animation for the second presentation emphasis object based on the second touch input;
displaying the second emphasis animation; and
displaying the second presentation emphasis object.

22. The non-transitory computer readable storage medium of claim 12, including instructions to, prior to displaying the first portion of the electronic document in the presentation mode of the electronic document authoring application:

display the electronic document in the edit mode of the electronic document authoring application;
detect one or more user inputs;
edit the electronic document in accordance with the one or more user inputs;
detect a user input that corresponds to a request to display the electronic document in the presentation mode of the electronic document authoring application; and,
in response to detecting the user input, display the electronic document in the presentation mode of the electronic document authoring application.

23. The non-transitory computer readable storage medium of claim 12, wherein:
the first touch input comprises a first select input and a second select input;
the respective predefined activation region includes a first cell in a table, wherein the first cell is associated with a first numerical value and the second cell is associated with a second numerical value;
the first presentation emphasis object is a calculated numerical value that is calculated based at least in part on the first numerical value and the second numerical value; and
the first emphasis animation comprises displaying the calculated numerical value.

24. The non-transitory computer readable storage medium of claim 23, wherein:
the calculated numerical value is calculated based at least in part on an order in which the first select input and the second select input were detected.

25. The non-transitory computer readable storage medium of claim 12, wherein:
the first touch input comprises a first select input and a second select input;
the respective predefined activation region includes a first portion of a chart and a second portion of the chart, wherein the first portion of the chart is associated with a first numerical value and the second portion of the chart is associated with a second numerical value;
the first presentation emphasis object is a calculated numerical value that is calculated based at least in part on the first numerical value and the second numerical value; and
the first emphasis animation comprises displaying the calculated numerical value.

26. The non-transitory computer readable storage medium of claim 12, wherein:
the first touch input is a de-pinch gesture;
the respective predefined activation region includes a first representation of a chart that includes a visual representation of a data series, wherein the first representation of the chart includes a first axis with a first range of values;
the first presentation emphasis object is a second representation of the chart, wherein the second representation of the chart includes a second axis that is parallel to the first axis, wherein the second axis includes a second range of values that is smaller than the first range of values; and
the first emphasis animation comprises transitioning from displaying the first representation of the chart to displaying the second representation of the chart.

27. The non-transitory computer readable storage medium of claim 12, wherein:
the first touch input is a flick gesture;
the respective predefined activation region includes a first representation of a chart that includes a visual representation of a data series, wherein the first representation of the chart includes a first axis with a first range of values;

the first presentation emphasis object is a second representation of the chart, wherein the second representation of the chart includes a second axis that is parallel to the first axis, wherein the second axis includes a second range of values that is distinct from the first range of values; and the first emphasis animation comprises transitioning from displaying the first representation of the chart to displaying the second representation of the chart.

28. The non-transitory computer readable storage medium of claim 12, wherein:

the first touch input is a flick gesture;

the respective predefined activation region includes a placeholder area for a data series in a chart or graph;

the first presentation emphasis object is a visual representation of the data series in the chart or graph; and the first emphasis animation comprises gradually displaying the visual representation of the data series in accordance with the flick gesture.

29. The non-transitory computer readable storage medium of claim 12, wherein:

the respective predefined activation region is for a subset of presentation emphasis objects including the first presentation emphasis object and a second presentation emphasis object different from the first presentation emphasis object, and the computer readable storage medium includes instructions to, while displaying the first portion of the electronic document in the presentation mode;

detect a second touch input that includes a finger gesture on the respective predefined activation region, wherein the second touch input is different from the first touch input; and in response to the second touch input on the respective predefined activation region;

select, based on the second touch input, the second presentation emphasis object of the subset of presentation emphasis objects and a second emphasis animation for the second presentation emphasis object;

display the second emphasis animation; and display the second presentation emphasis object.

30. The non-transitory computer readable storage medium of claim 12, including instructions to, after displaying the first emphasis animation:

detect a second touch input that includes a finger gesture on a respective predefined activation region for a second presentation emphasis object in the plurality of presentation emphasis objects;

in response to second touch input on the respective predefined activation region for the second presentation emphasis object:

cease to display the first presentation emphasis object;

select a second emphasis animation for the second presentation emphasis object based on the second touch input;

display the second emphasis animation; and display the second presentation emphasis object.

* * * * *